(12) United States Patent
Inoue et al.

(10) Patent No.: US 7,053,159 B2
(45) Date of Patent: May 30, 2006

(54) PROCESS FOR PRODUCING POLAR OLEFIN COPOLYMER AND POLAR OLEFIN COPOLYMER OBTAINED THEREBY

(75) Inventors: Yoshihisa Inoue, Sodegaura (JP);
Shigekazu Matsui, Sodegaura (JP);
Yasuhiko Suzuki, Sodegaura (JP);
Yasunori Yoshida, Sodegaura (JP);
Yukihiro Takagi, Sodegaura (JP);
Terunori Fujita, Sodegaura (JP);
Tomoaki Matsugi, Sodegaura (JP);
Takashi Nakano, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 325 days.

(21) Appl. No.: 09/897,111

(22) Filed: Jul. 3, 2001

(65) Prior Publication Data
US 2002/0099155 A1 Jul. 25, 2002

(30) Foreign Application Priority Data
Jul. 4, 2000 (JP) .............................. 2000-202571

(51) Int. Cl.
C08F 4/44 (2006.01)
C08F 4/602 (2006.01)
C08F 4/605 (2006.01)
C08F 4/10 (2006.01)

(52) U.S. Cl. ...................... 526/161; 526/172; 526/135; 526/141

(58) Field of Classification Search ................ 526/135, 526/141, 161, 172
See application file for complete search history.

(56) References Cited

U.S. PATENT DOCUMENTS

| 5,321,106 A | 6/1994 | LaPointe | |
|---|---|---|---|
| 6,197,715 B1 * | 3/2001 | Bansleben et al. | |
| 6,399,724 B1 * | 6/2002 | Matsui et al. | |
| 6,410,664 B1 * | 6/2002 | Bansleben et al. | |
| 6,506,861 B1 * | 1/2003 | Wang et al. | 526/172 |
| 6,559,091 B1 * | 5/2003 | Moody et al. | 502/167 |

FOREIGN PATENT DOCUMENTS

| EP | 0426637 | 5/1991 |
|---|---|---|
| EP | 0426638 | 5/1991 |
| EP | 0427696 | 5/1991 |
| EP | 0427697 | 5/1991 |
| EP | 0 889 061 A1 | 1/1999 |
| EP | 0 990 664 A1 | 4/2000 |
| EP | 1 008 595 A2 | 6/2000 |
| JP | 1501950 | 7/1989 |
| JP | 1502036 | 7/1989 |
| JP | 278687 | 3/1990 |
| JP | 3179005 | 8/1991 |
| JP | 3179006 | 8/1991 |
| JP | 3207703 | 9/1991 |
| JP | 3207704 | 9/1991 |
| JP | 11 199592 | 7/1999 |
| JP | 2001 261638 | 9/2001 |
| WO | WO 8800223 | 1/1988 |
| WO | WO 8805792 | 8/1988 |
| WO | WO 99/19335 | 4/1999 |
| WO | WO 02/02649 A1 | 1/2002 |

OTHER PUBLICATIONS

Stefan Mecking et al.; J. Am. Chem. Soc. 1998, 120, pp. 888-899.
Todd R. Younkin et al.; Science, Jan. 21, 2000, vol. 287, pp. 460-462.
Mecking et al.; Journal of the American Chemical Society, 1998, vol. 120, pp. 888-899.

* cited by examiner

*Primary Examiner*—Caixia Lu
(74) *Attorney, Agent, or Firm*—Birch, Stewart, Kolasch & Birch, LLP

(57) ABSTRACT

A process for producing a polar olefin copolymer comprises copolymerizing a non-polar olefin and a polar olefin in the presence of a transition metal compound selected from Groups 4, 5, 6 and 11 of the periodic table, which is represented by the following formula (IV):

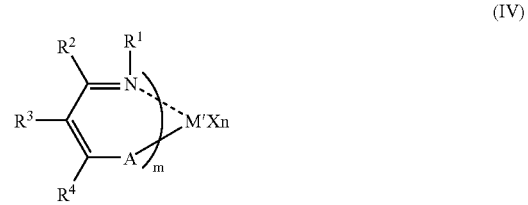

(IV)

wherein M' is a transition metal atom selected from Groups 4, 5, 6 and 11 of the periodic table, m is an integer of 1 to 6, A is —O—, —Si—, —Se—, —N($R^6$)—, n is a number satisfying a valence of M', $R^1$ to $R^4$ and $R^6$ are each a hydrogen atom, a halogen atom, a hydrocarbon group and the like, and X is a halogen atom, an oxygen atom, a hydrocarbon group and the like, and at least one compound (B) selected from the group consisting of an organometallic compound (B-1), an organoaluminum oxy-compound (B-2) and an ionic ionizing compound (B-3). Therefore, the process is capable of obtaining a polar olefin copolymer having excellent properties under mild polymerization conditions.

3 Claims, 1 Drawing Sheet

Fig. 1

(A) Transition metal component

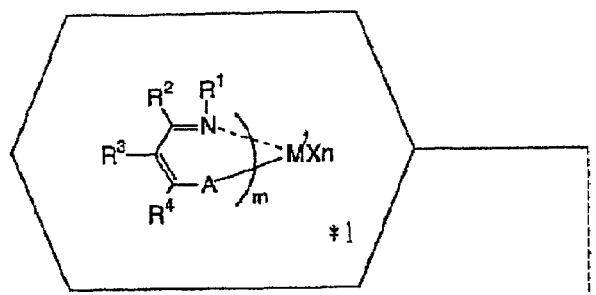

(B) Organometallic component

- Organometallic compound
- Organoaluminum oxy-compound
- Ionizing ionic compound (C) The third component
(Carrier)

Non-polar olefin
Polar olefin

*1 M: a transition metal atom of the group 4, 5, 6 or 11
m: an integer of 1 to 6
A: $-O-$, $-S-$, $-Se-$, $-N(R^6)-$
$R^1$ to $R^4$ and $R^6$: a hydrogen atom, a hydrocarbon group, and the like
X: a halogen atom, an oxygen atom, a hydrocarbon group, and the like

PROCESS FOR PRODUCING POLAR OLEFIN COPOLYMER AND POLAR OLEFIN COPOLYMER OBTAINED THEREBY

FIELD OF THE INVENTION

The present invention relates to a process for producing a polar olefin copolymer and a polar olefin copolymer obtained by the process. More particularly relates to a process for producing a polar olefin copolymer comprising copolymerizing a non-polar olefin and a polar olefin in the presence of a specific catalyst and a polar olefin copolymer obtained by the process.

BACKGROUND OF THE INVENTION

The olefin polymer is generally excellent in mechanical properties, and hence has widely been employed in varied fields such as ones of molded products of all sorts. However, since the demands for physical properties of olefin polymers have been diversified recently, olefin polymers with various properties have increasingly been desired.

As an example of olefin polymers satisfying such demands, known is a polar olefin copolymer obtained by copolymerizing a non-polar olefin and a polar olefin to provide properties which cannot be expected in a polymer consisting of non-polar olefins only. Radical polymerization method is well known as a conventional process for producing a polar olefin copolymer by copolymerizing a non-polar olefin and a polar olefin, and for example, ethylene-vinyl acetate copolymers and ethylene-acrylic ester copolymers have been produced by this method.

In producing a polar olefin copolymer by the radical polymerization method, reaction conditions at a high temperature and under high pressure are often required. In view of such circumstances, there has been desired a process capable of producing a polar olefin copolymer under more moderate conditions.

As a process for producing a polar olefin copolymer under less strict conditions than the conventional ones, the process for copolymerizing a non-polar olefin and a polar olefin using a transition metal complex catalyst has been reported recently. For example, Brookhart et al. disclosed a process for producing a copolymer of a non-polar olefin such as ethylene and methyl acrylate under moderate conditions using a diimine complex of palladium (J. Am. Chem. Soc. 1998, 120, 888 etc.). There are only a few cases, however, in which a non-polar olefin and a polar olefin have been copolymerized by using a transition metal complex catalyst, and the kinds of polar olefins employable to be copolymerized are still limited.

In the above situation, there has been desired the development of a process for producing a polar olefin copolymer which is superior in the capacity for copolymerizing a polar olefin and capable of obtaining a polar olefin copolymer with excellent properties.

OBJECT OF THE INVENTION

The present invention has been made in light of the above situation of the prior art. An object of the present invention is to provide a process for producing a polar olefin copolymer capable of obtaining a polar olefin copolymer with excellent properties under mild polymerization conditions, and also to provide a polar olefin copolymer obtained by the process.

SUMMARY OF THE INVENTION

The process for preparing a polar olefin copolymer of the present invention comprises:

copolymerizing a non-polar olefin and a polar olefin in the presence of a catalyst comprising (A0) a compound of a transition metal selected from Groups 3 to 11 of the periodic table, which is represented by the following formula (1):

$$L_m M X_n \qquad (1)$$

wherein M is a transition metal atom selected from Groups 3 to 11 of the periodic table, m is an integer of 1 to 6, n is a number satisfying a valence of M, L is a ligand coordinated to M and each ligand L has a feature that when the value obtained by subtracting the total sum of the whole energy, as determined by a density functional method, of the compounds on the left-hand member from the whole energy, as determined by a density functional method, of the compound on the right-hand member in the following chemical formula (2) and the value obtained by the same subtraction in the following chemical formula (3) are defined as coordination energy $E_1$ of ethylene and coordination energy $E_2$ of methyl acrylate, respectively, the difference $\Delta E$ ($\Delta E = E_1 - E_2$) between the coordination energy $E_1$ of ethylene and the coordination energy $E_2$ of methyl acrylate is 50 kJ/mol or less,

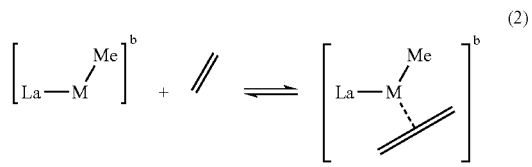

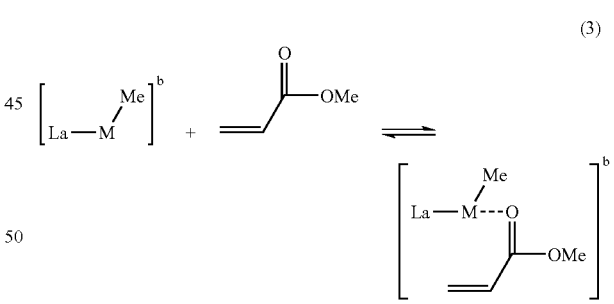

wherein M is the same transition metal atom selected from Groups 3 to 11 of the periodic table as M in the formula (1), a is an integer of 1 to 3, b is an electric charge of the compound in the blankets [ ] and is 0 or +1, and Me is a methyl group, and X is a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, silicon-containing group, a germanium-containing group and a tin-containing group, and when n is 2 or greater, plural atoms or groups indicated by X may be the same or different, and plural groups indicated by X may be bonded to each other to form a ring.

The other embodiment of the process for preparing a polar olefin copolymer of the invention comprises:

copolymerizing a non-polar olefin and a polar olefin in the presence of a catalyst comprising (A0) a compound of a transition metal selected from Groups 3 to 11 of the periodic table, which is represented by the above formula (1), and (B) at least one compound selected from the group consisting of (B-1) an organometallic compound, (B-2) an organoaluminum oxy-compound, and (B-3) a compound which reacts with a transition metal compound (A0) to form an ion pair.

In the present invention, the transition metal compound of the formula (1) is preferably a compound of a transition metal selected from Groups 4, 5, 6 and 11 of the periodic table.

Further, the other embodiment of the process for producing a polar olefin copolymer of the invention comprises:

copolymerizing a non-polar olefin and a polar olefin in the presence of a catalyst comprising:

(A1) a reaction product of (C) a compound of a transition metal selected from Groups 4, 5, 6 and 11 of the periodic table which is represented by the following formula (c):

$$M'X_k \tag{c}$$

wherein M' is a transition metal atom selected from Groups 4, 5, 6 and 11 of the periodic table, k is a number satisfying a valence of M', and X is a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group, and when k is 2 or greater, plural atoms or groups indicated by X may be the same or different, and plural groups indicated by X may be bonded to each other to form a ring, and (A-i) a compound represented by the following formula (I):

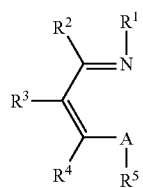

(I)

wherein A is an oxygen atom, a sulfur atom or a selenium atom, or a nitrogen atom having a substituent $R^6$, and $R^1$ to $R^6$ may be the same or different, they are each a hydrogen atom, a halogen atom, a hydrocarbon group, an oxygen-containing group, a sulfur-containing group, a nitrogen-containing group, a boron-containing group, an aluminum-containing group, a phosphorus-containing group, a heterocyclic compound residual group, a silicon-containing group, a germanium-containing group or a tin-containing group, two or more of them may be bonded to each other to form a ring; and (B) at least one compound selected from the group consisting of:

(B-1) an organometallic compound, (B-2) an organoaluminum oxy-compound, and (B-3) a compound which reacts with the reaction product (A1) to form an ion pair.

Further, the other embodiment of the process for producing a polar olefin of the invention comprises:

copolymerizing a non-polar olefin and a polar olefin in the presence of a catalyst comprising:

(A2) a reaction product of (C) a compound of a transition metal selected from Groups 4, 5, 6 and 11 of the periodic table, which is represented by the above formula (c), and (A-ii) a compound represented by the following formula (II):

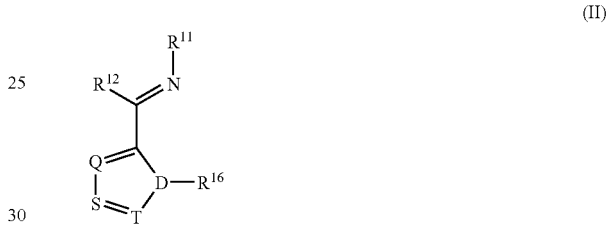

(II)

wherein D is a nitrogen atom or a phosphorus atom,

Q is a nitrogen atom or a phosphorus atom, or a carbon atom substituted with a substituent $R^{13}$, S is a nitrogen atom or a phosphorus atom, or a carbon atom substituted with a substituent $R^{14}$, T is a nitrogen atom or a phosphorus atom, or a carbon atom substituted with a substituent $R^{15}$, $R^{11}$ to $R^{16}$ may be the same or different, they are each a hydrogen atom, a halogen atom, a hydrocarbon group, an oxygen-containing group, a sulfur-containing group, a nitrogen-containing group, a boron-containing group, an aluminum-containing group, a phosphorus-containing group, a heterocyclic compound residual group, a silicon-containing group, a germanium-containing group or a tin-containing group, two or more of them may be bonded to each other to form a ring; and (B) at least one compound selected from the group consisting of:

(B-1) an organometallic compound, (B-2) an organoaluminum oxy-compound, and (B-3) a compound which reacts with the reaction product (A2) to form an ion pair.

Further, the other embodiment of the process for producing a polar olefin copolymer of the invention comprises:

copolymerizing a non-polar olefin and a polar olefin in the presence of a catalyst comprising:

(A3) a reaction product of (C') a compound of a transition metal selected from Groups 3 to 11 of the periodic table, which is represented by the following formula (c'):

$$MX_k \tag{c'}$$

wherein M is a transition metal atom selected from Groups 3 to 11 of the periodic table, k is a number satisfying a valence of M, and X is a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group, and when k is 2 or greater, plural atoms or groups indicated by X may be the same or different, and plural groups indicated by X may be bonded to each other to form a ring, and (A-iii) a compound represented by the following formula (III):

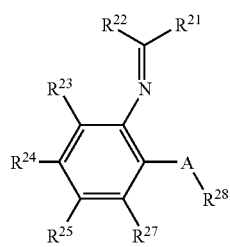

wherein A is an oxygen atom, a sulfur atom or a selenium atom, or a nitrogen atom having a substituent $R^{26}$, and $R^{21}$ to $R^{28}$ may be the same or different, they are each a hydrogen atom, a halogen atom, a hydrocarbon group, an oxygen-containing group, a sulfur-containing group, a nitrogen-containing group, a boron-containing group, an aluminum-containing group, a phosphorus-containing group, a heterocyclic compound residual group, a silicon-containing group, a germanium-containing group or a tin-containing group, two or more of them may be bonded to each other to form a ring.

The other embodiment of the process for producing a polar olefin copolymer of the invention comprises:

copolymerizing a non-polar olefin and a polar olefin in the presence of a catalyst comprising:

(A3) a reaction product of (C') a compound of a transition metal selected from Groups 3 to 11 of the periodic table, which is represented by the above formula (c'), and (A-iii) a compound represented by the above formula (III); and (B) at least one compound selected from the group consisting of:

(B-1) an organometallic compound, (B-2) an organoaluminum oxy-compound, and (B-3) a compound which reacts with the transition metal compound (A3) to form an ion pair.

In the present invention, the transition metal compound of the formula (c') is preferably a compound of a transition metal selected from Groups 4, 5, 6 and 11 of the periodic table.

Further, the other embodiment of the process for producing a polar olefin copolymer of the invention comprises:

copolymerizing a non-polar olefin and a polar olefin in the presence of a catalyst comprising:

(A4) a compound of a transition metal selected from Groups 4, 5, 6 and 11 of the periodic table, which is represented by the following formula (IV):

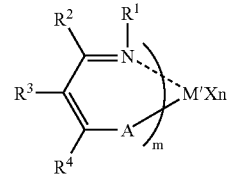

wherein M' has the same meaning as that of M' in the formula (c), m is an integer of 1 to 6, A, $R^1$ to $R^4$ and $R^6$ have the same meanings as those of A, $R^1$ to $R^4$ and $R^6$ in the formula (I), n is a number satisfying a valence of M', and X has the same meaning as that of X in the formula (1), and when n is 2 or greater, plural atoms or groups indicated by X may be the same or different, and plural groups indicated by X may be bonded to each other to form a ring, and (B) at least one compound selected from the group consisting of:

(B-1) an organometallic compound, (B-2) an organoaluminum oxy-compound, and (B-3) a compound which reacts with the transition metal compound (A4) to form an ion pair.

Further, the other embodiment of the process for producing a polar olefin copolymer of the invention comprises:

copolymerizing a non-polar olefin and a polar olefin in the presence of a catalyst comprising:

(A5) a compound of a transition metal selected from Groups 4, 5, 6 and 11 of the periodic table which is represented by the following formula (V)

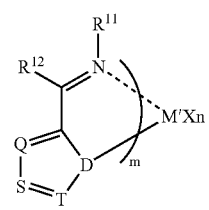

wherein M' has the same meaning as that of M' in the formula (c), m is an integer of 1 to 6, D, Q, S, T and $R^{11}$ to $R^{15}$ have the same meanings as those of D, Q, S, T and $R^{11}$ to $R^{15}$ in the formula (II), n is a number satisfying a valence of M', and X has the same meaning as that of X in the formula (1), and when n is 2 or greater, plural atoms or groups indicated by X may be the same or different, and plural groups indicated by X may be bonded to each other to form a ring, and (B) at least one compound selected from the group consisting of:

(B-1) an organometallic compound, (B-2) an organoaluminum oxy-compound, and (B-3) a compound which reacts with the transition metal compound (A5) to form an ion pair.

Further, the other embodiment of the process for producing a polar olefin copolymer of the invention comprises:

copolymerizing a non-polar olefin and a polar olefin in the presence of a catalyst comprising:

(A6) a compound of a transition metal selected from Groups 3 to 11 of the periodic table, which is represented by the following formula (VI):

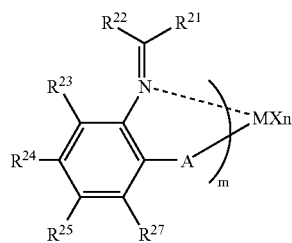

(VI)

wherein M has the same meaning as that of M in the formula (C'), m is an integer of 1 to 6, A and $R^{21}$ to $R^{27}$ have the same meanings as those of A and $R^{21}$ to $R^{27}$ in the formula (III), n is a number satisfying a valence of M, and X has the same meaning as that of X in the formula (1), and when n is 2 or greater, plural atoms or groups indicated by X may be the same or different, and plural groups indicated by X may be bonded to each other to form a ring.

The other embodiment of the process for producing a polar olefin copolymer of the present invention comprises copolymerizing a non-polar olefin and a polar olefin in the presence of a catalyst comprising:

(A6) a compound of a transition metal selected from Groups 3 to 11 of the periodic table, which is represented by the above formula (VI), and (B) at least one compound selected from the group consisting of:

(B-1) an organometallic compound, (B-2) an organoaluminum oxy-compound, and (B-3) a compound which reacts with the transition metal compound (A6) to form an ion pair.

In the present invention, the transition metal compound of the formula (VI) is preferably a compound of a transition metal selected from Groups 4, 5, 6 and 11 of the periodic table.

The polar olefin copolymer of the present invention is obtained by any of the above processes.

Hereinafter, a compound which reacts with a reaction product (A1) to form an ion pair, a compound which reacts with a reaction product (A2) to form an ion pair, a compound which reacts with a reaction product (A3) to form an ion pair, a compound which reacts with a transition metal compound (A4) to form an ion pair, a compound which reacts with a transition metal compound (A5) to form an ion pair and a compound which reacts with a transition metal compound (A6) to form an ion pair are referred to as "ionizing ionic compound".

BRIEF DESCRIPTION OF THE DRAWING

FIG. 1 is an explanatory diagram, which illustrates one embodiment of the preparation process of an olefin polymerization catalyst to be used in the present invention.

DETAILED DESCRIPTION OF THE INVENTION

The process for preparing a polar olefin copolymer according to the present invention is described in detail hereinafter.

The process for preparing a polar olefin copolymer according to the invention comprises:

copolymerizing a non-polar olefin and a polar olefin in the presence of a catalyst comprising a compound (A0) of a transition metal selected from Groups 3 to 11 of the periodic table, which is represented by the formula (1) wherein each ligand L has a feature that when the value obtained by subtracting the total sum of the whole energy, as determined by a density functional method, of the compounds on the left-hand member from the whole energy, as determined by a density functional method, of the compound on the right-hand member in the chemical formula (2) and the value obtained by the same subtraction in the chemical formula (3) are defined as coordination energy $E_1$ of ethylene and coordination energy $E_2$ of methyl acrylate, respectively, the difference $\Delta E$ ($\Delta E = E_1 - E_2$) between the coordination energy $E_1$ of ethylene and the coordination energy $E_2$ of methyl acrylate is not more than 50 kJ/mol, and optionally, at least one compound (B) selected from the group consisting of an organometallic compound (B-1), an organoaluminum oxy-compound (B-2) and an ionizing ionic compound (B-3); or copolymerizing a non-polar olefin and a polar olefin in the presence of a catalyst comprising a reaction product of a compound (C) of a transition metal selected from Groups 4, 5, 6 and 11 of the periodic table, said compound (C) being represented by the following formula (c), and a compound represented by the following formula (I) or (II), and at least one compound (B) selected from the group consisting of an organometallic compound (B-1), an organoaluminum oxy-compound (B-2) and an ionizing ionic compound (B-3); or copolymerizing a non-polar olefin and a polar olefin in the presence of a catalyst comprising a reaction product of a compound (C') of a transition metal selected from Groups 3 to 11 of the periodic table, said compound (C') being represented by the following formula (c'), and a compound represented by the following formula (III), and optionally, at least one compound (B) selected from the group consisting of an organometallic compound (B-1), an organoaluminum oxy-compound (B-2) and an ionizing ionic compound (B-3); or copolymerizing a non-polar olefin and a polar olefin in the presence of a catalyst comprising a compound of a transition metal selected from Groups 4, 5, 6 and 11 of the periodic table, said compound being represented by the following formula (IV) or (V), and at least one compound (B) selected from the group consisting of an organometallic compound (B-1), an organoaluminum oxy-compound (B-2) and an ionizing ionic compound (B-3); or copolymerizing a non-polar olefin and a polar olefin in the presence of a catalyst comprising a compound of a transition metal selected from Groups 3 to 11 of the periodic table, said compound being represented by the following formula (VI), and optionally, at least one compound (B) selected from the group consisting of an organometallic compound (B-1), an organoaluminum oxy-compound (B-2) and an ionizing ionic compound (B-3).

At first, the components forming the catalyst employed in the present invention are described below in order.

Transition Metal Compound (A0)

The transition metal compound (A0) is represented by the following formula (1)

$$L_m MX_n \quad (1)$$

In the formula (1), M is a transition metal atom selected from Groups 3 to 11, preferably Groups 4, 5, 6 and 11, of the periodic table. Specific examples of such transition metal atoms include scandium, yttrium, lanthanoid, titanium, zirconium, hafnium, vanadium, niobium, tantalum, chromium, molybdenum, tungsten, manganese, rhenium, iron, ruthenium, cobalt, rhodium, nickel, palladium, platinum, copper and silver. Of these, preferable are transition metal atoms selected from Groups 4, 5, 6 and 11 of the periodic table, such as titanium, zirconium, hafnium, vanadium, niobium, tantalum, chromium, molybdenum, tungsten, copper and silver, and more preferable are titanium, vanadium and chromium.

In the formula (1), m is an integer of 1 to 6, preferably an integer of 1 to 4.

In the formula (1), n is a number satisfying a valence of M, specifically an integer of 0 to 5, preferably an integer of 1 to 4, more preferably an integer of 1 to 3.

In the formula (1), L is a ligand coordinated to M and each ligand L has a feature that when the value obtained by subtracting the total sum of the whole energy, as determined by a density functional method, of the compounds on the left-hand member from the whole energy, as determined by a density functional method, of the compound on the right-hand member in the chemical formula (2) and the value obtained by the same subtraction in the chemical formula (3) are defined as coordination energy $E_1$ of ethylene and coordination energy $E_2$ of methyl acrylate, respectively, the difference $\Delta E$ ($\Delta E = E_1 - E_2$) between the coordination energy $E_1$ of ethylene and the coordination energy $E_2$ of methyl acrylate is not more than 50 kJ/mol.

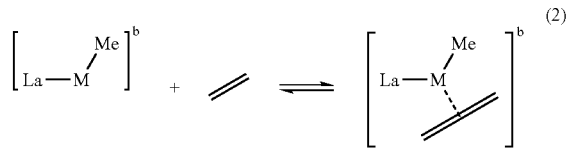

(2)

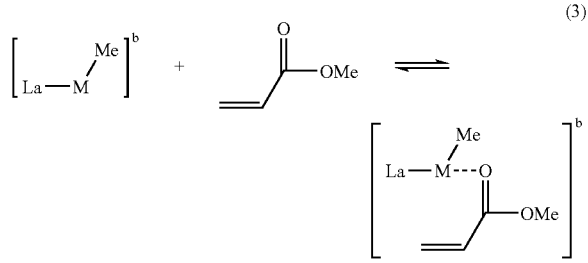

(3)

In the chemical formulas (2) and (3), M is the same transition metal atom selected from Groups 3 to 11 of the periodic table as M in the formula (1).

This ligand L may take any coordination form to the metal so long as the coordination energy difference $\Delta E$ is not more than 50 kJ/mol. Examples of the coordination forms include covalent bond, coordinate bond, ionic bond and hydrogen bond. Further, the ligand L may be a monodentate ligand or a polydentate ligand such as a bidentate ligand coordinated to the transition metal atom M, and to the metal, any atom of the ligand L may be coordinated.

In the chemical formulas (2) and (3), a is a number of the ligands L, and b is an electric charge of the compound in the brackets [ ]. b is 0 or +1. a is determined by the ligand L and a valence of the transition metal atom M, and is selected from integers of 1 to 3 so that the electric charge of the compound [$L_a$-M-Me] can be 0 or +1.

In the chemical formulas (2) and (3), Me is a methyl group.

In the process of the invention, the value obtained by subtracting the total sum of the whole energy, as determined by a density functional method, of the compounds on the left-hand member from the whole energy, as determined by a density functional method, of the compound on the right-hand member in the chemical formula (2) and the value obtained by the same subtraction in the chemical formula (3) are defined as coordination energy $E_1$ of ethylene and coordination energy $E_2$ of methyl acrylate, respectively.

The density functional method used herein means calculation using Program ADF2000.01 and using BLYP method.

In the calculation procedure, the structure of each compound in the chemical formulas (2) and (3) is optimized, and the whole energy of each compound having the optimized structure is calculated. Then, the total sum of the whole energy of the compounds on the left-hand member in the chemical formula (2) is subtracted from the whole energy of the compound on the right-hand member in the chemical formula (2), and the value obtained is taken as coordination energy $E_1$ of ethylene. Likewise, the total sum of the whole energy of the compounds on the left-hand member in the chemical formula (3) is subtracted from the whole energy of the compound on the right-hand member in the chemical formula (3), and the value obtained is taken as coordination energy $E_2$ of methyl acrylate.

In the optimization of the structure, for the central metal, a triple zeta type function is used as a basis function, for atoms bonded to the metal atom among a methyl group coordinated to the central metal, all atoms in ethylene and methyl acrylate and atoms in the ligand L, double zeta type functions are used as basis functions, and for the other atoms, single zeta type functions are used as basis functions. In the chemical formula (3), a structure in which oxygen of the carbonyl group is coordinated to the central metal M of the complex is shown as a coordination structure of methyl acrylate, and the coordination structure is determined by the result of the structure optimization calculation. As a result of the calculation, if the olefinic carbon of methyl acrylate and the central metal M have mutual interaction, the whole energy of the compound is calculated using the structure.

Then, the whole energy of the thus obtained optimum structure is calculated. In this case, for the central metal, a triple zeta type function is used as a basis function, and for the other atoms, functions obtained by adding polarization functions to double zeta type functions are used as basis functions. In addition, correction of Pauli's relativistic potential is made. Based on the whole energy of each compound, the total sum of the whole energy of the compounds on the left-hand member is subtracted from the whole energy of the compound on the right-hand member in each of the chemical formulas (2) and (3), and the values obtained on the chemical formulas (2) and (3) are taken as coordination energy $E_1$ of ethylene and coordination energy $E_2$ of methyl acrylate, respectively. Then, the difference $\Delta E$ between the coordination energy $E_1$ of ethylene and the coordination energy $E_2$ of methyl acrylate is calculated according to the equation $\Delta E = E_1 - E_2$.

In the present invention, a non-polar olefin and a polar olefin are copolymerized in the presence of a catalyst comprising a compound of a transition metal selected from Groups 3 to 11 of the periodic table, said compound containing each ligand L having a difference $\Delta E$, between the coordination energy of ethylene and the coordination energy of methyl acrylate, of not more than 50 kJ/mol and being represented by the above formula (1).

Each of the coordination energy $E_1$ of ethylene and the coordination energy $E_2$ of methyl acrylate indicates a degree of stabilization due to coordination of each monomer to the transition metal, and the difference $\Delta E$ is a measure of difference between the degrees of stabilization. In the present invention, the difference $\Delta E$ is not more than 50 kJ/mol, preferably not more than 30 kJ/mol, more preferably not more than 20 kJ/mol.

In the formula (1), X denotes a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group. When X is an oxygen atom, M and X are bonded through a double bond.

Examples of the halogen atoms include fluorine, chlorine, bromine and iodine.

Examples of the hydrocarbon groups include alkyl groups such as methyl, ethyl, propyl, butyl, hexyl, octyl, nonyl, dodecyl and eicosyl; cycloalkyl groups of 3 to 30 carbon atoms such as cyclopentyl, cyclohexyl, norbornyl and adamantyl; alkenyl groups such as vinyl, propenyl and cyclohexenyl; arylalkyl groups such as benzyl, phenylethyl and phenylpropyl; and aryl groups such as phenyl, tolyl, dimethylphenyl, trimethylphenyl, ethylphenyl, propylphenyl, biphenyl, naphthyl, methylnaphthyl, anthryl and phenanthryl. These hydrocarbon groups may also include halogenated hydrocarbon groups, specifically those groups of 1 to 30 carbon atoms in which at least one hydrogen is replaced with halogen. Of these, hydrocarbon groups of 1 to 20 carbon atoms are preferable.

Examples of the oxygen-containing groups include an oxy group; a peroxy group; a hydroxy group; a hydroperoxy group; alkoxy groups such as methoxy, ethoxy, propoxy and butoxy; aryloxy groups such as phenoxy, methylphenoxy, dimethylphenoxy and naphthoxy; arylalkoxy groups such as phenylmethoxy and phenylethoxy; an acetoxy group; a carbonyl group; an acetylacetonato group (acac); and an oxo group.

Examples of the sulfur-containing groups include sulfonato groups such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; sulfinato groups such as methylsulfinato, phenylsulfinato, benzylsulfinato, p-toluenesulfinato, trimethylbenzenesulfinato and pentafluorobenzenesulfinato; an alkylthio group; an arylthio group; a sulfate group; a sulfide group; a polysulfide group; and a thiolate group.

Examples of the nitrogen-containing groups include an amino group; alkylamino groups such as methylamino, dimethylamino, diethylamino, dipropylamino, dibutylamino and dicyclohexylamino; arylamino or alkylarylamino groups such as phenylamino, diphenylamino, ditolylamino, dinaphthylamino and methylphenylamino; and alkyl or arylamine groups such as trimethyamine, triethylamine, triphenylamine, N,N,N',N'-tetramethylethylenediamine (tmeda) and N,N,N',N'-tetraphenylpropylenediamine (tppda).

Examples of the boron-containing groups include $BR_4$ (R is hydrogen, an alkyl group, an aryl group which may have a substituent, a halogen atom or the like).

Examples of the aluminum-containing groups include $AlR_4$ (R is hydrogen, an alkyl group, an aryl group which may have a substituent, a halogen atom or the like).

Examples of the phosphorus-containing groups include trialkylphosphine groups such as trimethylphosphine, tributylphosphine and tricyclohexylphosphine; triarylphosphine groups such as triphenylphosphine and tritolylphosphine; phosphite groups (phosphido groups) such as methylphosphite, ethylphosphite and phenylphosphite; a phosphonic acid group; and a phosphinic acid group.

Examples of the halogen-containing groups include fluorine-containing groups such as $PF_6$ and $BF_4$; chlorine-containing groups such as $ClO_4$ and $SbCl_6$; and iodine-containing groups such as $IO_4$.

Examples of the heterocyclic compound residual groups include residual groups of nitrogen-containing compounds such as pyrrole, pyridine, pyrimidine, quinoline and triazine, oxygen-containing compounds such as furan and pyran and sulfur-containing compounds such as thiophene; and these heterocyclic compound residual groups which are further substituted with substituents such as alkyl or alkoxy groups of 1 to 30 carbon atoms, preferably 1 to 20 carbon atoms.

Examples of the silicon-containing groups include hydrocarbon-substituted silyl groups such as phenylsilyl, diphenylsilyl, trimethylsilyl, triethylsilyl, tripropylsilyl, tricyclohexylsilyl, triphenylsilyl, methyldiphenylsilyl, tritolylsilyl and trinaphthylsilyl; hydrocarbon-substituted silyl ether groups such as trimethylsilyl ether; silicon-substituted alkyl groups such as trimethylsilylmethyl; and silicon-substituted aryl groups such as trimethylsilylphenyl.

Examples of the germanium-containing groups include groups wherein silicon is replaced with germanium in the aforesaid silicon-containing groups.

Examples of the tin-containing groups include groups wherein silicon is replaced with tin in the aforesaid silicon-containing groups.

When k is 2 or greater, plural atoms or groups indicated by X may be the same or different, and plural groups indicated by X may be bonded to each other to form a ring.

The bond form between X and the transition metal atom M is not specifically restricted, and examples of the bond forms between X and the transition metal atom M include covalent bond, coordinate bond, ionic bond and hydrogen bond.

The ligands L and the transition metal atoms M in the formula (1) is quite the same as those in the chemical formulas (2) and (3), including the valence of the metal, but the numbers a of the ligands and n in those formulas are not necessarily equal to each other.

Reaction Product (A1)

The reaction product (A1) is a reaction product of a compound (C) of a transition metal selected from Groups 4, 5, 6 and 11 of the periodic table which is represented by the following formula (c), and a compound represented by the following formula (I).

(Transition Metal Compound (C))

$$M'X_k \tag{c}$$

In the above formula (c), M' is a transition metal atom selected from Groups 4, 5, 6 and 11 of the periodic table, and examples thereof include metal atoms of Group 4 such as titanium, zirconium and hafnium; metal atoms of Group 5 such as vanadium, niobium and tantalum; metal atoms of Group 6 such as chromium, molybdenum and tungsten; and metal atoms of Group 11 such as copper, silver and gold. Of these, titanium, vanadium and chromium are preferable.

X has the same meanings as that of X in the formula (1). When k is 2 or greater, plural groups indicated by X may be the same or different, and plural groups indicated by X may be bonded to each other to form a ring.

Bonding style between X and a transition metal atom M' has no specific restriction, and may be a covalent bond, a coordinate bond, an ionic bond, a hydrogen bond or the like.

The k is a number satisfying a valence of M', and determined according to a valence of the transition metal M' and a valence of X so that these positive and negative valences are neutralized.

In this regard, if an absolute value of a valence of the transition metal M' is indicated by a, and an absolute value of a valence of X is indicated by b, then the relationship is represented by the following formula:

$$a = b \times k.$$

In particular, when M' is $Ti^{3+}$ and X is $Cl^{31}$, for example, k is 3 so that the transition metal compound represented by the formula (c) becomes $TiCl_3$. In another case where M' is $Zr^{4+}$ and X is $SO_4^{2-}$, k is 2 so that the transition metal compound represented by the formula (c) becomes $Zr(SO_4)_2$.

Similarly, in the case where X comprises two or more groups, k is determined by dividing into two or more numbers in order that the positive and negative valences are neutralized. For example, in the case where X comprises two kinds of groups, if an absolute value of a valence of one of Xs is indicated by $b_1$, and the number thereof is indicated by $k_1$; and an absolute value of a valence of the other of Xs is indicated by $b_2$, and the number thereof is indicated by $k_2$, then the relationship is represented by the following formula:

$$a = b_1 \times k_1 + b_2 \times k_2.$$

In particular, when M' is $V^{5+}$ and Xs are $O^{2-}$ and $Cl^-$, for example, the transition metal compound represented by the formula (c) becomes $VOCl_3$ or $VO_2Cl$. In another case where M' is $V^{4+}$ and Xs are $O^{2-}$ and $SO_4^{2-}$, the transition metal compound represented by the formula (c) becomes $[VO][SO_4]$.

Examples of the transition metal compounds represented by the formula (c) include halides of transition metals such as $TiCl_3$, $TiCl_4$, $TiBr_3$, $TiBr_4$, $ZrCl_4$, $ZrBr_4$, $HfBr_4$, $HfCl_4$, $VCl_4$, $VCl_5$, $VBr_4$, $VBr_5$, $NbCl_5$, $NbBr_5$, $TaCl_5$, $TaBr_4$, $CrCl_3$, $CrCl_2$, $MoCl_5$, $MoCl_3$, $WCl_6$, $WCl_5$, $CuCl_2$, $CuBr_2$, $AgCl_2$ and $AuCl_2$; complex compounds of transition metal halides (e.g., $TiCl_4 \cdot 2(THF)$ and $ZrCl_4 \cdot 2(Et_2O)$) and electron donor compounds (e.g., tetrahydrofuran (THF), acetonitrile or diethyl ether); transition metal compounds having halogen atoms such as oxyhalides of transition metals, such as $ZrOCl_2$, $HfOCl_2$, $VOCl_2$, $VOBr$, $VOCl_3$, $NbOBr_3$, $CrO_2Cl_2$, $MoOBr$, $MoOCl_3$, $MoO_2Cl_2$, $WOCl_4$, $WO_2Br_2$, $CuCl_2 \cdot 2CuO \cdot 4H_2O$, $CuBr_2 \cdot Cu(OH)_2$, $CuBr_2 \cdot 3Cu(OH)_2$; transition metal compounds having hydrocarbon groups such as $Ti(CH_2Ph)_4$; transition metal compounds having oxygen-containing groups such as $Ti(O-iPr)_4$, $Zr(O-iPr)_4$, $Cu(acac)_2$, $MoO(acac)_2$, $W(OPh)_5$, $Cr(acac)_3$, $VO(acac)_2$, $V(acac)_3$, $Mo(CO)_6$, $W(CO)_6$ and $[VO][S_4] \cdot 5H_2O$; and transition metal compounds having nitrogen-containing groups such as $Ti(N(Me)_2)_4$ and $Zr(N(Me)_2)_4$.

As the transition metal compound (C), M' is preferably titanium, vanadium, chromium or copper, and X is preferably a halogen atom, an alkyl group, an oxygen-containing group or a nitrogen-containing group, more preferably a chlorine atom, a bromine atom or a methyl group.

The reaction product (A1) is a reaction product of the transition metal compound (C) represented by the formula (c) and the compound (A-i) represented by the following formula (I).

(Compound (A-i))

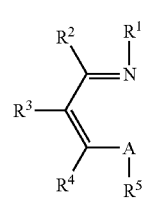

(I)

In the formula (I), A is an oxygen atom (—O—), a sulfur atom (—S—), a selenium atom (—Se—) or a nitrogen atom having a substituent $R^6$ (—N($R^6$)—).

$R^1$ to $R^6$ may be the same or different, they are each a hydrogen atom, a halogen atom, a hydrocarbon group, an oxygen-containing group, a sulfur-containing group, a nitrogen-containing group, a boron-containing group, an aluminum-containing group, a phosphorus-containing group, a heterocyclic compound residual group, a silicon-containing group, a germanium-containing group or a tin-containing group.

The halogen atoms include fluorine, chlorine, bromine and iodine.

Examples of the hydrocarbon groups include straight-chain or branched alkyl groups of 1 to 30 carbon atoms, preferably 1 to 20 carbon atoms, such as methyl, ethyl, n-propyl, isopropyl, n-butyl, isobutyl, sec-butyl, tert-butyl, neopentyl, n-pentyl and n-hexyl; straight-chain or branched alkenyl groups of 2 to 30 carbon atoms, preferably 2 to 20 carbon atoms, such as vinyl, allyl and isopropenyl; straight-chain or branched alkynyl groups of 2 to 30 carbon atoms, preferably 2 to 20 carbon atoms, such as ethynyl and propargyl; cyclic saturated hydrocarbon groups of 3 to 30 carbon atoms, preferably 3 to 20 carbon atoms, such as cyclopropyl, cyclobutyl, cyclopentyl, cyclohexyl and adamantyl; cyclic unsaturated hydrocarbon groups of 5 to 30 carbon atoms, such as cyclopentadienyl, indenyl and fluorenyl; aryl groups of 6 to 30 carbon atoms, preferably 6 to 20 carbon atoms, such as phenyl, benzyl, naphthyl, biphenylyl, terphenylyl, phenanthryl and anthryl; and alkyl-substituted aryl groups, such as tolyl, isopropylphenyl, t-butylphenyl, dimethylphenyl and di-t-butylphenyl.

In the above hydrocarbon groups, the hydrogen atom may be replaced with halogen, and examples of these halogenated hydrocarbon groups of 1 to 30 carbon atoms, preferably 1 to 20 carbon atoms, include trifluoromethyl, pentafluorophenyl and chlorophenyl.

In the above hydrocarbon groups, the hydrogen atom may also be replaced with another hydrocarbon group, and examples of these aryl-substituted alkyl groups include benzyl and cumyl.

Further, the above hydrocarbon groups may have heterocyclic compound residual groups; oxygen-containing groups, such as an alkoxy group, an aryloxy group, an ester group, an ether group, an acyl group, a carboxyl group, a carbonato group, a hydroxyl group, a peroxy group and a carboxylic anhydride group; nitrogen-containing groups, such as an amino group, an imino group, an amido group, an imido group, a hydrazino group, a hydrazono group, a nitro group, a nitroso group, a cyano group, an isocyano group, a cyanato group, an amidino group, a diazo group and ammonium salts derived from an amino group; sulfur-containing groups, such as a mercapto group, a thioester group, a dithioester group, an alkylthio group, an arylthio group, a thioacyl group, a thioether group, a thiocyanato group, an isothiocyanato group, a sulfonato ester group, a sulfonamido group, a thiocarboxyl group, a dithiocarboxyl group, a sulfo group, a sulfonyl group, a sulfinyl group and a sulfenyl group; phosphorus-containing groups, such as a phosphido group, a phosphoryl group, a thiophosphoryl group and a phosphate group; silicon-containing groups; germanium-containing groups; or tin-containing groups.

Of the above groups, preferable are straight-chain or branched alkyl groups of 1 to 30 carbon atoms, preferably 1 to 20 carbon atoms, such as methyl, ethyl, n-propyl, isopropyl, n-butyl, isobutyl, sec-butyl, t-butyl, neopentyl and n-hexyl; aryl groups of 6 to 30 carbon atoms, preferably 6 to 20 carbon atoms, such as phenyl, naphthyl, biphenylyl, terphenylyl, phenanthryl and anthryl; and substituted aryl groups such as the above aryl groups which are substituted with 1 to 5 substituents such as halogen atoms, alkyl or alkoxy groups of 1 to 30 carbon atoms, preferably 1 to 20 carbon atoms, and aryl or aryloxy groups of 6 to 30 carbon atoms, preferably 6 to 20 carbon atoms.

The heterocyclic compound residual groups are cyclic groups containing 1 to 5 hetero atoms therein, and particular examples of the hetero atoms include O, N, S, P and B. Particular examples of the cyclic groups include monocyclic and polycyclic groups of 4 to 7 members, and preferable are monocyclic and polycyclic groups of 5 to 6 members. As concrete examples, there may be enumerated residual groups of nitrogen-containing compounds such as pyrrole, pyridine, pyrimidine, quinoline and triazine; residual groups of oxygen-containing compounds such as furan and pyran; residual groups of sulfur-containing compounds such as thiophen; and these residual groups which are further substituted with substituents such as alkyl or alkoxy groups of 1 to 30 carbon atoms, preferably 1 to 20 carbon atoms.

The oxygen-containing groups are groups containing 1 to 5 oxygen atoms therein, but the above-mentioned heterocyclic residual groups are excluded. Similarly excluded from the oxygen-containing groups are groups containing a nitrogen atom, a sulfur atom, a phosphorus atom, a halogen atom or a silicon atom, and having a direct bond of such an atom and an oxygen atom. Examples of the oxygen-containing groups include an alkoxy group, an aryloxy group, an ester group, an ether group, an acyl group, a carboxyl group, a carbonate group, a hydroxyl group, a peroxy group and a carboxylic anhydride group. Of these, an alkoxy group, an aryloxy group, an acetoxy group, a carbonyl group and a hydroxyl group are preferable. When these oxygen-containing groups contain carbon atoms, 1 to 30 carbon atoms are preferable, and 1 to 20 carbon atoms are more preferable.

The nitrogen-containing groups are groups containing 1 to 5 nitrogen atoms therein, but the above-mentioned heterocyclic residual groups are excluded. Examples of the nitrogen-containing groups include an amino group, an imino group, an amido group, an imido group, a hydrazino group, a hydrazono group, a nitro group, a nitroso group, a cyano group, an isocyano group, a cyanato group, an amidino group, a diazo group and ammonium salts derived from an amino group. Of these, an amino group, an imino group, an amido group, an imido group, a nitro group and a cyano group are preferable. When these nitrogen-containing groups contain carbon atoms, 1 to 30 carbon atoms are preferable, and 1 to 20 carbon atoms are more preferable.

The sulfur-containing groups are groups containing 1 to 5 sulfur atoms therein, but the above-mentioned heterocyclic residual groups are excluded. Examples of the sulfur-containing groups include a mercapto group, a thioester group, a dithioester group, an alkylthio group, an arylthio group, a thioacyl group, a thioether group, a thiocyanato group, an isothiocyanato group, a sulfonato group, a sulfonamido group, a thiocarboxyl group, a dithiocarboxyl group, a sulfo group, a sulfonyl group, a sulfinyl group and a sulfenyl group, a sulfonate group and a sulfinate group. Of these, a sulfonate group, a sulfinate group, an alkylthio group and an arylthio group are preferable. When these sulfur-containing groups contain carbon atoms, 1 to 30 carbon atoms are preferable, and 1 to 20 carbon atoms are more preferable.

The silicon-containing groups are groups containing 1 to 5 silicon atoms therein, and examples thereof include a silyl group, a siloxy group, a hydrocarbon-substituted silyl group and a hydrocarbon-substituted siloxy group. Particular examples of the hydrocarbon-substituted silyl groups include methylsilyl, dimethylsilyl, trimethylsilyl, ethylsilyl, diethylsilyl, triethylsilyl, diphenylmethylsilyl, triphenylsilyl, dimethylphenylsilyl, dimethyl-t-butylsilyl and dimethyl (pentafluorophenyl)silyl. Of these, preferable are methylsilyl, dimethylsilyl, trimethylsilyl, ethylsilyl, diethylsilyl, triethylsilyl, dimethylphenylsilyl and triphenylsilyl. Particularly preferable are trimethylsilyl, triethylsilyl, triphenylsilyl and dimethylphenylsilyl. Particular examples of the hydrocarbon-substituted siloxy groups include trimethylsiloxy. When these silicon-containing groups contain carbon atoms, 1 to 30 carbon atoms are preferable, and 1 to 20 carbon atoms are more preferable.

The phosphorus-containing groups are groups containing 1 to 5 phosphorus atoms therein, but the above-mentioned heterocyclic residual groups are excluded. Examples of the phosphorus-containing groups include a phosphino group, a phosphoryl group, a phosphothioyl group and a phosphono group.

The boron-containing groups are groups containing 1 to 5 boron atoms therein, but the above-mentioned heterocyclic residual groups are excluded. Examples of the boron-containing groups include a boron substituted with an alkyl group, a boron substituted with an aryl group, a boron halide and a boron halide substituted with an alkyl group. Particular examples of the borons substituted with alkyl groups include $(Et)_2B-$, $(iPr)_2B-$, $(iBu)_2B-$, $(nC_5H_{11})_2B-$, $C_8H_{14}B$-(9-borabicyclononyl group); particular examples of the borons substituted with aryl groups include $(C_6H_5)_2B-$; particular examples of the boron halides include $BCl_2-$; particular examples of the boron halides substituted with alkyl groups include $(Et)BCl-$ and $(iBu)BCl-$. In these, Et denotes an ethyl group, iPr denotes an isopropyl group, and iBu denotes an isobutyl group.

Examples of the aluminum-containing groups include AlR$_4$ (R is hydrogen, an alkyl group, an aryl group which may have a substituent, a halogen atom or the like).

Examples of the germanium-containing groups or the tin-containing groups include groups wherein silicon is replaced with germanium or tin in the above-mentioned silicon-containing groups.

The heterocyclic compound residual group, the oxygen-containing group, the nitrogen-containing group, the sulfur-containing group, the boron-containing group, the germanium-containing group, the tin-containing group, the silicon-containing group and the phosphorus-containing group are each preferably the group wherein the characteristic atom group thereof is directly bonded to N, C or a carbon atom in A in the formula (I).

The above examples of the groups indicated by $R^1$ to $R^5$ are more specifically described below.

Of the oxygen-containing groups, preferred examples of the alkoxy groups include methoxy, ethoxy, n-propoxy, isopropoxy, n-butoxy, isobutoxy and tert-butoxy; preferred examples of the aryloxy groups include phenoxy, 2,6-dimethylphenoxy and 2,4,6-trimethylphenoxy; preferred examples of the acyl groups include formyl, acetyl, benzoyl, p-chlorobenzoyl and p-methoxybenzoyl; and preferred examples of the ester groups include acetyloxy, benzoyloxy, methoxycarbonyl, phenoxycarbonyl and p-chlorophenoxycarbonyl.

Of the nitrogen-containing groups, preferred examples of the amido groups include acetamido, N-methylacetamido and N-methylbenzamido; preferred examples of the amino groups include alkylamino groups such as methylamino, dimethylamino, diethylamino, dipropylamino, dibutylamino and dicyclohexylamino, and arylamino groups or alkylaryl groups such as phenylamino, diphenylamino, ditolylamino, dinaphthylamino and methylphenylamino; preferred examples of the imido groups include acetimido and benzimido; and preferred examples of the imino groups include methylimino, ethylimino, propylimino, butylimino and phenylimino.

Of the sulfur containing groups, preferred examples of the alkylthio groups include methylthio and ethylthio; preferred examples of the arylthio groups include phenylthio, methylphenylthio and naphthylthio; preferred examples of the thioester groups include acetylthio, benzoylthio, methylthiocarbonyl and phenylthiocarbonyl; preferred examples of sulfonato ester groups include methylsulfonato, ethylsulfonato and phenylsulfonato; and preferred examples of the sulfonamido groups include phenylsulfonamido, N-methylsulfonamido and N-methyl-p-toluenesulfonamido.

Examples of the sulfonate groups include methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; examples of the sulfinato groups include methylsulfinato, phenylsulfinato, benzylsulfinato, p-toluenesulfinato, trimethylbenzenesulfinato and pentafluorobenzenesulfinato.

Among the phosphorus-containing groups, examples of the phosphino groups include dimethylphosphino and diphenylphosphino; examples of the phosphoryl groups include methylphosphoryl, isopropylphosphoryl and phenylphosphoryl; examples of the phosphothioyl groups include methylphosphothioyl, isopropylphosphothioyl and phenylphosphothioyl; and examples of the phosphono groups include phosphate groups such as dimethylphosphate, diisopropylphosphate and diphenylphosphate, and a phosphoric acid group.

Two or more groups of $R^1$ to $R^6$, preferably the adjacent groups thereof, may be bonded to each other to form an aliphatic ring, an aromatic ring, or a hydrocarbon ring containing a hetero atom (e.g., a nitrogen atom), which rings may have a substituent respectively.

The compounds represented by the formula (I) in which $R^3$ and $R^4$ are bonded to form an aromatic ring are represented by the following forumula (I-a):

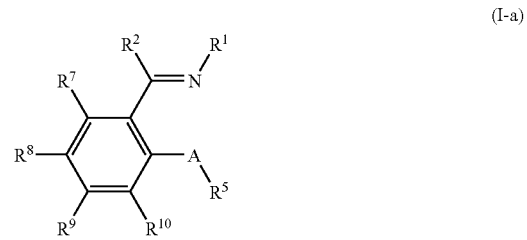

(I-a)

wherein A, $R^1$, $R^2$ and $R^5$ to $R^{10}$ have the same meanings respectively as those of A and $R^1$ to $R^6$ in the aforesaid formula (I). $R^1$, $R^2$ and $R^5$ to $R^{10}$ may be the same or different, and two or more of them may be bonded to each other to form a ring.

Among the compounds represented by the above formula (I) or (I-a), particularly preferable are the compounds in which $R^5$ is a hydrogen atom.

The compounds represented by the formula (I) in which $R^3$, $R^4$ and $R^5$ are bonded to form an aromatic ring and A is a nitrogen atom having a substituent $R^6$ are represented by the following formula (I-b):

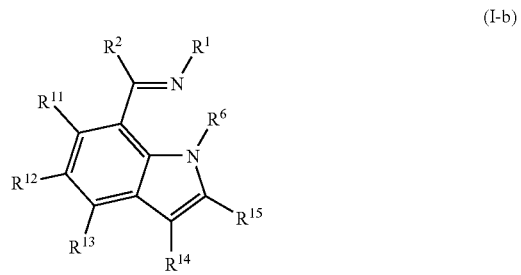

(I-b)

wherein $R^1$, $R^2$, $R^6$, $R^{11}$ to $R^{15}$ have the same meanings as those of $R^1$ to $R^6$ in the above formula (I), $R^1$, $R^2$, $R^6$, $R^{11}$ to $R^{15}$ may be the same or different and two or more of them may be bonded to each other to form a ring.

Among the compounds represented by the above formula (I-b), particularly preferable are compounds in which $R^6$ is a hydrogen atom.

Examples of such compounds represented by the formula (I) are given below.
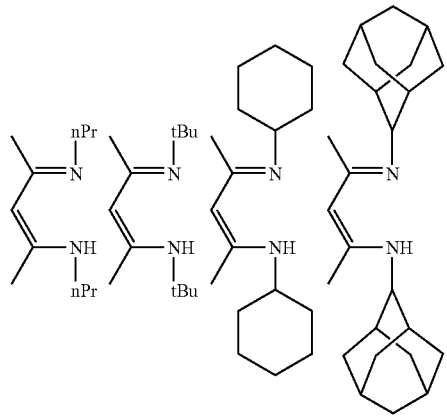
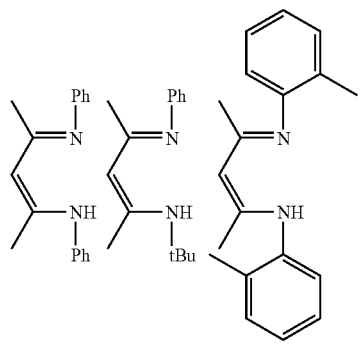
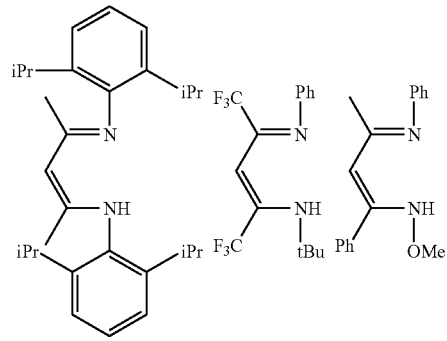
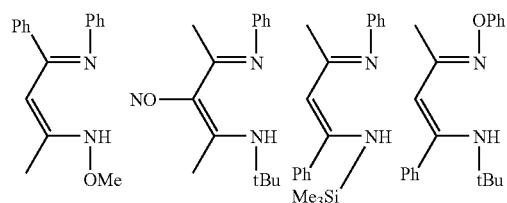
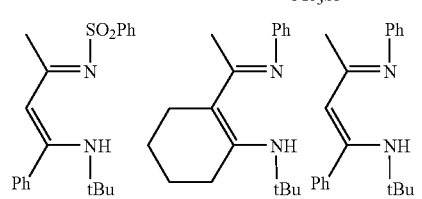
-continued
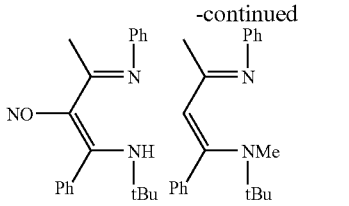
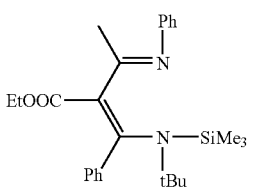
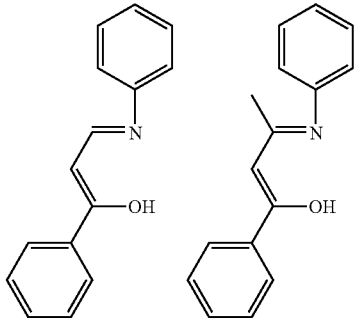
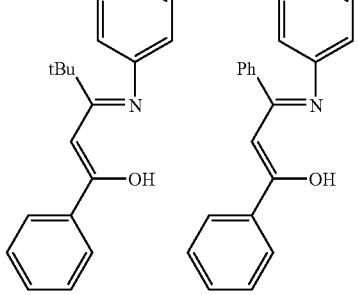
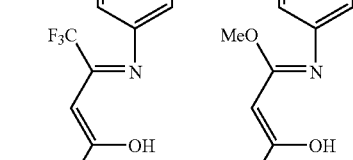
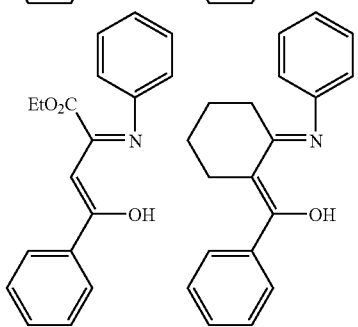

-continued
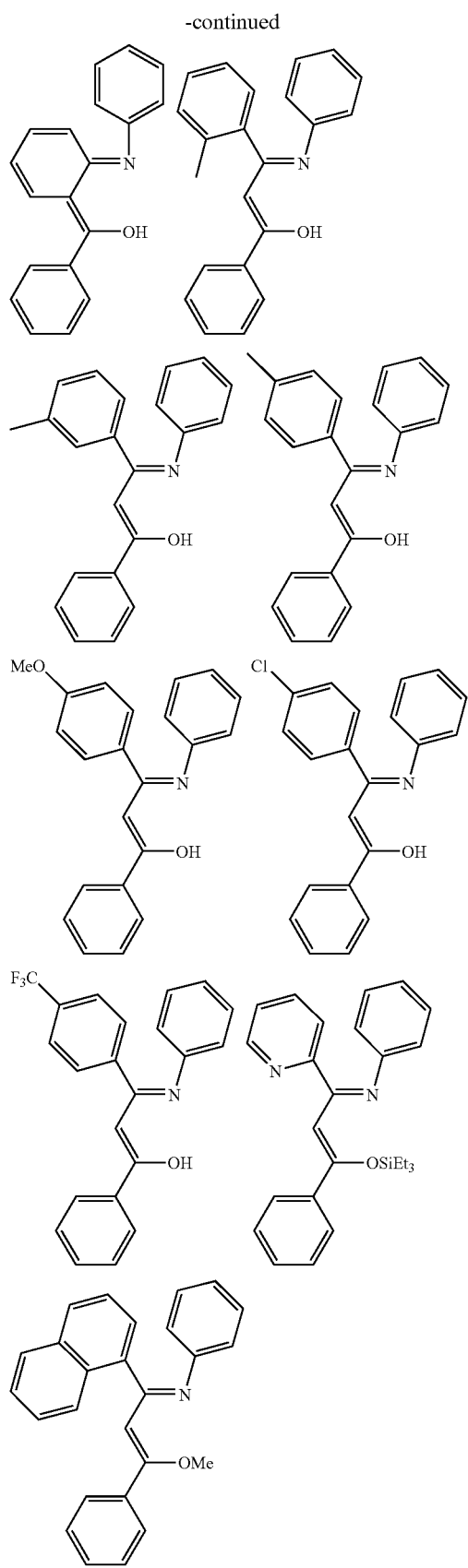
-continued
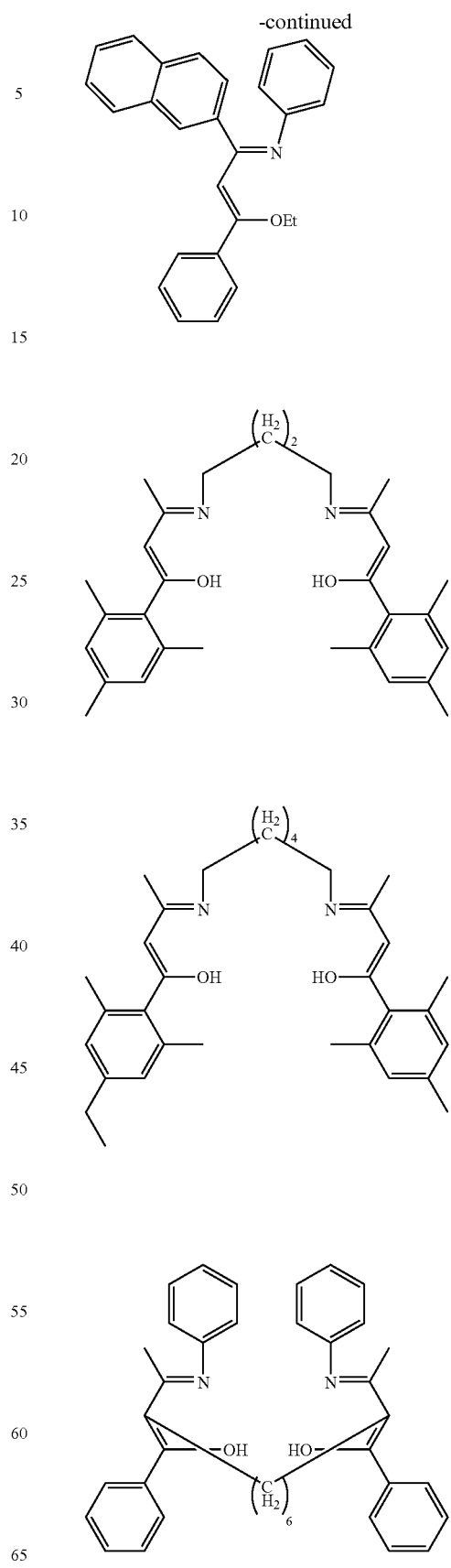

-continued
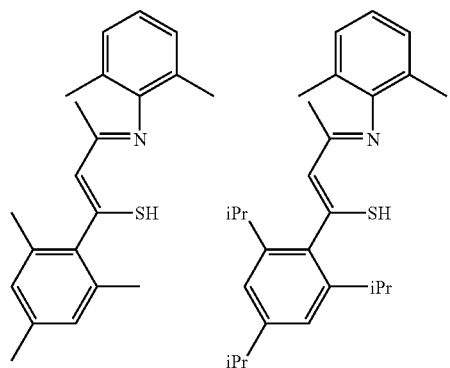
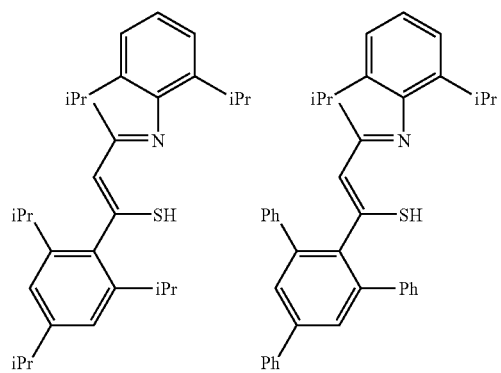
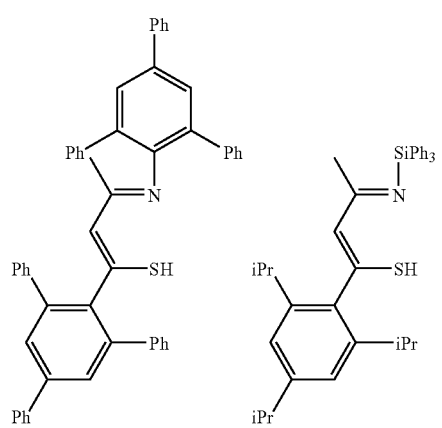
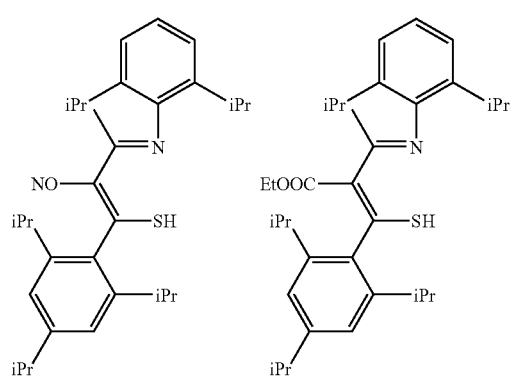
-continued
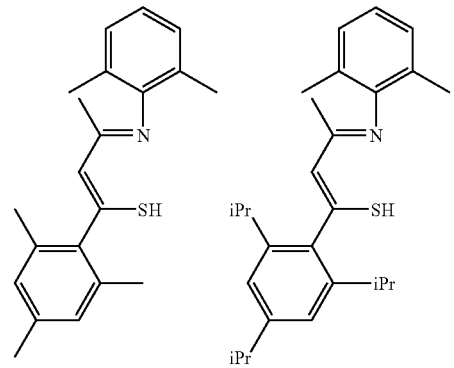
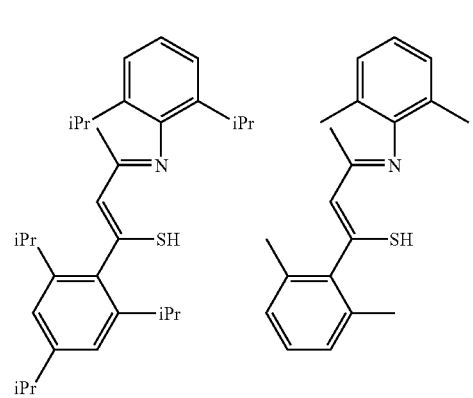
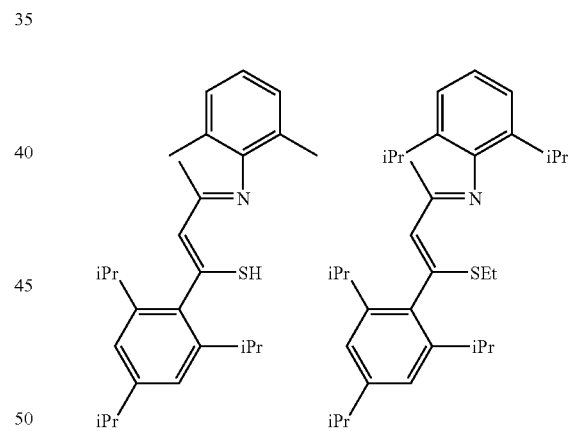
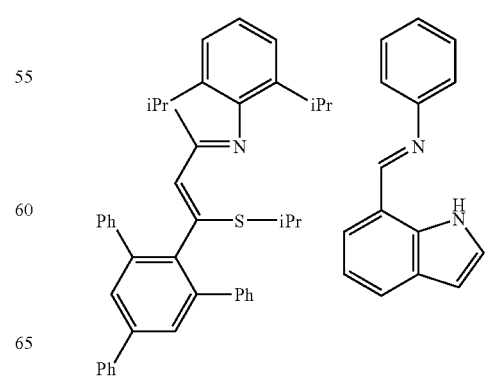

-continued
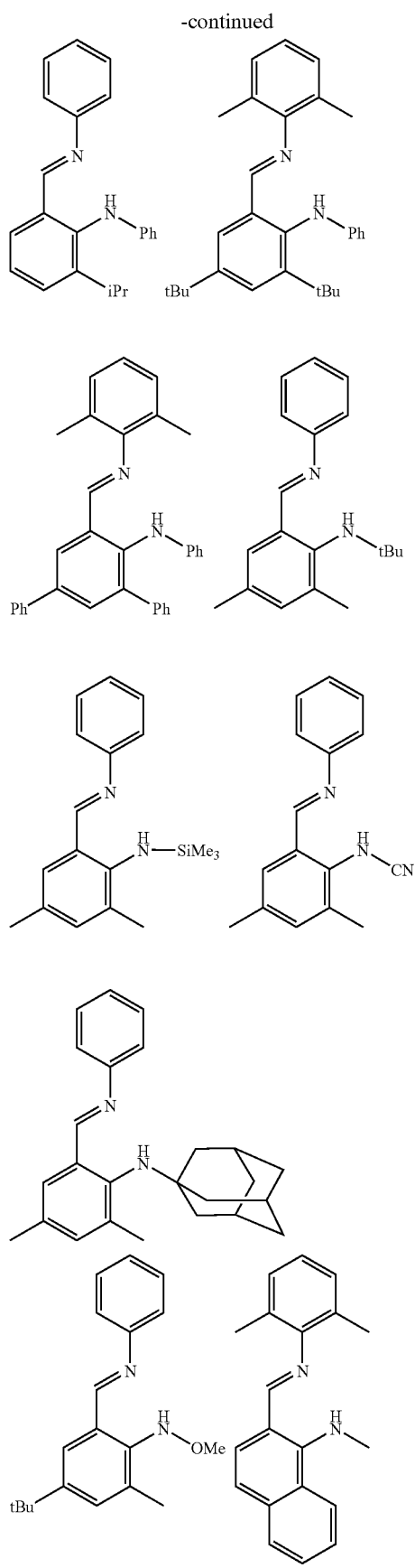
-continued
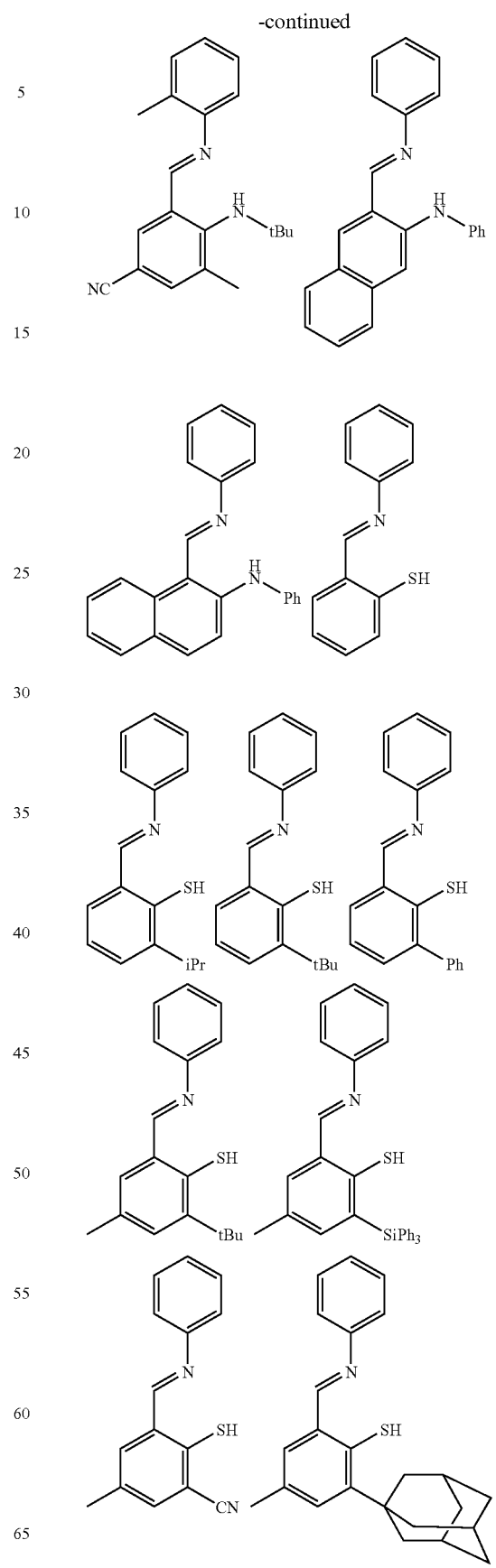

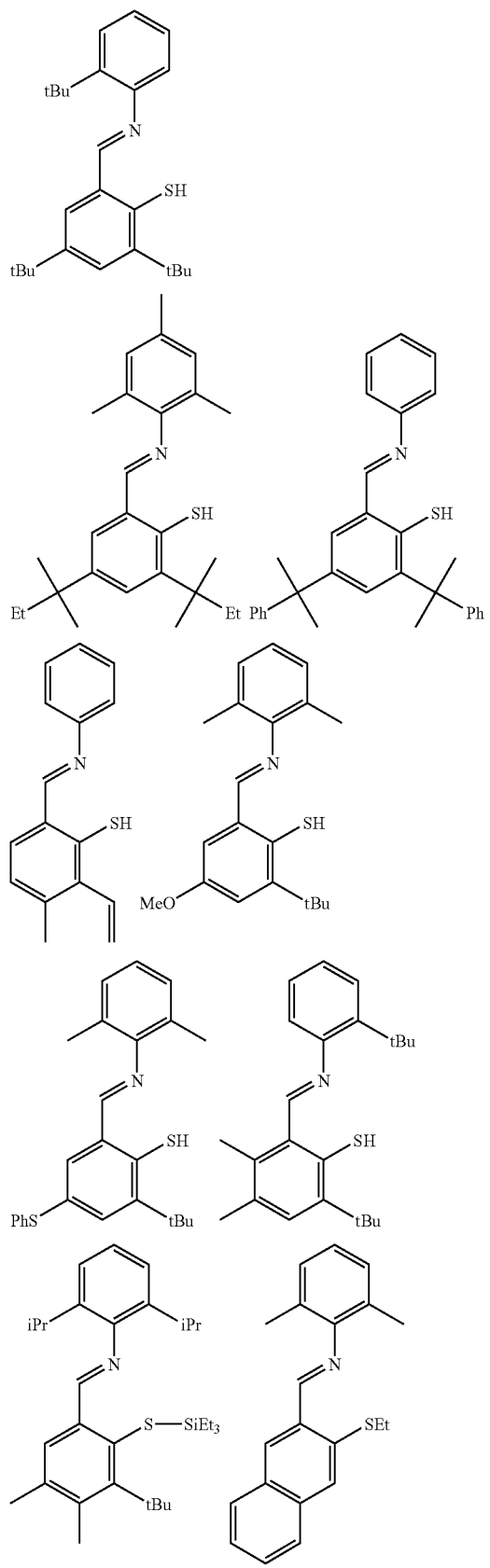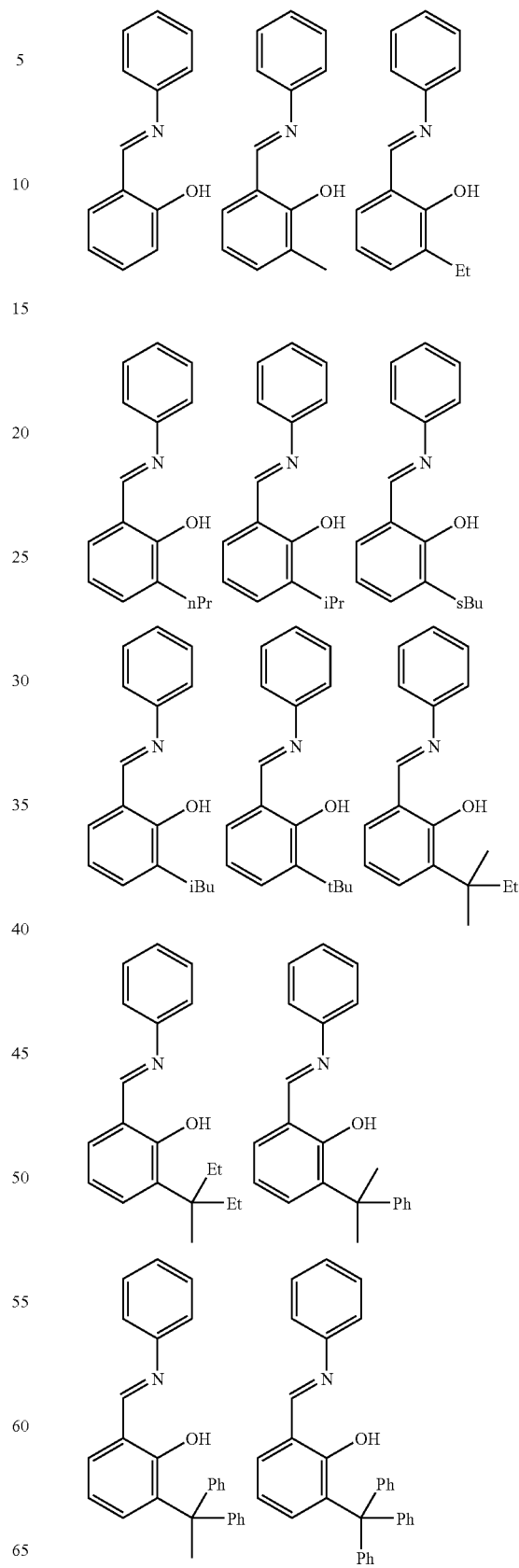

-continued
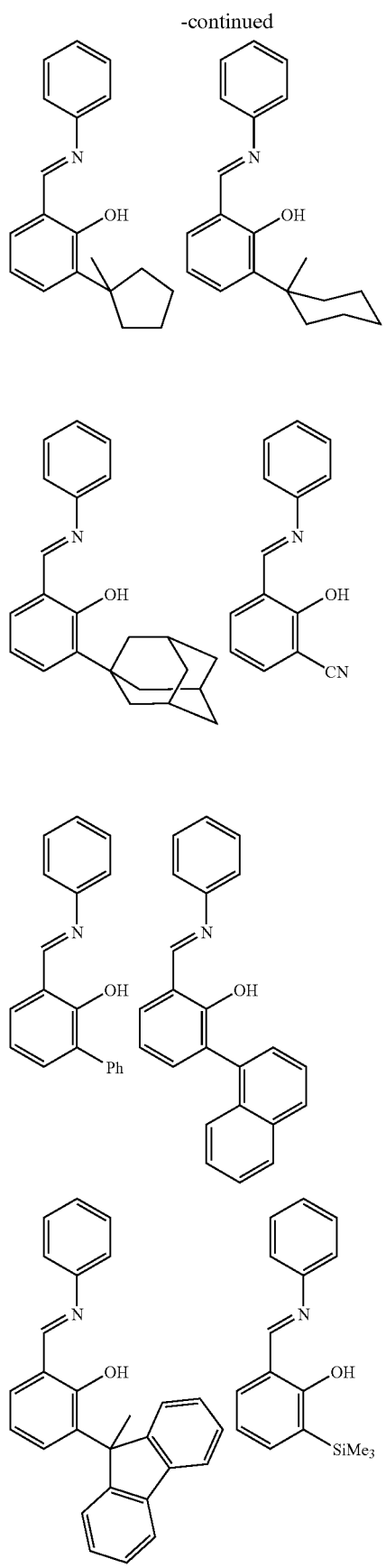
-continued
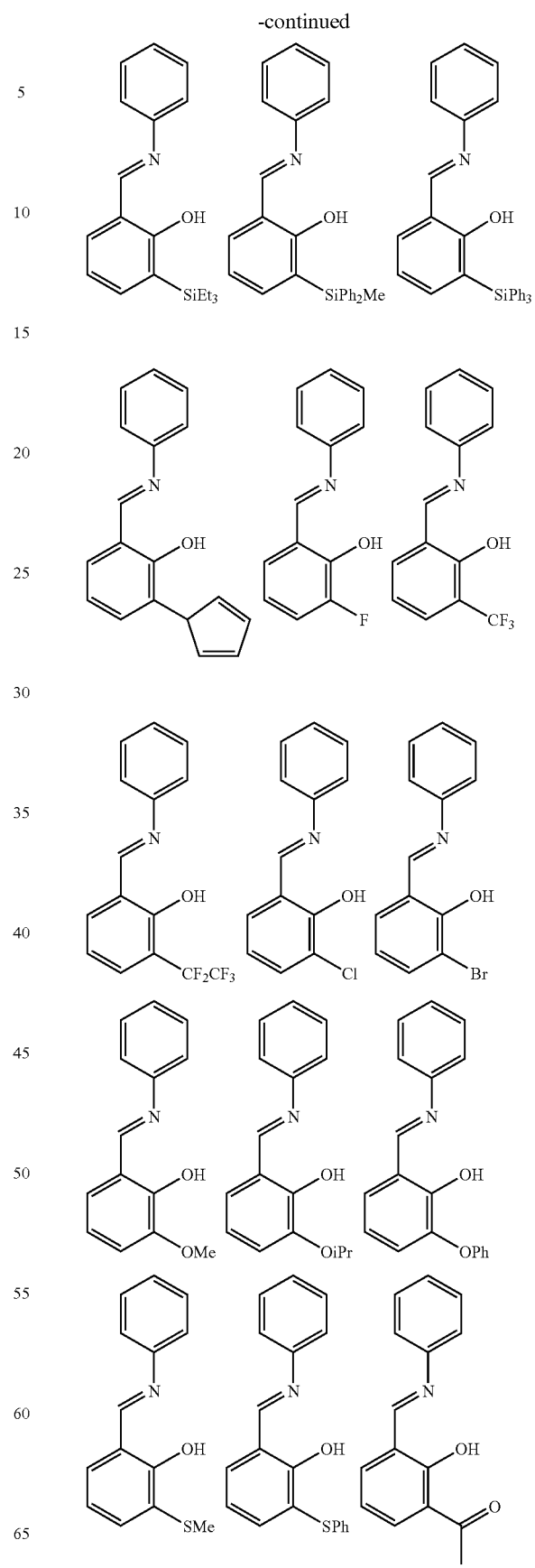

-continued
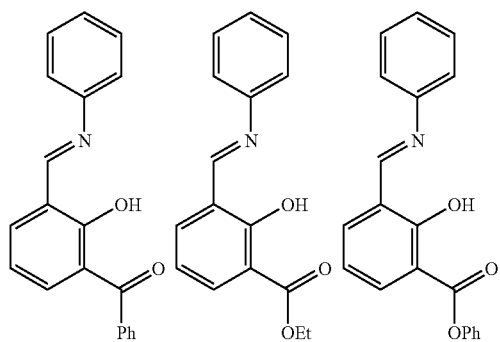
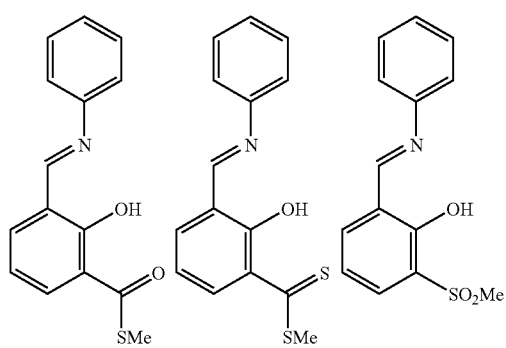
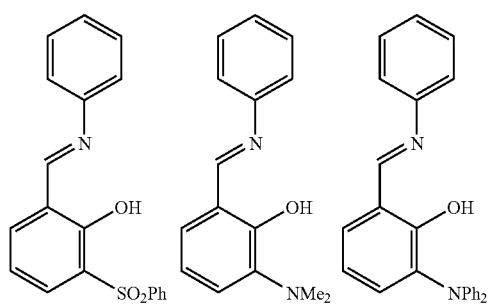
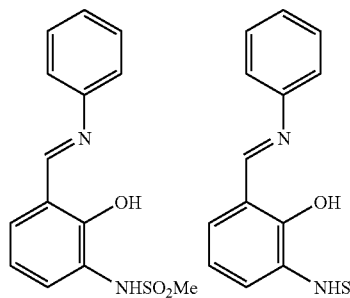
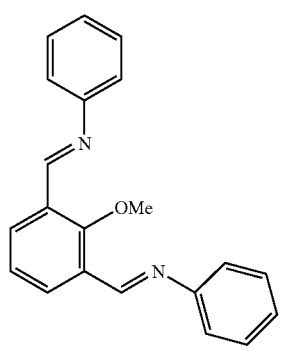
-continued
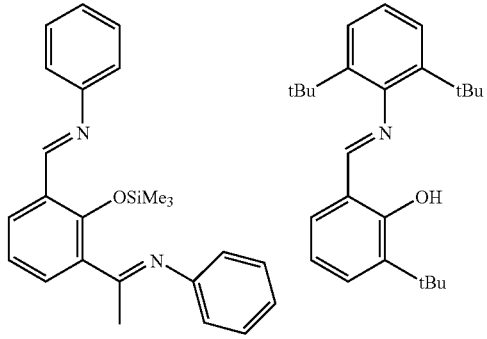
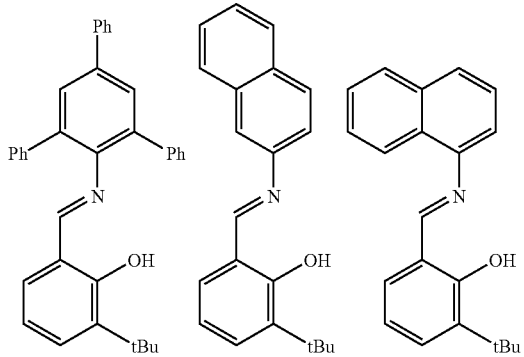
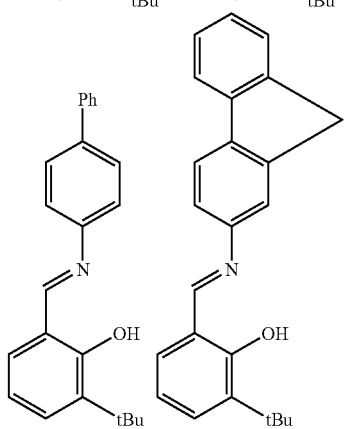
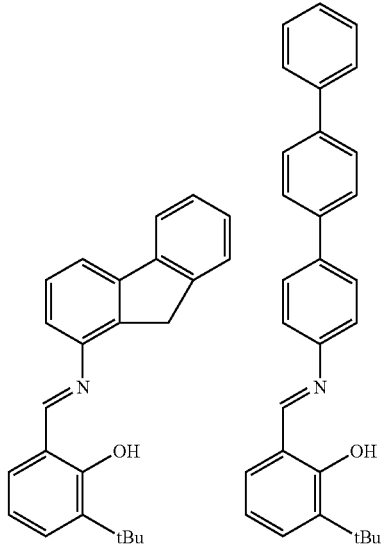

-continued
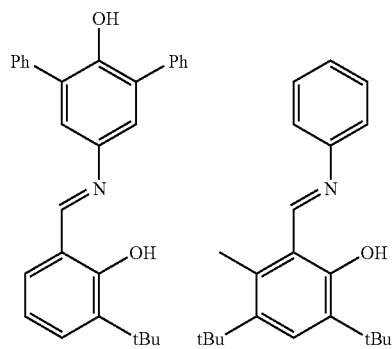
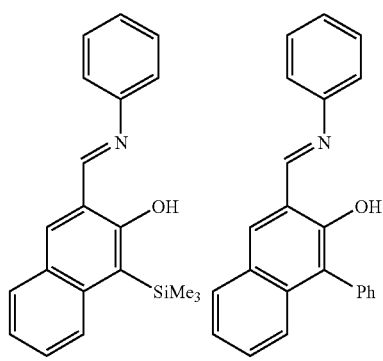
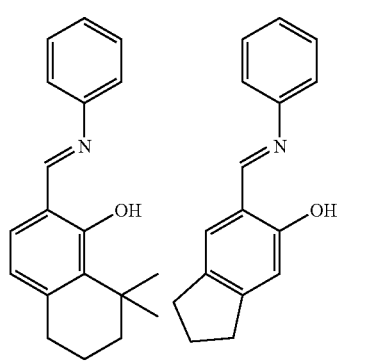
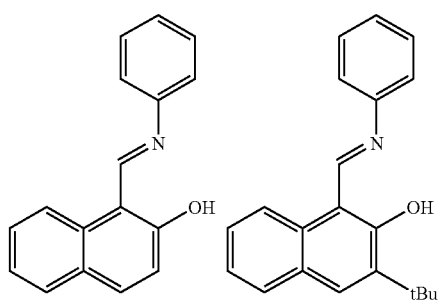
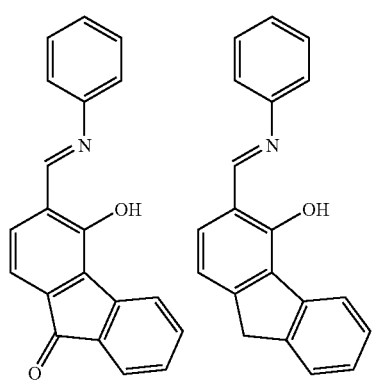
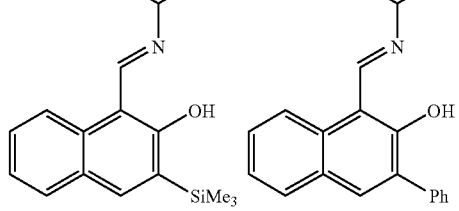
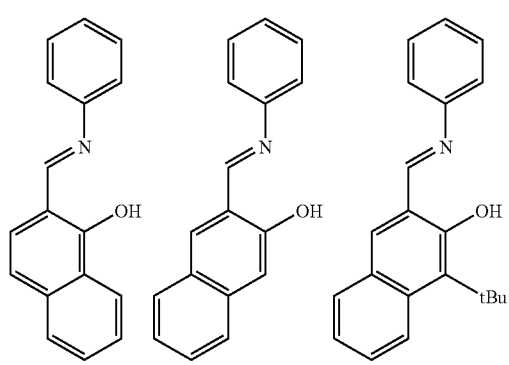
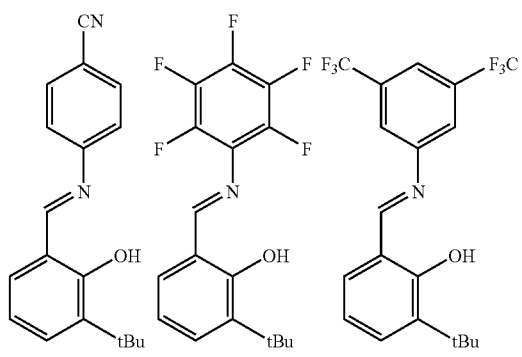

-continued
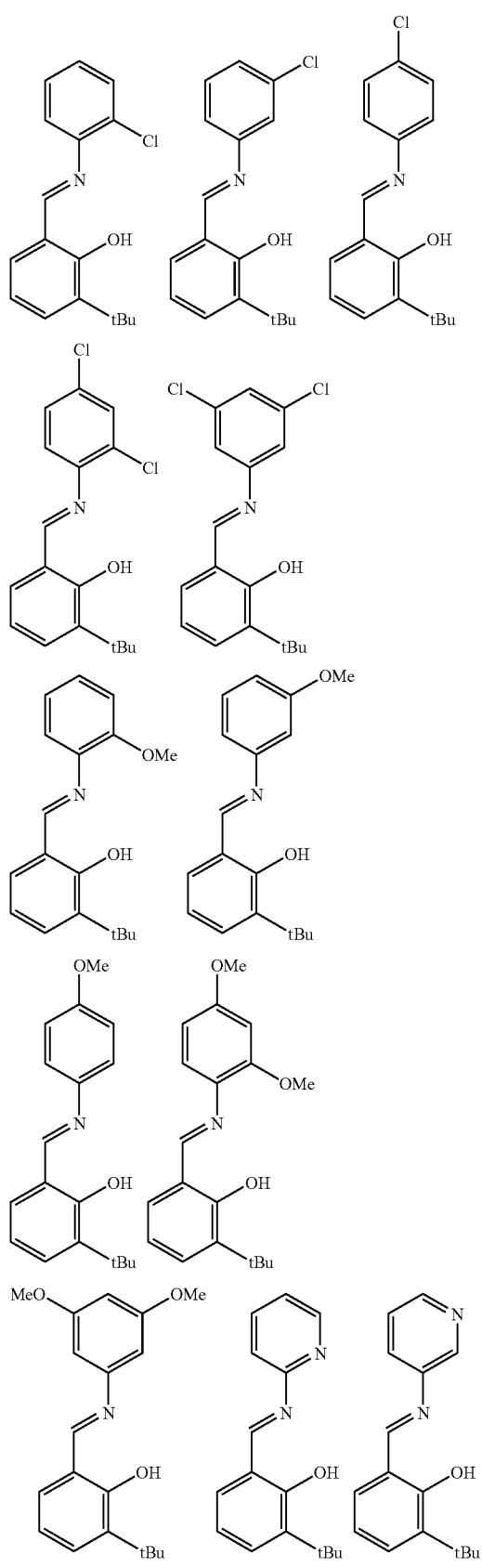
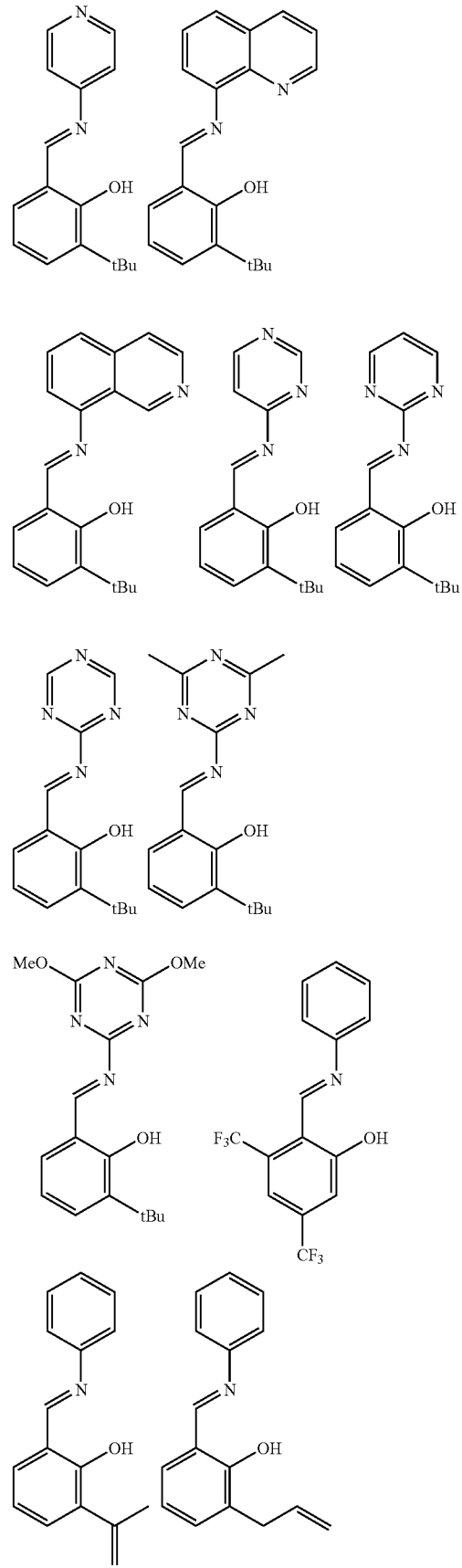

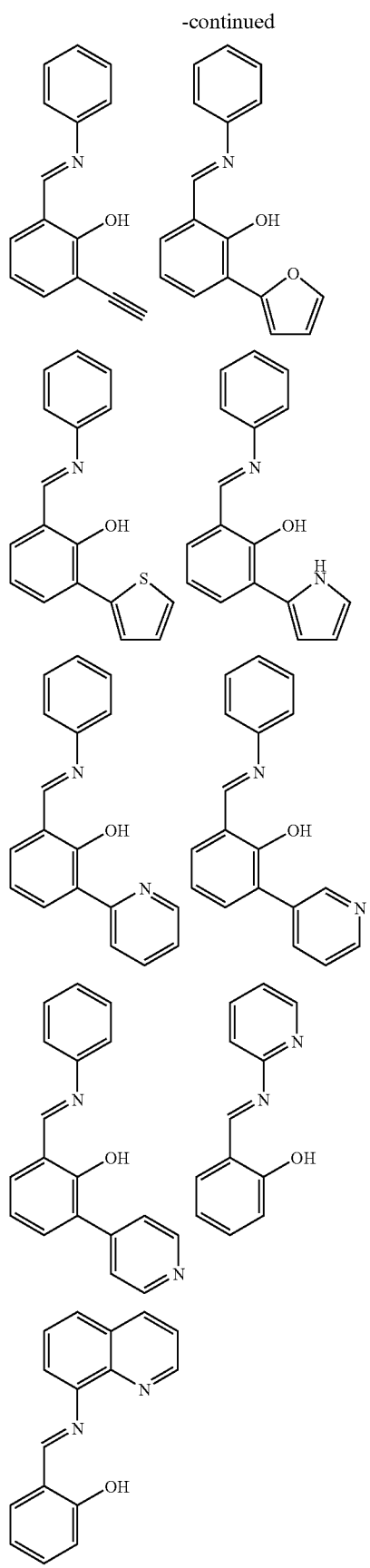
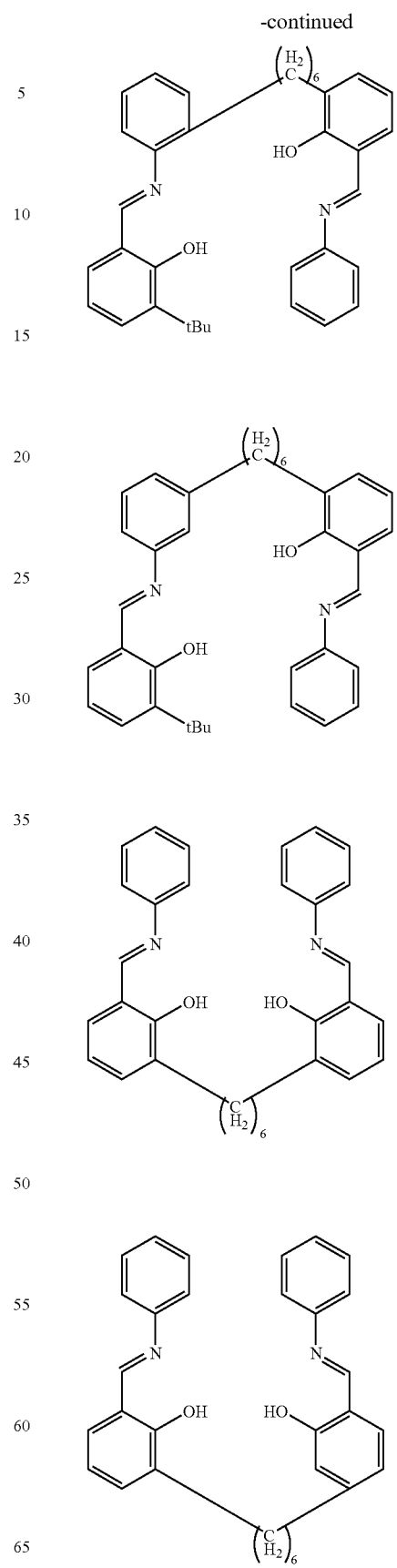

-continued
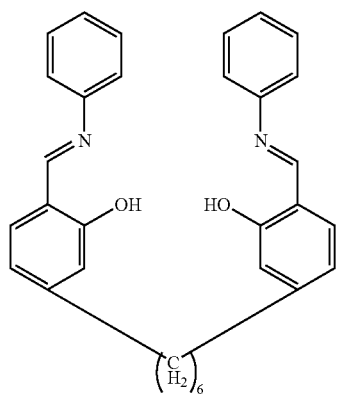
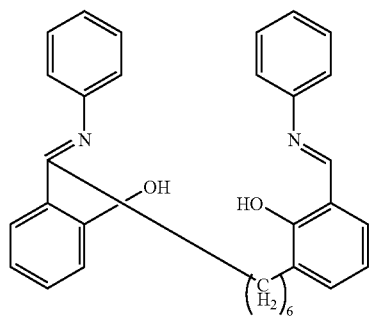
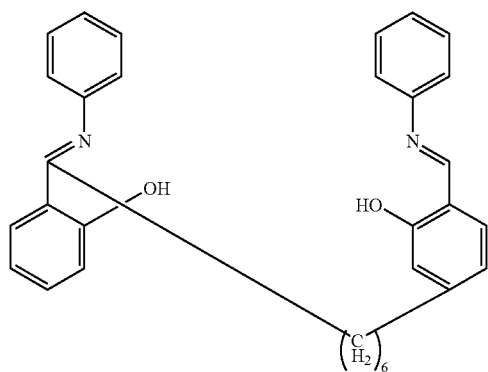
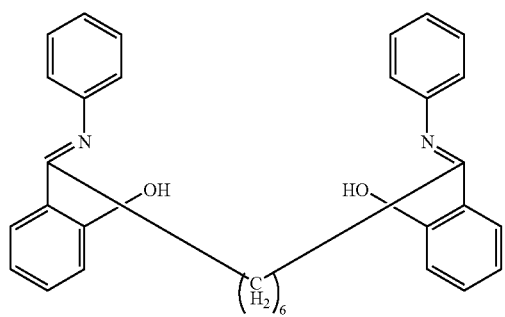
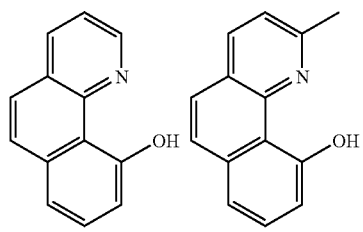
-continued
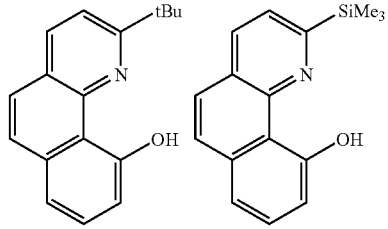
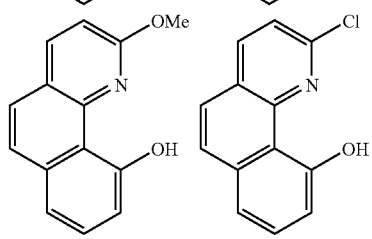
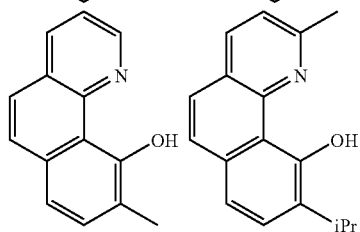
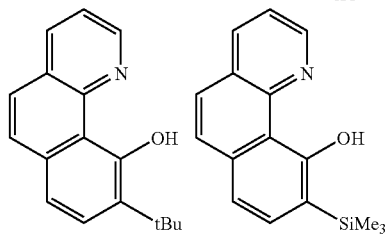
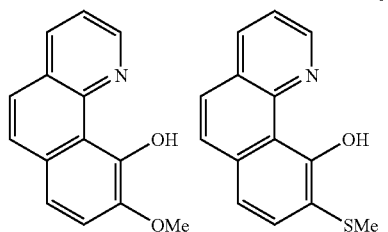
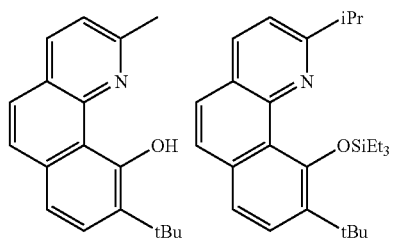
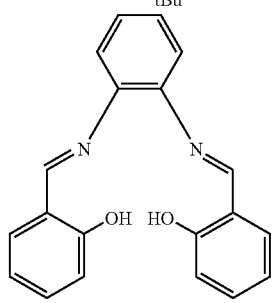

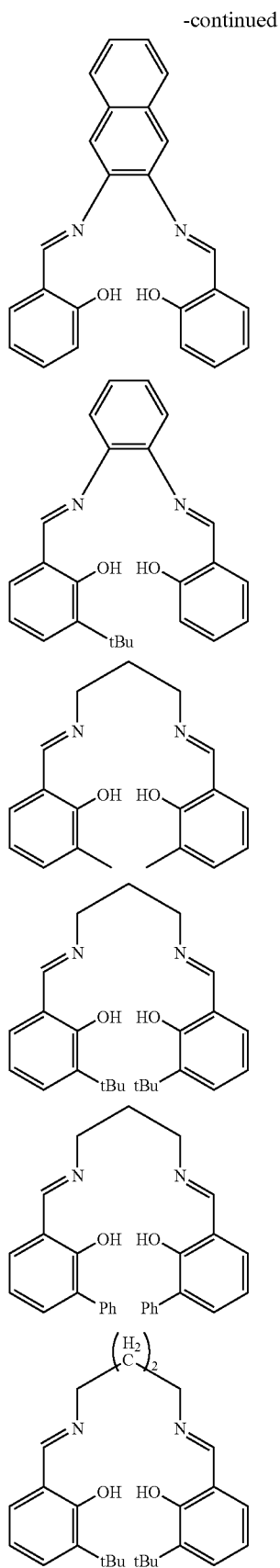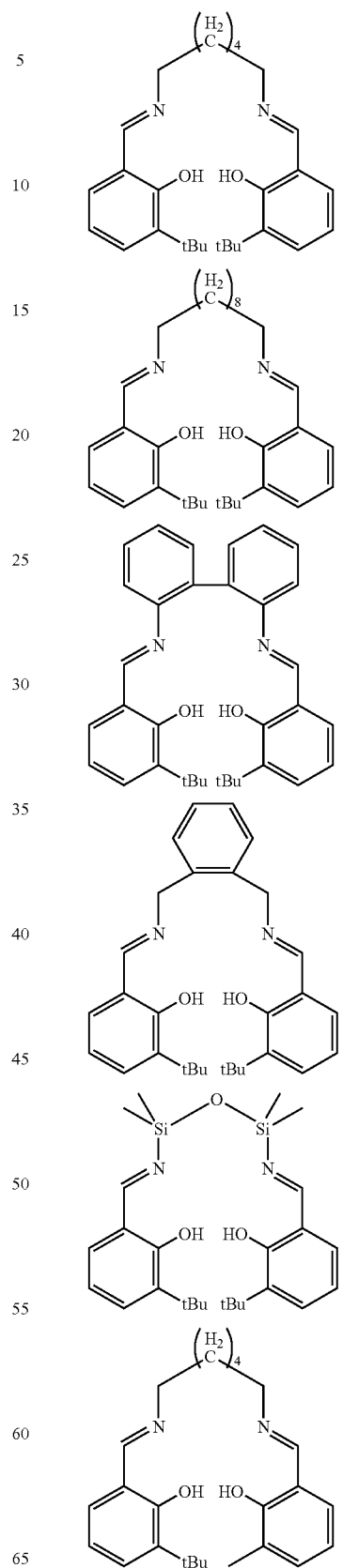

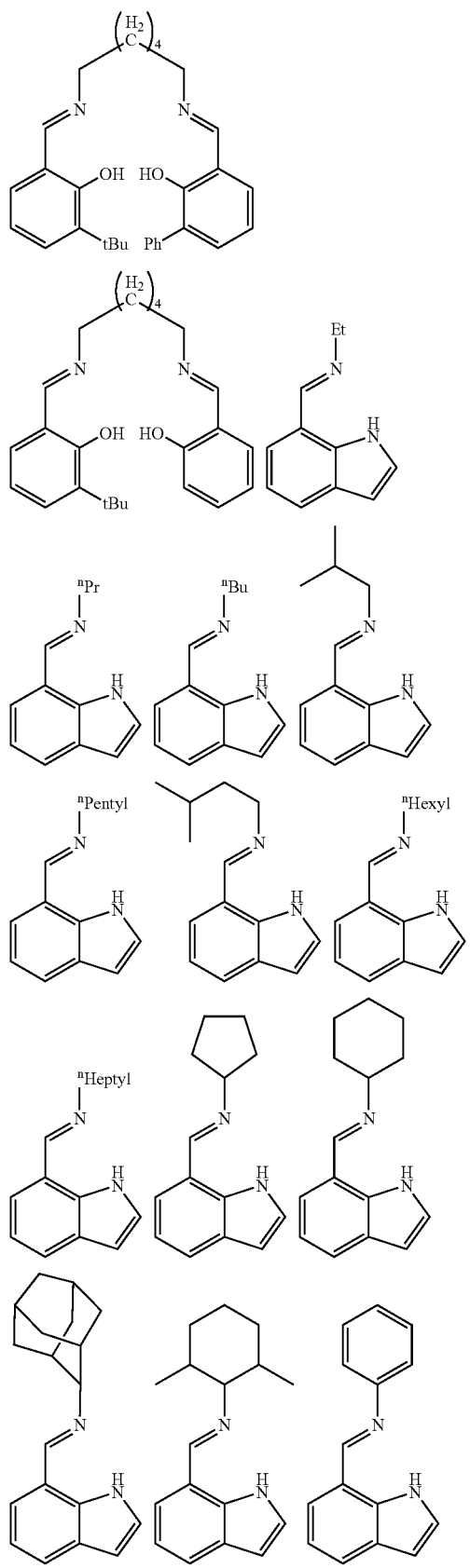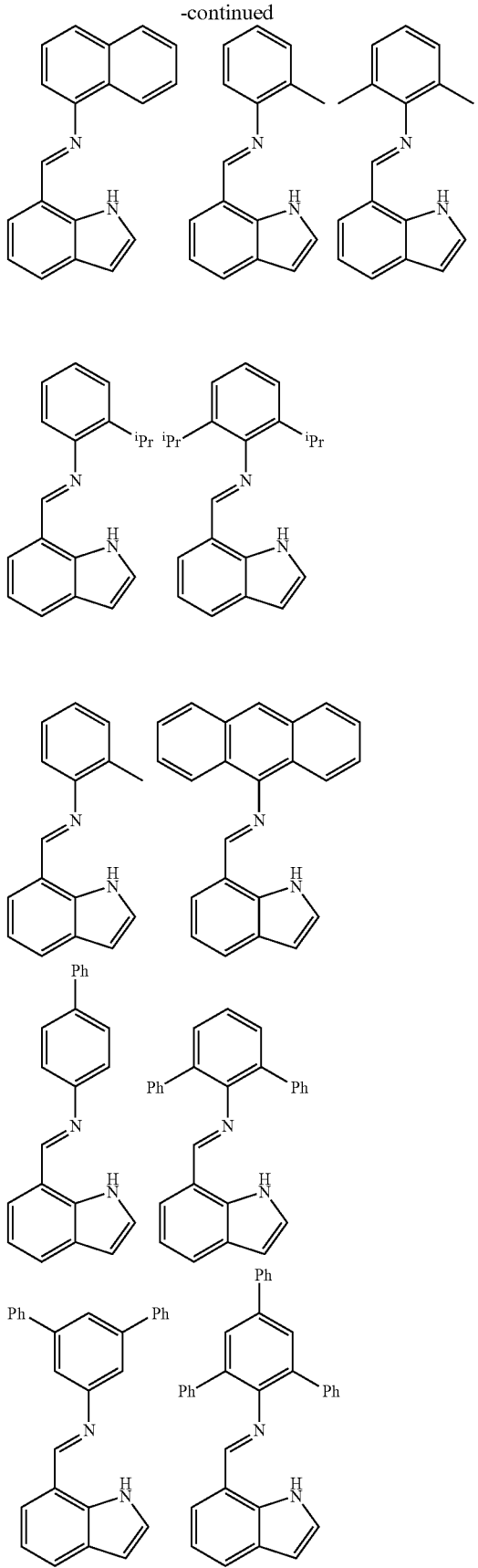

-continued
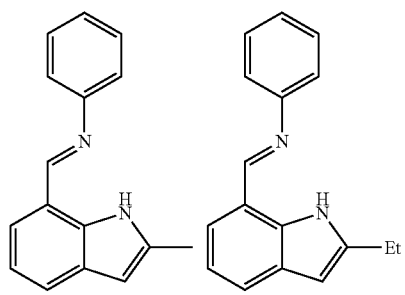 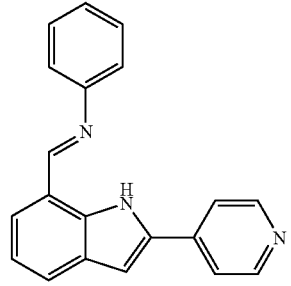
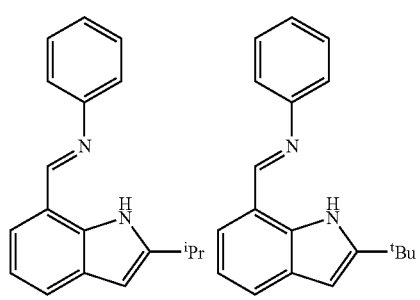 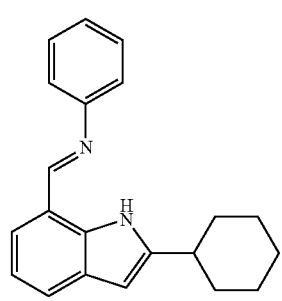
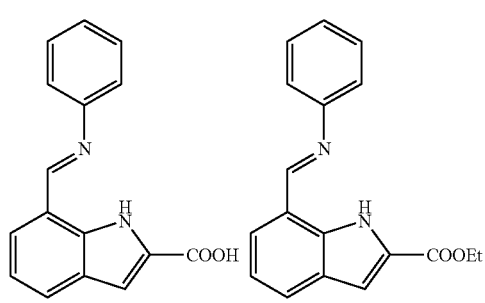 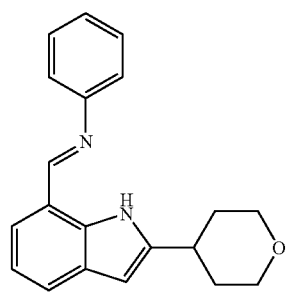
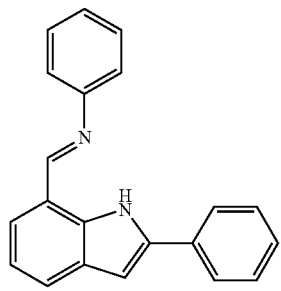 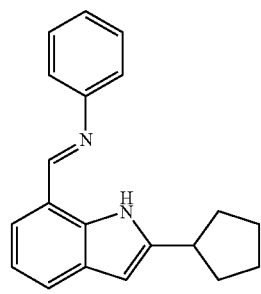
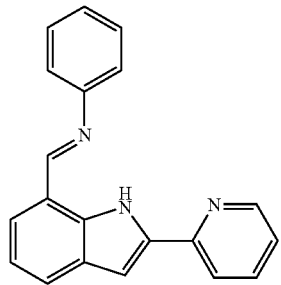 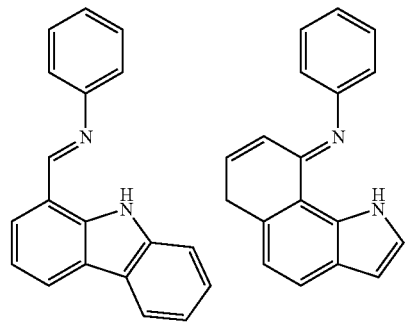

-continued
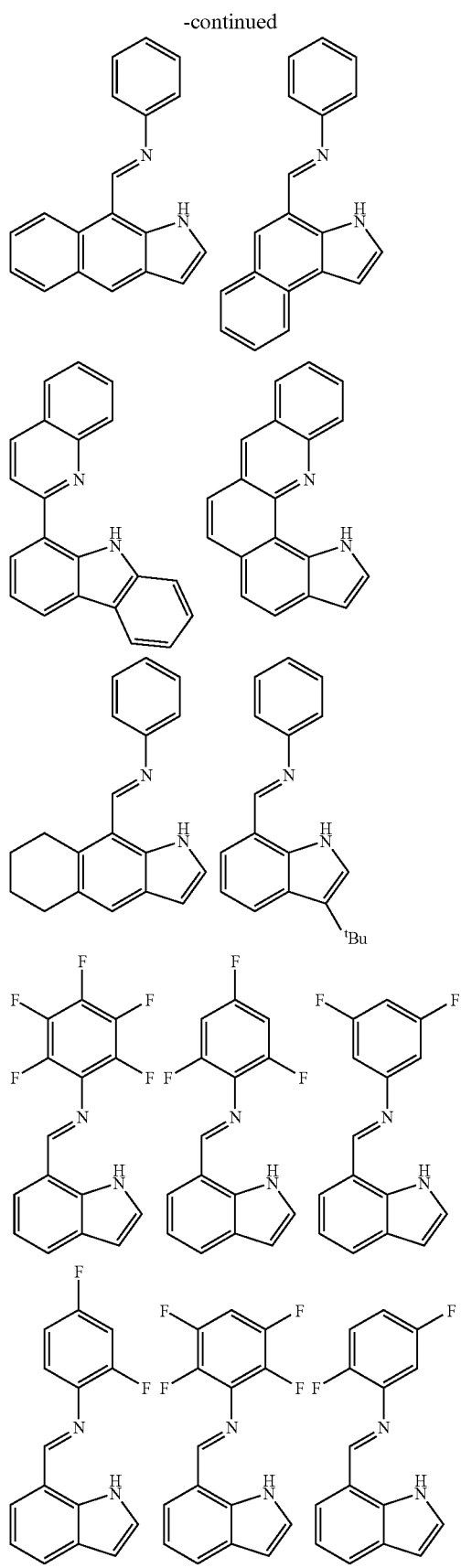
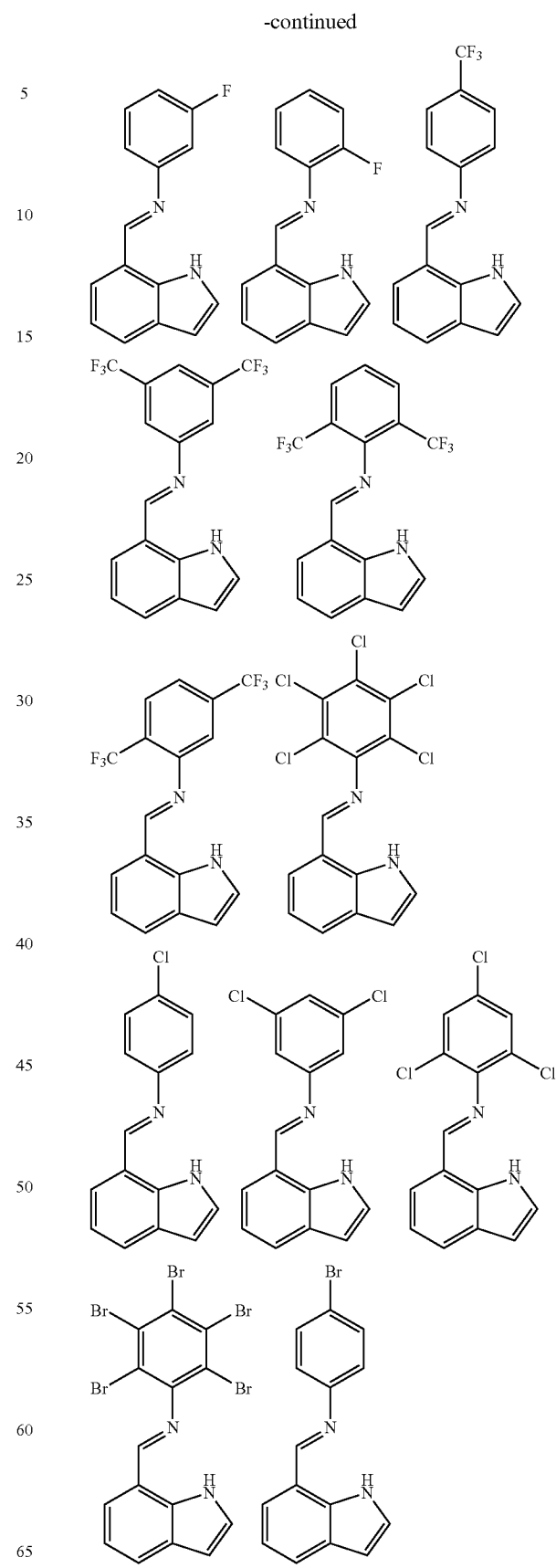

-continued

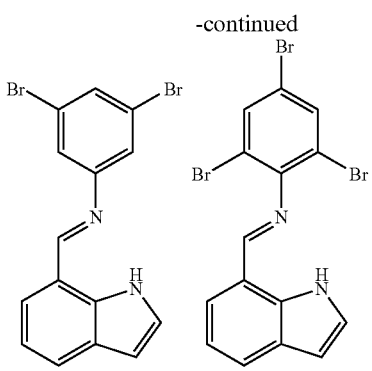

The reaction between the transition metal compound (C) and the compound represented by the formula (I) is carried out, for example, as follows.

The transition metal compound (C) and the compound (I) are mixed at a low temperature in the presence of a solvent, and then stirred at a temperature of −78° C. to room temperature, or under reflux, for 1 to 48 hours.

As the solvent, any solvent generally used for such reaction is employable. Above all, a polar solvent such as ether or tetrahydrofuran (THF), and a hydrocarbon solvent such as toluene are preferable.

When $R^5$ in the formula (I) is a hydrogen atom so that the compound (I) has an active hydrogen group, the reaction with the transition metal compound (C) may be conducted after the compound (I) has been contacted with a base to prepare a salt, or after the compound (I) has been contacted with a silicon compound to produce a silicon compound. As the base used in this case, there may be enumerated basic alkali metal compounds such as n-butyllithium and sodium hydroxide; basic alkali earth metal compounds such as ethylmagnesium bromide; and organic bases such as triethylamine and pyridine. As the silicon compound, there may be enumerated alkylsilylchlorides such as trimethylsilylchloride and triethylsilylchloride.

By the reaction between the transition metal compound (C) and the compound (I), at least a part of X in the formula (c) is substituted with a ligand derived from the compound (I). The number of such ligands can be adjusted by altering the charge ratio between the transition metal compound (C) and the compound (I).

As the molar ratio between the transition metal compound (C) and the compound (I) in the reaction, the compound (I) is in an amount of usually 1 to 6 mol, preferably 1 to 4 mol, based on 1 mol of the transition metal compound (C).

In the reaction, two or more kinds of compounds (I) may be used, and a different kind of compound (I) may be added successively during the reaction process. In this manner, the compound in which plural kinds of ligands are coordinated to the transition metal can be synthesized. The proportion of ligands coordinated to the transition metal can be adjusted by altering the charge ratio between two or more kinds of compounds (I).

When any of $R^1$ to $R^4$ and $R^6$ in the compound (I) is a hydrogen atom, a substituent other than a hydrogen atom may be introduced in any stage of the reaction.

The composition and structure of the reaction product (A1) can be confirmed by analyzing through elemental analysis, X-ray crystal structure analysis, mass spectrum, NMR, IR or the like.

The thus obtained reaction product (A1) contains the after-mentioned transition metal compound (IV), and as the case may be, contains also the compound in which a part of X in the formula (c) is substituted with a ligand derived from the compound (I) (the compound (A1-a)), the unreacted transition metal compound (C), the compound (I) and others.

After the reaction, the reaction product (A1) may be used in the form of mixture without purification, or with purification by distillation, recrystallization or the like.

The metal in the compound contained in the obtained reaction product (A1) may be replaced with another transition metal selected from Groups 4, 5, 6 and 11 of the periodic table by a conventional procedure.

It is also possible to further convert a substituent other than the ligand derived from the compound (I) contained in the compound (A1-a) in the reaction product (A1). Concretely, the residual halogen group may be converted into a hydrocarbon group, and the amido group may be converted into a halogen group.

Reaction Product (A2)

The catalyst component (A2) is a reaction product of the transition metal compound (C) represented by the formula (c) and a compound represented by the following formula (II).

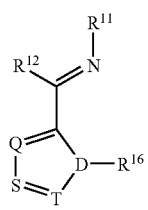

(II)

In the above formula (II), D denotes a nitrogen atom or a phosphorus atom.

Q denotes a nitrogen atom (=N—) or a phosphorus atom (=P—), or a carbon atom substituted with a substitutent $R^{13}$ (=C($R^{13}$)—).

S denotes a nitrogen atom (—N=) or a phosphorus atom (—P=), or a carbon atom substituted with a substitutent $R^{14}$ (—C($R^{14}$)=).

T denotes a nitrogen atom (=N—) or a phosphorus atom (=P—), or a carbon atom substituted with a substitutent $R^{15}$ (=C($R^{15}$)—).

$R^{11}$ to $R^{16}$ may be the same or different, and have the same meanings as those of $R^1$ to $R^6$ in the formula (I).

In these $R^{11}$ to $R^{16}$, the heterocyclic compound residual group, the oxygen-containing group, the nitrogen-containing group, the sulfur-containing group, the boron-containing group, the germanium-containing group, the tin-containing group, the silicon-containing group and the phosphorus-containing group are each preferably the group wherein the characteristic atom group thereof is directly bonded to N, a carbon atom, a carbon atom in Q, S or T, or D in the formula (II).

Two or more groups of $R^{11}$ to $R^{16}$, preferably the adjacent groups thereof, may be bonded to each other to form an aliphatic ring, an aromatic ring, or a hydrocarbon ring containing a hetero atom (e.g., a nitrogen atom), which rings may have a substituent respectively.

Among the compounds represented by the formula (II), particularly preferable are the compounds in which $R^{16}$ is a hydrogen atom.

Examples of such compounds represented by the formula (II) are given below.

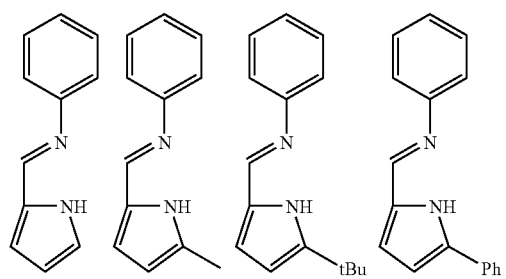
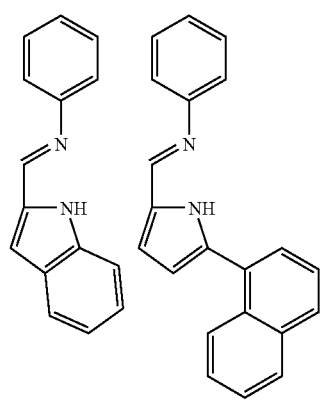
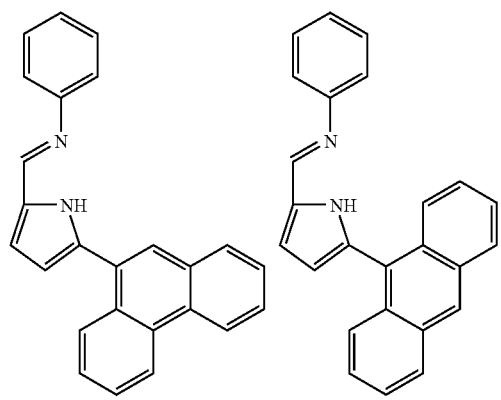
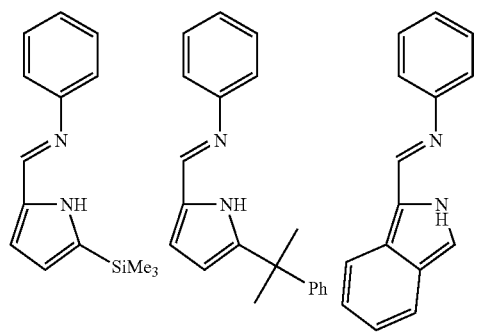
-continued
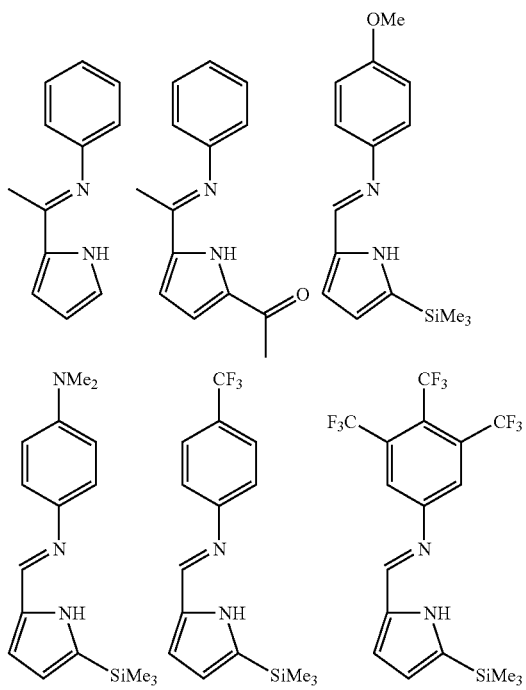
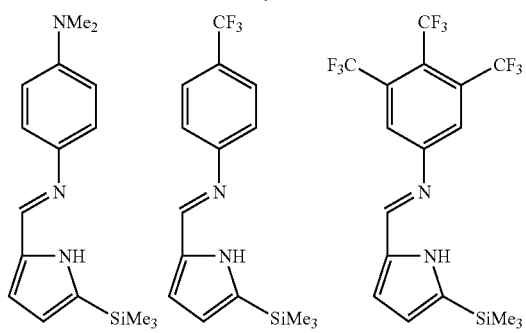
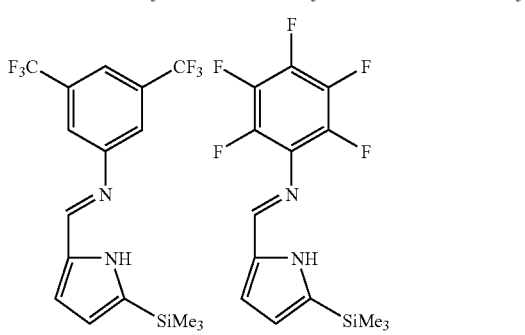
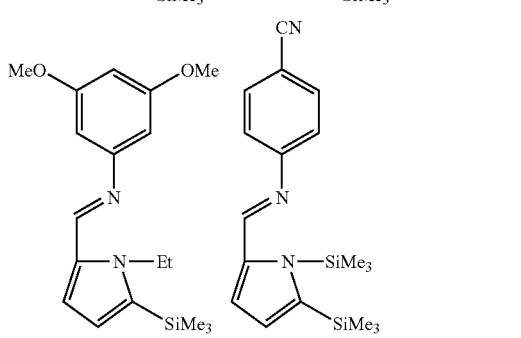
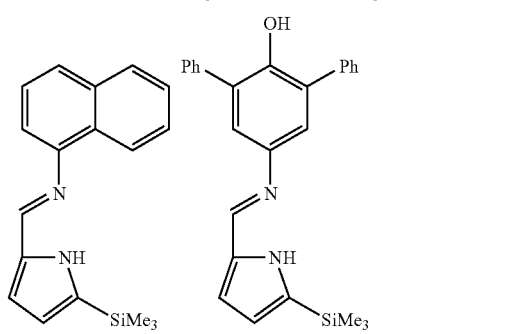

-continued
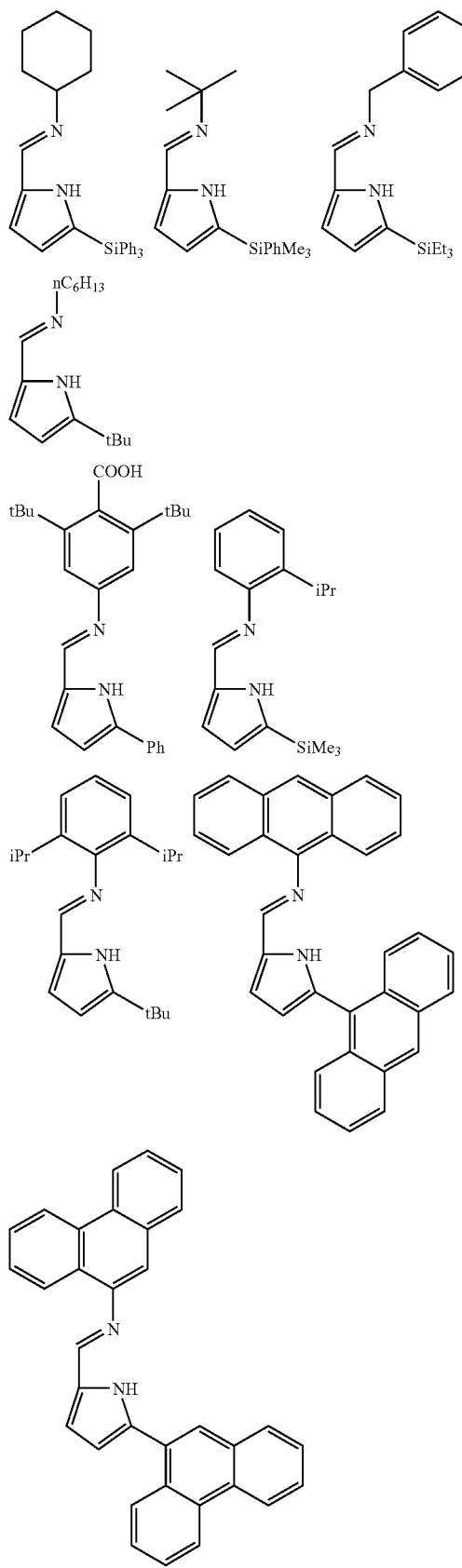
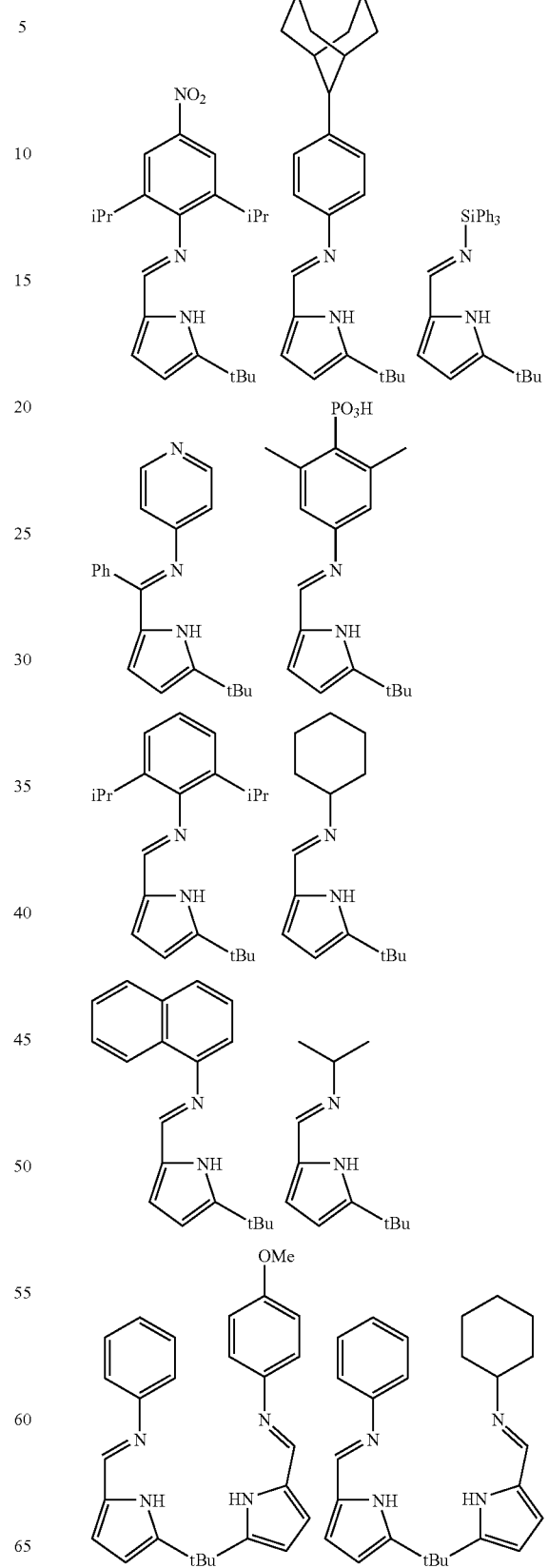

-continued
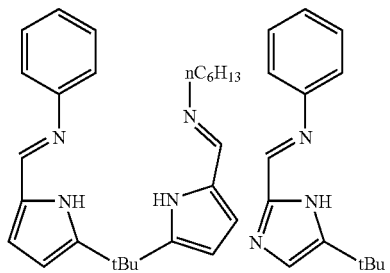
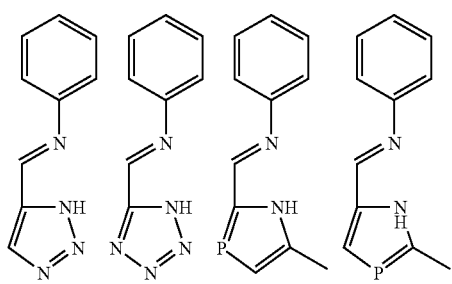
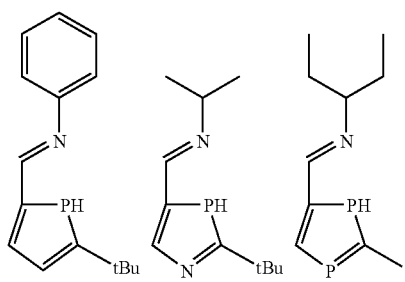
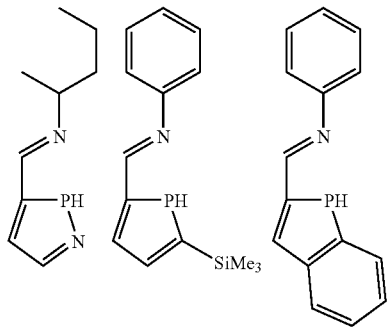
-continued
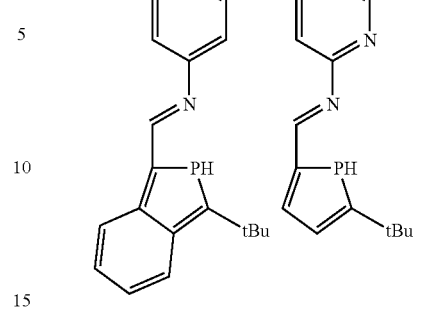
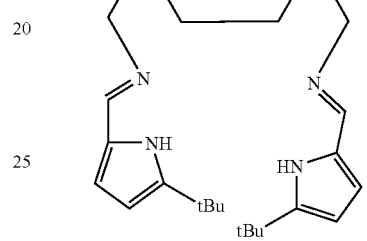
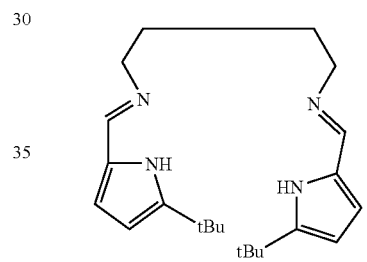
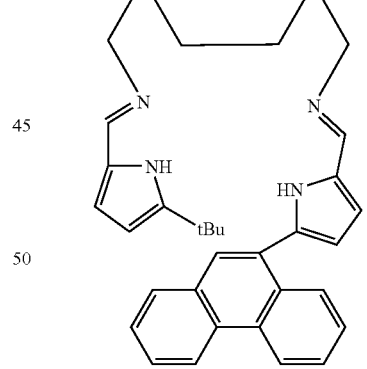
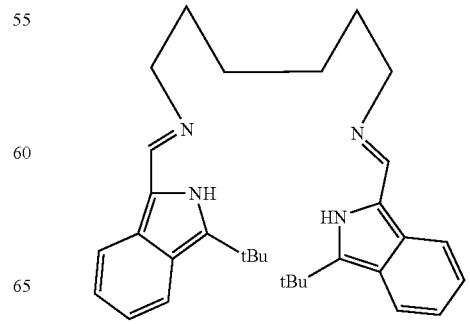

-continued
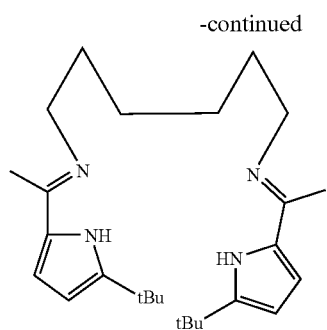
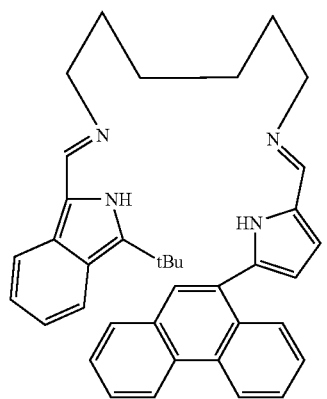
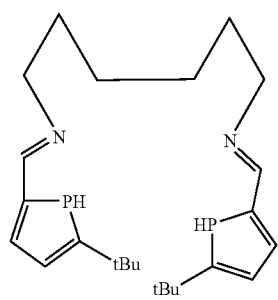
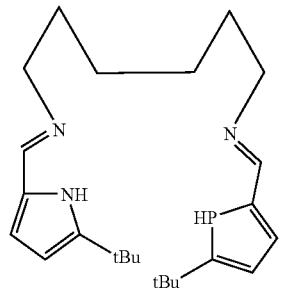
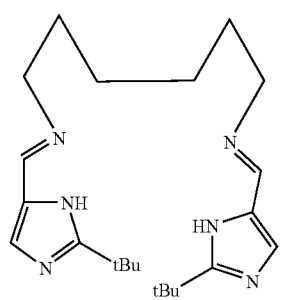
-continued
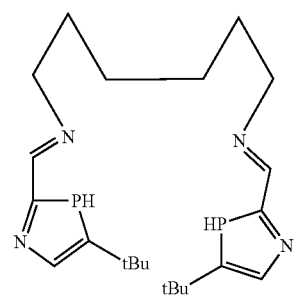
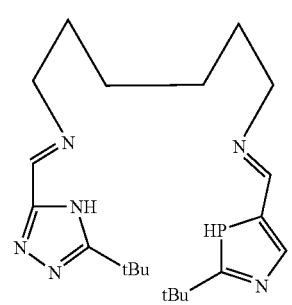
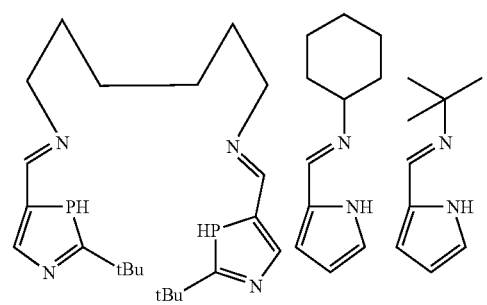
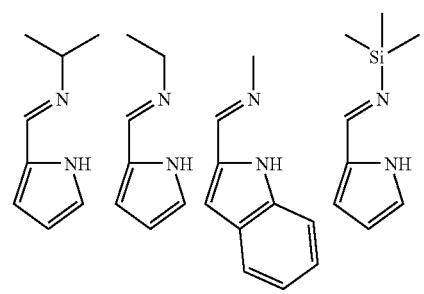
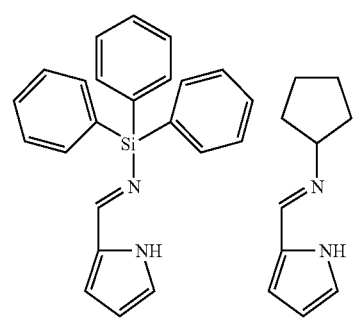

-continued

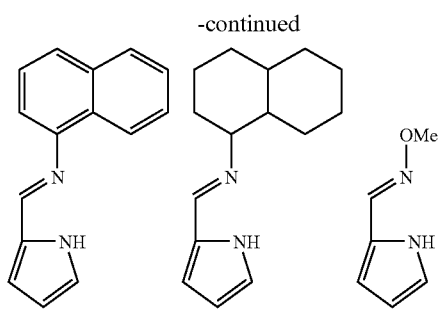
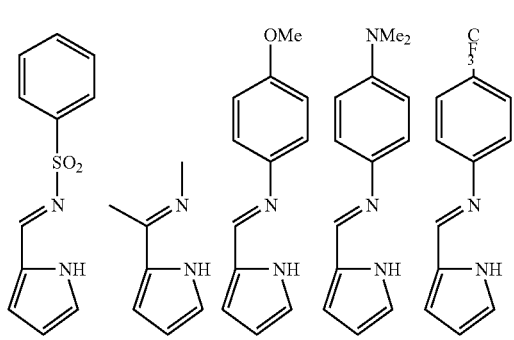
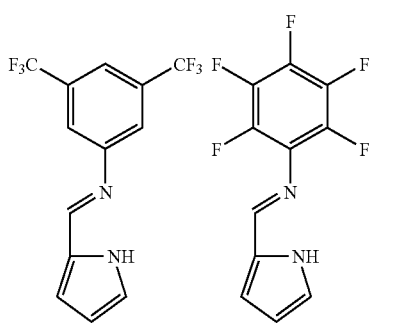
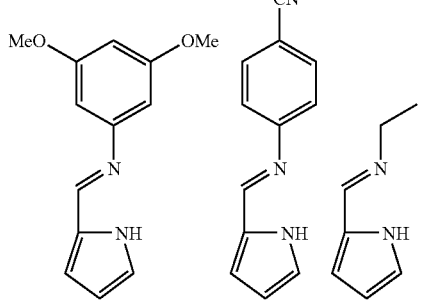
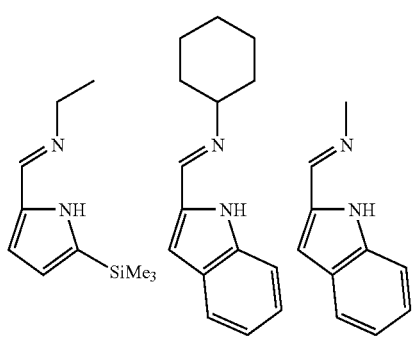

-continued

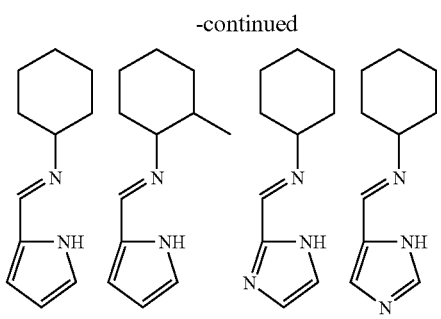
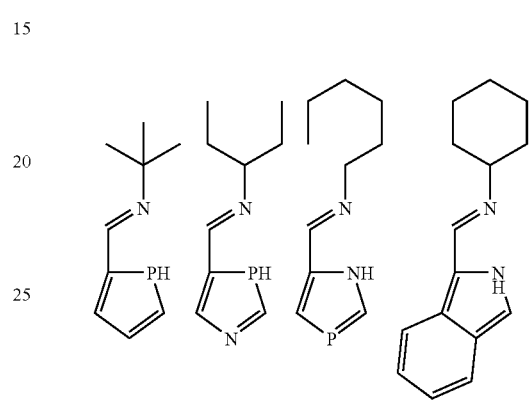
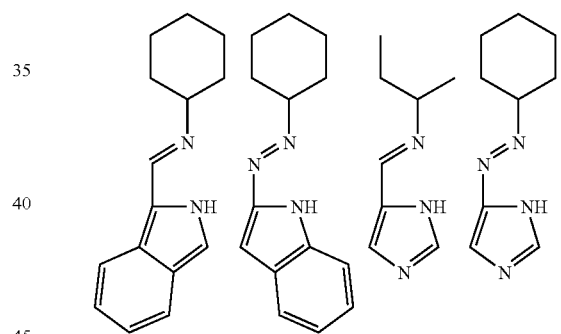
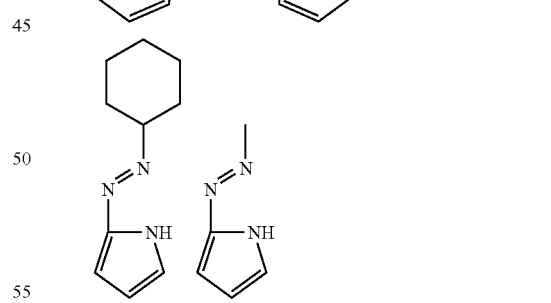

The reaction between the transition metal compound (C) and the compound represented by the formula (II) is carried out, for example, as follows.

The transition metal compound (C) and the compound (II) are mixed at a low temperature in the presence of a solvent, and then stirred at a temperature of −78° C. to room temperature, or under reflux, for 1 to 48 hours.

As the solvent, the same solvents as previously cited for the preparation of the reaction product (A1) are employable.

When $R^{16}$ in the formula (II) is a hydrogen atom so that the compound (II) has an active hydrogen group, the reaction with the transition metal compound (C) may be conducted after the compound (II) has been contacted with a base to prepare a salt, or after the compound (II) has been contacted with a silicon compound to produce a silicon compound. As the base and the silicon compound used in this case, the same ones as previously cited for the preparation of the reaction product (A1) may be enumerated.

By the reaction between the transition metal compound (C) and the compound (II), at least a part of X in the formula (c) is substituted with a ligand derived from the compound (II). The number of such ligands can be adjusted by altering the charge ratio between the transition metal compound (C) and the compound (II).

As the molar ratio between the transition metal compound (C) and the compound (II) in the reaction, the compound (II) is in an amount of usually 1 to 6 mol, preferably 1 to 4 mol, based on 1 mol of the transition metal compound (C).

In the reaction, two or more kinds of compounds (II) may be used, and a different kind of compound (II) may be added successively during the reaction process. In this manner, the compounds in which plural kinds of ligands are coordinated to the transition metal can be synthesized. The proportion of ligands coordinated to the transition metal can be adjusted by altering the charge ratio between two or more kinds of compounds (II).

When any of $R^{11}$ to $R^{15}$ in the compound (II) is a hydrogen atom, a substituent other than a hydrogen atom may be introduced in any stage of the reaction.

The composition and structure of the reaction product (A2) can be confirmed by analyzing through elemental analysis, X-ray crystal structure analysis, mass spectrum, NMR, IR or the like.

The thus obtained reaction product (A2) contains the after-mentioned transition metal compound (V), and as the case may be, contains also the compound in which a part of X in the formula (c) is substituted with a ligand derived from the compound (II) (the compound (A2-a)), the unreacted transition compound (C), the compound (II) and others.

After the reaction, the reaction product (A2) may be used in the form of mixture without purification, or with purification by distillation, recrystallization or the like.

The metal in the compound contained in the obtained reaction product (A2) may be replaced with another transition metal selected from Groups 4, 5, 6 and 11 of the periodic table by a conventional procedure.

It is also possible to further convert a substituent other than the ligand derived from the compound (II) contained in the compound (A2-a) in the reaction product (A2). Concretely, the residual halogen group may be converted into a hydrocarbon group, and the amido group may be converted into a halogen group.

Reaction Product (A3)

The catalyst component (A3) is a reaction product of the transition metal compound (C') represented by the formula (c') and a compound represented by the following formula (III).

$$MX_k \quad (c')$$

In the formula (c'), M is a transition metal atom selected from Groups 3 to 11, preferably Groups 4, 5, 6 and 11, of the periodic table, and specific examples thereof include scandium, yttrium, lanthanum, titanium, zirconium, hafnium, vanadium, niobium, tantalum, chromium, molybdenum, tungsten, manganese, rhenium, iron, ruthenium, cobalt, rhodium, nickel, palladium, platinum, copper and silver. Of these, preferable are transition metal atoms selected from Groups 4, 5, 6 and 11 of the periodic table, such as titanium, zirconium, hafnium, vanadium, niobium, tantalum, chromium, molybdenum, tungsten, copper and silver, and more preferable are titanium, vanadium and chromium.

X and k have the same meanings as those of X and k in the above formula (c). When k is 2 or greater, plural groups indicated by X may be the same or different, and plural groups indicated by X may be bonded to each other to form a ring.

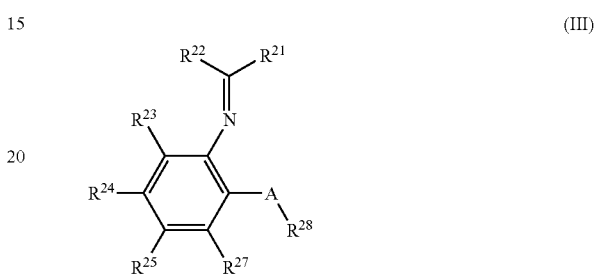

In the above formula (III), A denotes an oxygen atom (—O—), a sulfur atom (—S—) or a selenium atom (—Se—), or a nitrogen atom having a substitutent $R^{26}$ (—N($R^{26}$)—).

$R^{21}$ to $R^{28}$ may be the same or different, and have the same meanings as those of $R^1$ to $R^6$ in the formula (I).

In these $R^{21}$ to $R^{28}$, the hetero-containing compound residual group, the oxygen-containing group, the nitrogen-containing group, the sulfur-containing group, the boron-containing group, the germanium-containing group, the tin-containing group, the silicon-containing group and the phosphorus-containing group are each preferably the group wherein the characteristic atom group thereof is directly bonded to N, a carbon atom or A in the formula (III).

Two or more groups of $R^{21}$ to $R^{28}$, preferably the adjacent groups thereof, may be bonded to each other to form an aliphatic ring, an aromatic ring, or a hydrocarbon ring containing a hetero atom (e.g., a nitrogen atom), which rings may have a substituent respectively.

Among the compounds represented by the formula (III), particularly preferable are the compounds in which $R^{28}$ is a hydrogen atom.

Examples of such compounds represented by the formula (III) are given below.

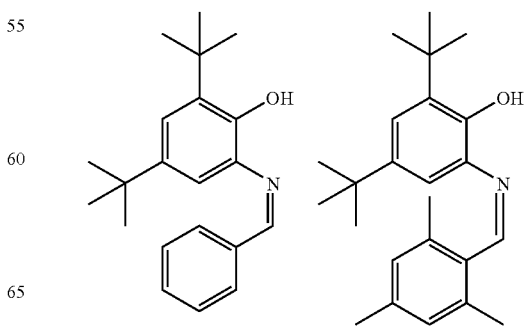

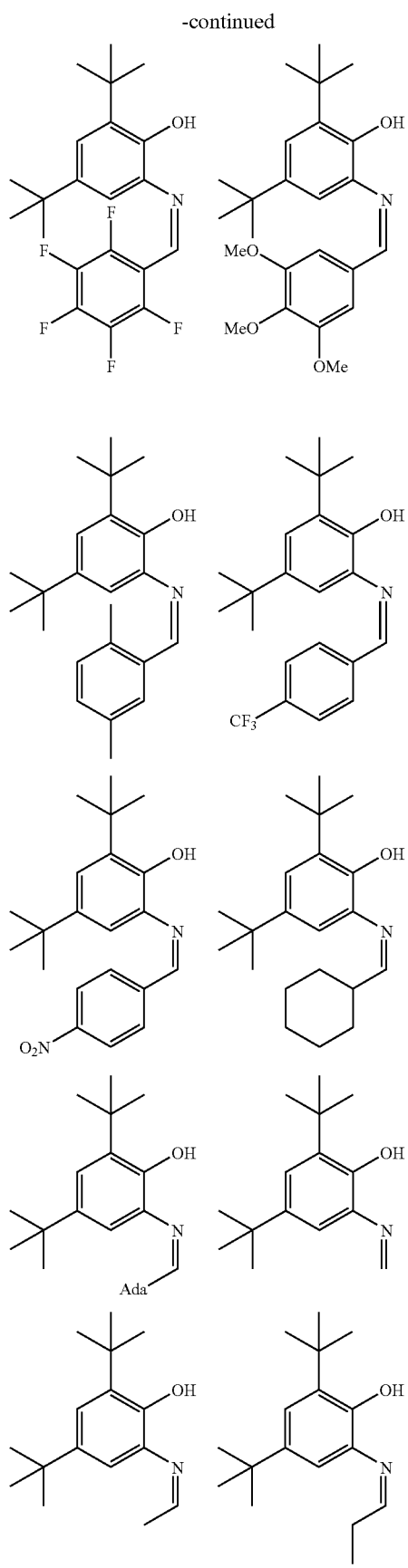
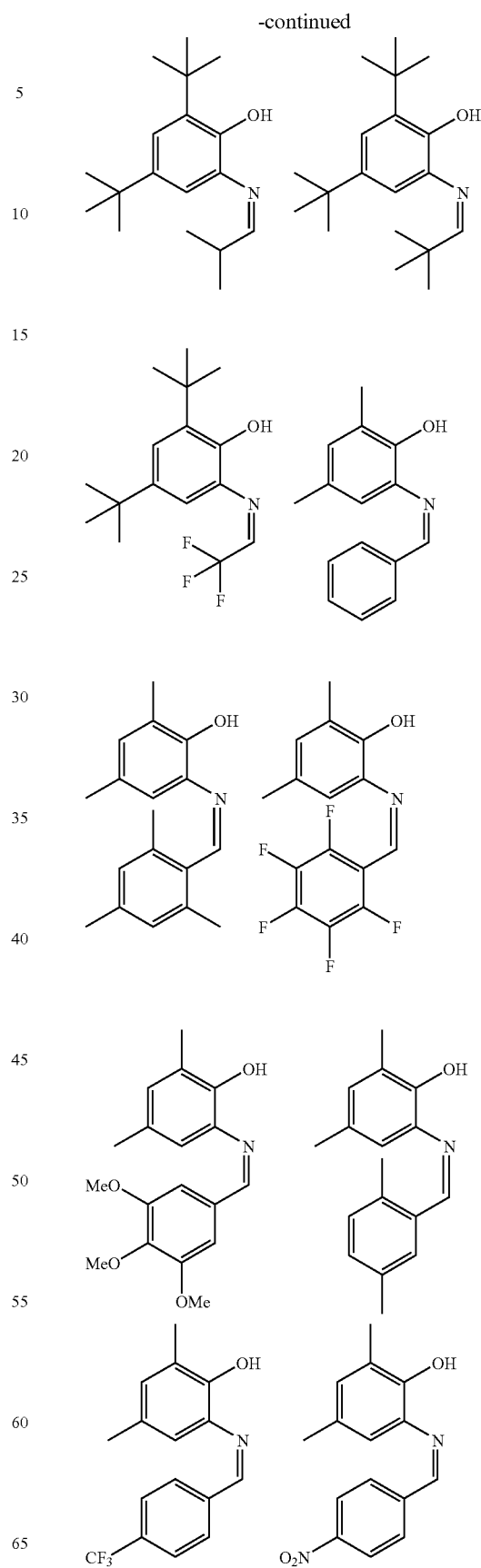

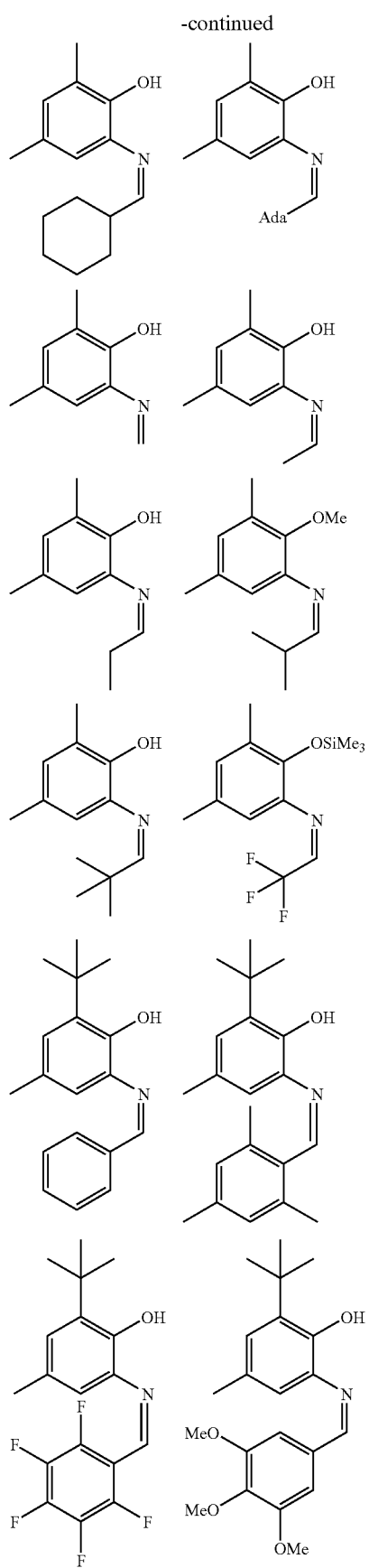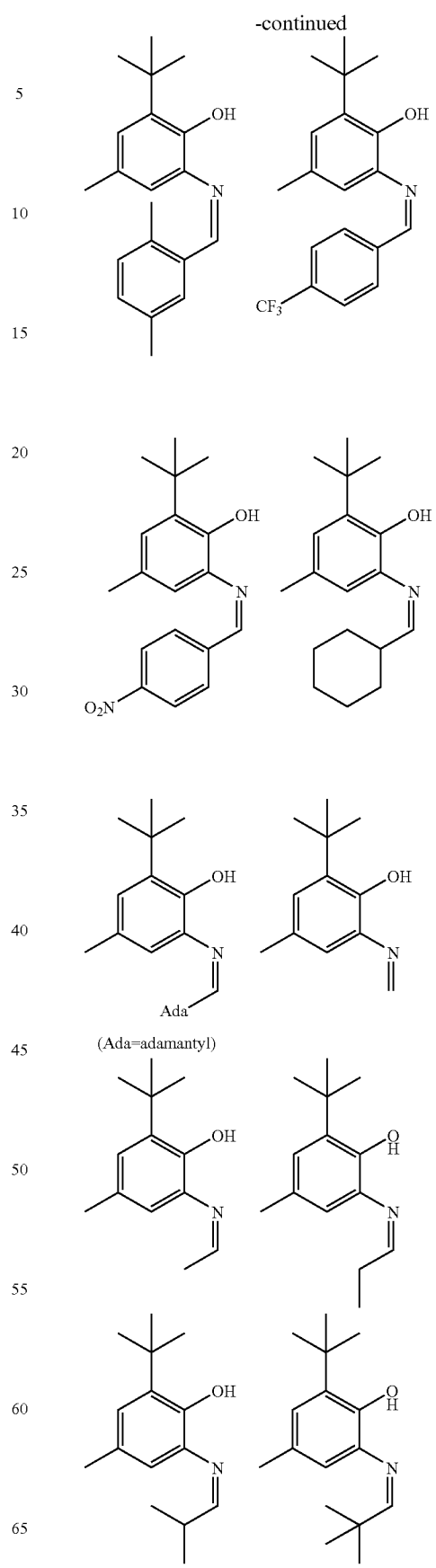
(Ada=adamantyl)

-continued

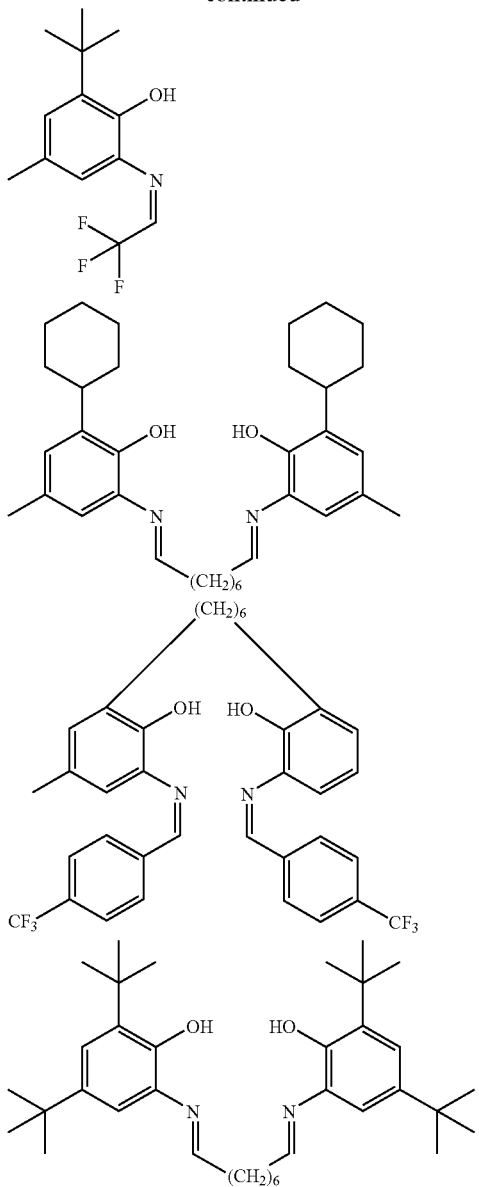

The reaction between the transition metal compound (C') and the compound represented by the formula (III) is carried out, for example, as follows.

The transition metal compound (C') and the compound (III) are mixed at a low temperature in the presence of a solvent, and then stirred at a temperature of −78° C. to room temperature, or under reflux, for 1 to 48 hours.

As the solvent, the same solvents as previously cited for the preparation of the reaction product (A1) are employable.

When $R^{28}$ in the formula (III) is a hydrogen atom so that the compound (III) has an active hydrogen group, the reaction with the transition metal compound (C') may be conducted after the compound (III) has been contacted with a base to prepare a salt, or after the compound (III) has been contacted with a silicon compound to produce a silicon compound. As the base and the silicon compound used in this case, the same ones as previously cited for the preparation of the reaction product (A1) may be enumerated.

By the reaction between the transition metal compound (C') and the compound (III), at least a part of X in the formula (c') is substituted with a ligand derived from the compound (III). The number of such ligands can be adjusted by altering the charge ratio between the transition metal compound (C') and the compound (III).

As the molar ratio between the transition metal compound (C') and the compound (III) in the reaction, the compound (III) is in an amount of usually 1 to 6 mol, preferably 1 to 4 mol, based on 1 mol of the transition metal compound (C').

In the reaction, two or more kinds of compounds (III) may be used, and a different kind of compound (III) may be added successively during the reaction process. In this manner, the compounds in which plural kinds of ligands are coordinated to the transition metal can be synthesized. The proportion of ligands coordinated to the transition metal can be adjusted by altering the charge ratio between two or more kinds of compounds (III).

When any of $R^{21}$ to $R^{27}$ in the compound (III) is a hydrogen atom, a substituent other than a hydrogen atom may be introduced in any stage of the reaction.

The composition and structure of the reaction product (A3) can be confirmed by analyzing through elemental analysis, X-ray crystal structure analysis, mass spectrum, NMR, IR or the like.

The thus obtained reaction product (A3) contains the after-mentioned transition metal compound (VI), and as the case may be, contains also the compound in which a part of X in the formula (c') is substituted with a ligand derived from the compound (III) (the compound (A3-a)), the unreacted transition compound (C'), the compound (III) and others.

After the reaction, the reaction product (A3) may be used in the form of mixture without purification, or with purification by distillation, recrystallization or the like.

The metal in the compounds contained in the obtained reaction product (A3) may be replaced with another transition metal selected from Groups 4, 5, 6 and 11 of the periodic table by a conventional procedure.

It is also possible to further convert a substituent other than the ligand derived from the compound (III) contained in the compound (A3-a) in the reaction product (A3). Concretely, the residual halogen group may be converted into a hydrocarbon group, and the amide group may be converted into a halogen group.

Transition Metal Compound (A4)

The transition metal compound (A4) is a compound of a transition metal selected from Groups 4, 5, 6 and 11 of the periodic table which is represented by the following formula (IV):

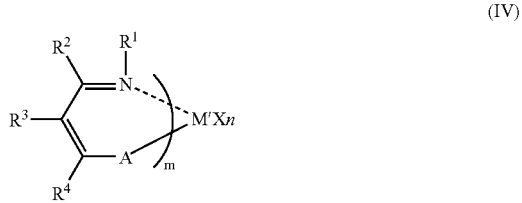

(IV)

(wherein the dotted line (----) of N----M' means that a coordinate bond is formed, but a compound having no coordinate bond is also included in the present invention.)

In the above formula (IV), M' has the same meaning as that of M' in the formula (c), and particularly preferable is a titanium atom, a vanadium atom, a chromium atom or a copper atom.

The m is an integer of 1 to 6, preferably an integer of 1 to 4.

A has the same meaning as that of A in the formula (I).

$R^1$ to $R^4$ and $R^6$ have the same meanings as those of $R^1$ to $R^6$ in the formula (I).

Two or more groups of $R^1$ to $R^4$ and $R^6$, preferably the adjacent groups thereof, may be bonded to each other to form an aliphatic ring, an aromatic ring, or a hydrocarbon ring containing a hetero atom (e.g., a nitrogen atom), which rings may have a substituent respectively. When m is 2 or greater, one group of $R^1$ to $R^4$ and $R^6$ contained in one ligand may be bonded to one group of $R^1$ to $R^4$ and $R^6$ contained in another ligand, and $R^1$s, $R^2$s, $R^3$s, $R^4$s or $R^6$s may be the same or different.

The n is a number satisfying a valence of M', and concretely an integer of 0 to 5, preferably an integer of 1 to 4, more preferably an integer of 1 to 3.

X has the same meaning as that of X in the formula (c). When n is 2 or greater, the plural groups indicated by X may be the same or different, and the plural groups indicated by X may be bonded to each other to form a ring.

The transition metal compound represented by the formula (IV) wherein $R^3$ and $R^4$ are bonded to each other to form an aromatic ring is represented by the following formula (IV-a).

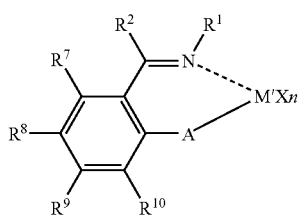

(IV-a)

In the above formula (IV-a), A, M', X, m and n have the same meanings respectively as those of A, M', X, m and n in the formula (IV).

$R^1$, $R^2$ and $R^6$ to $R^{10}$ may be the same or different, and have the same meanings as those of $R^1$ to $R^6$ in the formula (I). Two or more of $R^1$, $R^2$ and $R^6$ to $R^{10}$ may be bonded to each other to form a ring.

Among the transition metal compounds represented by the formula (IV), the compounds wherein m is 2, and one group of $R^1$ to $R^4$ and $R^6$ contained in any one ligand is bonded to one group of $R^1$ to $R^4$ and $R^6$ contained in another ligand are represented, for example, by the following formula (IV-b).

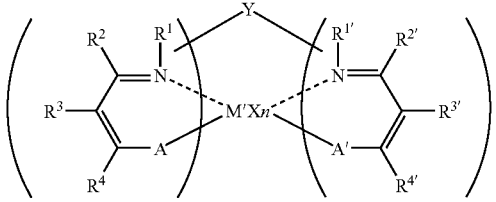

(IV-b)

In the above formula (IV-b), A, M', X and n have the same meanings respectively as those of A, M', X and n in the aforesaid formula (IV).

$R^1$ to $R^4$ and $R^6$ may be the same or different, and have the same meanings as those of $R^1$ to $R^6$ in the formula (I). Two or more of $R^1$ to $R^4$ and $R^6$ may be bonded to each other to form a ring.

A' may be the same as, or different from A, and denotes an oxygen atom (—O—), a sulfur atom (—S—) or a selenium atom (—Se—), or a nitrogen atom having a bonding group $R^{6'}$ (—N($R^{6'}$)—).

$R^{1'}$ to $R^{4'}$ and $R^{6'}$ may be the same or different, and have the same meanings as those of $R^1$ to $R^6$ in the formula (I). Two or more of $R^{1'}$ to $R^{4'}$ and $R^{6'}$ may be bonded to each other to form a ring. Further, $R^1$ to $R^4$ and $R^6$ may be the same as, or different from $R^{1'}$ to $R^{4'}$ and $R^{6'}$ respectively.

Y denotes a bonding group or a single bond, in which at least one group selected from $R^1$ to $R^4$ is bonded to at least one group selected from $R^{1'}$ to $R^{4'}$. Although there is no specific restriction on the bonding group, it desirably has a structure wherein the main chain consists of 3 or more atoms, preferably 4 to 20 atoms, more preferably 4 to 10 atoms. The bonding group may have a substituent.

As the bonding group indicated by Y, there may be enumerated groups containing at least one element selected from oxygen, sulfur, carbon, nitrogen, phosphorus, silicon, selenium, tin, boron and so on. Examples of such groups include chalcogen atom-containing groups such as —O—, —S— and —Se—; nitrogen or phosphorus atom-containing groups such as —NH—, —N(CH$_3$)$_2$—, —PH— and —P(CH$_3$)$_2$—; hydrocarbon groups of 1 to 20 carbon atoms such as —CH$_2$—, —CH$_2$—CH$_2$— and —C(CH$_3$)$_2$—; residual groups of cyclic unsaturated hydrocarbons of 6 to 20 carbon atoms such as benzene, naphthalene and anthracene; residual groups of heterocyclic compounds having 3 to 20 carbon atoms and containing hetero atoms such as pyridine, quinoline, thiophene and furan; silicon atom-containing groups such as —SiH$_2$— and —Si(CH$_3$)$_2$—; tin atom-containing groups such as —SnH$_2$— and —Sn(CH$_3$)$_2$—; and boron atom-containing groups such as —BH—, —B(CH$_3$)— and —BF—.

The compounds represented by the formula (IV-b) in which $R^3$ and $R^4$ are bonded to $R^{3'}$ and $R^{4'}$ to form an aromatic ring are represented by the following forumula (IV-c).

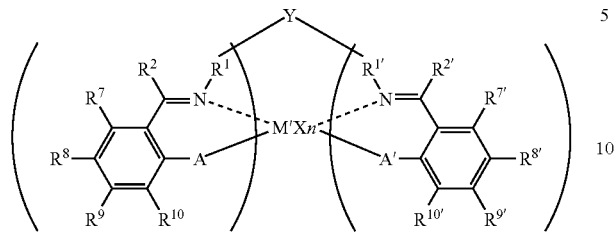

(IV-c)

In the above formula (IV-c), A, M', X and n have the same meanings respectively as those of A, M', X and n in the formula (IV).

$R^1$, $R^2$ and $R^6$ to $R^{10}$ may be the same or different, and have the same meanings as those of $R^1$ to $R^6$ in the formula (I). Two or more of $R^1$, $R^2$ and $R^6$ to $R^{10}$ may be bonded to each other to form a ring.

A' may be the same as, or different from A, and denotes an oxygen atom (—O—), a sulfur atom (—S—) or a selenium atom (—Se—), or a nitrogen atom having a bonding group $R^{6'}$ (—N($R^{6'}$)—).

$R^{1'}$, $R^{2'}$ and $R^{6'}$ to $R^{10'}$ may be the same or different, and have the same meanings as those of $R^1$ to $R^6$ in the formula (I). Two or more of $R^{1'}$, $R^{2'}$ and $R^{6'}$ to $R^{10'}$ may be bonded to each other to form a ring. Further, $R^1$, $R^2$ and $R^6$ to $R^{10}$ may be the same as, or different from $R^{1'}$, $R^{2'}$ and $R^{6'}$ to $R^{10'}$ respectively.

Y denotes a bonding group or a single bond, in which at least one group selected from $R^1$, $R^2$ and $R^6$ to $R^{10}$ is bonded to at least one group selected from $R^{1'}$, $R^{2'}$ and $R^{6'}$ to $R^{10'}$. Although there is no specific restriction on the bonding group, it desirably has a structure wherein the main chain consists of 3 or more atoms, preferably 4 to 20 atoms, more preferably 4 to 10 atoms. The bonding group may have a substituent. As the bonding group indicated by Y, there may be enumerated the same groups as indicated by Y in the formula (IV-b).

Among the transition metal compounds represented by the above formula (IV), compounds in which $R^3$, $R^4$ and $R^5$ are bonded to form an aromatic ring are represented by the following formula (IV-d).

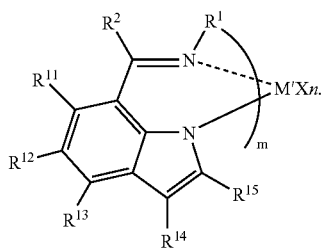

(IV-d)

In the above formula (IV-d), M', X, m and n have the same meanings respectively as those of M', X, m and n in the formula (IV).

$R^1$, $R^2$ and $R^{11}$ to $R^{15}$ may be the same or different and have the same meanings as those of $R^1$ to $R^6$ in the formula (I). Further, two or more of these $R^1$, $R^2$ and $R^{11}$ to $R^{15}$ may be bonded to each other to form a ring.

Examples of the transition metal compounds represented by the formula (IV), (IV-a), (IV-b), (IV-c) and (IV-d) are given below.

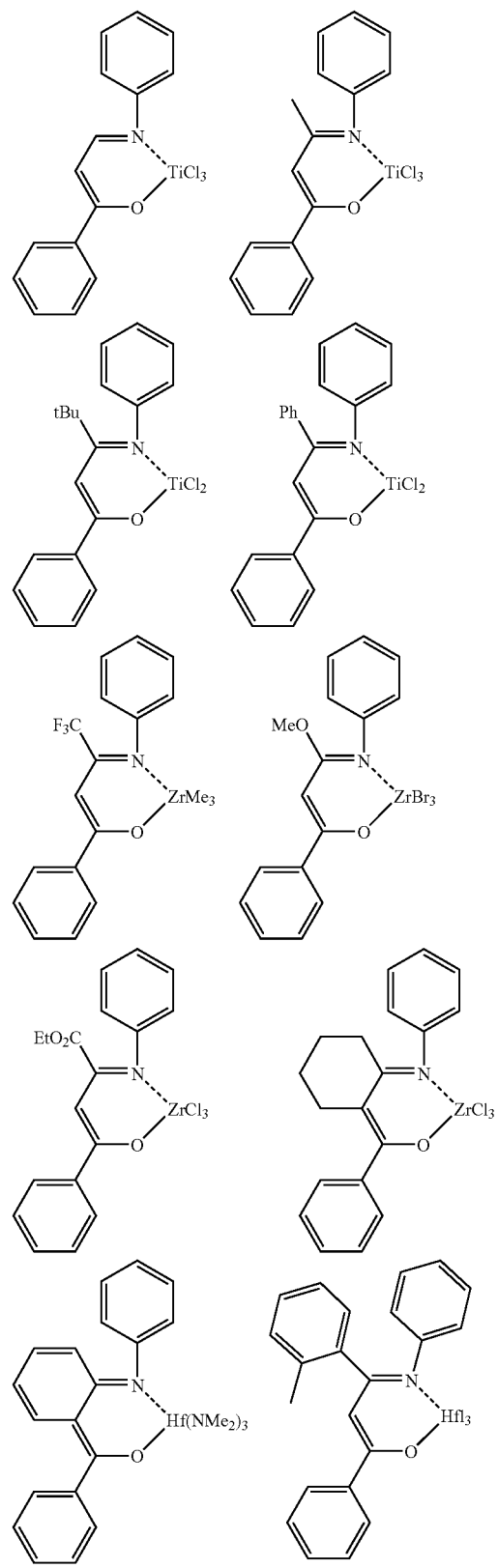

-continued
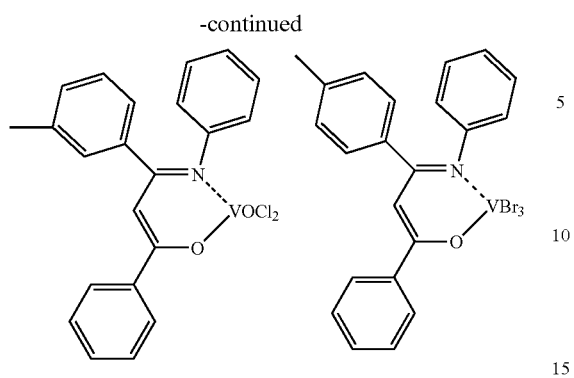
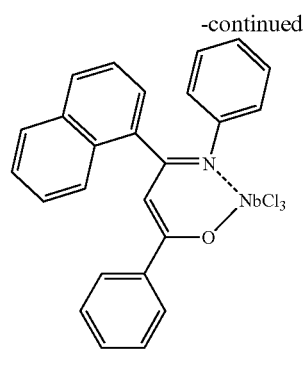
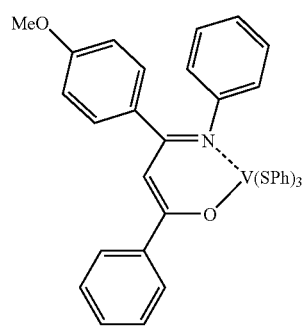
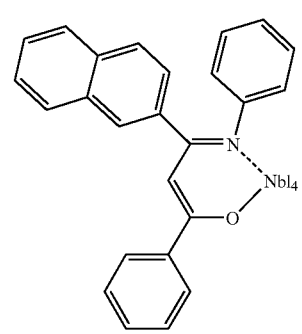
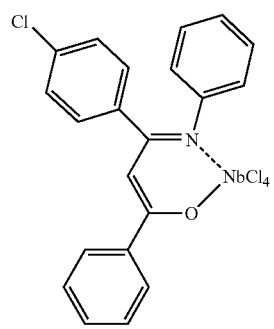
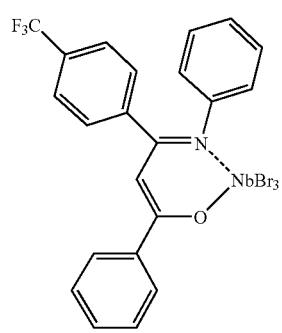
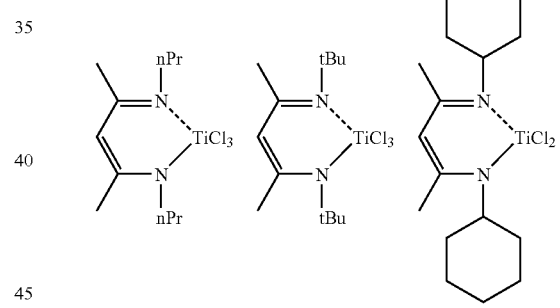
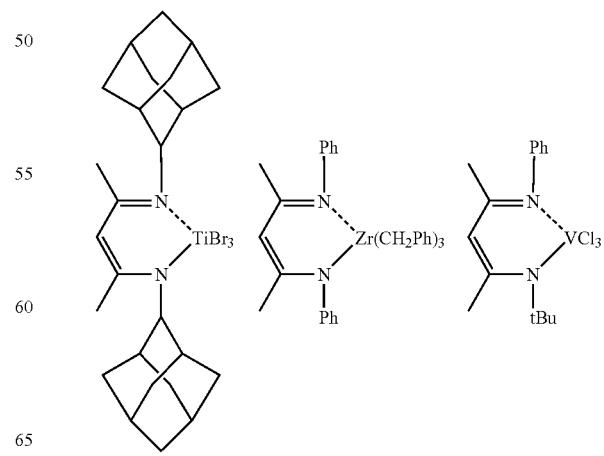
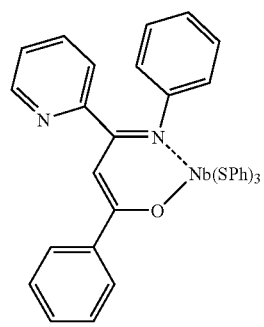

-continued
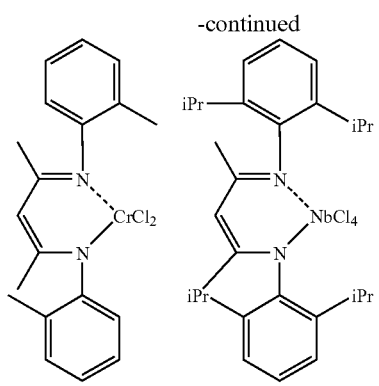
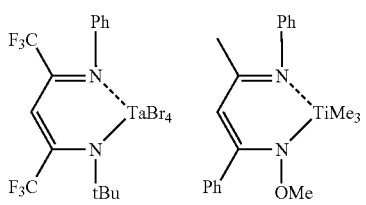
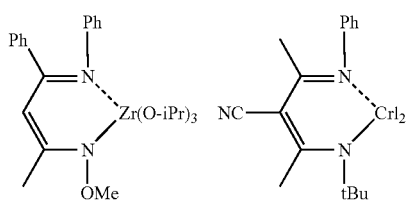
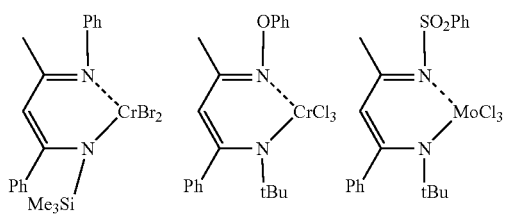
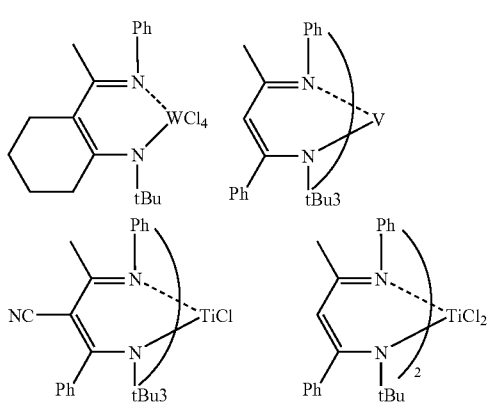
-continued
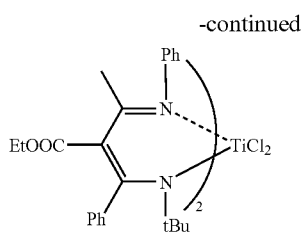
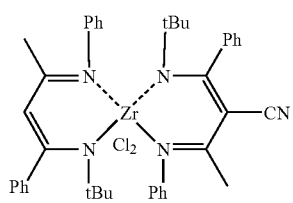
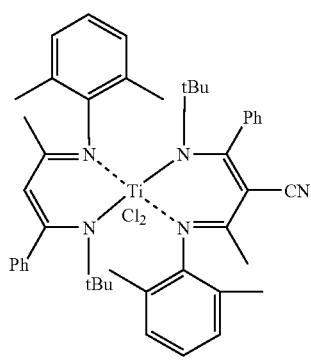
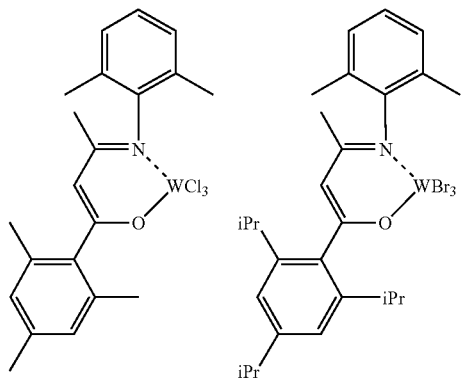
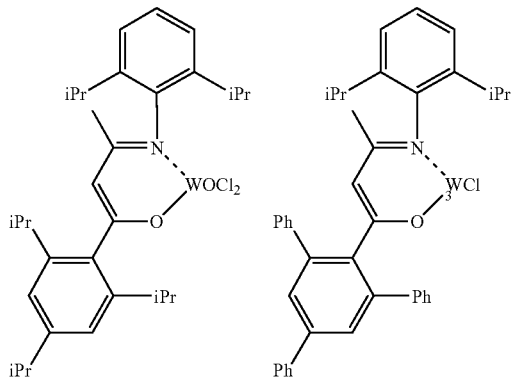

-continued
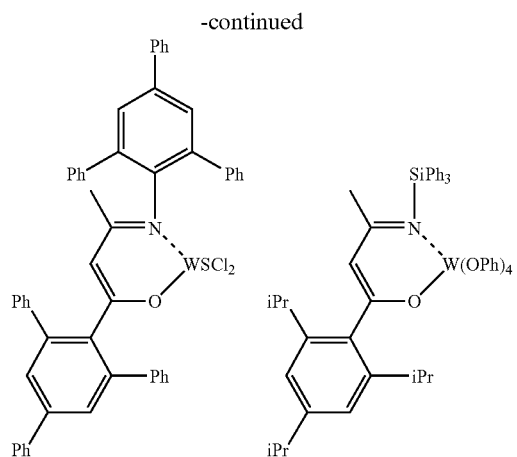
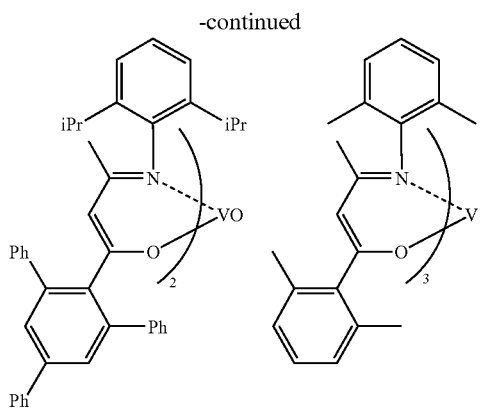
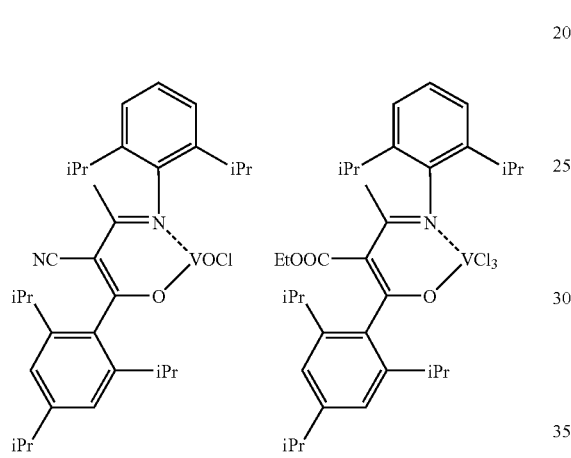
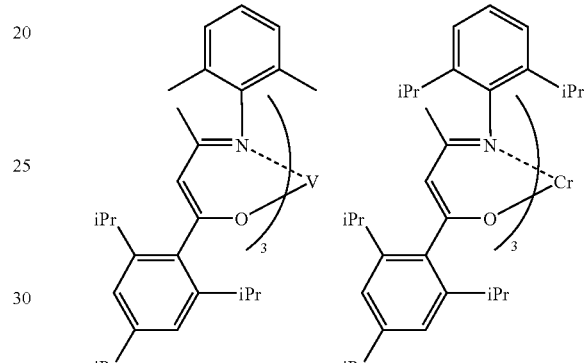
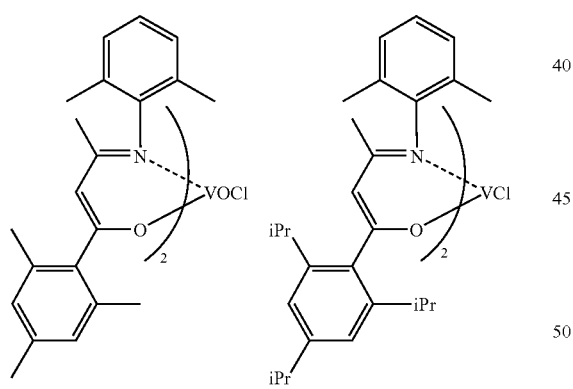
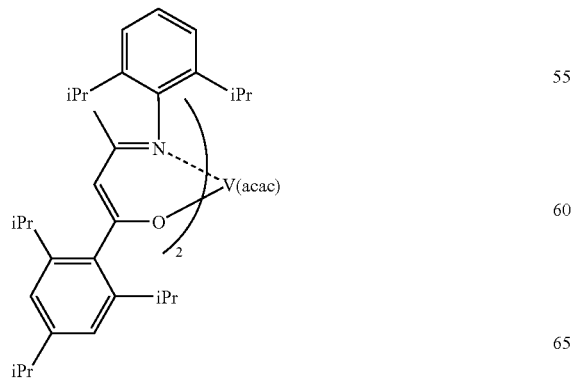
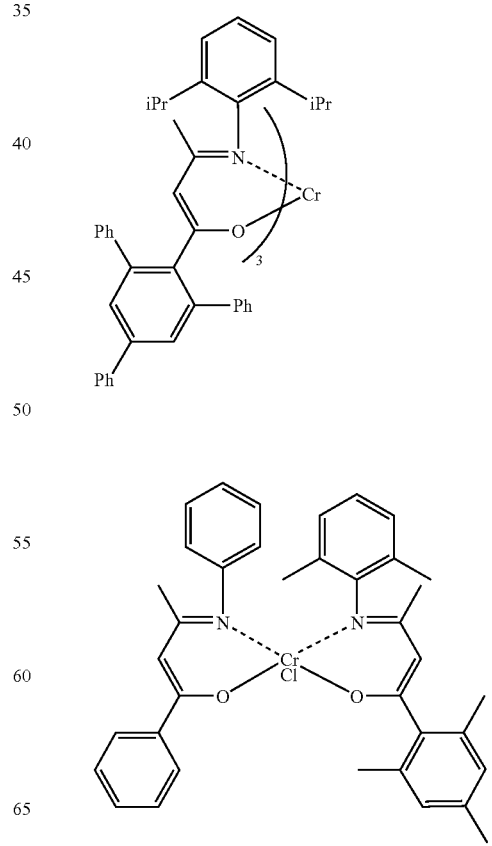

-continued
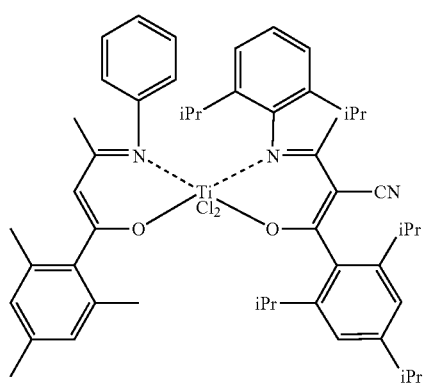
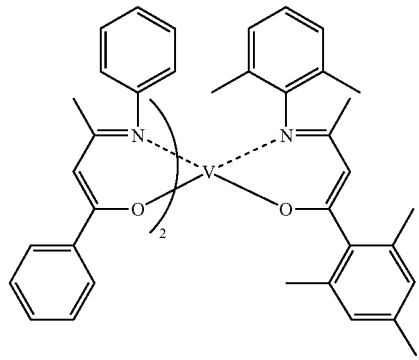
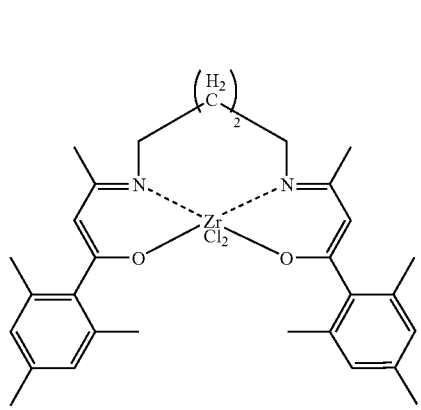
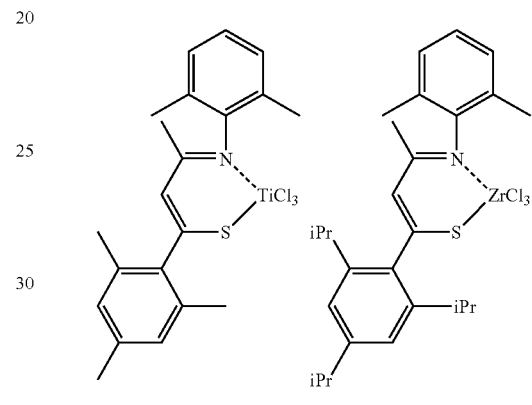
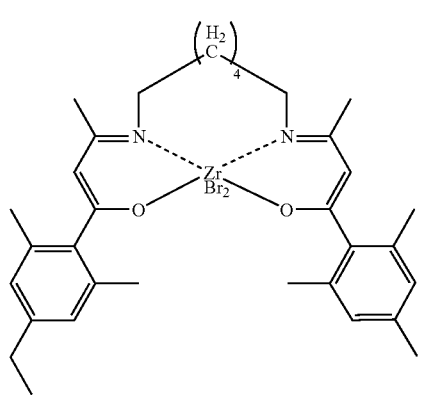
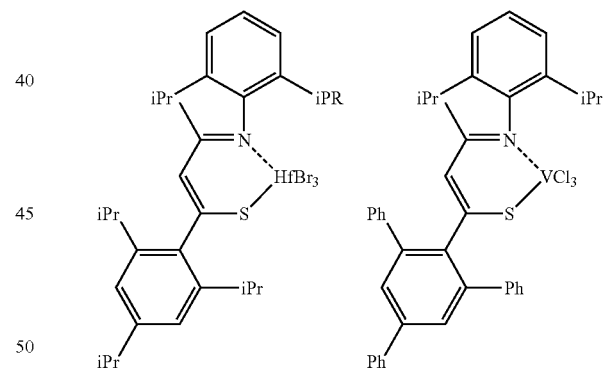
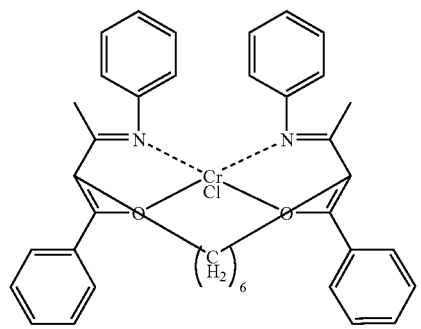
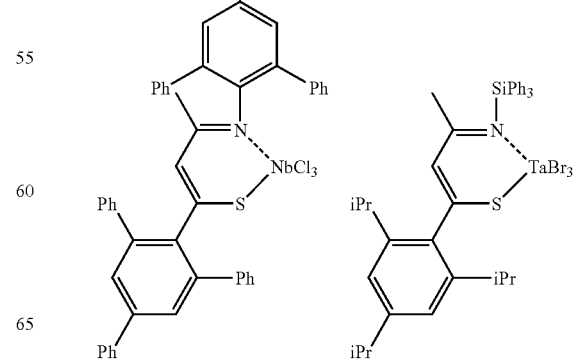

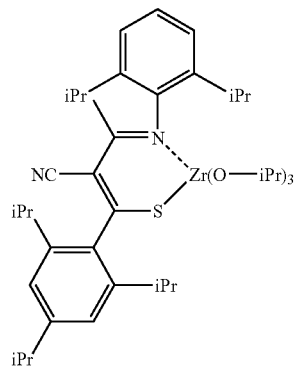
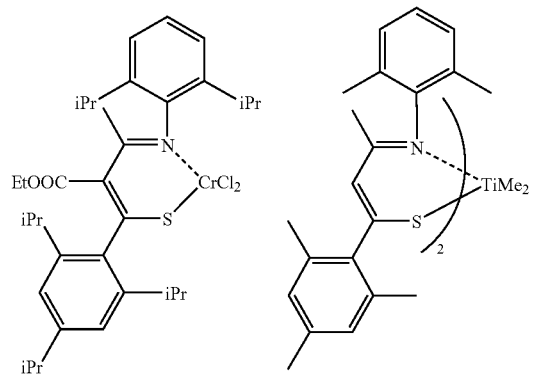
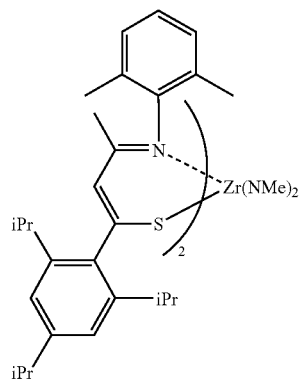
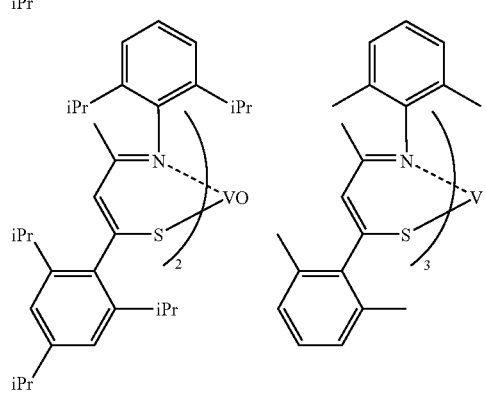
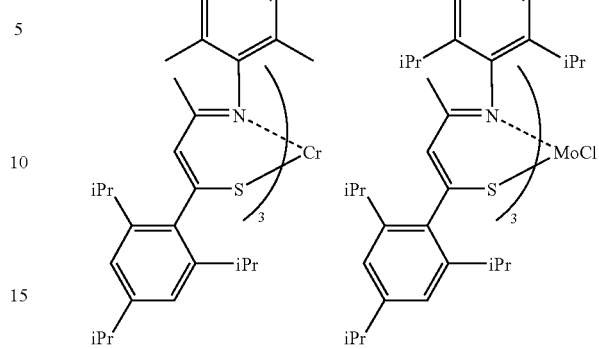
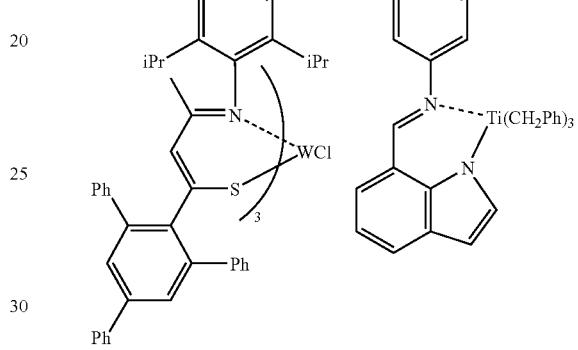
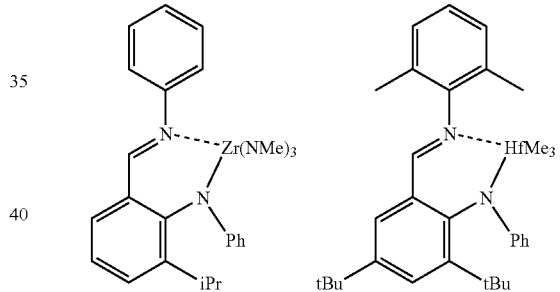
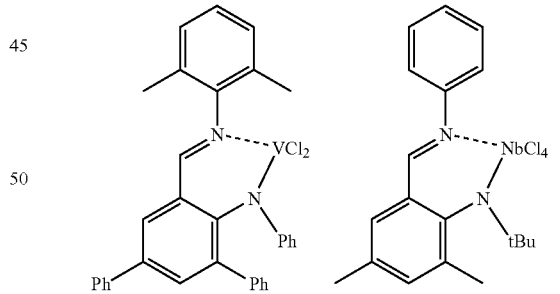
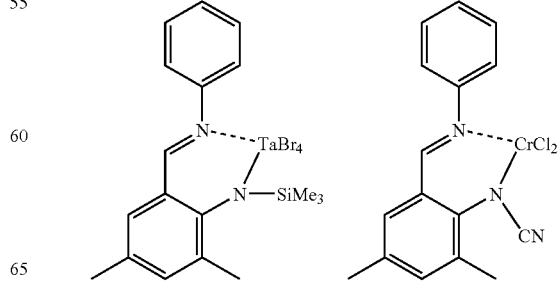

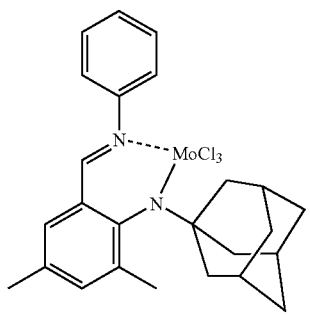
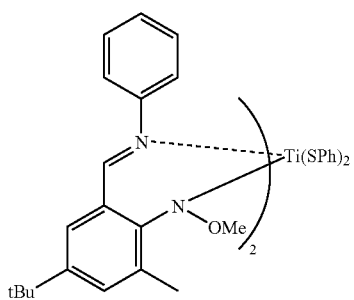
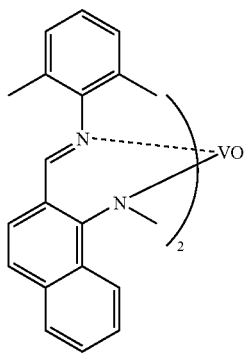
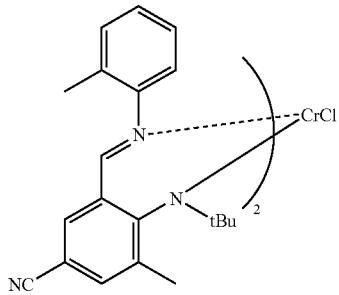
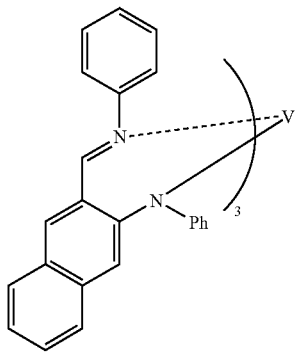
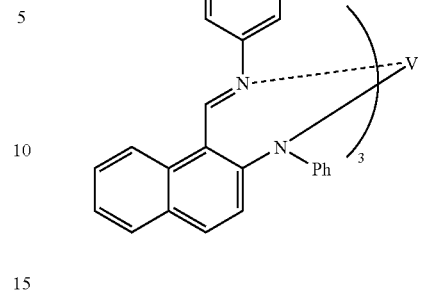
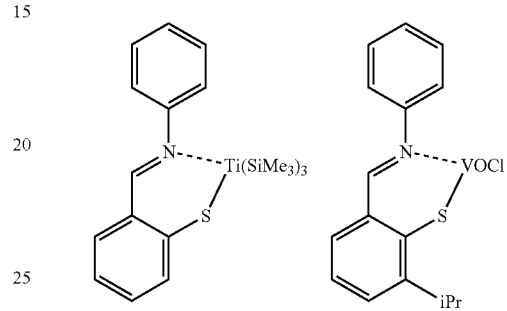
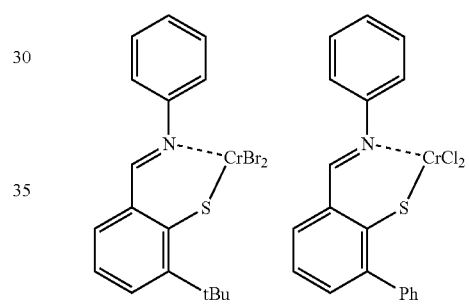
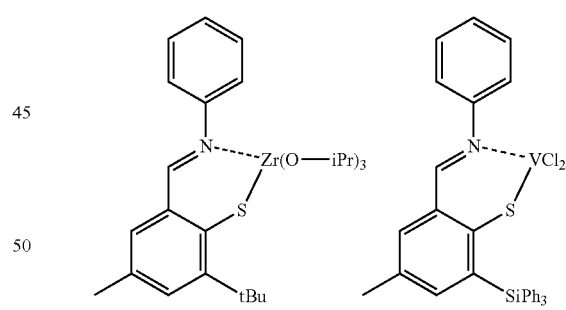
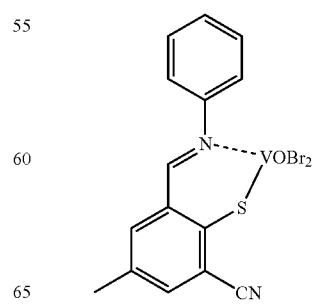

-continued
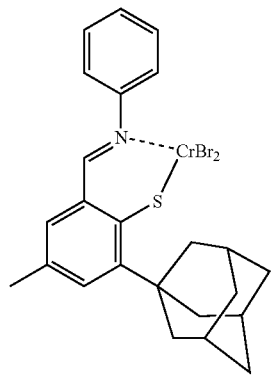
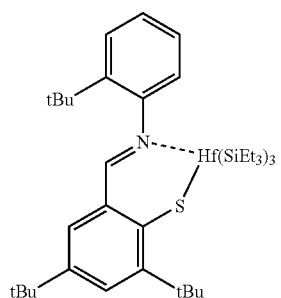
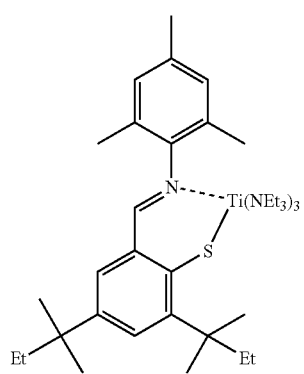
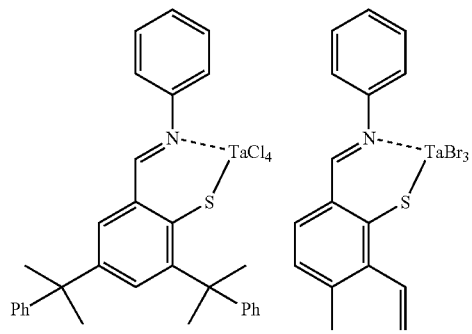
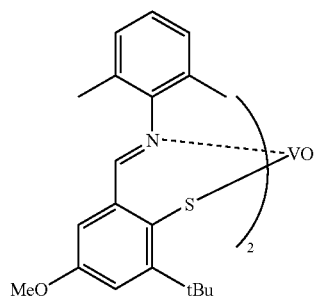
-continued
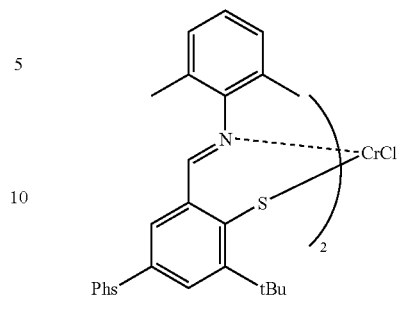
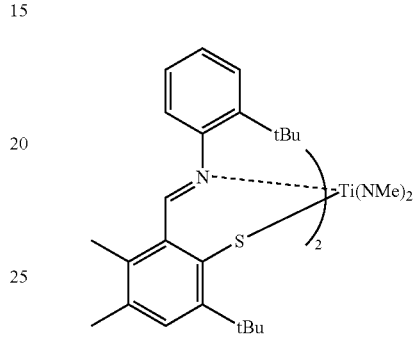
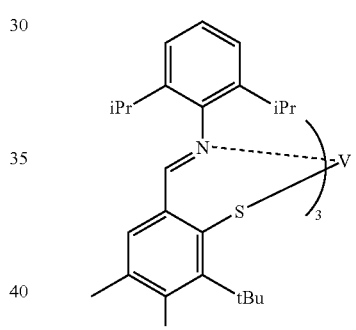
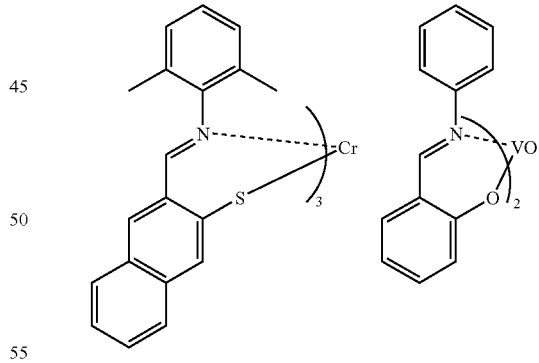
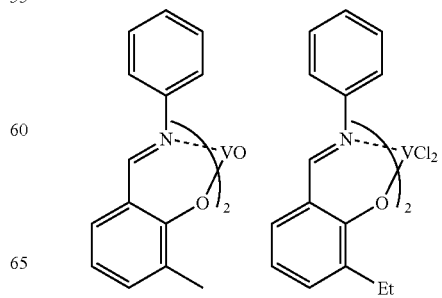

-continued
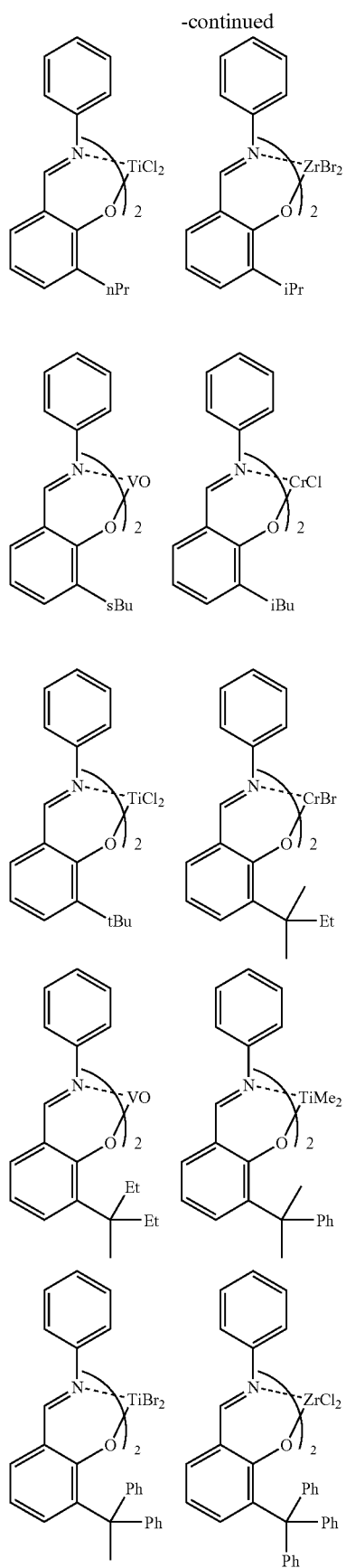
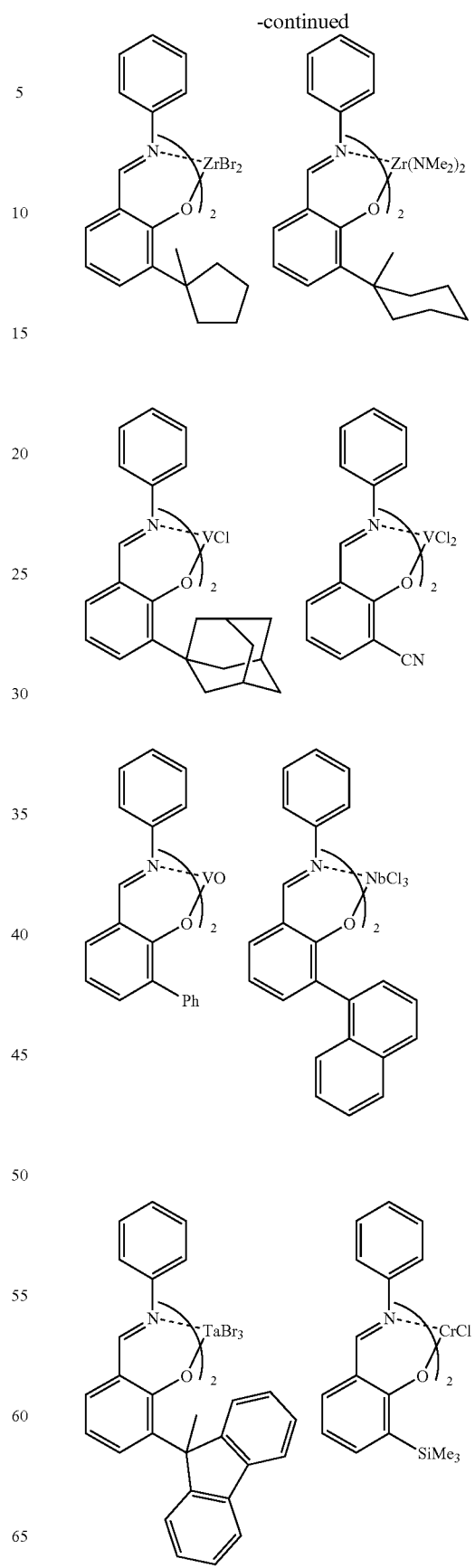

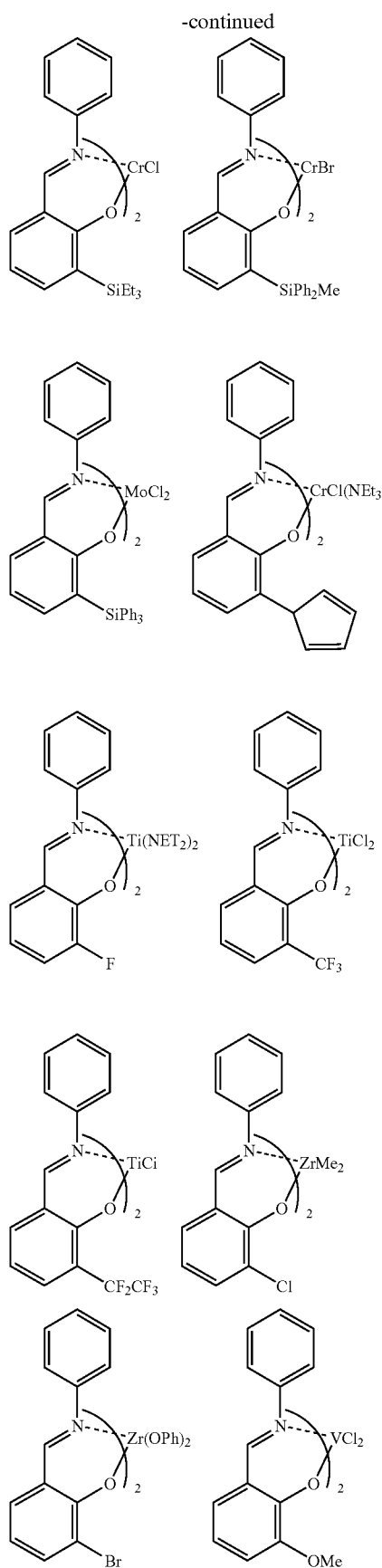
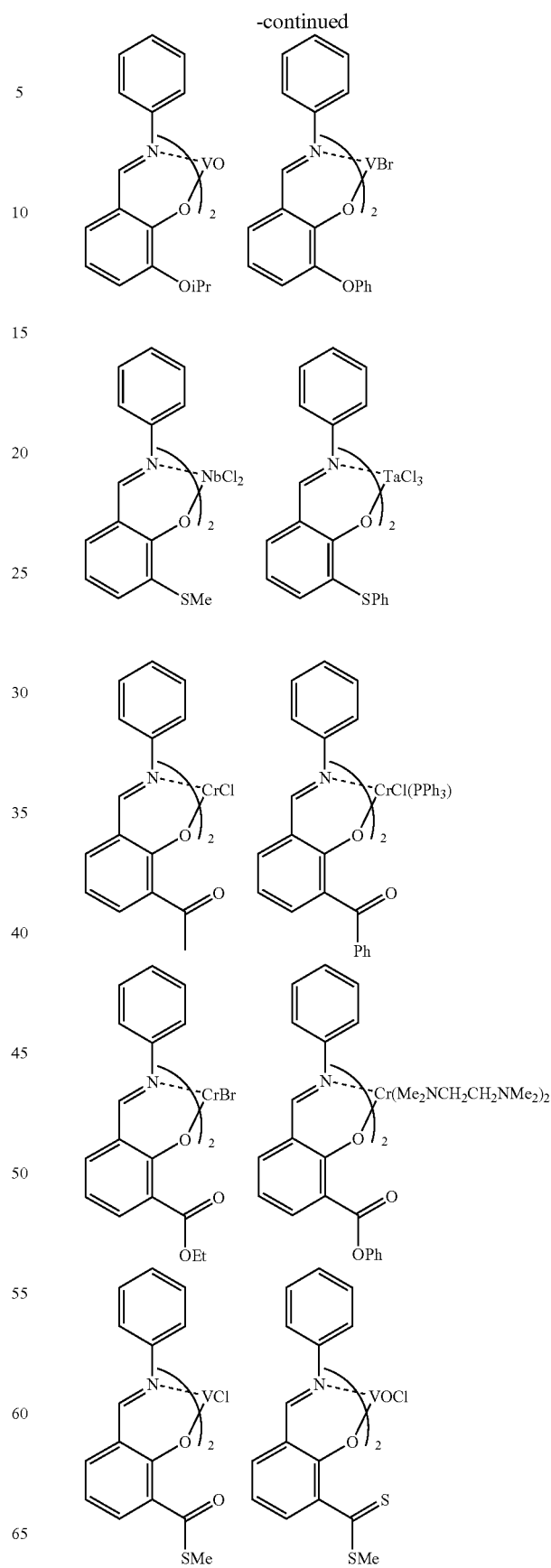

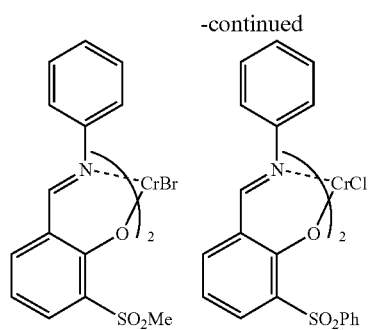
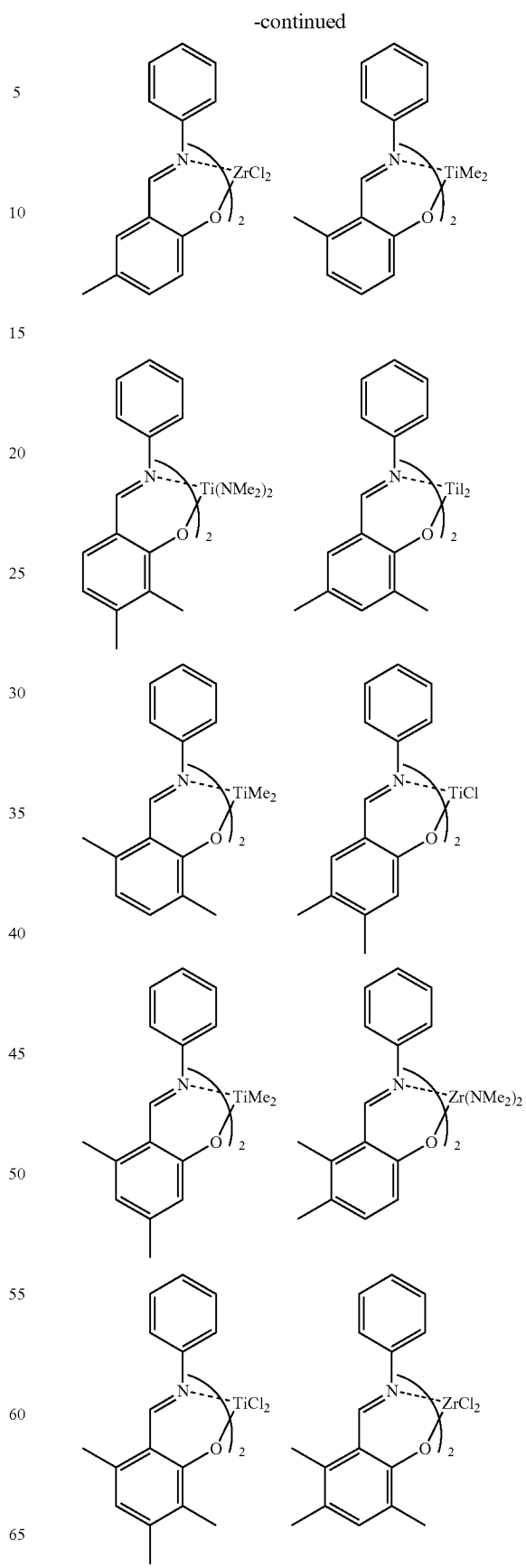

-continued
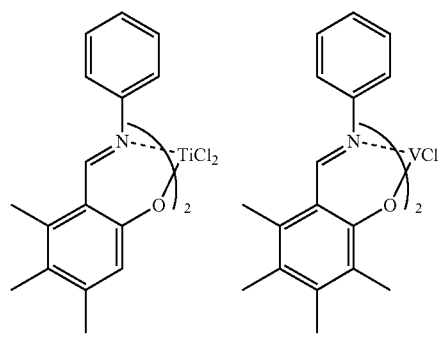
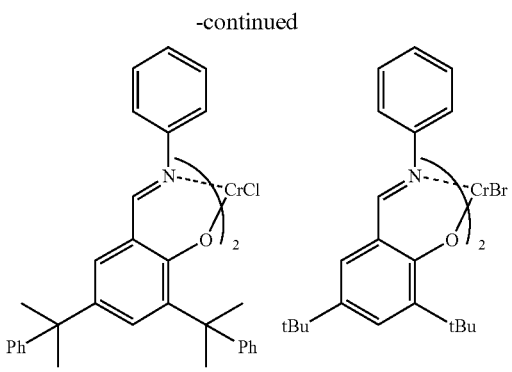
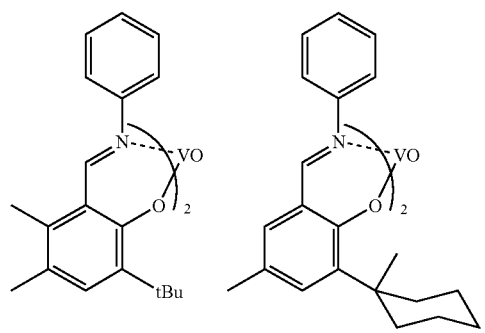
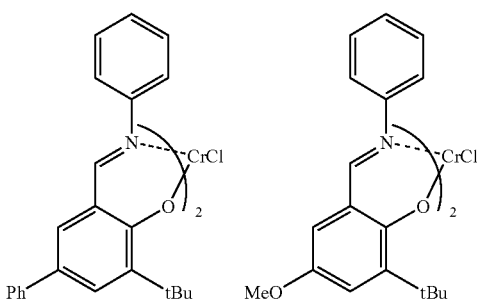
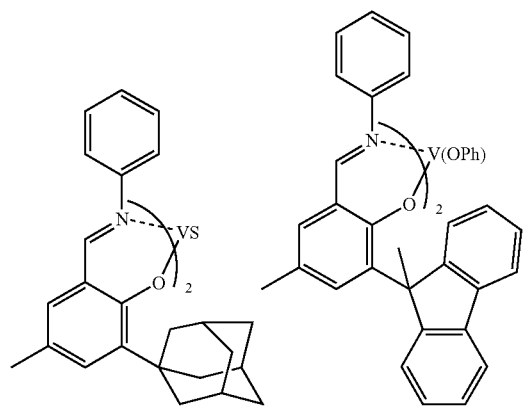
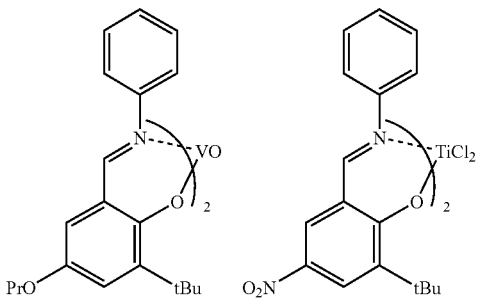
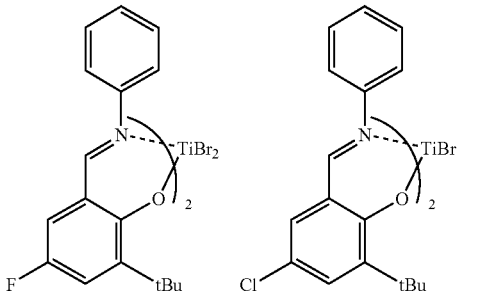
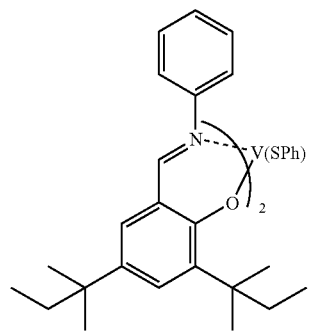
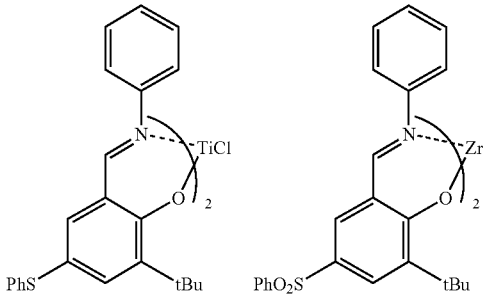

-continued
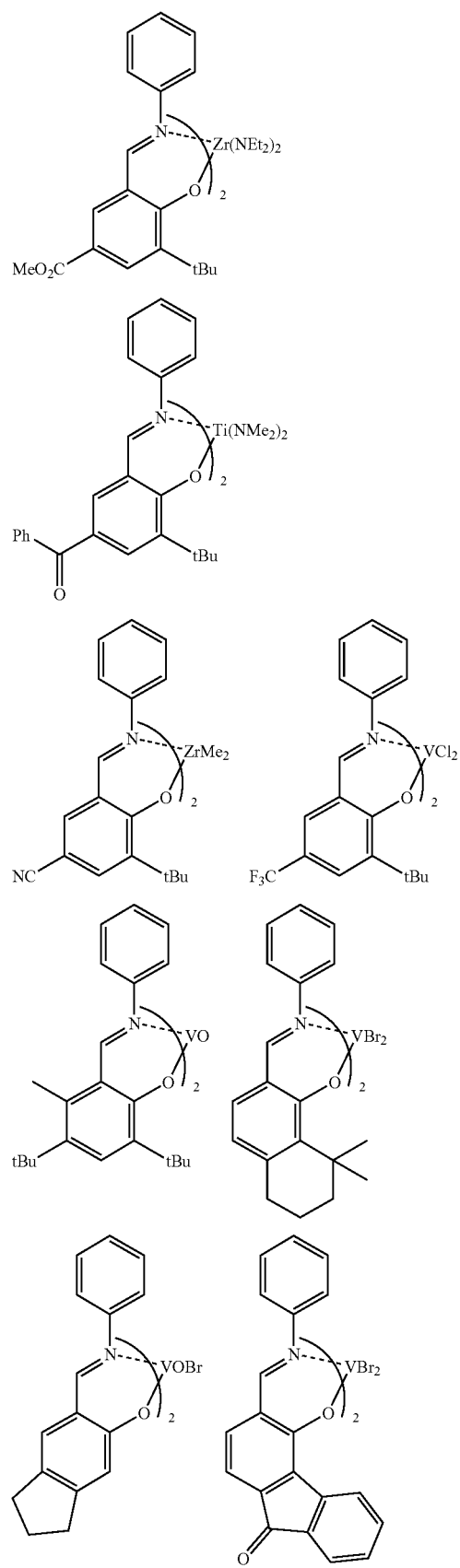
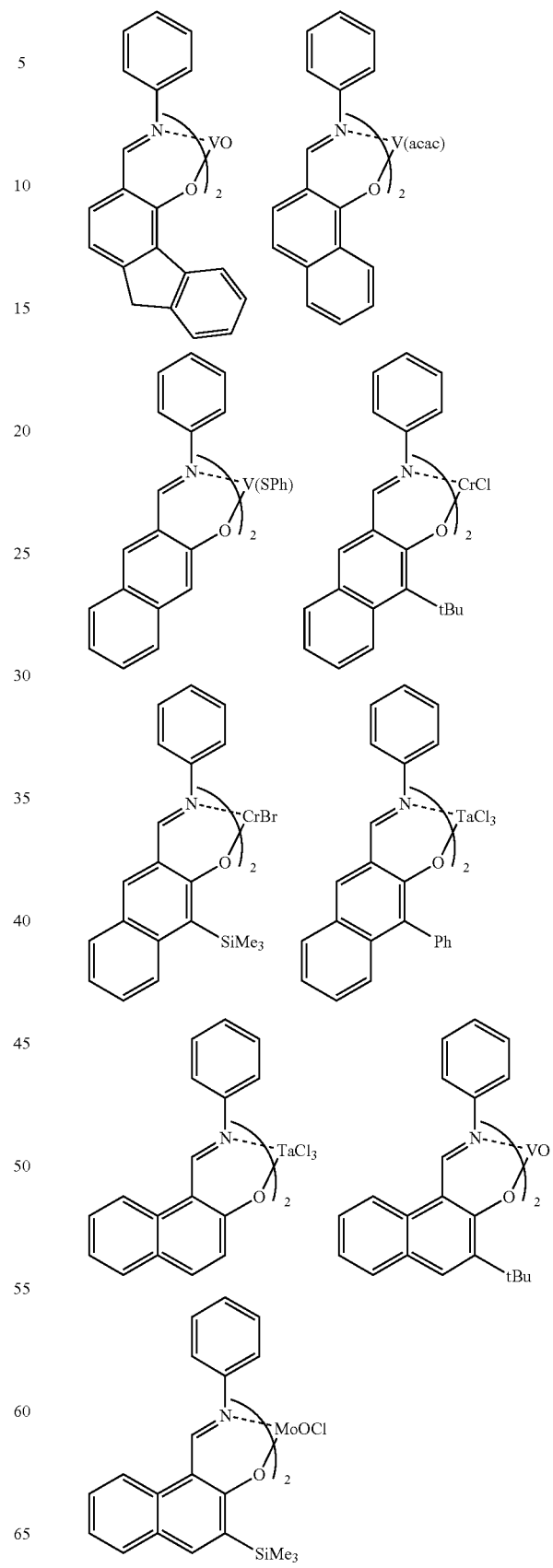

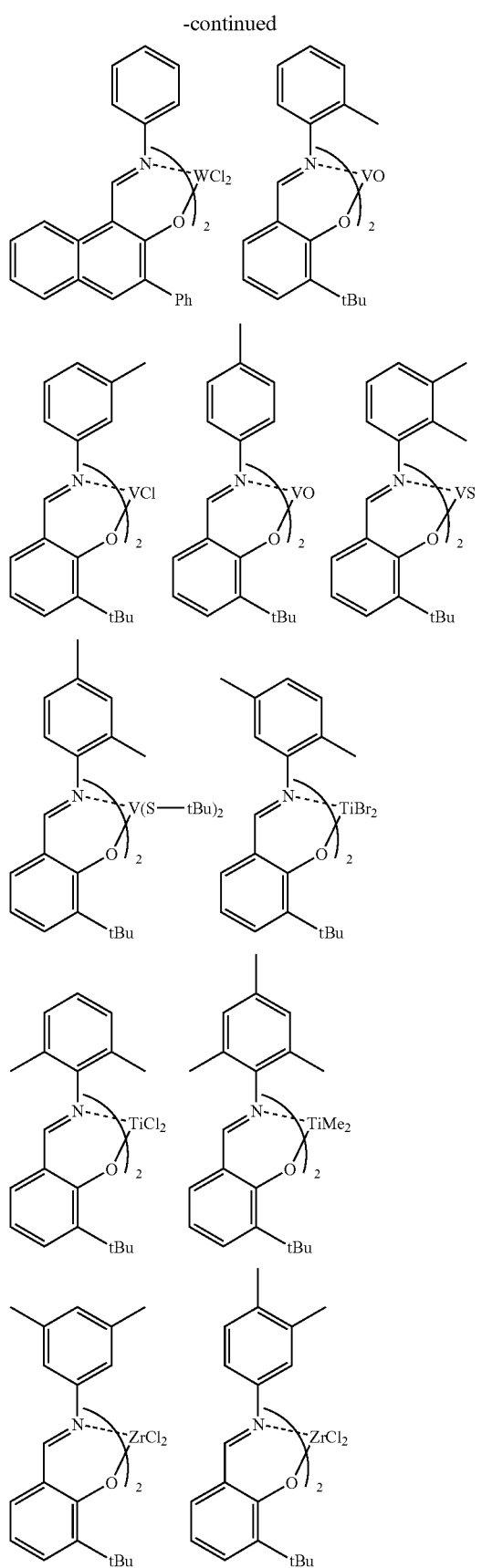
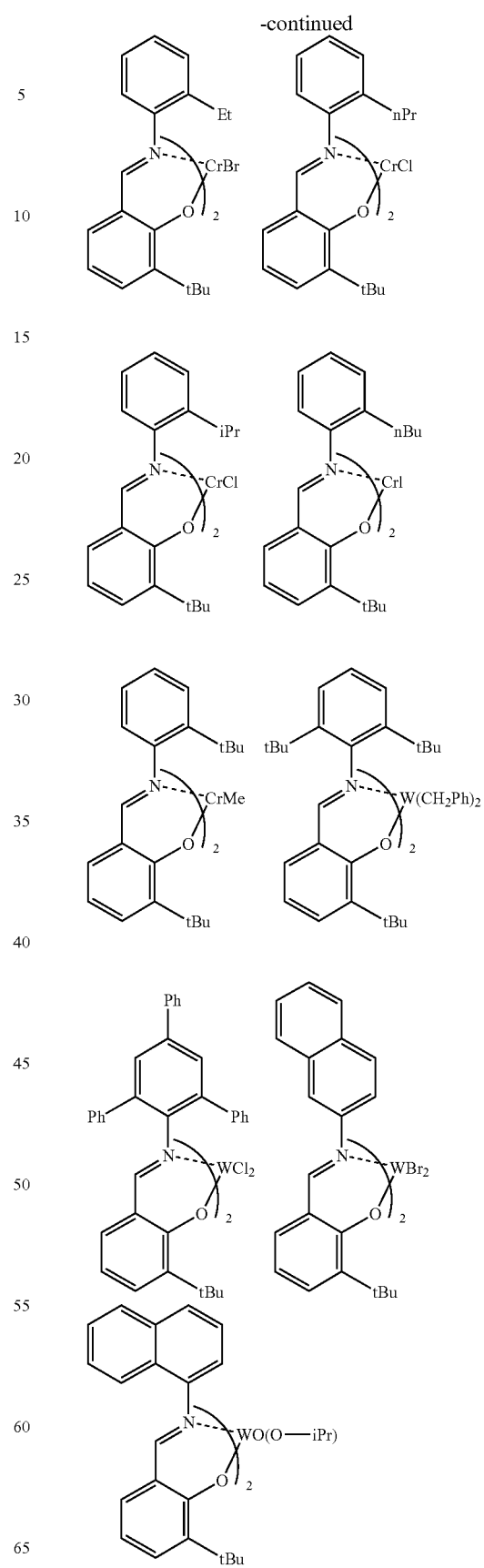

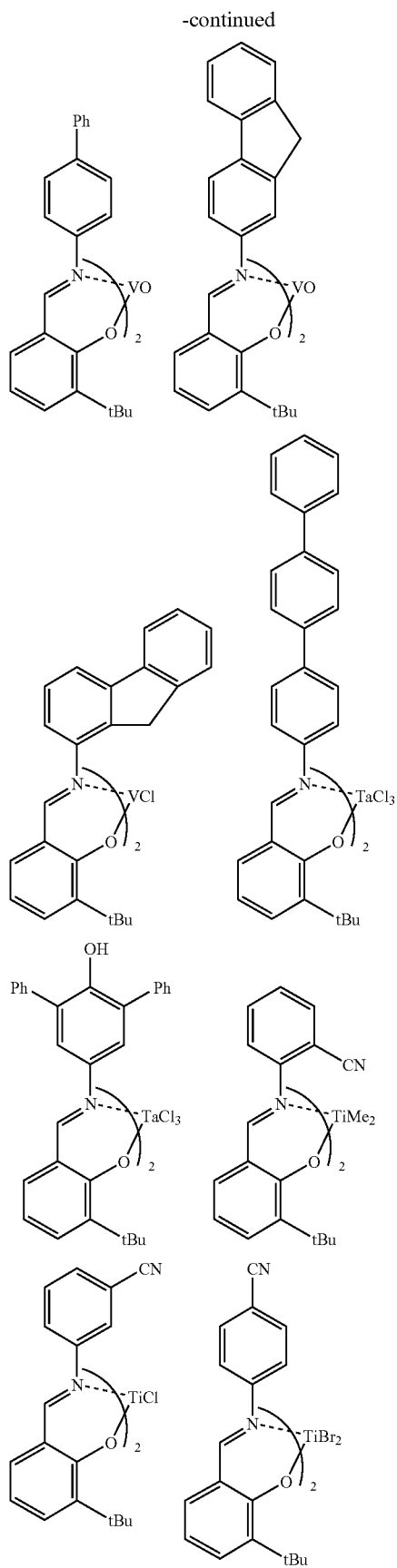
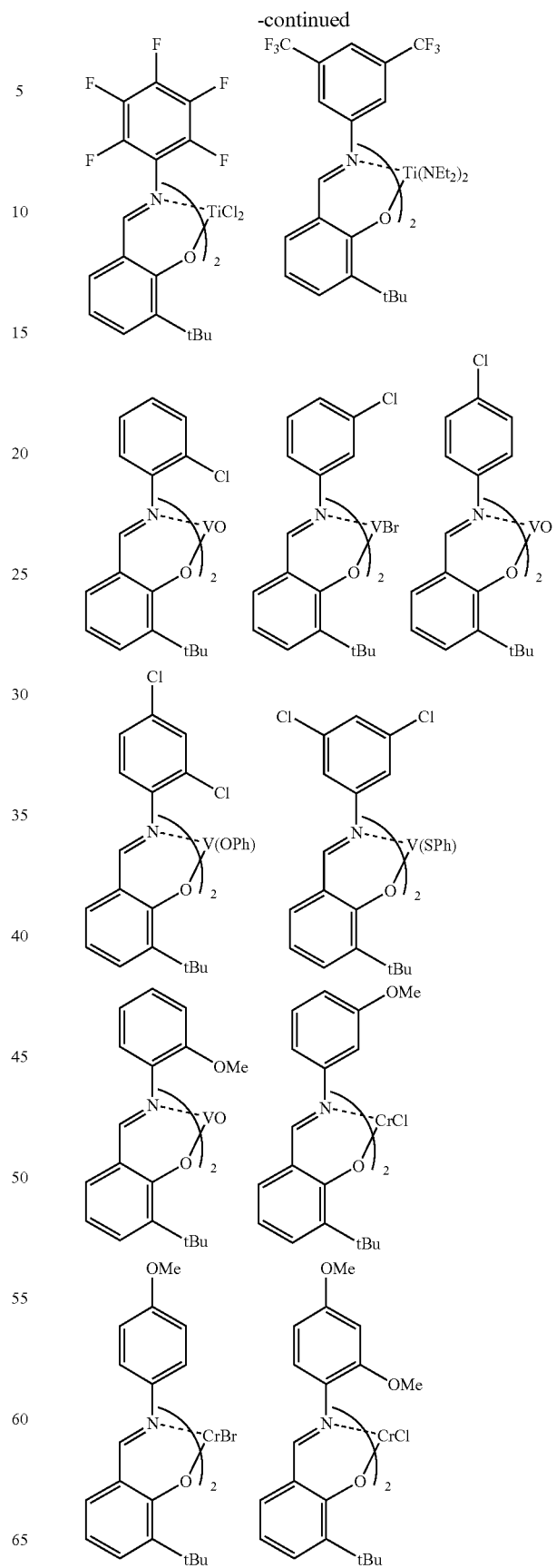

-continued
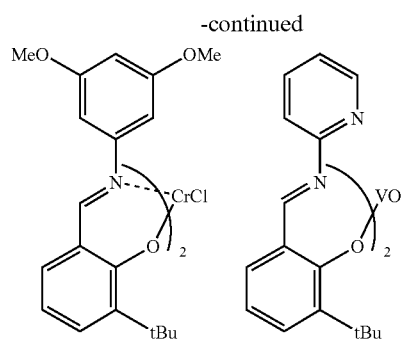
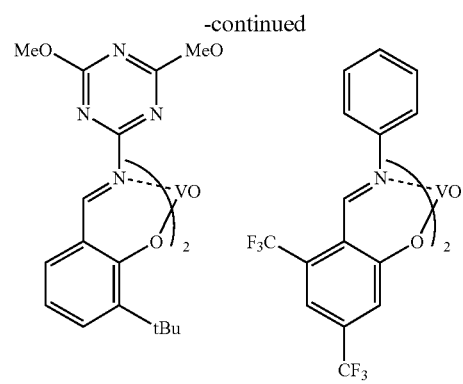
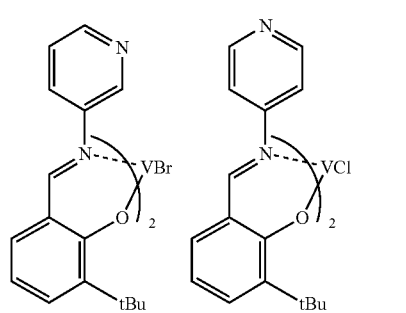
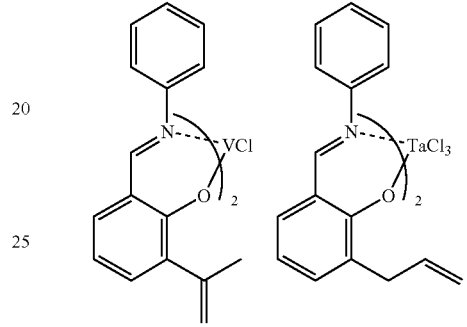
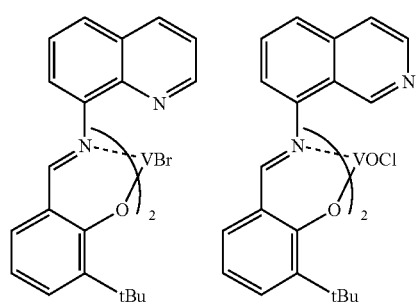
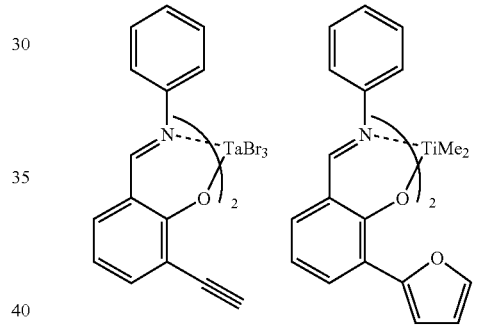
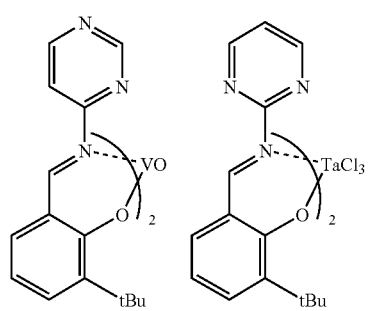
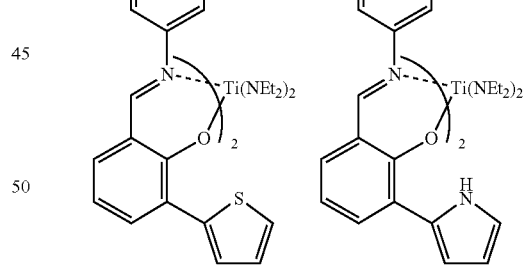
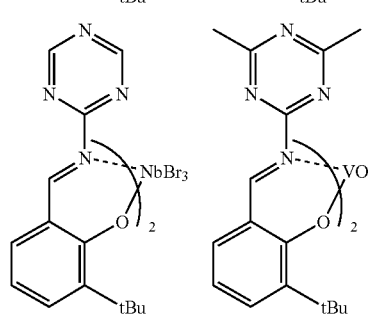
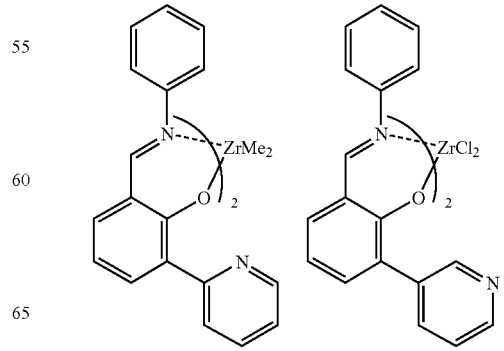

-continued
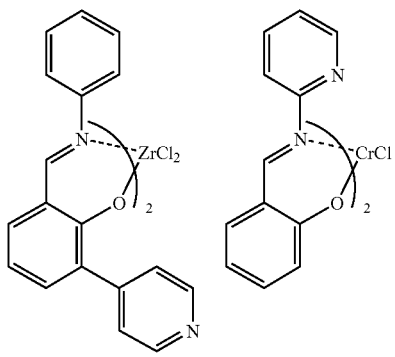
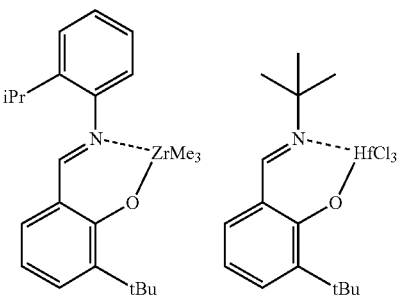
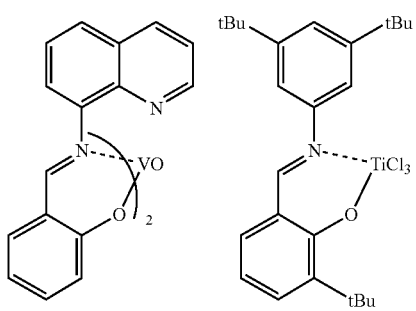
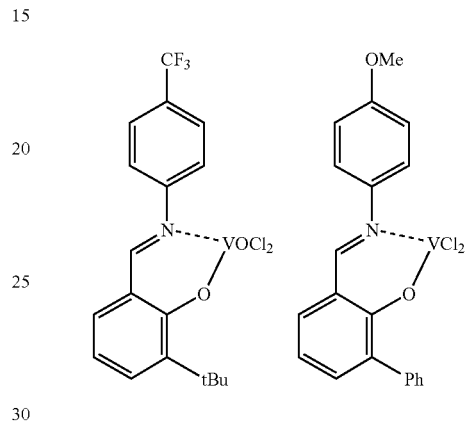
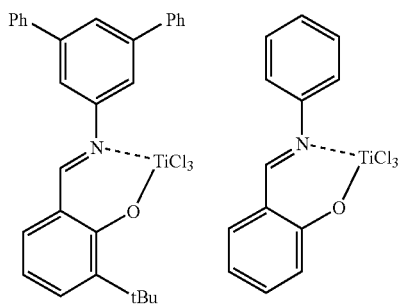
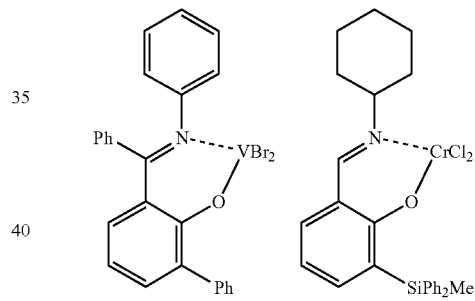
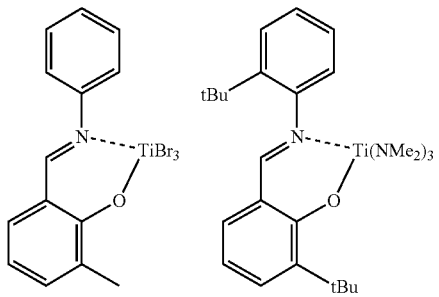
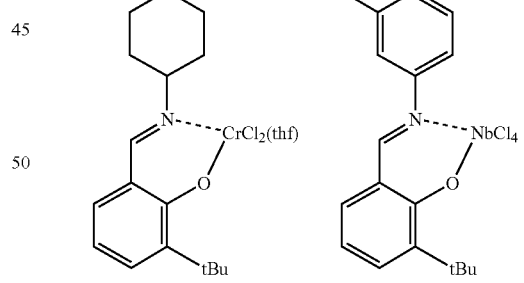
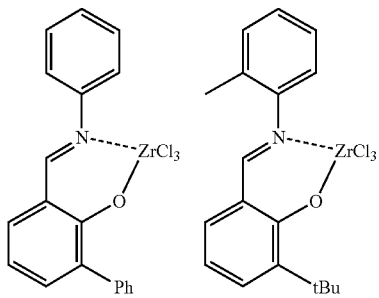
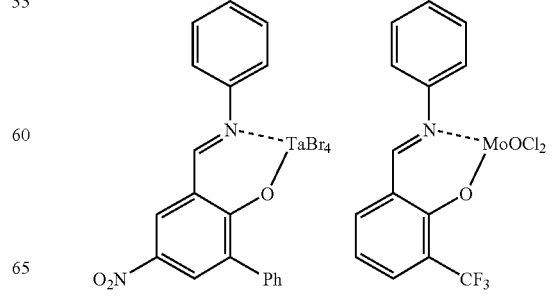

-continued
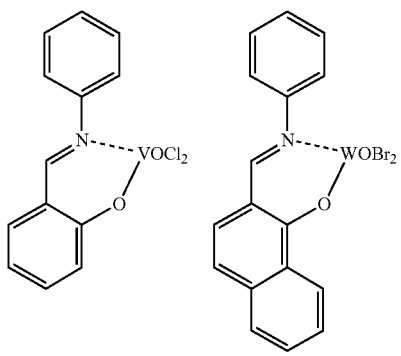
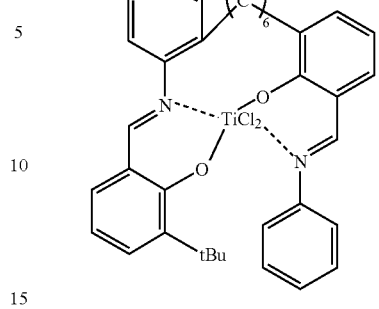
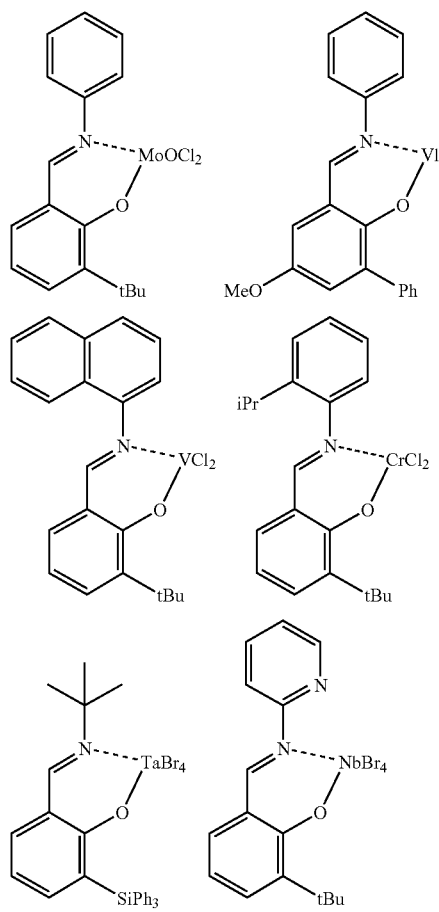
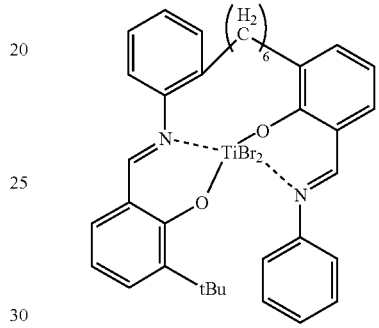
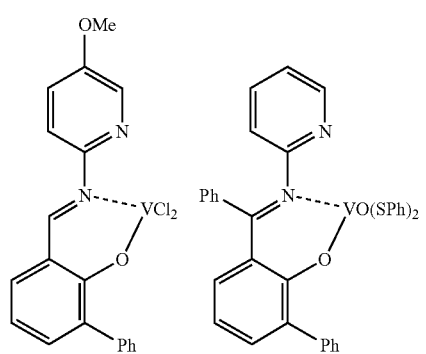
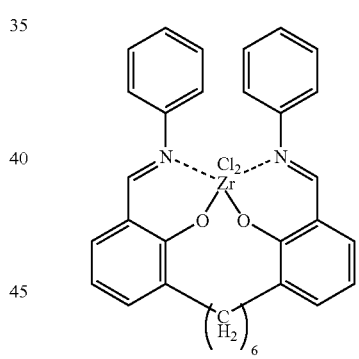
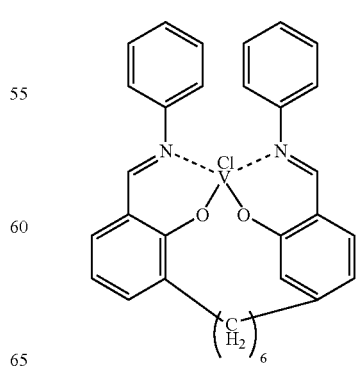

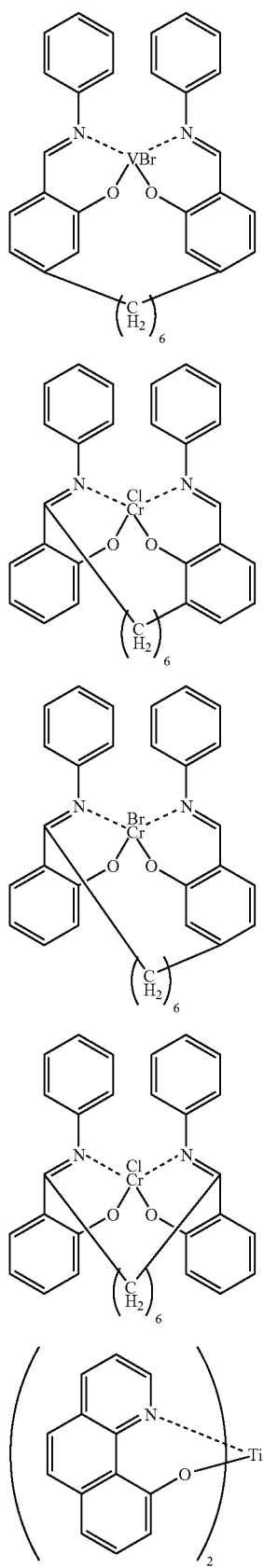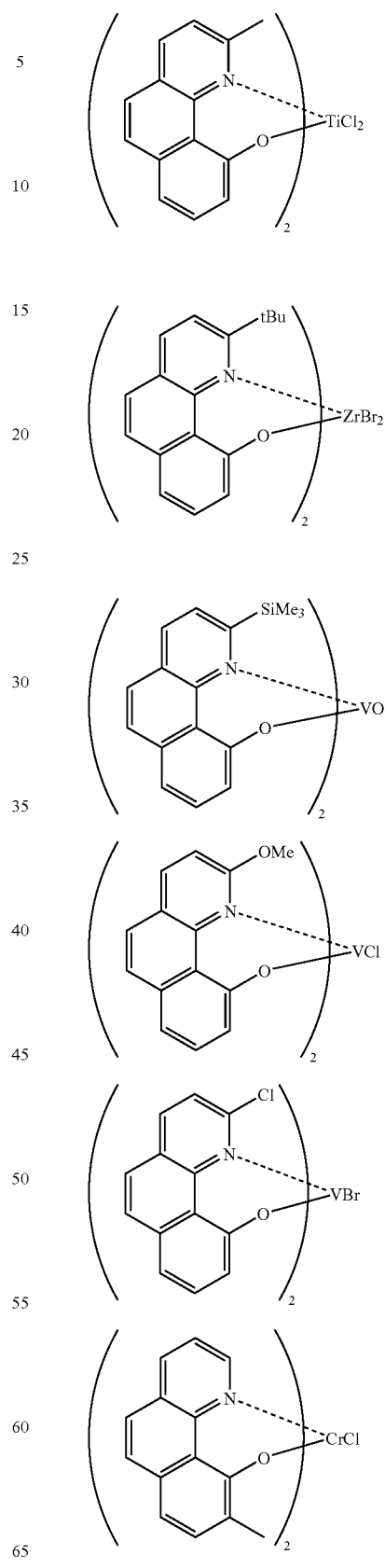

-continued
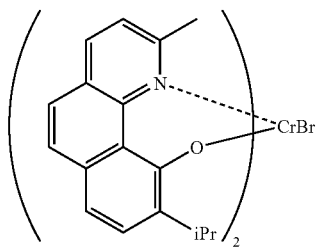
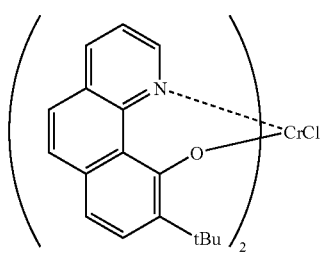
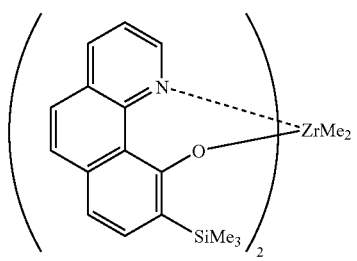
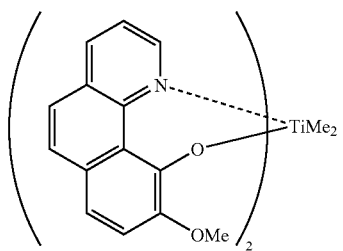
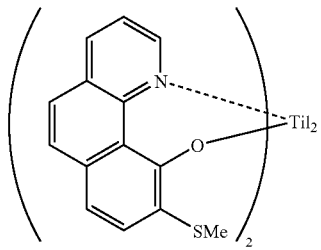
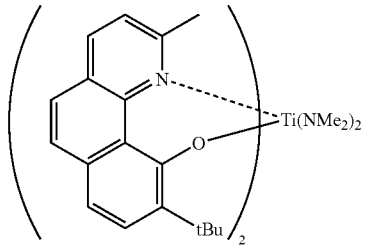
-continued
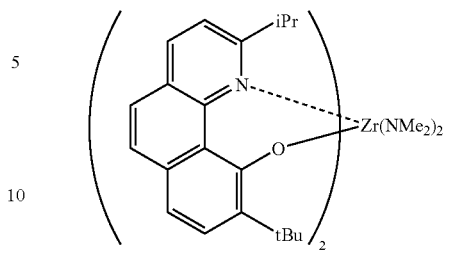
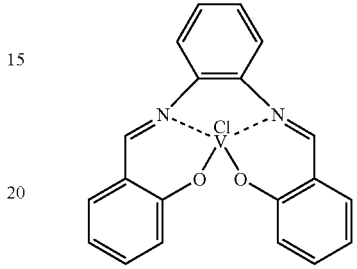
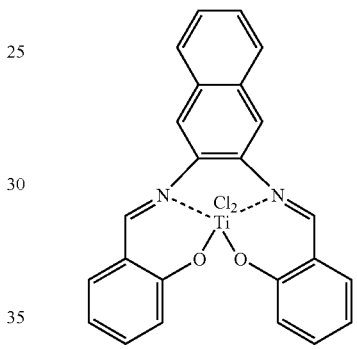
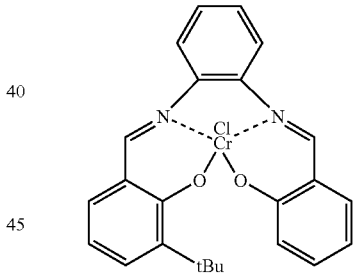
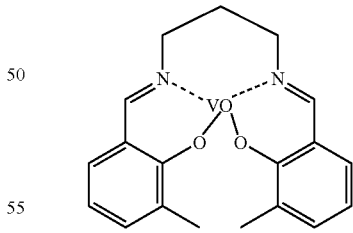
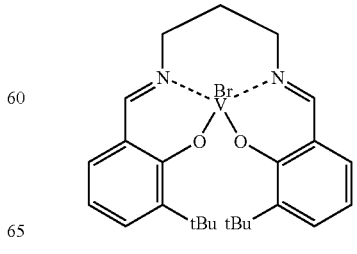

111
-continued
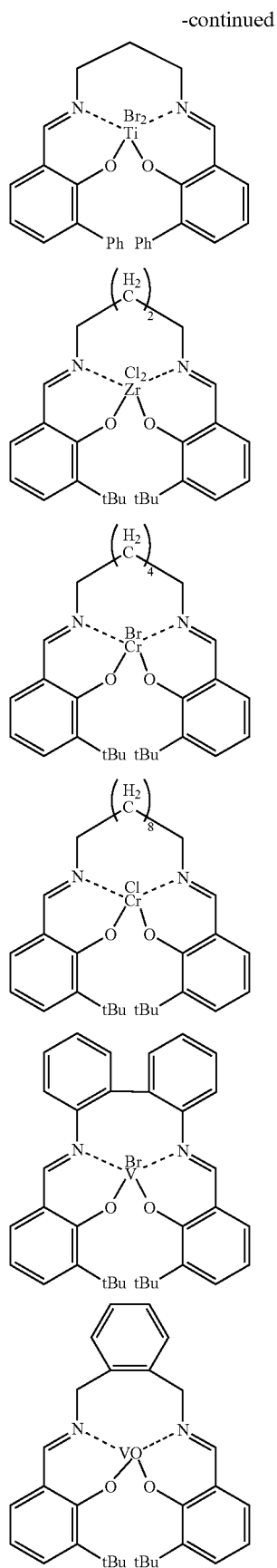
112
-continued
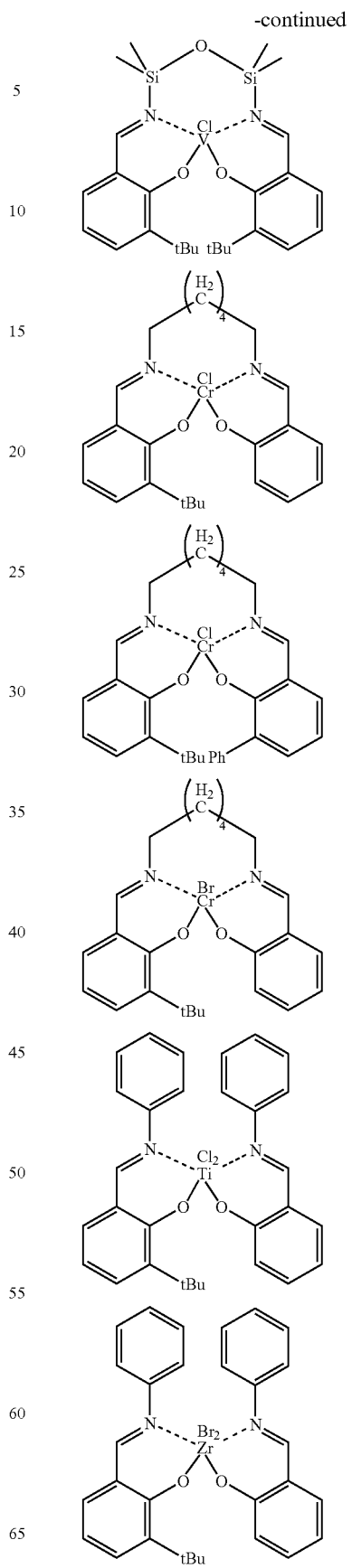

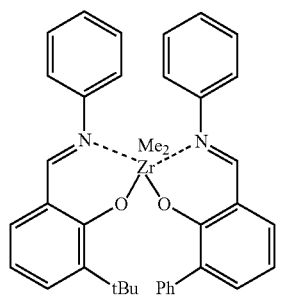
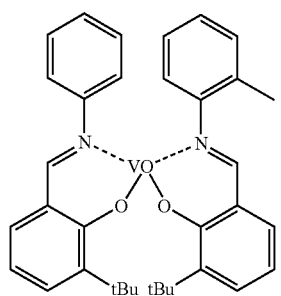
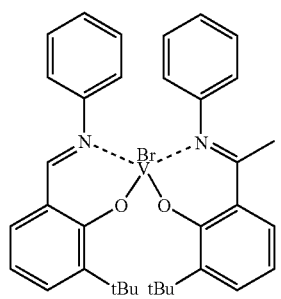
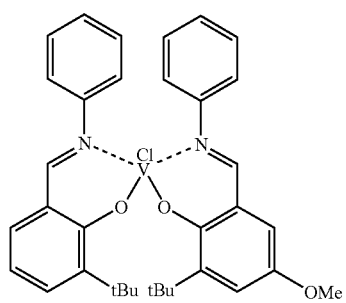
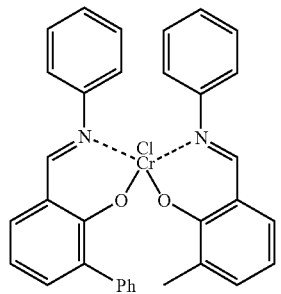
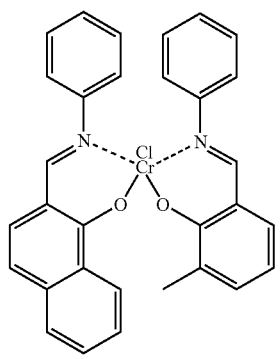
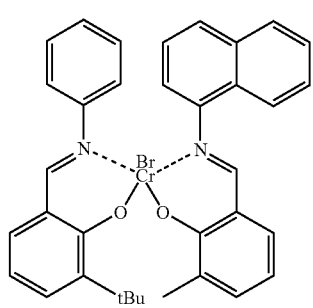
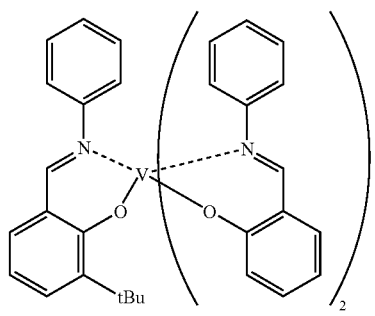
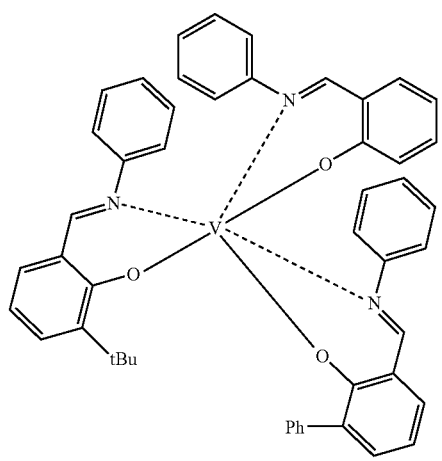
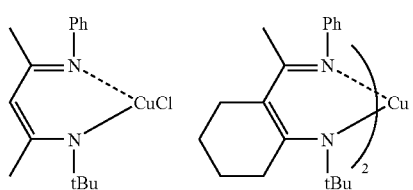

-continued
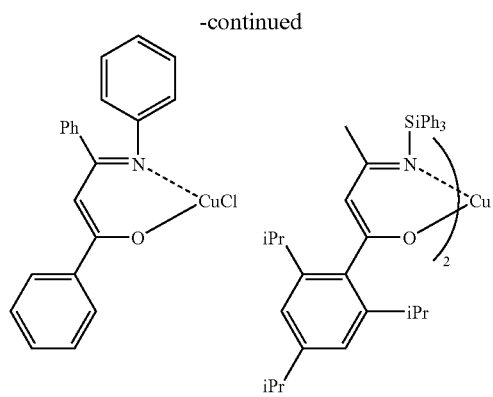
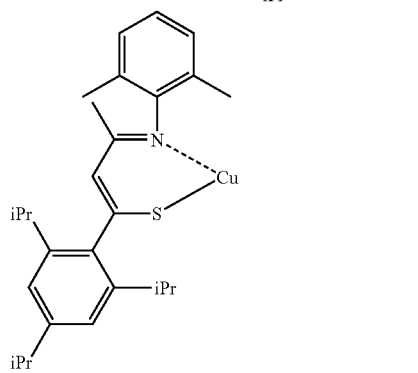
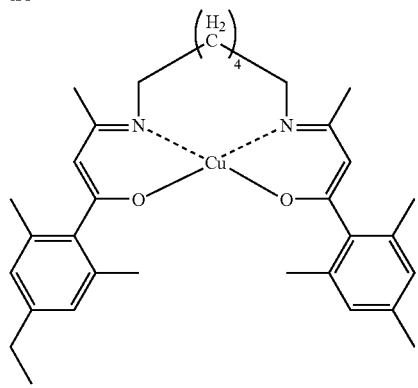
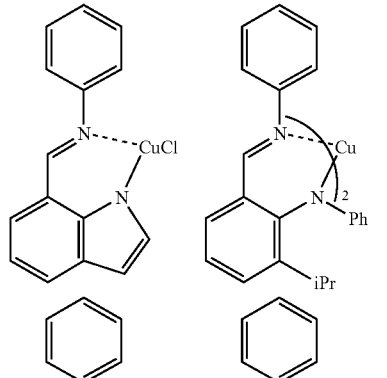
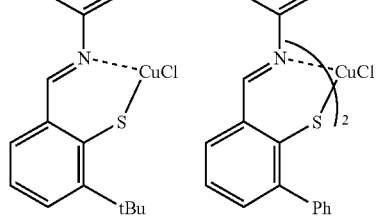
-continued
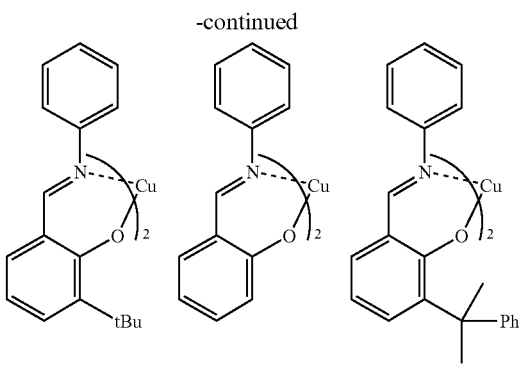
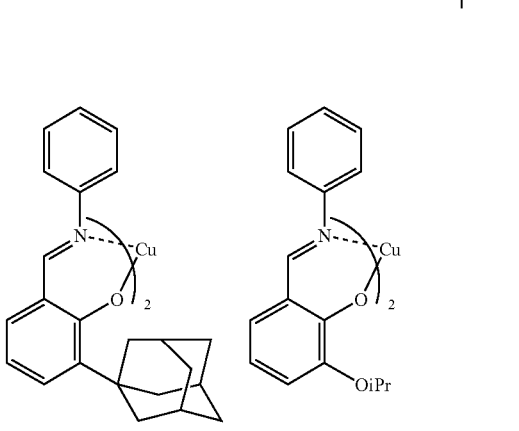
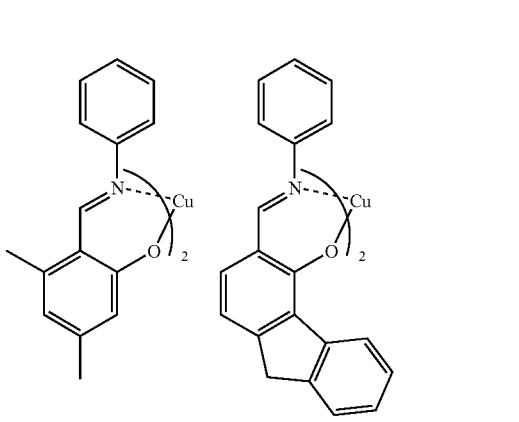

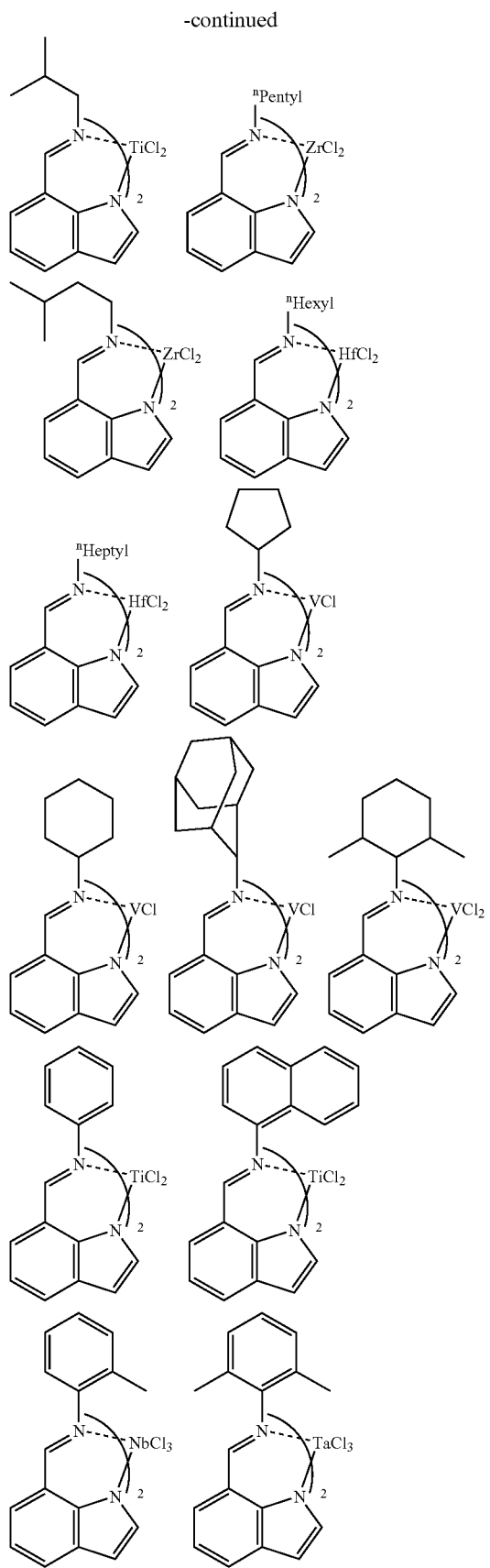
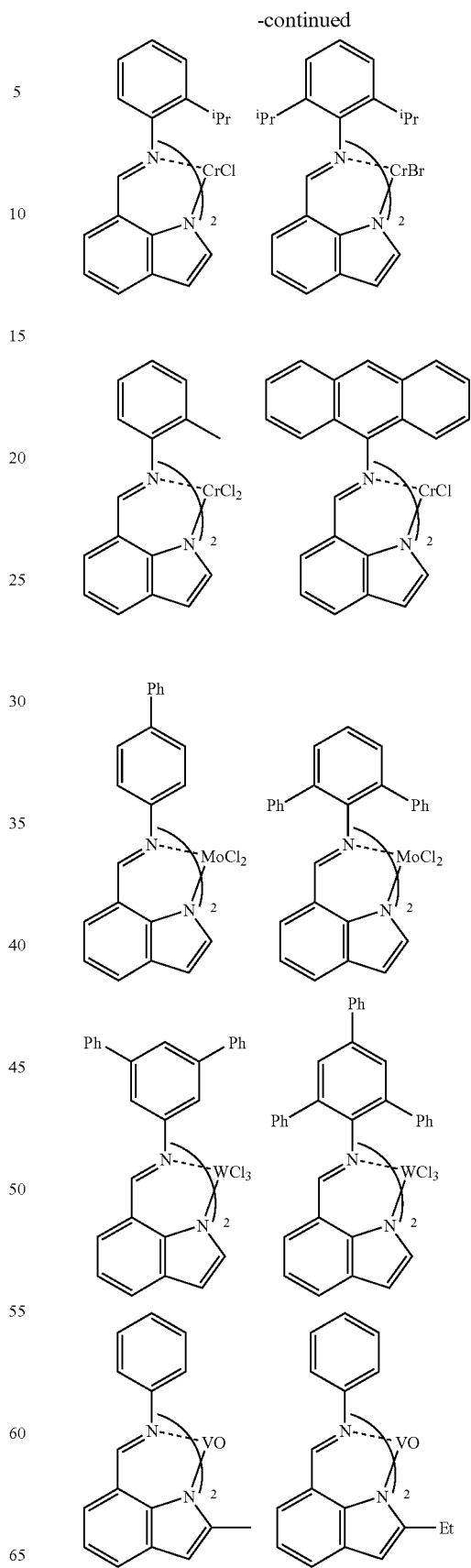

-continued
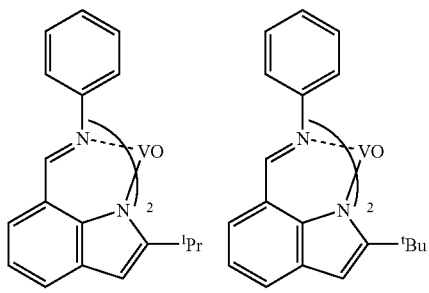
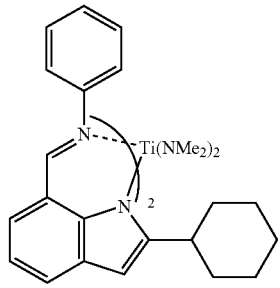
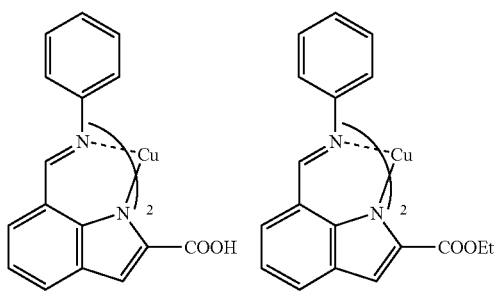
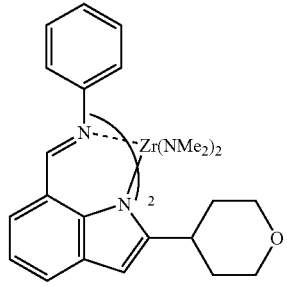
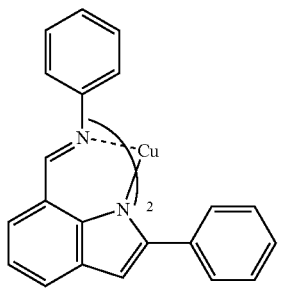
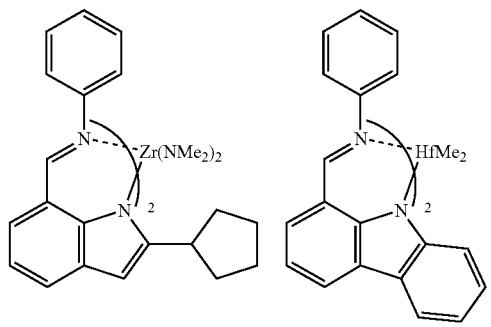
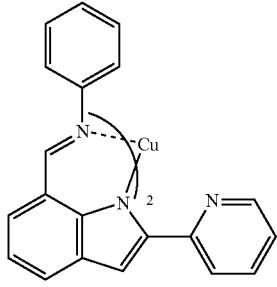
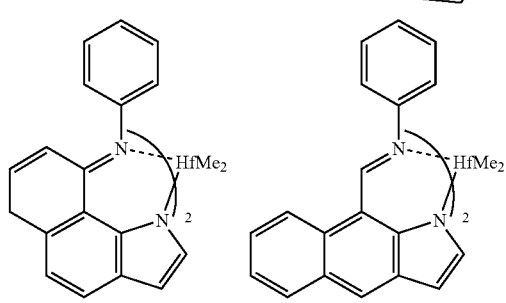
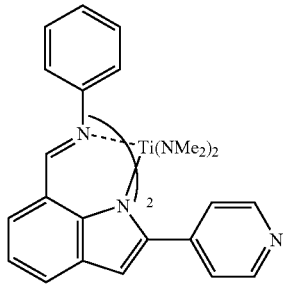
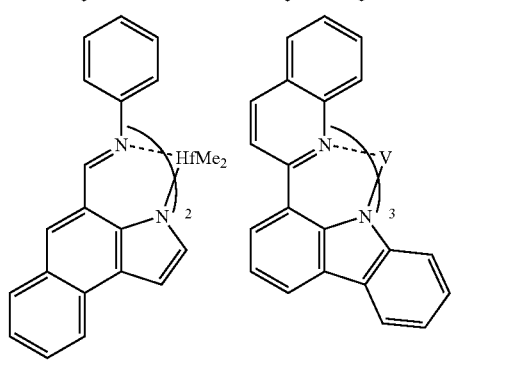

-continued
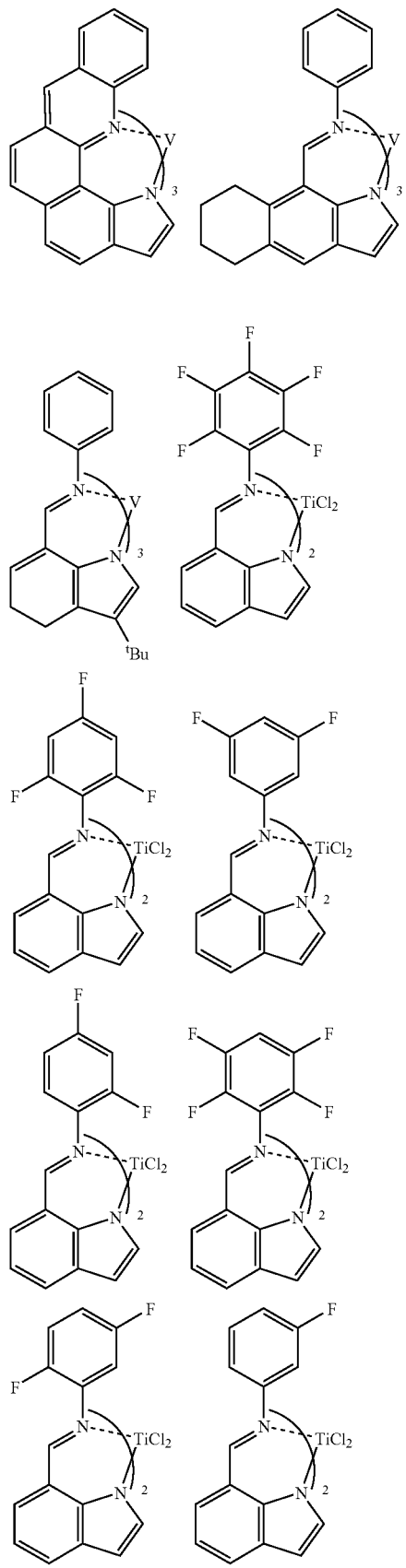
-continued
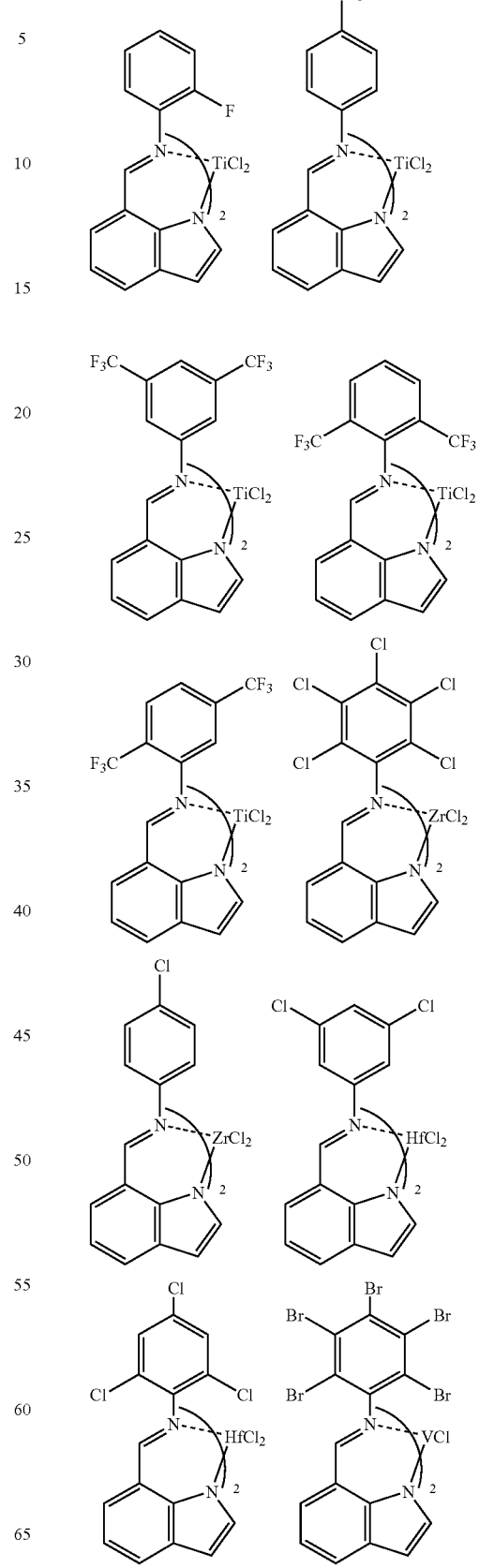

-continued

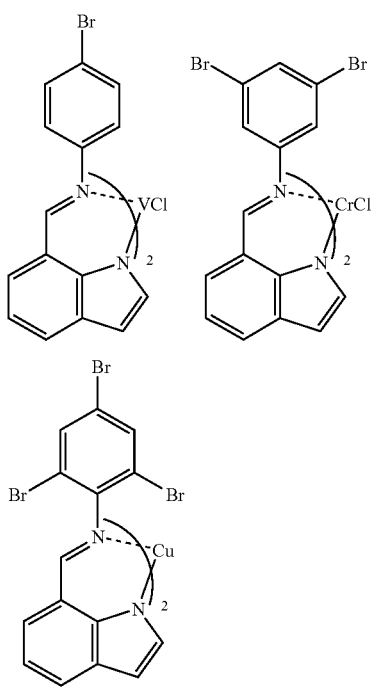

In the case of a compound of a metal of Group 4, the compound in which such a metal of Group 4 is replaced with another metal of Group 4 may be included in the above examples. Concretely, when a specific example is a Ti compound, the compound wherein Ti is replaced with Zr or Hf can also be enumerated.

Similarly, in the case of a compound of a metal of Group 5, the compound in which such a metal of Group 5 is replaced with another metal of Group 5 may be included in the above examples. Concretely, when a specific example is a V compound, the compound wherein V is replaced with Nb or Ta can also be enumerated.

Moreover, in the case of a compound of a metal of Group 6, the compound in which such a metal of Group 6 is replaced with another metal of Group 6 may be included in the above examples. Concretely, when a specific example is a Cr compound, the compound wherein Cr is replaced with Mo or W can also be enumerated.

Furthermore, in the case of a compound of a metal of Group 11, the compound in which such a metal of Group 11 is replaced with another metal of Group 11 may be included in the above examples. Concretely, when a specific example is a Cu compound, the compound wherein Cu is replaced with Ag or Au can also be enumerated.

Transition Metal Compound (A5)

The transition metal compound (A5) is a compound of a transition metal selected from Groups 4, 5, 6 and 11 of the periodic table which is represented by the following formula (V):

(wherein the dotted line (----) of N----M' means that a coordinate bond is formed, but a compound having no coordinate bond is also included in the present invention.)

In the above formula (V), M' has the same meaning as that of M' in the formula (c), and particularly preferable is a titanium atom, a vanadium atom, a chromium atom or a copper atom.

D, Q, S and T have the same meanings respectively as those of D, Q, S and T in the formula (II).

The m is an integer of 1 to 6, preferably an integer of 1 to 4.

$R^{11}$ to $R^{15}$ may be the same or different, and have the same meanings as those of $R^{11}$ to $R^{16}$ in the formula (II). Two or more groups of $R^{11}$ to $R^{15}$, preferably the adjacent groups thereof, may be bonded to each other to form an aliphatic ring, an aromatic ring, or a hydrocarbon ring containing a hetero atom (e.g., a nitrogen atom), which rings may have a substituent respectively. When m is 2 or greater, one group of $R^{11}$ to $R^{15}$ contained in any one ligand may be bonded to one group of $R^{11}$ to $R^{15}$ contained in another ligand, and $R^{11}$s, R $R^{13}$s, $R^{14}$s or $R^{15}$s may be the same or different.

The n is a number satisfying a valence of M', and concretely an integer of 0 to 5, preferably an integer of 1 to 4, more preferably an integer of 1 to 3.

X has the same meaning as that of X in the formula (c). When n is 2 or greater, the plural groups indicated by X may be the same or different, and the plural groups indicated by X may be bonded to each other to form a ring.

Among the compounds represented by the formula (V), the compounds in which m is 2, and one group of $R^{11}$ to $R^{15}$ contained in any one ligand is bonded one group of $R^{11}$ to $R^{15}$ contained in another ligand are represented, for example, by the following forumula (V-a).

(V-a)

In the above formula (V-a), M', X, n, D, Q, S and T have the same meanings respectively as those of M', X, n, D, Q, S and T in the formula (V).

$R^{11}$ to $R^{15}$ may be the same or different, and have the same meanings as those of $R^{11}$ to $R^{16}$ in the formula (II). Two or more of $R^{11}$ to $R^{15}$ may be bonded to each other to form a ring.

D' may be the same as, or different from D, and denotes a nitrogen atom or a phosphorus atom.

Q' may be the same as, or different from Q, and denotes a nitrogen atom (=N—) or a phosphorus atom (=P—), or a carbon atom substituted with a substituent $R^{13'}$ (=C($R^{13'}$)—).

S' may be the same as, or different from S, and denotes a nitrogen atom (—N=) or a phosphorus atom (—P=), or a carbon atom substituted with a substituent $R^{14'}$ (—C($R^{14'}$)=).

T' may be the same as, or different from T, and denotes a nitrogen atom (=N—) or a phosphorus atom (=P—), or a carbon atom substituted with a substituent $R^{15'}$ (=C($R^{15'}$)—).

$R^{11'}$ to $R^{15'}$ may be the same or different, and have the same meanings as those of $R^1$ to $R^6$ in the formula (I). Two or more of $R^{11'}$ to $R^{15'}$ may be bonded to each other to form a ring. Further, $R^{11}$ to $R^{15}$ may be the same as, or different from $R^{11'}$ to $R^{15'}$ respectively.

Y denotes a bonding group or a single bond, in which at least one group selected from $R^{11}$ to $R^{15}$ is bonded to at least one group selected from $R^{11'}$ to $R^{15'}$. Although there is no specific restriction on the bonding group, it desirably has a structure wherein the main chain consists of 3 or more atoms, preferably 4 to 20 atoms, more preferably 4 to 10 atoms. The bonding group may have a substituent. As the bonding group indicated by Y, there may be enumerated the same groups as indicated by Y in the formula (IV-b).

Examples of the transition metal compounds represented by the formula (V) or (V-a) are given below.

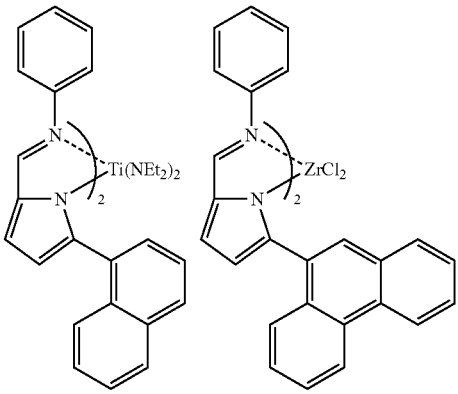

-continued

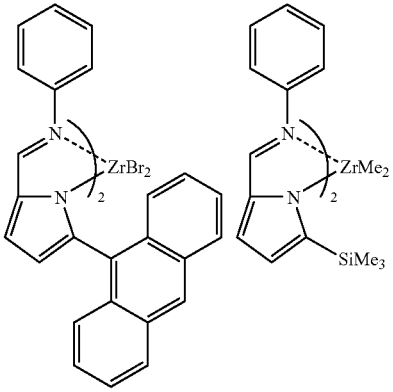

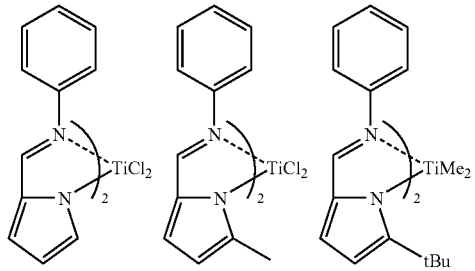

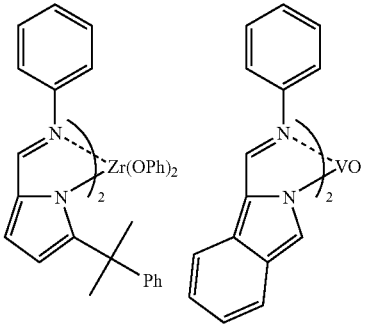

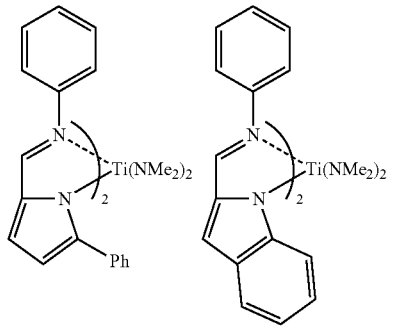

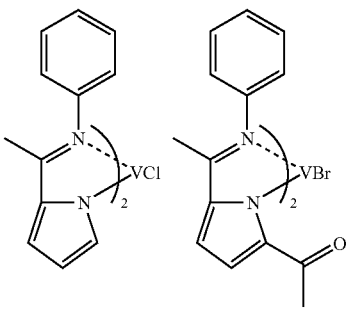

-continued
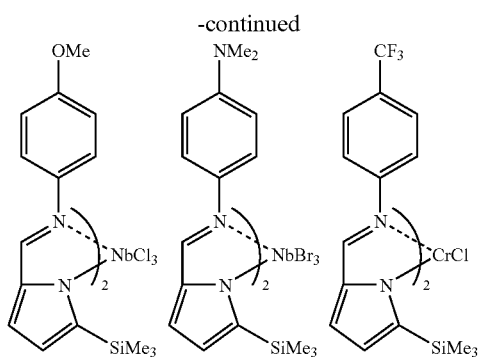
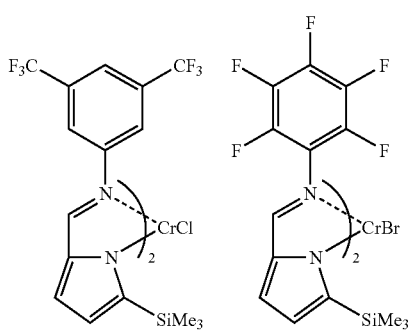
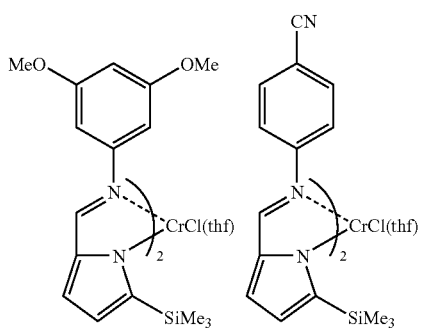
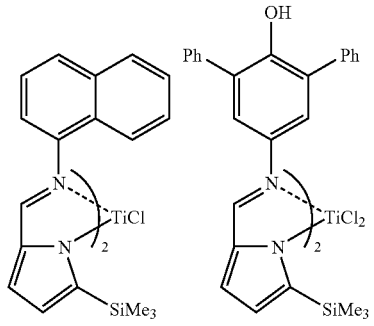
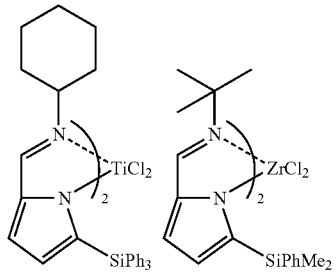
-continued
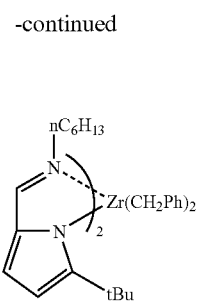
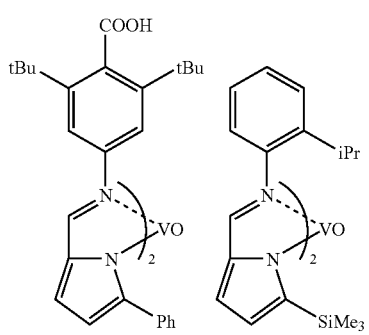
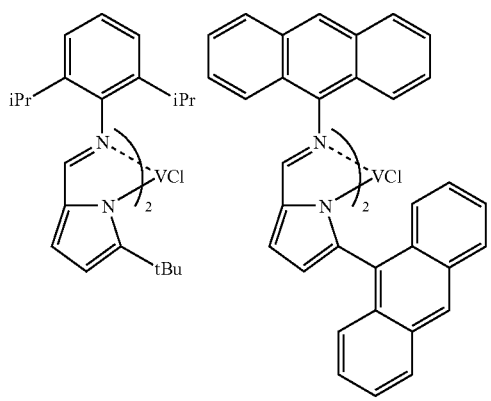
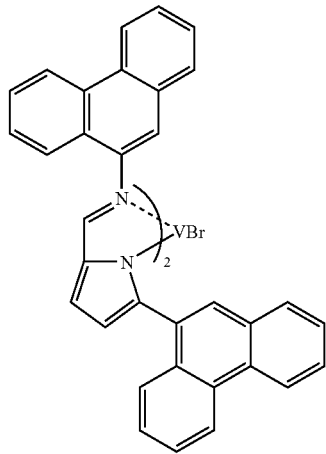

-continued
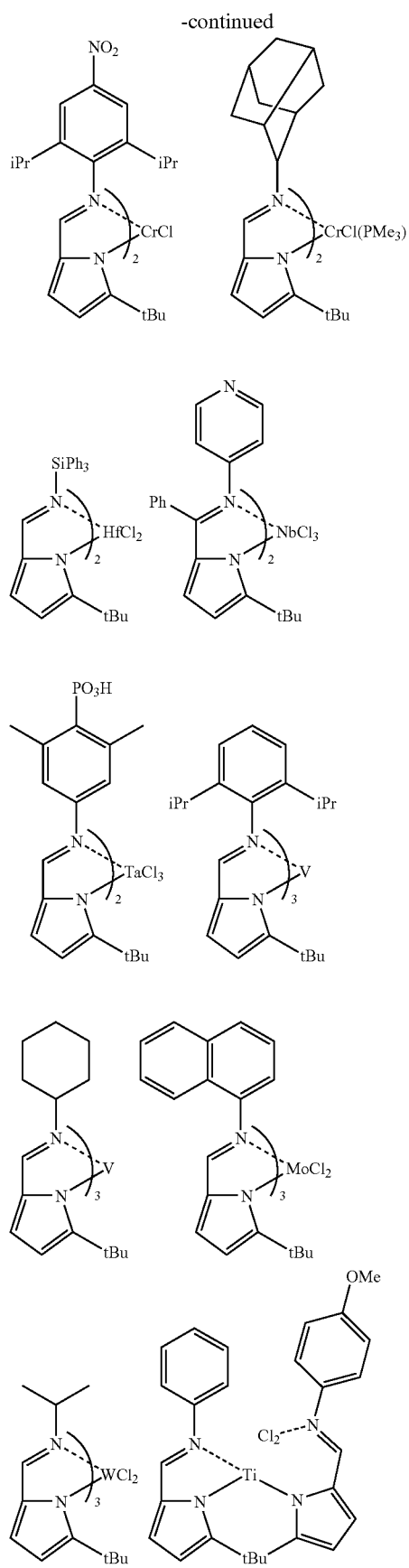
-continued
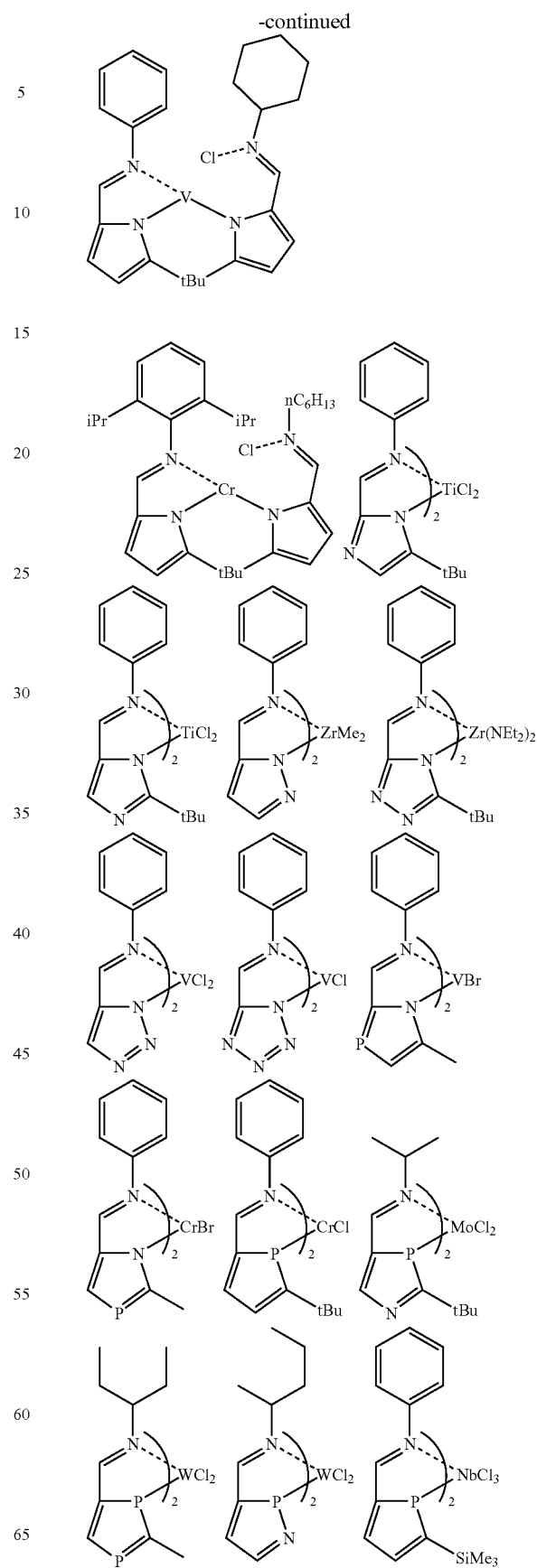

-continued
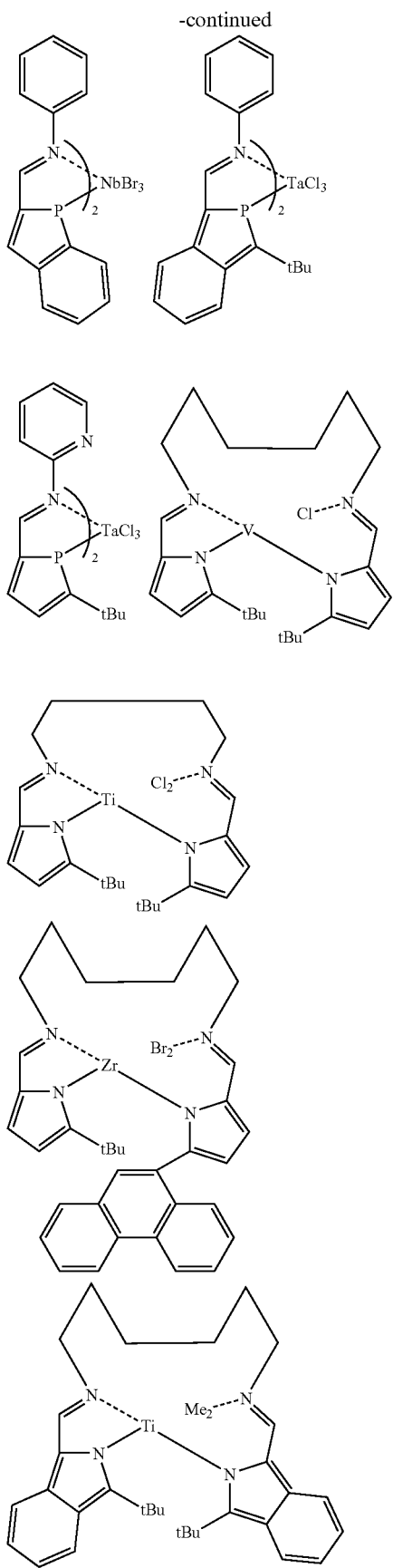
-continued
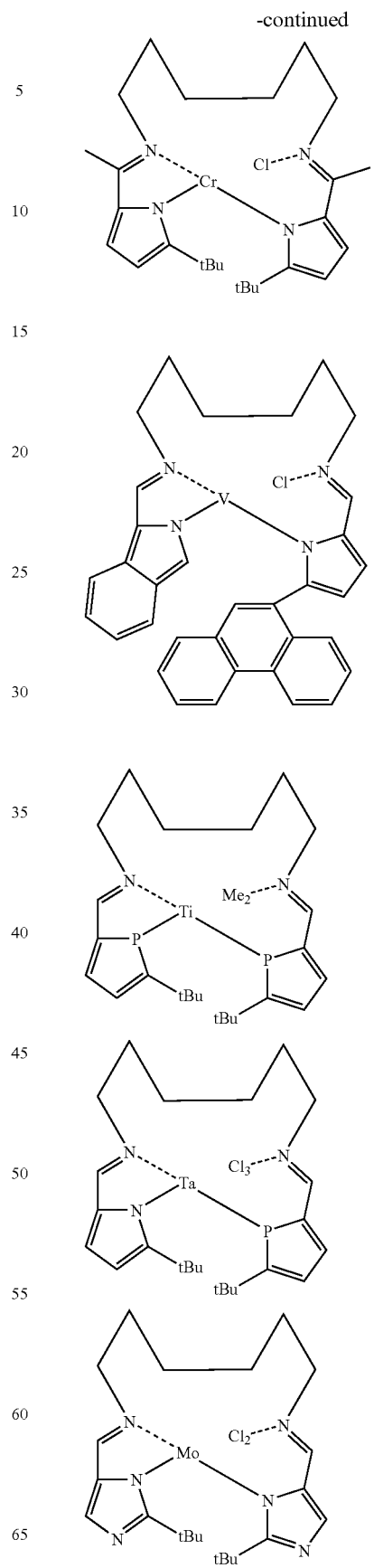

-continued
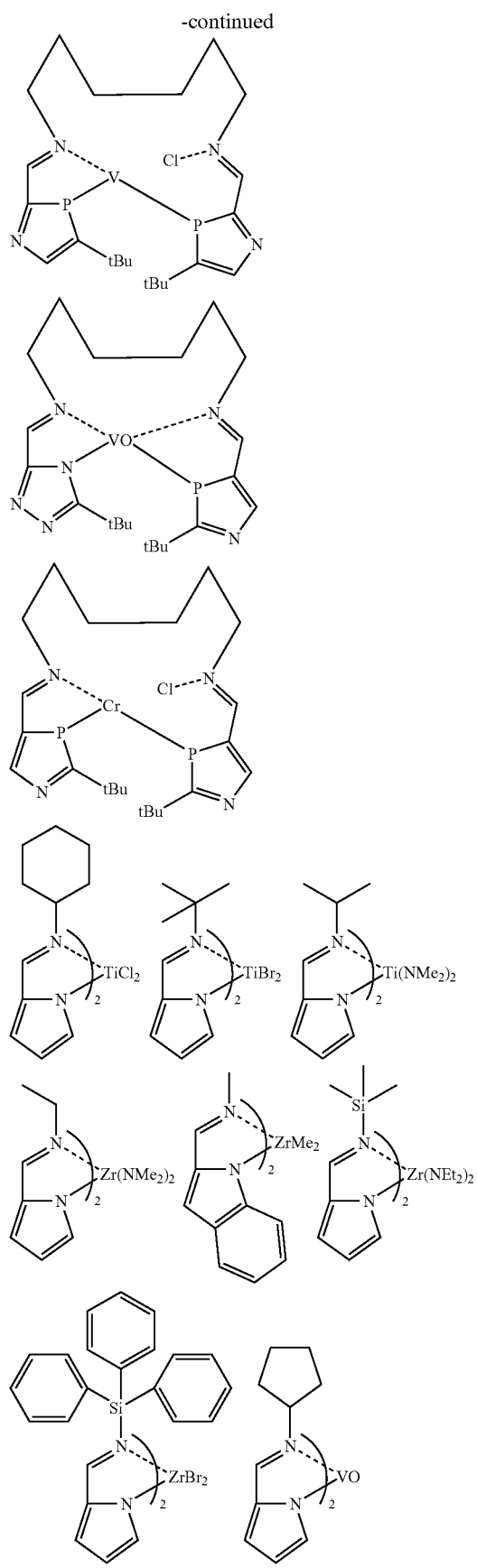
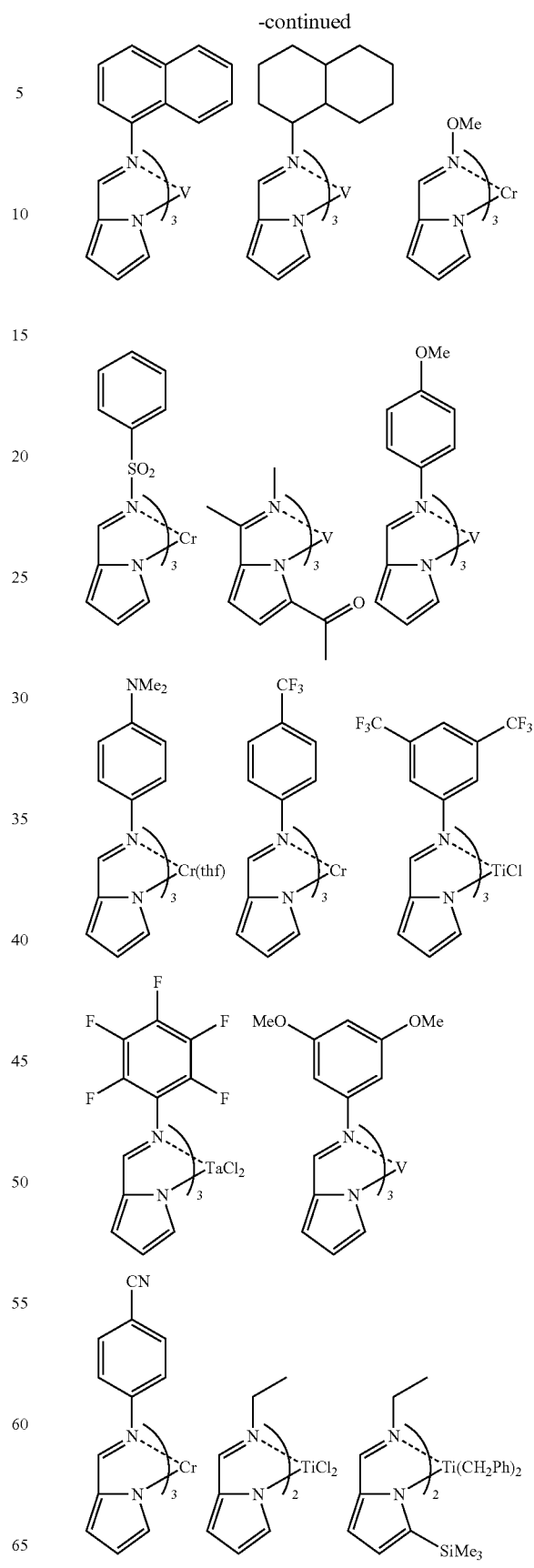

-continued
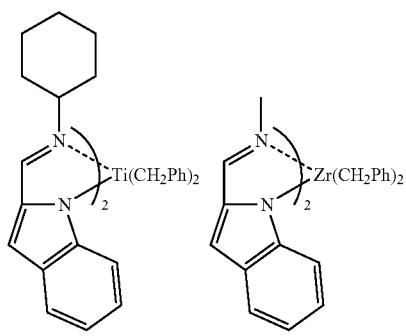
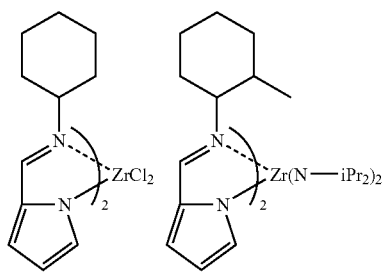
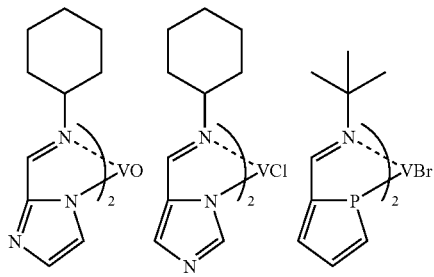
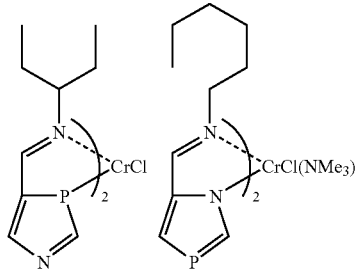
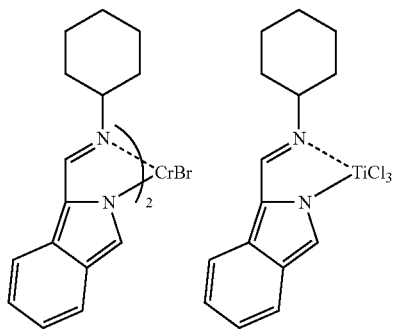
-continued
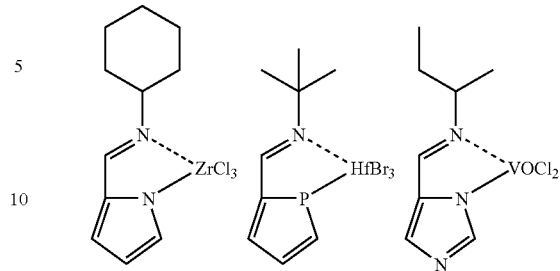
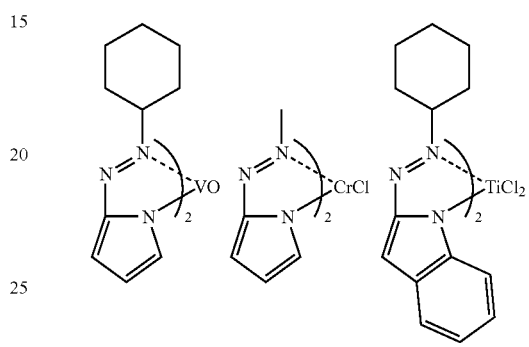
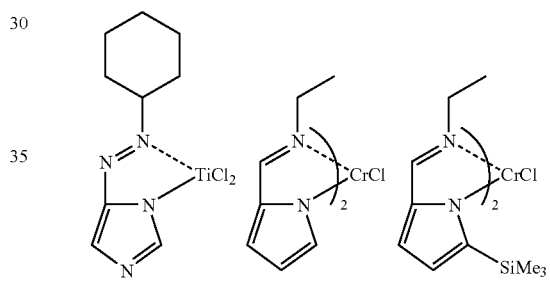
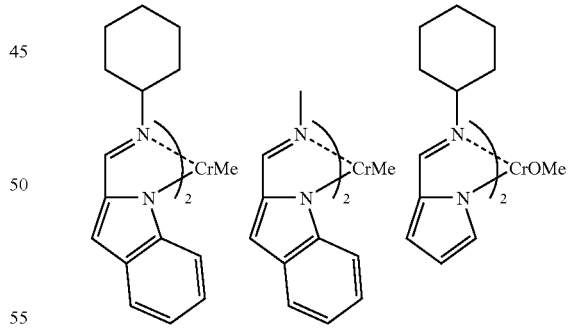
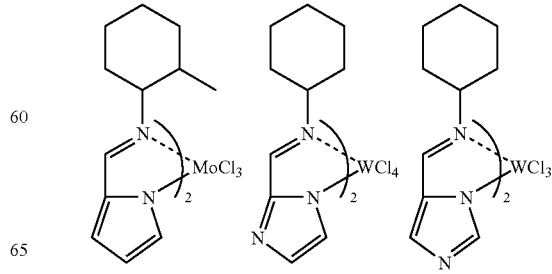

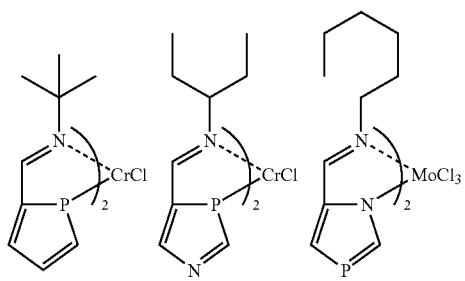
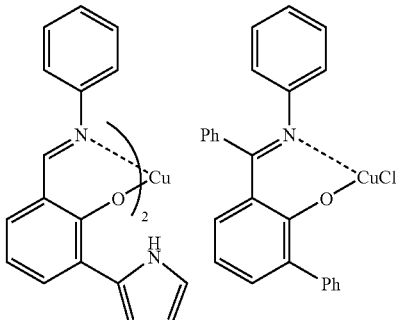
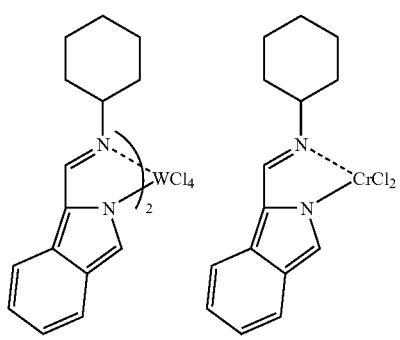
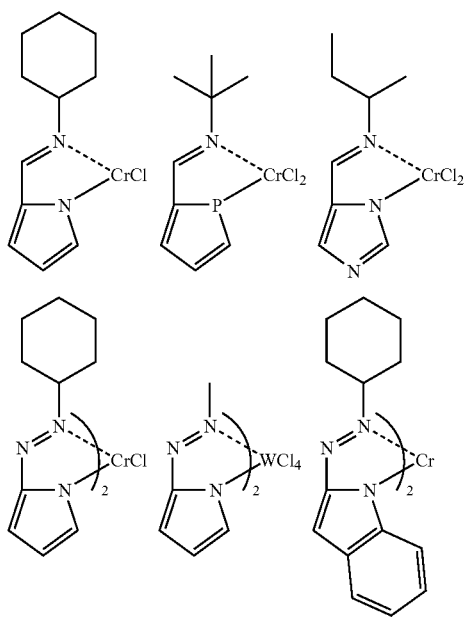
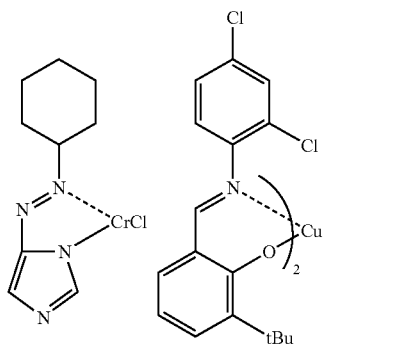
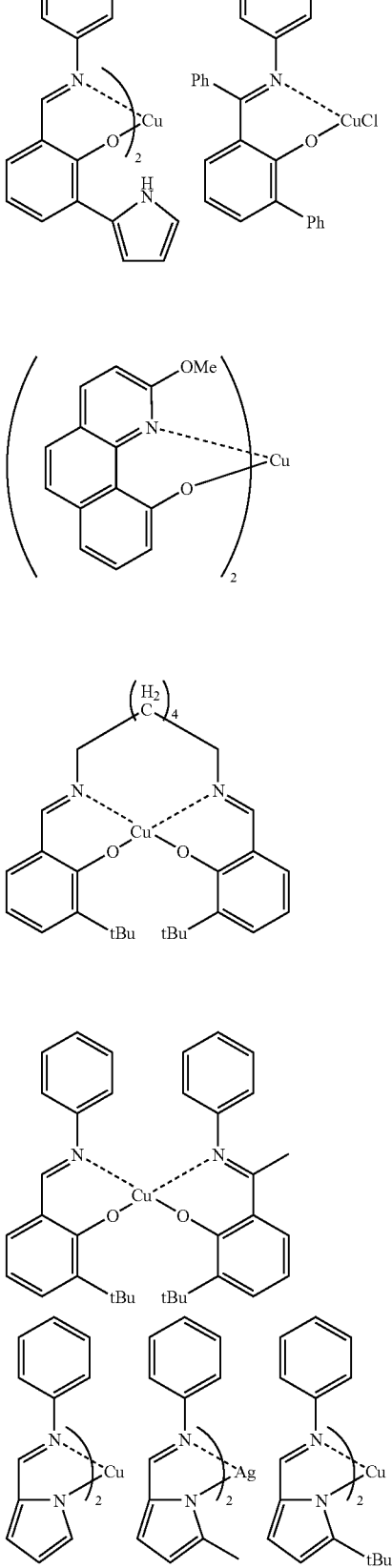

-continued

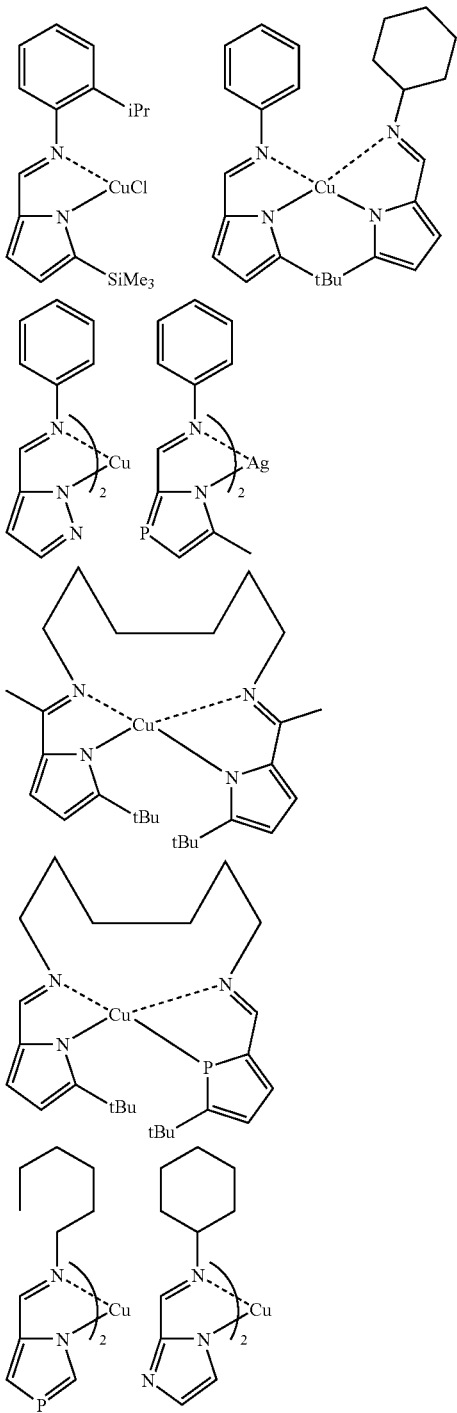

In the case of a compound of a metal of Group 4, the compound in which such a metal of Group 4 is replaced with another metal of Group 4 may be included in the above examples. Concretely, when a specific example is a Ti compound, the compound wherein Ti is replaced with Zr or Hf can also be enumerated.

Similarly, in the case of a compound of a metal of Group 5, the compound in which such a metal of Group 5 is replaced with another metal of Group 5 may be included in the above examples. Concretely, when a specific example is a V compound, the compound wherein V is replaced with Nb or Ta can also be enumerated.

Moreover, in the case of a compound of a metal of Group 6, the compound in which such a metal of Group 6 is replaced with another metal of Group 6 may be included in the above examples. Concretely, when a specific example is a Cr compound, the compound wherein Cr is replaced with Mo or W can also be enumerated.

Furthermore, in the case of a compound of a metal of Group 11, the compound in which such a metal of Group 11 is replaced with another metal of Group 11 may be included in the above examples. Concretely, when a specific example is a Cu compound, the compound wherein Cu is replaced with Ag or Au can also be enumerated.

Transition Metal Compound (A6)

The transition metal compound (A6) is a compound of a transition metal selected from Groups 3 to 11 of the periodic table which is represented by the following formula (VI):

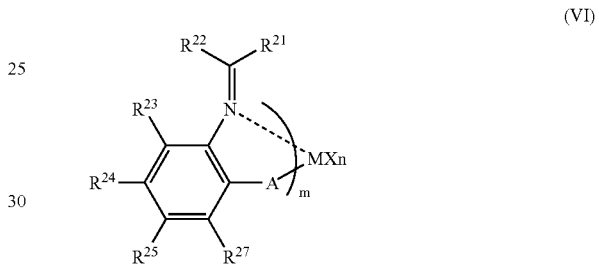

(VI)

(wherein the dotted line (----) of N----M means that a coordinate bond is formed, but a compound having no coordinate bond is also included in the present invention.)

In the above formula (VI), M has the same meaning as that of M in the formula (c'), and preferred is a transition metal atom selected from Group 4, 5, 6 and 11 of the periodic table such as titanium, zirconium, hafnium, vanadium, niobium, tantalum, chromium, molybdenum, tungsten, copper and silver, and particularly preferred is titanium, vanadium or chromium.

The m is an integer of 1 to 6, preferably an integer of 1 to 4.

A has the same meaning as that of A in the formula (III).

$R^{21}$ to $R^{27}$ may be the same or different, and have the same meanings as those of $R^{21}$ to $R^{28}$ in the formula (III). Two or more groups of $R^{21}$ to $R^{27}$, preferably the adjacent groups thereof, may be bonded to each other to form an aliphatic ring, an aromatic ring, or a hydrocarbon ring containing a hetero atom (e.g., a nitrogen atom), which rings may have a substituent respectively. When m is 2 or greater, one group of $R^{21}$ to $R^{27}$ contained in any one ligand may be bonded to one group of $R^{21}$ to $R^{27}$ contained in another ligand, and $R^{21}$s, $R^{22}$s, $R^{23}$s, $R^{24}$s, $R^{25}$s, $R^{26}$s or $R^{27}$s may be the same or different.

The n is a number satisfying a valence of M, and concretely an integer of 0 to 5, preferably an integer of 1 to 4, more preferably an integer of 1 to 3.

X has the same meaning as that of X in the formula (c)'. When n is 2 or greater, the plural groups indicated by X may be the same or different, and the plural groups indicated by X may be bonded to each other to form a ring.

Among the compounds represented by the formula (VI), the compounds in which m is 2, and one group of $R^{21}$ to $R^{27}$ contained in any one ligand is bonded one group of $R^{21}$ to $R^{27}$ contained in another ligand are represented, for example, by the following formula (VI-a).

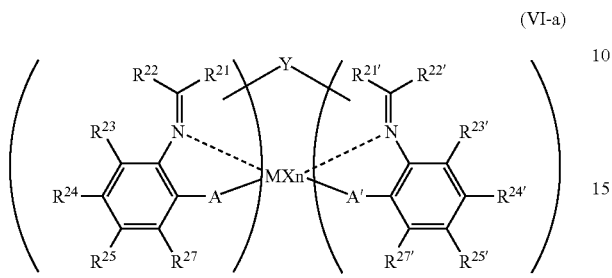

(VI-a)

In the above formula (VI-a), A, M, X and n have the same meanings respectively as those A, M, X and n in the formula (VI).

$R^{21}$ to $R^{27}$ may be the same or different, and have the same meanings as those of $R^{21}$ to $R^{27}$ in the formula (III). Two or more of $R^{21}$ to $R^{27}$ may be bonded to each other to form a ring.

A' may be the same as, or different from A, and denotes an oxygen atom (—O—), a sulfur atom (—S—) or a selenium atom (—Se—), or a nitrogen atom having a bonding group $R^{26'}$ (—N($R^{26'}$)—).

$R^{21'}$ to $R^{27'}$ may be the same or different, and have the same meanings as those of $R^1$ to $R^6$ in the formula (I). Two or more of $R^{21'}$ to $R^{27'}$ may be bonded to each other to form a ring. Further, $R^{21'}$ to $R^{27'}$ may be the same as, or different from $R^{21'}$ to $R^{27'}$ respectively.

Y denotes a bonding group or a single bond, in which at least one group selected from $R^{21}$ to $R^{27}$ is bonded to at least one group selected from $R^{21'}$ to $R^{27'}$. Although there is no specific restriction on the bonding group, it desirably has a structure wherein the main chain consists of 3 or more atoms, preferably 4 to 20 atoms, more preferably 4 to 10 atoms. The bonding group may have a substituent. As the bonding group indicated by Y, there may be enumerated the same groups as indicated by Y in the formula (IV-b).

Examples of the transition metal compounds represented by the formula (VI) or (VI-a) are given below.

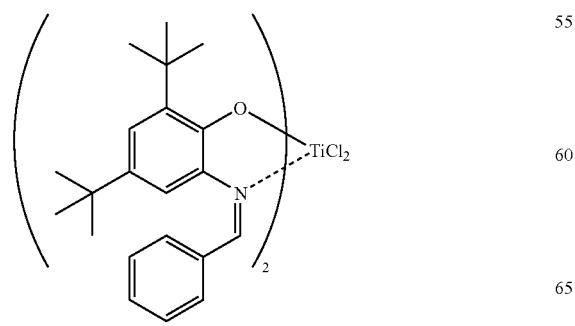

-continued

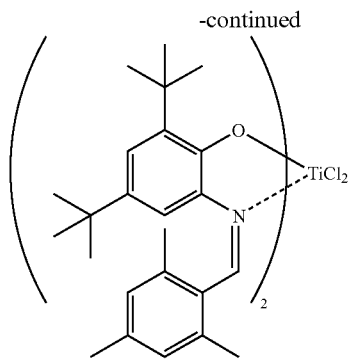

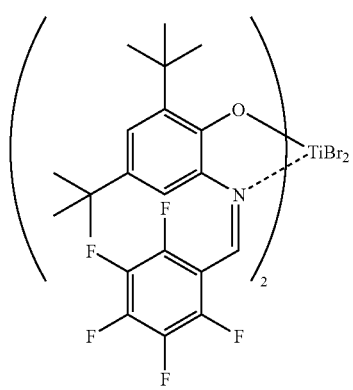

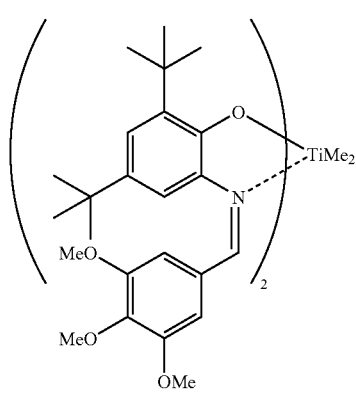

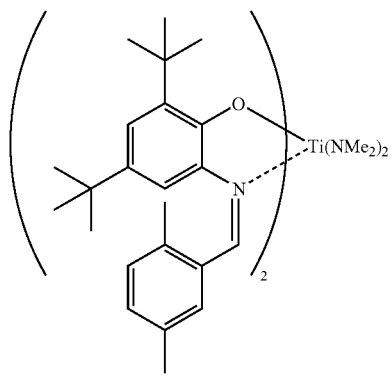

-continued
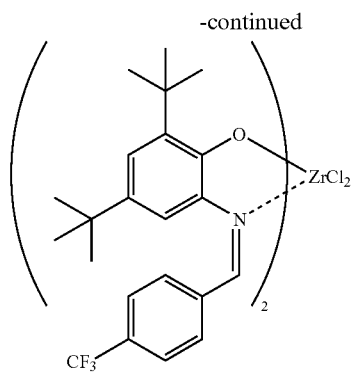
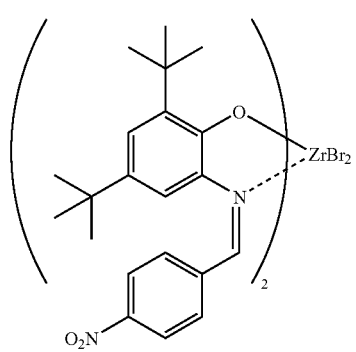
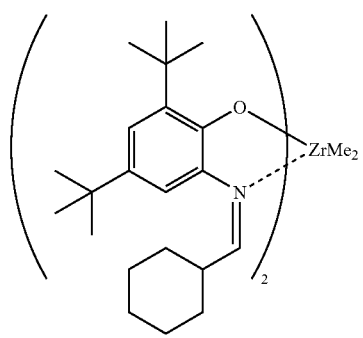
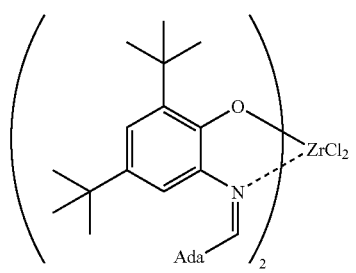
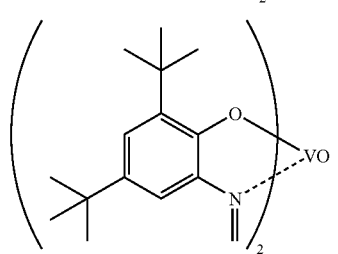
-continued
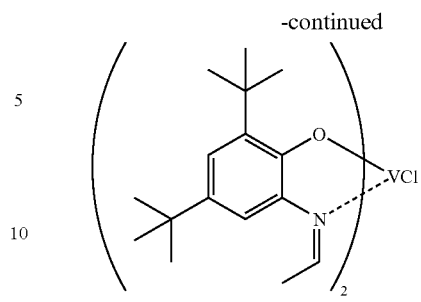
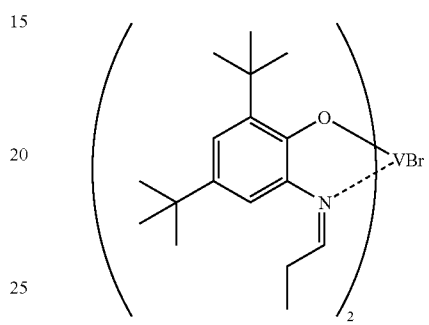
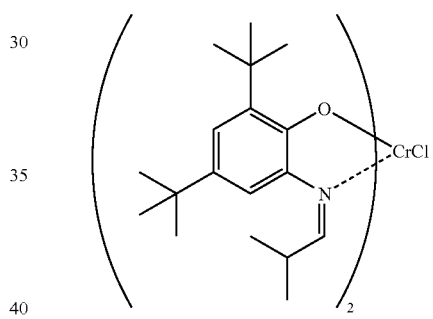
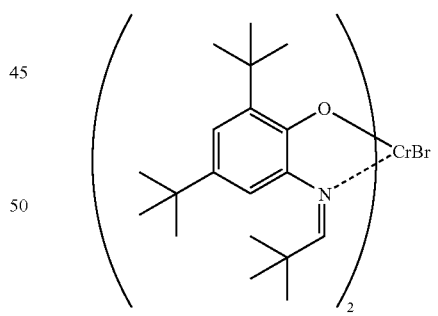
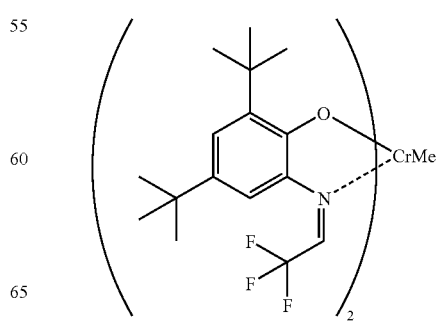

-continued
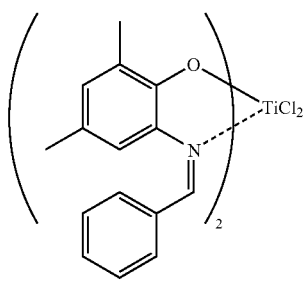
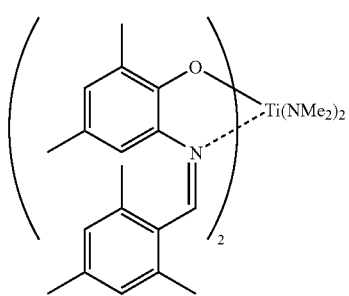
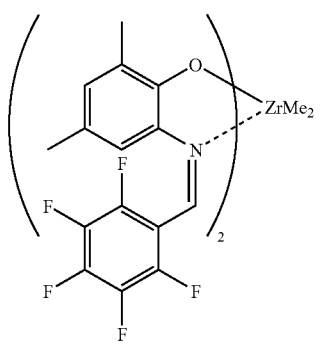
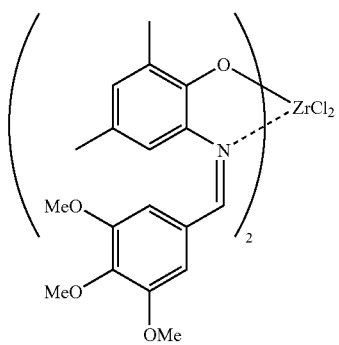
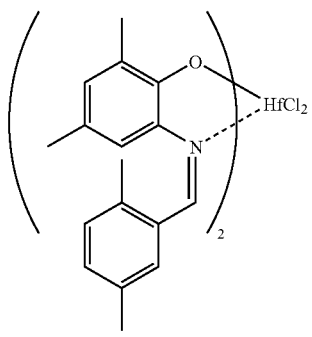
-continued
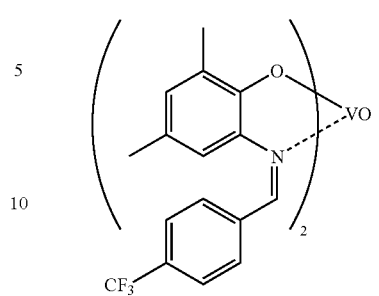
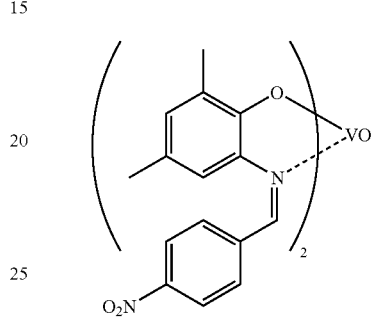
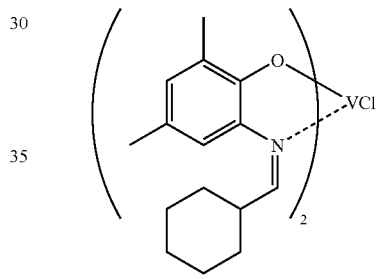
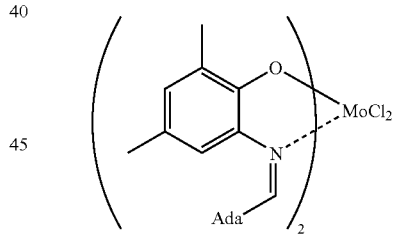
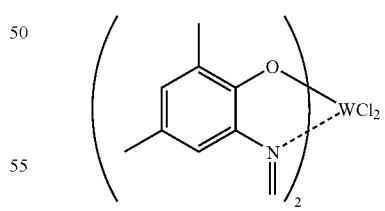
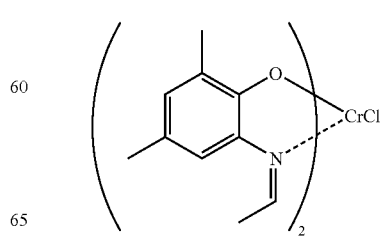

-continued
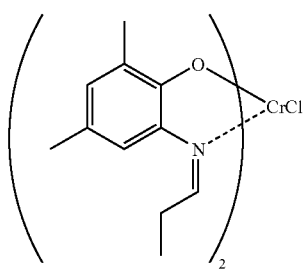
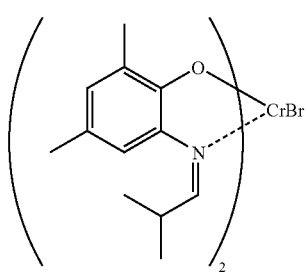
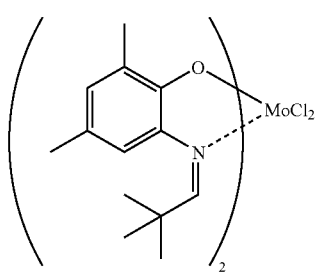
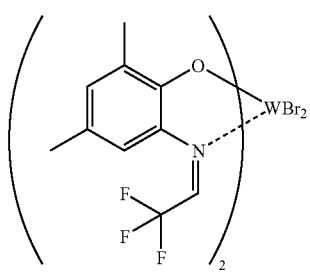
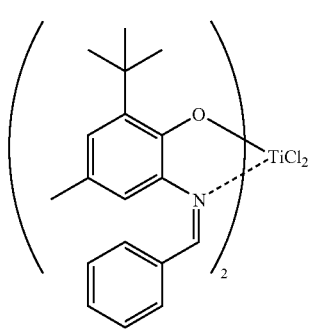
-continued
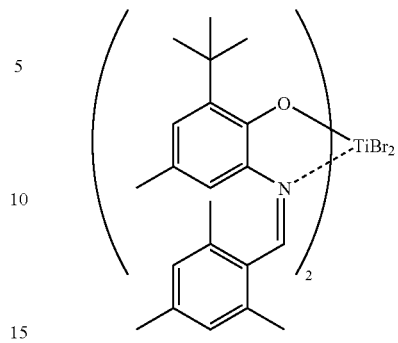
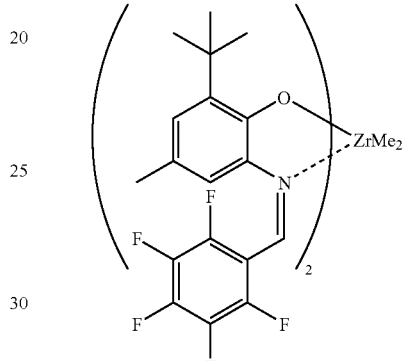
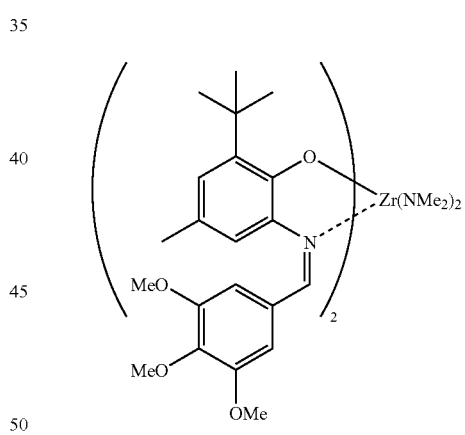
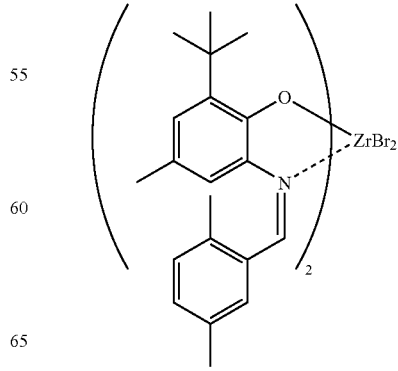

-continued
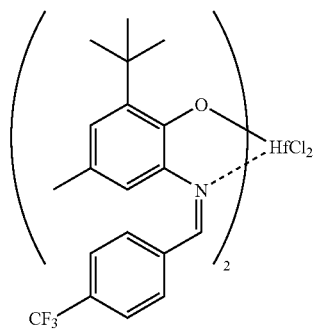
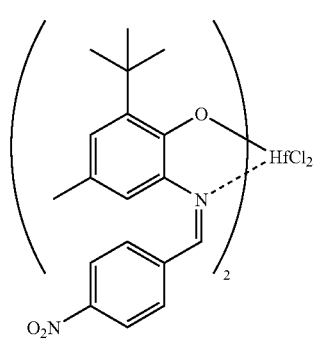
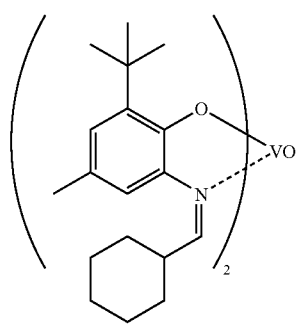
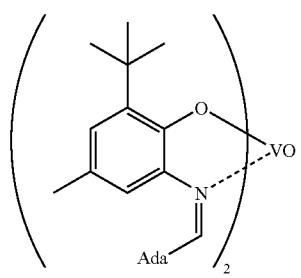
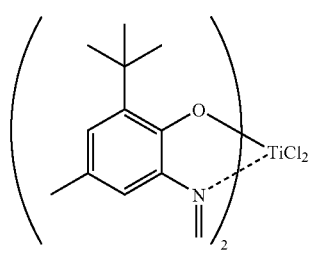
-continued
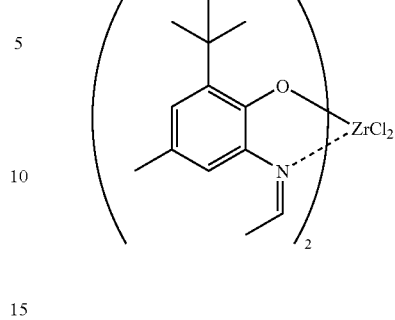
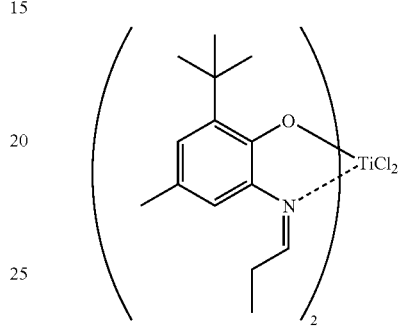
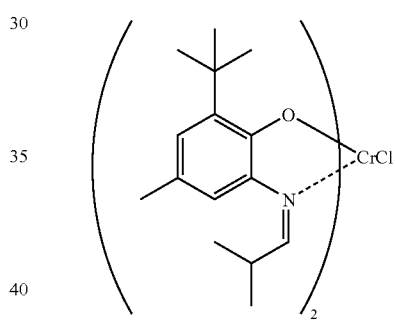
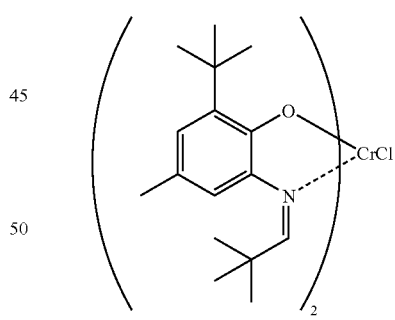
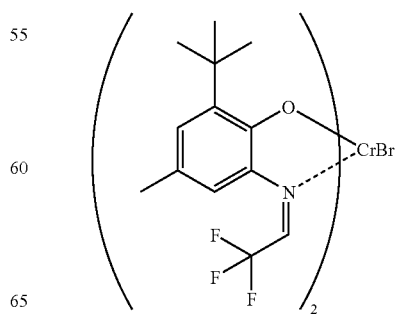

-continued
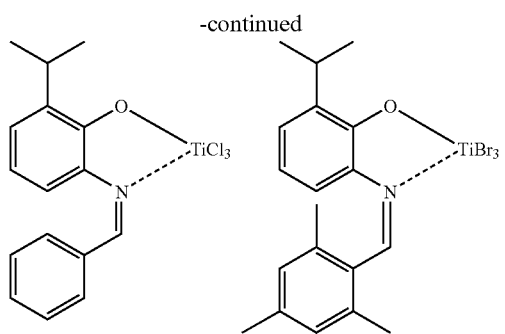
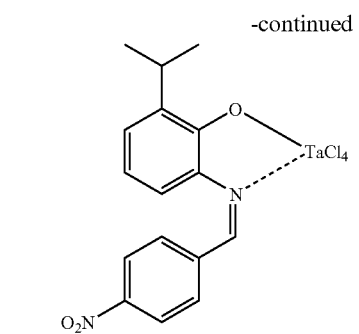
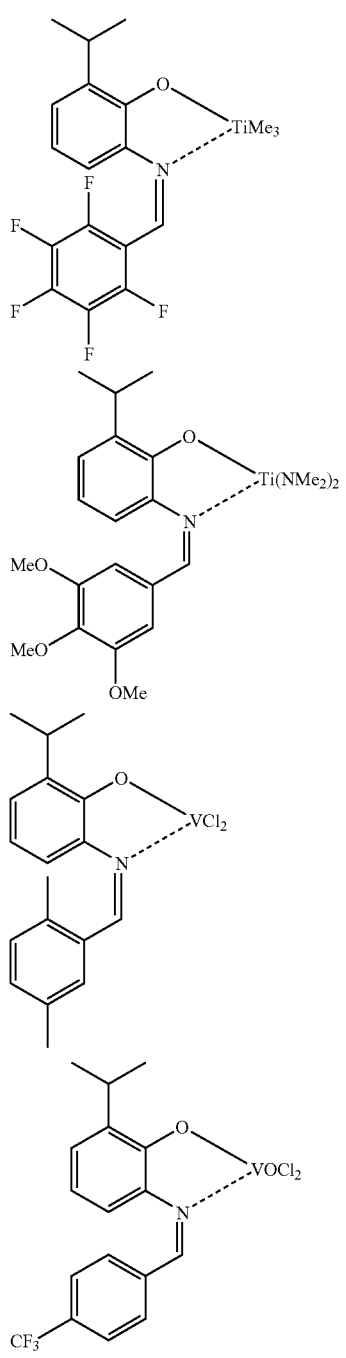
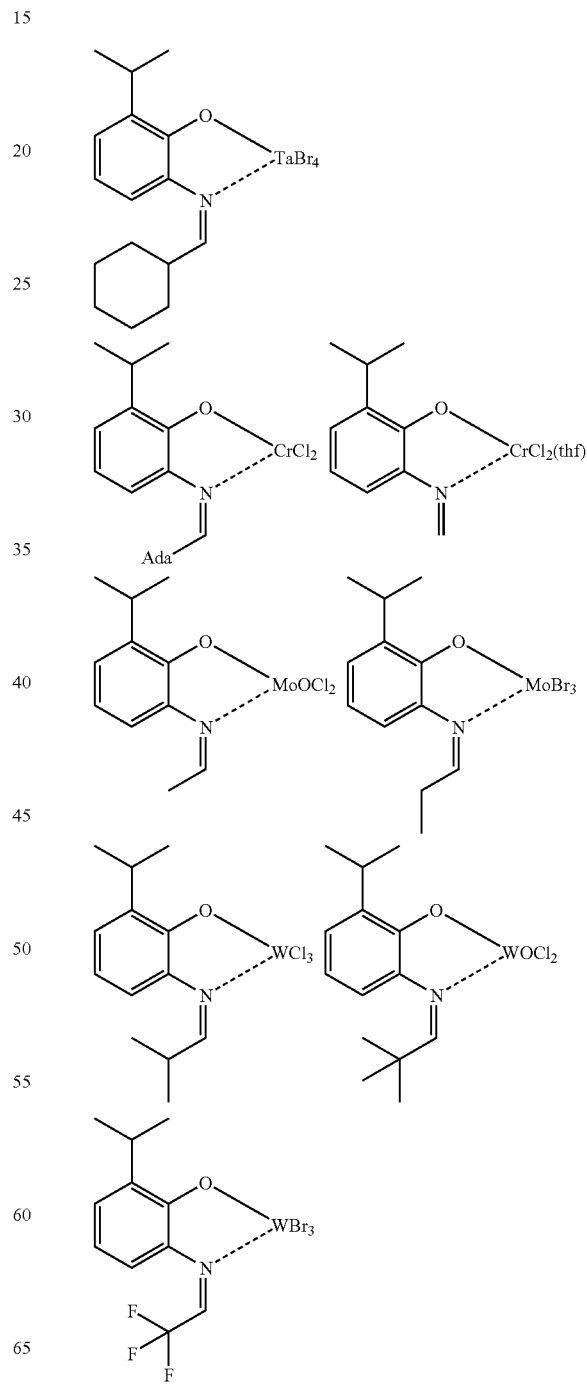

-continued
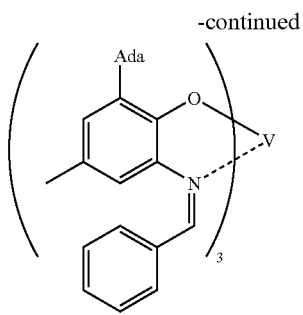
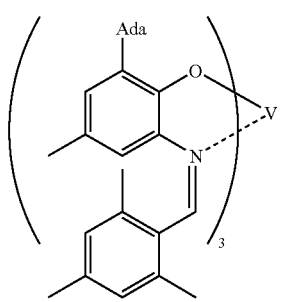
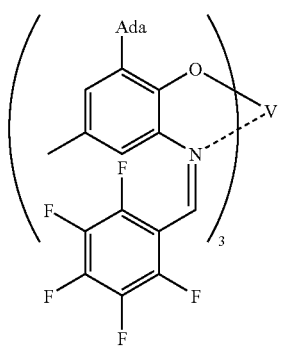
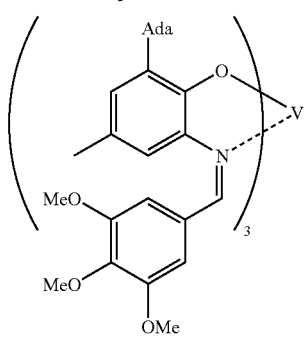
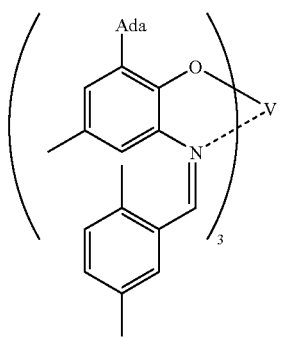
-continued
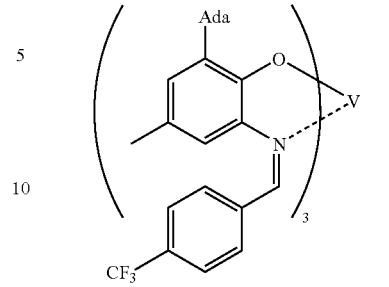
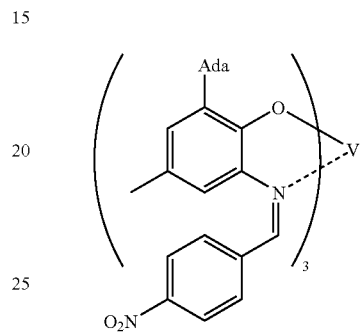
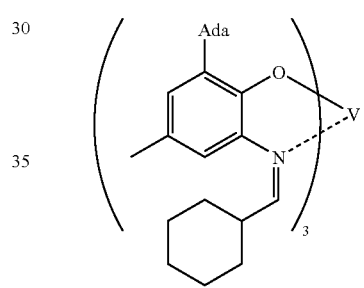
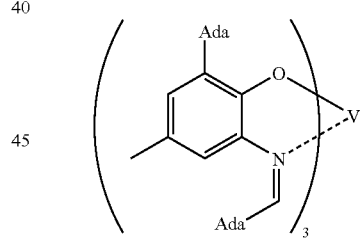
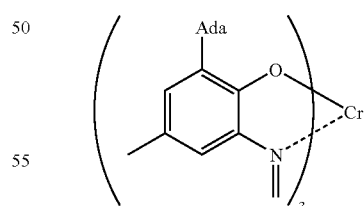
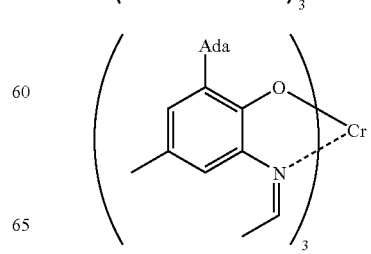

-continued
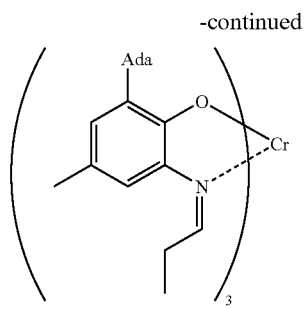
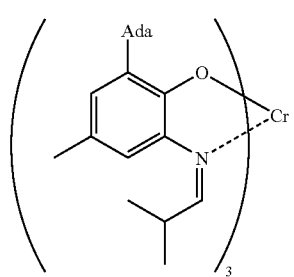
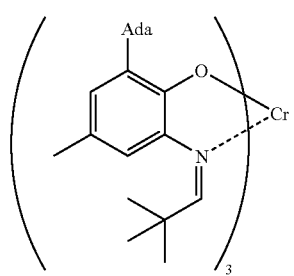
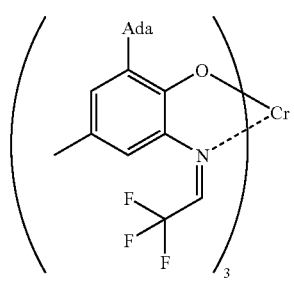
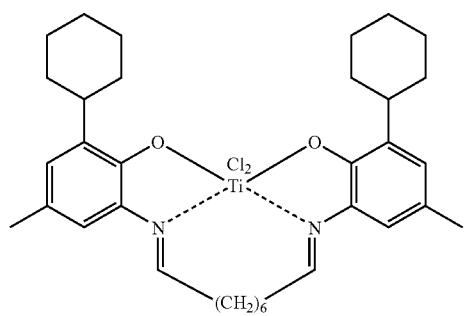
-continued
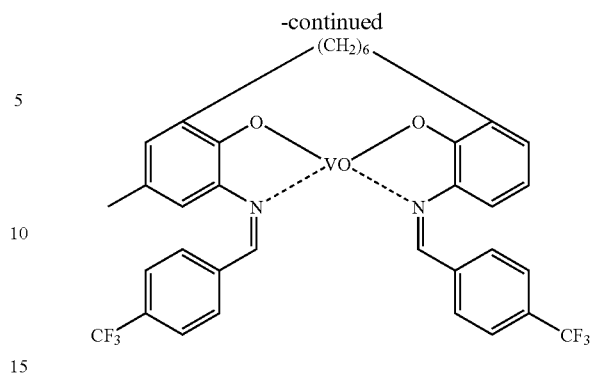
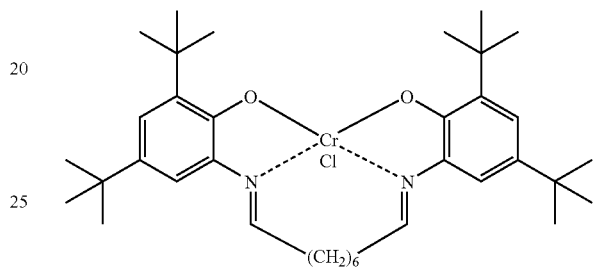
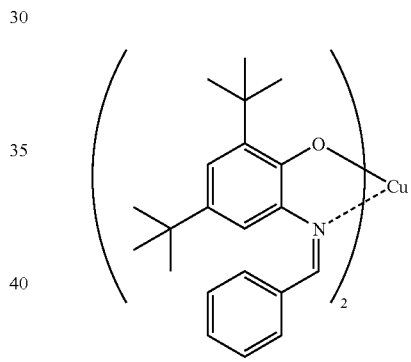
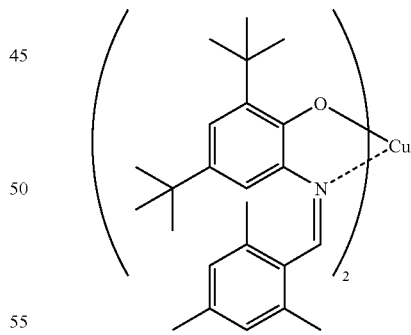
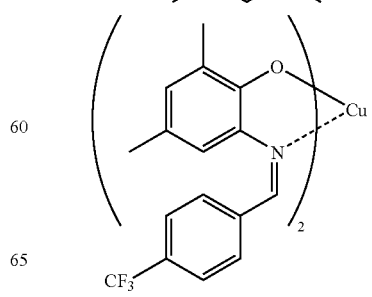

-continued
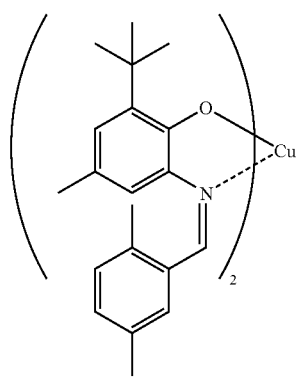
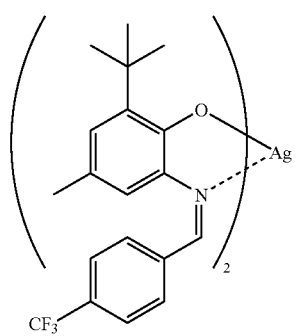
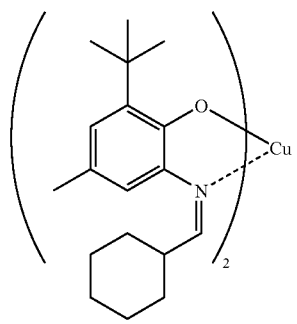
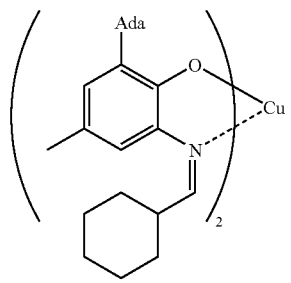
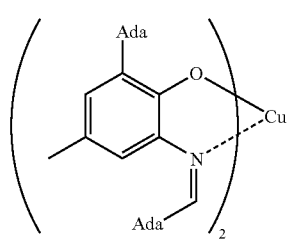
-continued
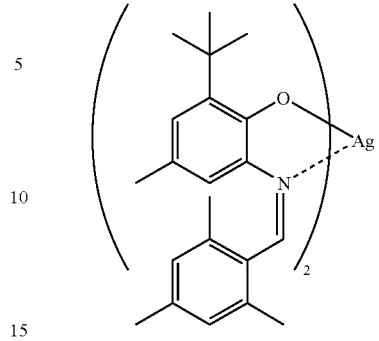
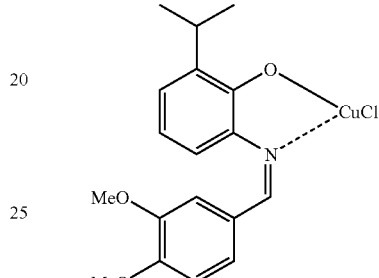
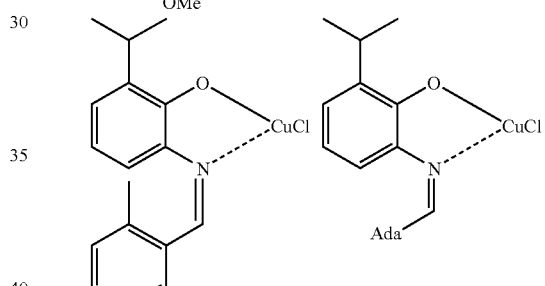
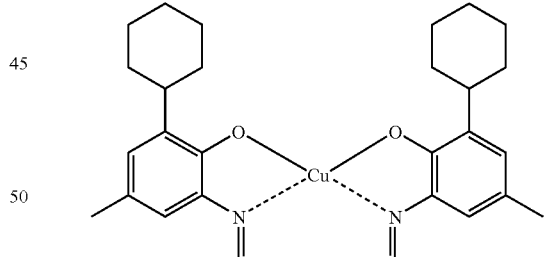
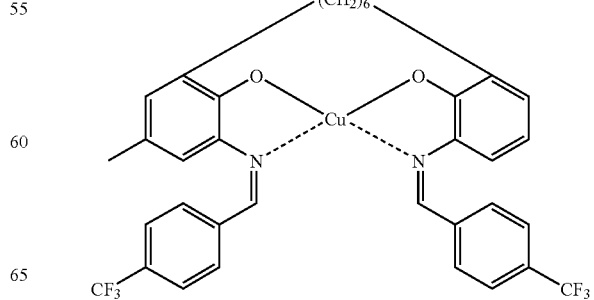

-continued
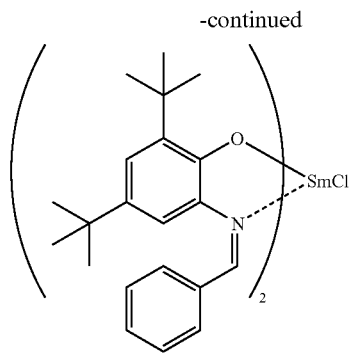
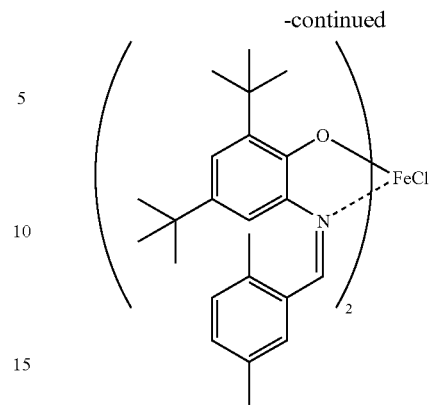
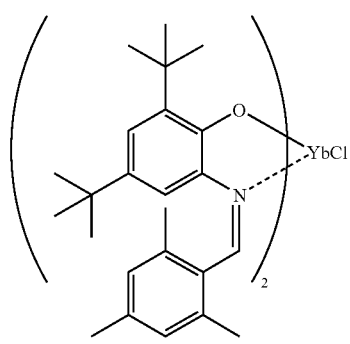
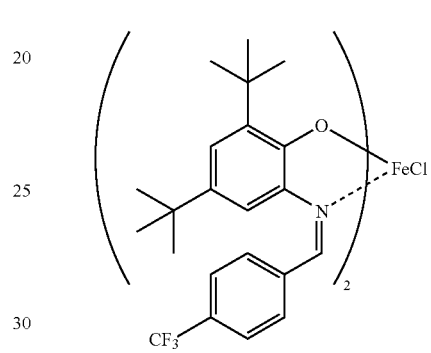
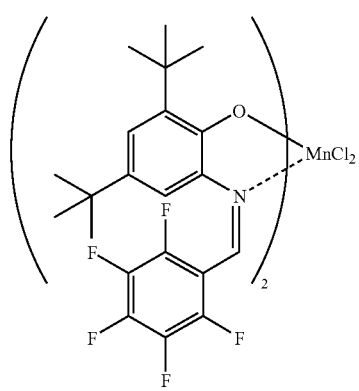
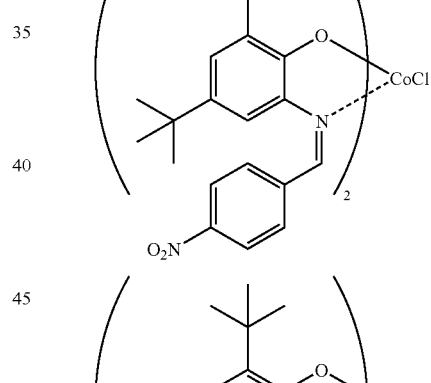
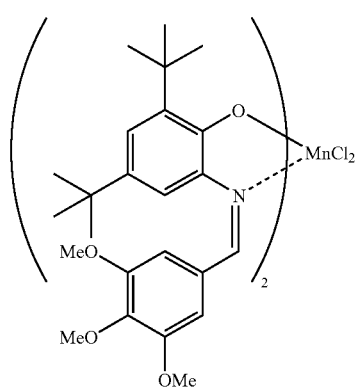
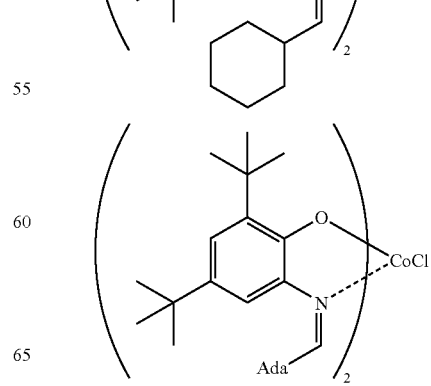

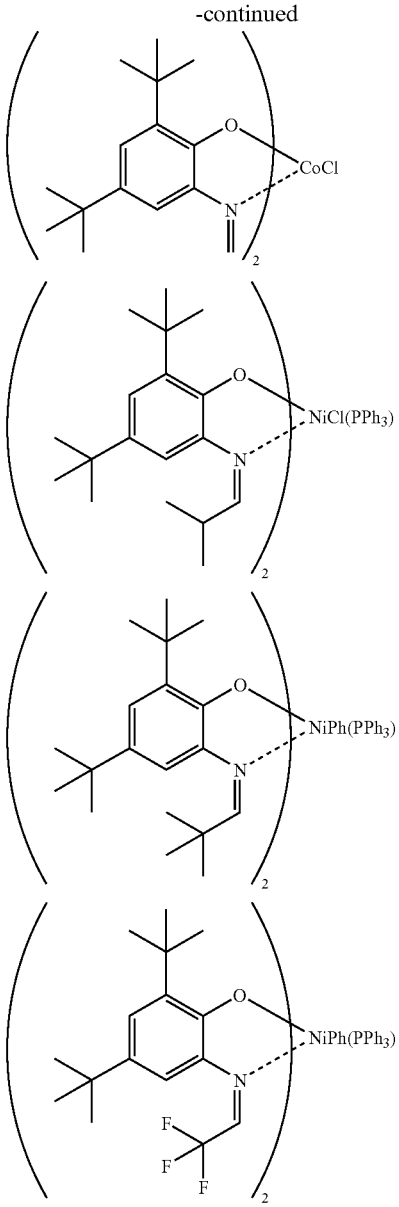

Further, in the above examples, compounds in which the transition metal is replaced with another transition metal of the same Group may be enumerated. For example, when a specific example is a Ti compound, the compound wherein Ti is replaced with Zr or Hf can also be enumerated.

In processes of the invention, for the above transition metal compound (A1), (A2), (A4) or (A5), a non-polar olefin and a polar olefin are copolymerized in the presence of a catalyst comprising these transition metal compounds and at least one compound (B) selected from the group consisting of (B-1) an organometallic compound, (B-2) an organoaluminum oxy-compound and (B-3) an ionizing ionic compound.

Further, in the processes of the invention, for the above transition metal compound (A0), (A3) or (A6), it is one of the preferred embodiments that a non-polar olefin and a polar olefin are copolymerized in the presence of a catalyst comprising these transitin metal compounds and the component (B).

Next, each compound as the component (B) is described.

(B-1) Organometallic Compound

Examples of the organometallic compound (B-1) include organometallic compounds containing metals of Group 1, Group 2, Group 12 and Group 13 of the periodic table, such as those described below.

(B-1a) Organoaluminum compound represented by the following formula:

wherein $R^a$ and $R^b$ may be the same or different and are each a hydrocarbon group of 1 to 15 carbon atoms, preferably 1 to 4 carbon atoms; X is a halogen atom; and m, n, p and q are numbers satisfying the conditions of $0<m\leq3$, $0\leq n<3$, $0\leq p<3$, $0\leq q<3$ and $m+n+p+q=3$.

(B-1b) Alkyl complex compound comprising a metal of Group 1 and aluminum and represented by the following formula:

$$M^2AlR^a_4$$

wherein $M^2$ is Li, Na or K; and $R^a$ is a hydrocarbon group of 1 to 15 carbon atoms, preferably 1 to 4 carbon atoms.

(B-1c) Dialkyl compound containing a metal of Group 2 or Group 12 and represented by the following formula:

$$R^aR^bM^3$$

wherein $R^a$ and $R^b$ may be the same or different and are each a hydrocarbon group of 1 to 15 carbon atoms, preferably 1 to 4 carbon atoms; and $M^3$ is Mg, Zn or Cd.

Examples of the organoaluminum compounds (B-1a) include:

an organoaluminun compound represented by the following formula:

wherein $R^a$ and $R^b$ may be the same or different and are each a hydrocarbon group of 1 to 15 carbon atoms, preferably 1 to 4 carbon atoms, and m is preferably a number satisfying the condition of $1.5\leq m\leq3$;

an organoaluminum compound represented by the following formula:

wherein $R^a$ is a hydrocarbon group of 1 to 15 carbon atoms, preferably 1 to 4 carbon atoms, X is a halogen atom, and m is preferably a number satisfying the condition of $0<m<3$;

an organoaluminum compound represented by the following formula:

wherein $R^a$ is a hydrocarbon group of 1 to 15 carbon atoms, preferably 1 to 4 carbon atoms, and m is preferably a number satisfying the condition of $2\leq m<3$;

and an organoaluminum compound represented by the following formula:

wherein $R^a$ and $R^b$ may be the same or different and are each a hydrocarbon group of 1 to 15 carbon atoms, preferably 1 to 4 carbon atoms, X is a halogen atom, and m, n and q are numbers satisfying the conditions of $0<m\leq3$, $0\leq n<3$, $0\leq q<3$ and $m+n+q=3$.

Particular examples of the organoaluminum compounds (B-1a) include:

tri-n-alkylaluminums, such as trimethylaluminum, triethylaluminum, tri-n-butylaluminum, tripropylaluminum, tripentylaluminum, trihexylaluminum, trioctylaluminum and tridecylaluminum;

branched-chain trialkylaluminums, such as triisopropylaluminum, triisobutylaluminum, tri-sec-butylaluminum, tritert-butylaluminum, tri-2-methylbutylaluminum, tri-3-methylbutylaluminum, tri-2-methylpentylaluminum, tri-3-methylpentylaluminum, tri-4-methylpentylaluminum, tri-2-methylhexylaluminum, tri-3-methylhexylaluminum and tri-2-ethylhexylaluminum;

tricycloalkylaluminums, such as tricyclohexylaluminum and tricyclooctylaluminum;

triarylaluminums, such as triphenylaluminum and tritolylaluminum;

dialkylaluminum hydrides, such as diethylaluminum hydride and diisobutylaluminum hydride;

trialkenylaluminums, e.g., those represented by the formula $(i-C_4H_9)_xAl_y(C_5H_{10})_z$ (wherein x, y and z are each a positive number, and $z\geq 2x$), such as isoprenylaluminum;

alkylaluminum alkoxides, such as isobutylaluminum methoxide, isobutylaluminum ethoxide and isobutylaluminum isopropoxide;

dialkylaluminum alkoxides, such as dimethylaluminum methoxide, diethylaluminum ethoxide and dibutylaluminum butoxide;

alkylaluminum sesquialkoxides, such as ethylaluminum sesquiethoxide and butylaluminum sesquibutoxide;

partially alkoxylated alkylaluminums, such as those having an average composition represented by $R^a{}_{2.5}Al(OR^b)_{0.5}$;

dialkylaluminum aryloxides, such as diethylaluminum phenoxide, diethylaluminum(2,6-di-t-butyl-4-methylphenoxide), ethylaluminumbis(2,6-di-t-butyl-4-methylphenoxide), diisobutylalumium(2,6-di-t-butyl-4-methylphenoxide) and isobutylaluminumbis(2,6-di-t-butyl-4-methylphenoxide);

dialkylaluminum halides, such as dimethylaluminum chloride, diethylaluminum chloride, dibutylaluminum chloride, diethylaluminum bromide and diisobutylaluminum chloride;

alkylaluminum sesquihalides, such as ethylaluminum sesquichloride, butylaluminum sesquichloride and ethylaluminum sesquibromide, partially halogenated alkylaluminums, such as ethylaluminum dichloride, propylaluminum dichloride and butylaluminum dibromide;

dialkylaluminum hydrides, such as diethylaluminum hydride and dibutylaluminum hydride;

partially hydrogenated alkylaluminums, e.g., alkylaluminum dihydrides, such as ethylaluminum dihydride and propylaluminum dihydride; and partially alkoxylated and halogenated alkylaluminums, such as ethylaluminum ethoxychloride, butylaluminum butoxychloride and ethylaluminum ethoxybromide.

Also employable are compounds analogous to the organoaluminum compound (B-1a). For example, there can be mentioned organoaluminum compounds wherein two or more aluminum compounds are combined through a nitrogen atom, such as $(C_2H_5)_2AlN(C_2H_5)Al(C_2H_5)_2$.

Examples of the compounds (B-1b) include $LiAl(C_2H_5)_4$ and $LiAl(C_7H_{15})_4$.

Other compounds, also employable as the organometallic compounds (B-1) include methyllithium, ethyllithium, propyllithium, butyllithium, methylmagnesium bromide, methylmagnesium chloride, ethylmagnesium bromide, ethylmagnesium chloride, propylmagnesium bromide, propylmagnesium chloride, butylmagnesium bromide, butylmagnesium chloride, dimethylmagnesium, diethylmagnesium, dibutylmagnesium and butylethylmagnesium.

Combinations of compounds capable of producing the above-mentioned organoaluminum compounds in the polymerization system, e.g., a combination of halogenated aluminum and alkyllithium and a combination of halogenated aluminum and alkylmagnesium, are also employable.

Of the organometallic compounds (B-1), the organoaluminum compounds are preferable.

The organometallic compounds (B-1) mentioned above are used singly or in combination of two or more kinds.

(B-2) Organoaluminum Oxy-Compound

The organoaluminum oxy-compound (B-2) may be conventional aluminoxane or a benzene-insoluble organoaluminum oxy-compound such as exemplified in Japanese Patent Laid-Open Publication No. 78687/1990.

The conventional aluminoxane can be prepared by, for example, the following processes, and is generally obtained as a hydrocarbon solvent solution.

(1) An organoaluminum compound such as trialkylaluminum is added to a hydrocarbon medium suspension of a compound containing adsorption water or a salt containing water of crystallization, e.g., magnesium chloride hydrate, copper sulfate hydrate, aluminum sulfate hydrate, nickel sulfate hydrate or cerous chloride hydrate, to allow the organoaluminum compound to react with the adsorption water or the water of crystallization.

(2) Water, ice or water vapor is allowed to directly act on an organoaluminum compound such as trialkylaluminum in a medium such as benzene, toluene, ethyl ether or tetrahydrofuran.

(3) An organotin oxide such as dimethyltin oxide or dibutyltin oxide is allowed to react with an organoaluminum compound such as trialkylaluminum in a medium such as decane, benzene or toluene.

The aluminoxane may contain a small amount of an organometallic component. Further, it is possible that the solvent or the unreacted organoaluminum compound is distilled off from the recovered solution of aluminoxane and the remainder is redissolved in a solvent or suspended in a poor solvent for aluminoxane.

Examples of the organoaluminum compounds used for preparing the aluminoxane include the same organoaluminum compounds as previously described with respect to the organoaluminum compound (B-1a). Of these, preferable are trialkylaluminums and tricycloalkylaluminums. Particularly preferable is trimethylaluminum.

The organoaluminum compounds are used singly or in combination of two or more kinds.

Examples of the solvents used for preparing the aluminoxane include aromatic hydrocarbons, such as benzene, toluene, xylene, cumene and cymene; aliphatic hydrocarbons, such as pentane, hexane, heptane, octane, decane, dodecane, hexadecane and octadecane; alicyclic hydrocarbons, such as cyclopentane, cyclohexane, cyclooctane and methylcyclopentane; petroleum fractions, such as gasoline, kerosine and gas oil; and halogenated products of these aromatic, aliphatic and alicyclic hydrocarbons (e.g., chlorinated or brominated products thereof). Also employable are ethers such as ethyl ether and tetrahydrofuran. Of the solvents, particularly preferable are aromatic hydrocarbons and aliphatic hydrocarbons.

The benzene-insoluble organoaluminum oxy-compound for use in the invention is preferably an organoaluminum oxy-compound containing an Al component which is soluble in benzene at 60° C., in an amount of usually not more than 10%, preferably not more than 5%, particularly preferably not more than 2%, in terms of Al atom. That is, the benzene-insoluble organoaluminum oxy-compound is preferably insoluble or sparingly soluble in benzene.

The organoaluminum oxy-compound is, for example, an organoaluminum oxy-compound containing boron and represented by the following formula (i):

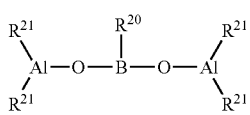

(i)

wherein $R^{20}$ is a hydrocarbon group of 1 to 10 carbon atoms; and each $R^{21}$ may be the same or different and is a hydrogen atom, a halogen atom or a hydrocarbon group of 1 to 10 carbon atoms.

The organoaluminum compound containing boron and represented by the formula (i) can be prepared by allowing an alkylboronic acid represented by the following formula (ii):

$$R^{20}-B-(OH)_2 \quad\quad (ii)$$

wherein $R^{20}$ is the same group as described above, to react with an organoaluminum compound in an inert solvent at a temperature of −80° C. to room temperature for 1 minute to 24 hours under an inert gas atmosphere.

Examples of the alkylboronic acids represented by the formula (ii) include methylboronic acid, ethylboronic acid, isopropylboronic acid, n-propylboronic acid, n-butylboronic acid, isobutylboronic acid, n-hexylboronic acid, cyclohexylboronic acid, phenylboronic acid, 3,5-difluorophenylboronic acid, pentafluorophenylboronic acid and 3,5-bis(trifluoromethyl)phenylboronic acid. Of these, preferable are methylboronic acid, n-butylboronic acid, isobutylboronic acid, 3,5-difluorophenylboronic acid and pentafluorophenylboronic acid.

These alkylboronic acids are used singly or in combination of two or more kinds.

Examples of the organoaluminum compounds to be reacted with the alkylboronic acid include the same organoaluminum compounds as previously described with respect to the organoaluminum compound (B-1a). Of these, preferable are trialkylaluminums and tricycloalkylaluminums. Particularly preferable are trimethylaluminum, triethylaluminum and triisobutylaluminum. These organoaluminum compounds are used singly or in combination of two or more kinds.

The organoaluminum oxy-compounds (B-2) mentioned above are used singly or in combination of two or more kinds.

(B-3) Ionizing Ionic Compound

The ionizing ionic compound (B-3) includes a compound which reacts with the reaction product (A1) to form an ion pair, a compound which reacts with the reaction product (A2) to form an ion pair, a compound which reacts with the reaction product (A3) to form an ion pair, a compound which reacts with transition metal compound (A4) to form an ion pair, a compound which reacts with transition metal compound (A5) to form an ion pair, and a compound which reacts with transition metal compound (A6) to form an ion pair. Any compound which forms an ion pair by the contact with at least the reaction products and the transition metal compounds is employable as the compound (B-3).

Examples of such compounds includes Lewis acids, ionic compounds, borane compounds and carborane compounds described in Japanese Patent Laid-Open Publications No. 501950/1989, No. 502036/1989, No. 179005/1991, No. 179006/1991, No. 207703/1991 and No. 207704/1991, and U.S. Pat. No. 5,321,106. A heteropoly compound and an isopoly compound may also be employed.

The Lewis acids are, for example, compounds represented by $BR_3$ (R is fluorine or a phenyl group which may have a substituent such as fluorine, methyl or trifluoromethyl). Examples of such compounds include trifluoroboron, triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron and tris(3,5-dimethylphenyl)boron.

The ionic compounds are, for example, compounds represented by the following formula (iii):

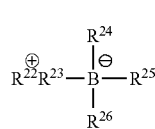

(iii)

In the above formula, $R^{22}$ is H+, carbonium cation, oxonium cation, ammonium cation, phosphonium cation, cycloheptyltrienyl cation, ferrocenium cation having a transition metal, or the like.

$R^{23}$ to $R^{26}$ may be the same or different and are each an organic group, preferably an aryl group or a substituted aryl group.

Examples of the carbonium cations include tri-substituted carbonium cations, such as triphenylcarbonium cation, tri(methylphenyl)carbonium cation and tri(dimethylphenyl)carbonium cation.

Examples of the ammonium cations include trialkylammonium cations, such as trimethylammonium cation, triethylammonium cation, tripropylammonium cation, tributylammonium cation and tri(n-butyl)ammonium cation; N,N-dialkylanilinium cations, such as N,N-dimethylanilinium cation, N,N-diethylanilinium cation and N,N-2,4,6-pentamethylanilinium cation; and dialkylammonium cations, such as di(isopropyl)ammonium cation and dicyclohexylammonium cation.

Examples of the phosphonium cations include triarylphosphonium cations, such as triphenylphosphonium cation, tri(methylphenyl)phosphonium cation and tri(dimethylphenyl)phosphonium cation.

$R^{22}$ is preferably carbonium cation or ammonium cation, particularly preferably triphenylcarbonium cation, N,N-dimethylanilinium cation or N,N-diethylanilinium cation.

Also employable as the ionic compound is a trialkyl-substituted ammonium salt, a N,N-dialkylanilinium salt, a dialkylammonium salt or a triarylphosphonium salt.

Examples of the trialkyl-substituted ammonium salts include triethylammoniumtetra(phenyl)boron, tripropylammoniumtetra(phenyl)boron, tri(n-butyl)ammoniumtetra(phenyl)boron, trimethylammoniumtetra(p-tolyl)boron, trimethylammoniumtetra (o-tolyl)boron, tri(n-butyl)ammoniumtetra(pentafluorophenyl)boron, tripropylammoniumtetra(o,p-dimethylphenyl)boron, tri(n-butyl)ammoniumtetra(m,m-dimethylphenyl)boron, tri(n-butyl)ammoniumtetra(p-trifluoromethylphenyl)boron, tri(n-butyl)ammoniumtetra(3,5-ditrifluoromethylphenyl)boron and tri(n-butyl)ammoniumtetra(o-tolyl)boron.

Examples of the N,N-dialkylanilinium salts include N,N-dimethylaniliniumtetra(phenyl)boron, N,N-diethylaniliniumtetra(phenyl)boron and N,N-2,4,6-pentamethylaniliniumtetra(phenyl)boron.

Examples of the dialkylammonium salts include di(1-propyl)ammoniumtetra(pentafluorophenyl)boron and dicyclohexylammoniumtetra(phenyl)boron.

Further employable as the ionic compounds are triphenylcarbeniumtetrakis(pentafluorophenyl)borate, N,N-dimethylaniliniumtetrakis(pentafluorophenyl)borate, ferroceniumtetra(pentafluorophenyl)borate, triphenylcarbeniumpentaphenylcyclopentadienyl complex, N,N-diethylaniliniumpentaphenylcyclopentadienyl complex and a boron compound represented by the formula (iv):

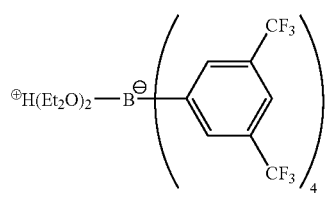

(iv)

wherein Et is an ethyl group, or the formula (v):

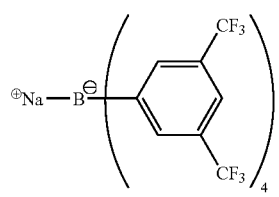

(v)

Examples of the borane compounds include:
decaborane;
salts of anions, such as
bis[tri(n-butyl)ammonium]nonaborate,
bis[tri(n-butyl)ammonium]decaborate,
bis[tri(n-butyl)ammonium]undecaborate,
bis[tri(n-butyl)ammonium]dodecaborate,
bis[tri(n-butyl)ammonium]decachlorodecaborate and
bis[tri(n-butyl)ammonium]dodecachlorododecaborate; and salts of metallic borane anions, such as tri(n-butyl)ammoniumbis(dodecahydridododecaborate)cobaltate (III) and bis [tri(n-butyl)ammonium]bis-(dodecahydridododecaborate)nickelate(III).

Examples of the carborane compounds include:

salts of anions, such as 4-carbanonaborane, 1,3-dicarbanonaborane, 6,9-dicarbadecaborane, dodecahydrido-1-phenyl-1,3-dicarbanonaborane, dodecahydrido-1-methyl-1,3-dicarbanonaborane, undecahydrido-1,3-dimethyl-1,3-dicarbanonaborane, 7,8-dicarbaundecaborane, 2,7-dicarbaundecaborane, undecahydrido-7,-dimethyl-7,8-dicarbaundecaborane, dodecahydrido-11-methyl-2,7-dicarbaundecaborane, tri (n-butyl)ammonium-1-carbadecaborate, tri (n-butyl)ammonium-1-carbaundecaborate, tri (n-butyl)ammonium-1-carbadodecaborate, tri (n-butyl)ammonium-1-trimethylsilyl-1-carbadecaborate, tri (n-butyl)ammoniumbromo-1-carbadodecaborate, tri (n-butyl)ammonium-6-carbadecaborate, tri (n-butyl)ammonium-6-carbadecaborate, tri(n-butyl)ammonium-7-carbaundecaborate, tri(n-butyl)ammonium-7,8-dicarbaundecaborate, tri(n-butyl)ammonium-2,9-dicarbaundecaborate, tri(n-butyl)ammoniumdodecahydrido-8-me thyl-7,9-dicarbaundecaborate, tri(n-butyl)ammoniumundecahydrido-8-ethyl-7,9-dicarbaundecaborate, tri(n-butyl)ammoniumundecahydrido-8-butyl-7,9-dicarbaundecaborate, tri(n-butyl)ammoniumundecahydrido-8-allyl-7,9-dicarbaundecaborate, tri(n-butyl)ammoniumundecahydrido-9-trimethylsilyl-7,8-dicarbaundecaborate and tri(n-butyl)ammoniumundecahydrido-4,6-dibromo-7-carbaundecaborate; and salts of metallic carborane anions, such as tri(n-butyl)ammoniumbis(nonahydrido-1,3-dicarbanonaborate)cobaltate(III), tri(n-butyl)ammoniumbis(undecahydrido-7,8-dicarbaundecaborate)ferrate(III), tri(n-butyl)ammoniumbis(undecahydrido-7,8-dicarbaundecaborate)cobaltate(III), tri (n-butyl)ammoniumbis(undecahydrido-7,8-dicarbaundecaborate)nickelate(III), tri(n-butyl)ammoniumbis(undecahydrido-7,8-dicarbaundecaborate) cuprate(III), tri(n-butyl)ammoniumbis(undecahydrido-7,8-dicarbaundecaborate)aurate(III), tri(n-butyl)ammoniumbis(nonahydrido-7,8-dimethyl-7,8-dicarbaundecaborate)ferrate (III), tri(n-butyl)ammoniumbis(nonahydrido-7,8-dimethyl-7,8-dicarbaundecaborate)chromate(III), tri(n-butyl)ammoniumbis(tribromooctahydrido-7,8-dicarbaundecaborate)cobaltate(III), tris[tri(n-butyl)ammonium]bis(undecahydrido-7-carbaundecaborate)chromate(III), bis[tri(n-butyl)ammonium]bis(undecahydrido-7-carbaundecaborate)manganate(IV), bis[tri(n-butyl)ammonium]bis(undecahydrido-7-carbaundecaborate) cobaltate(III) and bis[tri(n-butyl)ammonium]bis(undecahydrido-7-carbaundecaborate)nickelate(IV).

The heteropoly compound comprises an atom of silicon, phosphorus, titanium, germanium, arsenic or tin and one or more atoms selected from vanadium, niobium, molybdenum and tungsten. Examples of such compounds include phosphovanadic acid, germanovanadic acid, arsenovanadic acid, phosphoniobic acid, germanoniobic acid, silicomolybdic acid, phosphomolybdic acid, titanomolybdic acid, germanomolybdic acid, arsenomolybdic acid, stannomolybdic acid, phosphotungstic acid, germanotungstic acid, stannotungstic acid, phosphomolybdovanadic acid, phosphotungstovanadic acid, germanotaungstovanadic acid, phosphomolybdotungstovanadic acid, germanomolybdotungstovanadic acid, phosphomolybdotungstic acid, phosphomolybdoniobic acid, metallic salts of these acids, specifically, salts of these acids, for example with metals of Group 1 or 2 of the periodic table such as lithium, sodium, potassium, rubidium, cesium, beryllium, magnesium, calcium, strontium and barium, organic salts of the above acids such as triphenylethyl salt, and isopoly compounds.

These heteropoly compounds and isopoly compounds may be used singly or in combination of two or more kinds.

The ionizing ionic compounds (B-3) mentioned above may be used singly or in combination of two or more kinds.

(C) Carrier

In the present invention, the below-described carrier (C) can optionally be used by supporting at least one component selected from the above-mentioned reaction products (A1) to (A3) and transition metal compounds (A0) and (A4) to (A6) (referred to as "Component A" hereinafter) and/or at least one compound selected from the organometallic compound (B-1), the organoaluminum oxy-compound (B-2) and the ionizing ionic compound (B-3) (referred to as "Compound B" hereinafter).

The carrier (C) optionally used in the invention is an inorganic or organic compound in the form of granular or particulate solid. As the inorganic compounds, porous oxides, inorganic chlorides, clay, clay minerals or ion-exchange layered compounds are preferable.

Examples of the porous oxides include $SiO_2$, $Al_2O_3$, MgO, ZrO, $TiO_2$, $B_2O_3$, CaO, ZnO, BaO, $ThO_2$, and complex compounds or mixtures containing these oxides, such as natural or synthetic zeolite, $SiO_2$—MgO, $SiO_2$—$Al_2O_3$, $SiO_2$—$TiO_2$, $SiO_2$—$V_2O_5$, $SiO_2$—$Cr_2O_3$ and $SiO_2$—$TiO_2$—MgO. Of these, preferable are compounds containing $SiO_2$ and/or $Al_2O_3$ as the main component.

The inorganic oxides may contain small amounts of carbonate, sulfate, nitrate and oxide components, such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$.

Although the porous oxides differ in their properties depending upon the type and the preparation process thereof, the carrier preferably used in the invention has a particle diameter of 10 to 300 μm, preferably 20 to 200 μm, a specific surface area of 50 to 1,000 $m^2/g$, preferably 100 to 700 $m^2/g$, and a pore volume of 0.3 to 3.0 $cm^3/g$. If necessary, the carrier may be calcined at 100 to 1,000° C., preferably 150 to 700° C., prior to use.

Examples of the inorganic chlorides employable in the invention include $MgCl_2$, $MgBr_2$, $MnCl_2$ and $MnBr_2$. The inorganic chloride may be used as it is, or may be used after pulverized by, for example, a ball mill or an oscillating mill. The inorganic chloride may also be used as fine particles of a obtained by dissolving the inorganic chloride in a solvent such as alcohol and then precipitating using a precipitant.

The clay employable as a carrier in the invention is generally composed mainly of clay minerals. The ion-exchange layered-compounds employable as a carrier in the invention is compounds having a crystal structure wherein planes formed by ionic bonding or the like are laminated in parallel to one another with a weak bond strength, and the ions contained therein are exchangeable. Most of clay minerals are ion-exchange layered compounds. The clay, the clay minerals and the ion-exchange layered compounds employable in the invention are not limited to natural ones but include synthetic ones.

Examples of such clay, clay minerals and ion-exchange layered compounds include clay, clay minerals and ion crystalline compounds having layered crystal structures such as hexagonal closest packing type, antimony type, $CdCl_2$ type and $CdI_2$ type.

Particular examples of the clay and the clay minerals include kaolin, bentonite, kibushi clay, gairome clay, allophane, hisingerite, pyrophyllite, mica, montmorillonite, vermiculite, chlorite, palygorskite, kaolinite, nacrite, dickite and halloysite. Particular examples of the ion-exchange layered compounds include crystalline acid salts of polyvalent metals, such as α-$Zr(HAsO_4)_2 \cdot H_2O$, α-$Zr(HPO_4)_2$, α-$Zr(KPO_4)_2 \cdot 3H_2O$, α-$Ti(HPO_4)_2$, α-$Ti(HasO_4)_2 \cdot H_2O$, α-$Sn(HPO_4)_2 \cdot H_2O$, γ-$Zr(HPO_4)_2$, γ-$Ti(HPO_4)_2$ and γ-$Ti(NH_4PO_4)_2 \cdot H_2$, The clay, the clay minerals and the ion-exchange layered compounds are preferably those having a pore volume, as measured on pores having a radius of not less than 20 Å by a mercury penetration method, of not less than 0.1 cc/g, and are particularly preferably those having a pore volume of 0.3 to 5 cc/g. The pore volume is measured on the pores having a radius of 20 to $3 \times 10^4$ Å by a mercury penetration method using a mercury porosimeter.

If a compound having a pore volume, as measured on pores having a radius of not less than 20 Å, of less than 0.1 cc/g is used as the carrier, high polymerization activity tends to be hardly obtained.

It is also preferable that the clay and the clay minerals to be used in the invention are subjected to chemical treatments. Any of surface treatments, for example, to remove impurities attached to the surface and to influence on the crystal structure of the clay, are employable. Examples of such chemical treatments include acid treatment, alkali treatment, salt treatment and organic substance treatment. The acid treatment can contribute to not only removing impurities from the surface but also eluting cations such as Al, Fe and Mg present in the crystal structure to increase the surface area. The alkali treatment can destroy crystal structure of clay to bring about change in the structure of the clay. The salt treatment and the organic substance treatment can produce, for example, ionic composites, molecular composites, or organic derivative to change the surface area or the distance between layers.

The ion-exchange layered compound for use in the invention may be a layered compound in which the exchangeable ions between layers have been exchanged with other large and bulky ions utilizing ion exchange properties to enlarge the distance between the layers. The bulky ion plays a pillar-like roll to support the layer structure and is generally called a "pillar". Introduction of other substances between layers of a layered compound is called "intercalation". Examples of the guest compounds to be intercalated include cationic inorganic compounds, such as $TiCl_4$ and $ZrCl_4$; metallic alkoxides, such as $Ti(OR)_4$, $Zr(OR)_4$, $PO(OR)_3$ and $B(OR)_3$ (R is a hydrocarbon group or the like); and metallic hydroxide ions, such as $[Al_{13}O_4(OH)_{24}]^{7+}$, $[Zr_4(OH)_{14}]^{2+}$ and $[Fe_3O(OCOCH_3)_6]$.

The compounds mentioned above may be used singly or in combination of two or more kinds.

The intercalation of the compounds may be carried out in the presence of polymers obtained by hydrolysis of metallic alkoxides such as $Si(OR)_4$, $Al(OR)_3$ and $Ge(OR)_4$ (R is a hydrocarbon group or the like) or in the presence of colloidal inorganic compounds such as $SiO_2$. Examples of the pillars include oxides produced by intercalation of the above-mentioned metallic hydroxide ions between layers, followed by dehydration under heating.

The clay, clay minerals and ion-exchange layered compounds mentioned above may be used as they are, or may be used after they are subjected to a treatment of ball milling, sieving or the like. Moreover, they may be used after they are subjected to water adsorption or dehydration under heating. The clay, clay minerals and ion-exchange layered compounds may be used singly or in combination of two or more kinds.

Of the above-mentioned materials, preferable are clay and clay minerals, and particularly preferable are montmorillonite, vermiculite, hectorite, tenorite and synthetic mica.

The organic compound is, for example, a granular or particulate solid compound having a particle diameter of 10 to 300 μm. Examples of such compounds include (copolymers produced using an (α-olefin of 2 to 14 carbon atoms such as ethylene, propylene, 1-butene or 4-methyl-1-pentene as a main ingredient, (co)polymers produced using vinylcyclohexane or styrene as a main ingredient, and modified products thereof.

(D) Organic Compound Component

In the polymerization of the invention, the below-described specific organic compound component (D) may be optionally used.

The organic compound component (D) is optionally used to improve polymerizability and properties of the resulting polymer. Examples of the organic compounds include alcohols, phenolic compounds, carboxylic acids, carboxylic acid esters, phosphorus compounds, sulfonates and halogenated hydrocarbons.

As the alcohols and the phenolic compounds, those represented by $R^{31}$—OH ($R^{31}$ is a hydrocarbon group of 1 to 50 carbon atoms or a halogenated hydrocarbon group of 1 to 50 carbon atoms) are generally employed. Preferable alcohols are those wherein $R^{31}$ is a halogenated hydrocarbon group. Preferable phenolic compounds are preferably those wherein the α,α'-positions to the hydroxyl group are substituted with hydrocarbon groups of 1 to 20 carbon atoms.

As the carboxylic acids, those represented by $R^{32}$—COOH ($R^{32}$ is a hydrocarbon group of 1 to 50 carbon atoms or a halogenated hydrocarbon group of 1 to 50 carbon atoms, preferably a halogenated hydrocarbon group of 1 to 50 carbon atoms) are generally employed.

As the carboxylic acid esters, alkyl or aryl esters of the carboxylic acids represented by $R^{32}$—COOH are generally employed. Of these, desirable are carboxylic acid esters having halogenated hydrocarbon groups such as n-butyl perchlorocrotonate and ethyl trichloroacetate for the purpose to improve polymerizability.

As the phosphorus compounds, phosphoric acids having P—O—H bond, phosphates having P—OR bond or P=O bond and phosphine oxide compounds are preferably employed.

The sulfonates used in the invention are those represented by the following formula:

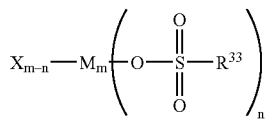

In the above formula, M is an element of Group 1 to Group 14 of the periodic table.

$R^{33}$ is hydrogen, a hydrocarbon group of 1 to 20 carbon atoms or a halogenated hydrocarbon group of 1 to 20 carbon atoms.

X is a hydrogen atom, a halogen atom, a hydrocarbon group of 1 to 20 carbon atoms or a halogenated hydrocarbon group of 1 to 20 carbon atoms.

m is an integer of 1 to 7, and $1 \leq n \leq 7$.

As halogenated hydrocarbons, chloroform and carbon tetrachloride are exemplified.

Other Transition Metal Compounds

In the polymerization of the present invention, transition metal compounds other than the above mentioned transition metal compound (A0) and (A4) to (A6) can be used in combination.

Examples of the other transition metal compounds include the following compounds.

(a-1) Transition metal imide compound represented by the following formula:

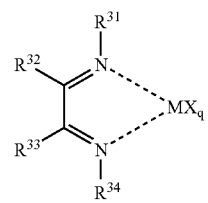

In the above formula, M is a transition metal atom of Group 8 to Group 10 of the periodic table, preferably nickel, palladium or platinum.

$R^{31}$ to $R^{34}$ may be the same or different and are each a hydrocarbon group of 1 to 50 carbon atoms, a halogenated hydrocarbon group of 1 to 50 carbon atoms, a hydrocarbon-substituted silyl group, or a hydrocarbon group substituted with a substituent containing at least one element selected from nitrogen, oxygen, phosphorus, sulfur and silicon.

Two or more of the groups indicated by $R^{31}$ to $R^{34}$, preferably adjacent groups, may be bonded to each other to form a ring.

q is an integer of 0 to 4.

X is a hydrogen atom, a halogen atom, a hydrocarbon group of 1 to 20 carbon atoms, a halogenated hydrocarbon group of 1 to 20 carbon atoms, an oxygen-containing group, a sulfur-containing group, a silicon-containing group or a nitrogen-containing group. When q is 2 or greater, plural groups indicated by X may be the same or different.

(a-2) Transition metal amide compound represented by the following formula:

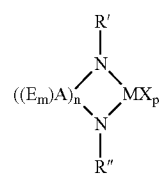

In the above formula, M is a transition metal atom of Group 3 to Group 6 of the periodic table, preferably titanium, zirconium or hafnium.

R' and R" may be the same or different and are each a hydrogen atom, a hydrocarbon group of 1 to 50 carbon atoms, a halogenated hydrocarbon group of 1 to 50 carbon atoms, a hydrocarbon-substituted silyl group, or a substituent having at least one element selected from nitrogen, oxygen, phosphorus, sulfur and silicon.

m is an integer of 0 or 2.

n is an integer of 1 to 5

A is an atom of Group 13 to Group 16 of the periodic table, specifically boron, carbon, nitrogen, oxygen, silicon, phosphorus, sulfur, germanium, selenium, tin or the like, preferably carbon or silicon. When n is 2 or greater, plural of A may be the same or different.

E is a substituent having at least one element selected from carbon, hydrogen, oxygen, halogen, nitrogen, sulfur, phosphorus, boron and silicon. When m is 2, two of E may be the same or different, or may be bonded to each other to form a ring.

p is an integer of 0 to 4.

X is a hydrogen atom, a halogen atom, a hydrocarbon group of 1 to 20 carbon atoms, a halogenated hydrocarbon group of 1 to 20 carbon atoms, an oxygen-containing group, a sulfur-containing group, a silicon-containing group or a nitrogen-containing group. When p is 2 or greater, plural groups indicated by X may be the same or different.

X is preferably a halogen atom, a hydrocarbon group of 1 to 20 carbon atoms or a sulfonato group.

(a-3) Transition metal diphenoxy compound represented by the following formula:

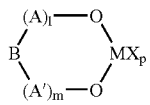

In the above formula, M is a transition metal atom of Group 3 to Group 11 of the periodic table.

l and m are each an integer of 0 or 1.

A and A' are each a hydrocarbon group of 1 to 50 carbon atoms, a halogenated hydrocarbon group of 1 to 50 carbon atoms, or a hydrocarbon group or a halogenated hydrocarbon group of 1 to 50 carbon atoms each having a substituent containing oxygen, sulfur or silicon; and A and A' may be the same or different.

B is a hydrocarbon group of 0 to 50 carbon atoms, a halogenated hydrocarbon group of 1 to 50 carbon atoms, a group represented by $R^1R^2Z$, oxygen or sulfur. $R^1$ and $R^2$ are each a hydrocarbon group of 1 to 20 carbon atoms or a hydrocarbon group of 1 to 20 carbon atoms containing at least one hetero atom, and Z is a carbon atom, a nitrogen atom, a sulfur atom, a phosphorus atom or a silicon atom.

p is a number satisfying a valence of M.

X is a hydrogen atom, a halogen atom, a hydrocarbon group of 1 to 20 carbon atoms, a halogenated hydrocarbon group of 1 to 20 carbon atoms, an oxygen-containing group, a sulfur-containing group, a silicon-containing group or a nitrogen-containing group. When p is 2 or greater, plural groups X may be the same or different or may be bonded to each other to form a ring.

(a-4) Transition metal compound represented by the following formula and comprising a ligand having cyclopentadienyl skeleton containing at least one hetero atom:

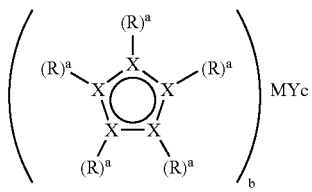

In the above formula, M is a transition metal atom of Group 3 to Group 11 of the periodic table.

X is an atom of Group 13, Group 14 or Group 15 of the periodic table, and at least one X is an element other than carbon.

a is 0 or 1.

Each R may be the same or different and is a hydrogen atom, a halogen atom, a hydrocarbon group, a halogenated hydrocarbon group, a hydrocarbon-substituted silyl group, or a hydrocarbon group substituted with a substituent containing at least one element selected from nitrogen, oxygen, phosphorus, sulfur and silicon. Two or more of R may be bonded to each other to form a ring.

b is an integer of 1 to 4. When b is 2 or greater, groups $[((R)_a)_5-X_5]$ may be the same or different, and Rs may be bridged to each other.

c is a number satisfying a valence of M.

Y is a hydrogen atom, a halogen atom, a hydrocarbon group of 1 to 20 carbon atoms, a halogenated hydrocarbon group of 1 to 20 carbon atoms, an oxygen-containing group, a sulfur-containing group, a silicon-containing group or a nitrogen-containing group. When c is 2 or greater, plural groups indicated by Y may be the same or different, and may be bonded to each other to form a ring.

(a-5) Transition metal compound represented by the formula $PB(Pz)_3MX_n$.

In the above formula, M is a transition metal atom of Group 3 to Group 11 of the periodic table.

R is a hydrogen atom, a hydrocarbon group of 1 to 20 carbon atoms or a halogenated hydrocarbon group of 1 to 20 carbon atoms.

Pz is a pyrazolyl group or a substituted pyrazolyl group.

n is a number satisfying a valence of M.

X is a hydrogen atom, a halogen atom, a hydrocarbon group of 1 to 20 carbon atomsr a halogenated hydrocarbon group of 1 to 20 carbon atoms, an oxygen-containing group, a sulfur-containing group, a silicon-containing group or a nitrogen-containing group. When n is 2 or greater, plural groups indicated by X may be the same or different or may be bonded to each other to form a ring.

(a-6) Transition metal compound represented by the following formula:

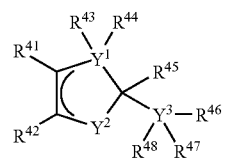

In the above formula, $Y^1$ and $Y^3$ may be the same or different and are each an element of Group 15 of the periodic table, and y2 is an element of Group 16 of the periodic table.

$R^{41}$ to $R^{48}$ may be the same or different, they are each a hydrogen atom, a halogen atom, a hydrocarbon group of 1 to 20 carbon atoms, a halogenated hydrocarbon group of 1 to 20 carbon atoms, an oxygen-containing group, a sulfur-containing group or a silicon-containing group, and two or more of them may be bonded to each other to form a ring.

(a-7) Compound comprising a compound represented by the following formula and a transition metal atom of Group 8 to Group 10 of the periodic table:

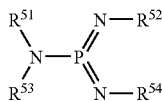

In the above formula, $R^{51}$ to $R^{54}$ may be the same or different, they are each a hydrogen atom, a halogen atom, a hydrocarbon group of 1 to 20 carbon atoms or a halogenated hydrocarbon group of 1 to 20 carbon atoms, and two or more of them may be bonded to each other to form a ring.

(a-8) Transition metal compound represented by the following formula:

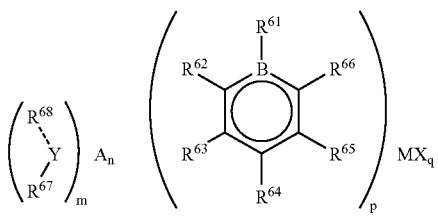

In the above formula, M is a transition metal atom of Group 3 to Group 11 of the periodic table.

m is an integer of 0 to 3.

n is an integer of 0 or 1.

p is an integer of 1 to 3.

q is a number satisfying a valence of M.

$R^{61}$ to R68 may be the same or different, they are each a hydrogen atom, a halogen atom, a hydrocarbon group of 1 to 20 carbon atoms, a halogenated hydrocarbon group of 1 to 20 carbon atoms, an oxygen-containing group, a sulfur-containing group, a silicon-containing group or a nitrogen-containing group, and two or more of them may be bonded to each other to form a ring.

X is a hydrogen atom, a halogen atom, a hydrocarbon group of 1 to 20 carbon atoms, a halogenated hydrocarbon group of 1 to 20 carbon atoms, an oxygen-containing group, a sulfur-containing group, a silicon-containing group or a nitrogen-containing group. When q is 2 or greater, plural groups indicated by X may be the same or different or may be bonded to each other to form a ring.

Y is a group to bridge a boratabenzene ring and is carbon, silicon or germanium.

A is an element of Group 14, Group 15 or Group 16 of the periodic table.

(a-9) Transition metal compound other than the aforesaid compound (a-4) and containing a ligand having cyclopentadienyl skeleton.

(a-10) Compound containing magnesium, titanium and halogen as essential ingredients Copolymerization In the process for producing a polar olefin copolymer according to the present invention, a non-polar olefin and a polar olefin are copolymerized in the presence of a catalyst comprising the aforesaid components (A) and (B). FIG. 1 shows an example of the preparation process of the olefin polymerization catalyst used in the present invention.

Non-polar olefin means the unsaturated hydrocarbon consisting of carbon atoms and hydrogen atoms only. Examples of the non polar olefins include α-olefins of 2 to 20 carbon atoms such as ethylene, propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicocene; cycloolefins of 3 to 20 carbon atoms such as cyclopentene, cycloheptene, norbornene, 5-methyl-2-norbornene and tetracyclododecene; dienes or polyenes which are cyclic or chain compounds having two or more double bonds, and having 4 to 30 carbon atoms, preferably 4 to 20 carbon atoms, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidene norbornene, vinyl norbornene, dicyclopentadiene, 7-methyl-1,6-octadiene, 4-ethylidene-8-methyl-1,7-nonadiene and 5,9-dimethyl-1,4,8-decatriene; aromatic vinyl compounds such as styrene, o-methylstyrene, m-methylstyrene, p-methylstyrene, o,p-dimethylstyrene, o-ethylstyrene, m-ethylstyrene and p-ethylstyrene; and vinylcyclohexane. Of these, preferable are α-olefins, and particularly preferable is ethylene.

The polar olefins of the present invention are unsaturated hydrocarbons having polar groups. Examples thereof include:

unsaturated carboxylic acids such as acrylic acid, 3-butenoic acid, 4-pentenoic acid, 5-hexenoic acid, 6-heptenoic acid, 7-octenoic acid, 8-nonenoic acid, 9-decenoic acid, 10-undecenoic acid, 11-dodecenoic acid, 12-tridecenoic acid, 13-tetradecenoic acid, 14-pentadecenoic acid, 15-hexadecenoic acid, 16-heptadecenoic acid, 17-octadecenoic acid, 18-nonadecenoic acid, 19-eicosenoic acid, 20-heneicosanoic acid, 21-docosenoic acid, 22-tricosanoic acid, methacrylic acid, 2-methyl-pentenoic acid, 2,2-dimethyl-3-butenoic acid, 2,2-dimethyl-4-pentenoic acid, 3-vinyl-benzoic acid, 4-vinyl-benzoic acid, 2,6-heptadiene acid, 2-(4-isopropylbenzylidene)-4-pentenoic acid, allylmalonic acid, 2-(10-undecenyl)malonic acid, fumaric acid, itaconic acid, bicyclo[2.2.1]-5-heptene-2-carboxylic-acid and-bicyclo[2.2.1]-5-heptene-2,3-dicarboxylic acid, metallic salts thereof such as sodium salt, potassium salt, lithium salt, zinc salt, magnesium salt and calcium salt, unsaturated carboxylic esters thereof such as methyl ester, ethyl ester, n-propyl ester, isopropyl ester, n-butyl ester, isobutyl ester and (5-norbornene-2-yl)ester (when the unsaturated carboxylic acid is dicarboxylic acid, both monoester and diester may be included.), and unsaturated carboxylic acid amides thereof such as N,N-dimethyl amide (when the unsaturated carboxylic acid is dicarboxylic acid, both monoamide and diamide may be included.);

unsaturated carboxylic anhydrides such as maleic anhydride, itaconic anhydride, succinic anhydride, isobutenyl succinic anhydride, (2,7-octadiene-1-yl)succinic anhydride, tetrahydrophtalic anhydride and bicyclo[2.2.1]-5-heptene-2,3-dicarboxylic anhydride;

vinyl esters such as vinyl acetate, vinyl propionate, vinyl caproate, vinyl caprate, vinyl laurate, vinyl stearate and vinyl trifluoroacetate;

halogenated olefins such as vinyl chloride, vinyl fluoride, allyl bromide, allyl chloride and allyl fluoride;

silylated olefins such as allyltrimethylsilane, diallyldimethylsilane, 3-butenyltrimethylsilane, allyltriisopropylsilane and allyltriphenylsilane;

unsaturated nitriles such as acrylonitrile, 2-cyanobicyclo [2.2.1]-5-heptene and 2,3-dicyanobicyclo[2.2.1]-5-heptene;

unsaturated alcohol compounds such as allylalcohol, 3-butenol, 4-pentenol, 5-hexenol, 6-heptenol, 7-octenol, 8-nonenol, 9-decenol, 10-undecenol, 11-dodecenol and 12-tridecenol, and unsaturated esters thereof such as acetate, benzoate, propionate, caproate, caprate, laurate and stearate;

substituted phenols such as vinyl phenol and allyl phenol;

unsaturated ethers such as methylvinyl ether, ethylvinyl ether, allylmethyl ether, allylpropyl ether, allylbutyl ether, allylmethallyl ether, methoxy styrene and ethoxy styrene;

unsaturated epoxides such as butadiene monooxide, 1,2-epoxy-7-octene and 3-vinyl-7-oxabicyclo[4.1.0]heptane, unsaturated aldehydes such as acrolein and undecenal and unsaturated acetals thereof such as dimethyl acetal and diethyl acetal;

unsaturated ketones such as methylvinyl ketone, ethylvinyl ketone, allylmethyl ketone, allylethyl ketone, allylpropyl ketone, allylbutyl ketone and allylbenzyl ketone and unsaturated acetals thereof such as dimethyl acetal and diethyl acetal;

unsaturated thioethers such as allylmethyl sulfide, allylphenyl sulfide, allylisopropyl sulfide, allyl-n-propyl sulfide and 4-pentenylphenyl sulfide; unsaturated sulfoxides such as allylphenyl sulfoxide; and unsaturated sulfones such as allylphenyl sulfone; unsaturated phosphines such as allyldiphenyl phosphine; and unsaturated phosphine oxides such as allyldiphenyl phosphine oxide.

Further, unsaturated hydrocarbons having two or more of the above mentioned polar groups are employable. Examples thereof include vinylbenzoic acid, methylvinylbenzoate, vinylbenzylacetate, hydroxystyrene, 4-(3-butenyloxy)methyl benzoate, allyltrifluoroacetate, o-chlorostyrene, p-chlorostyrene, divinylbenzene, glycidylacrylate, allylglycidylether, (2H-perfluoropropyl)-2-propenylether, linalooloxide, 3-allyloxy-1,2-propanediol, 2-(allyloxy) ethanol, N-allylmorpholine, allylglycine, N-vinyl pyrrolidone, allyltrichlorosilane, acryltrimethylsilane, allyldimethyl(diisopropylamino)silane, 7-octenyltrimethoxysilane and allyloxytrimethylsilane, allyloxytriphenyl silane. As the polar olefins, unsaturated carboxylic derivatives (especially, acid anhydrides, esters and amides), halogenated olefins or vinylesters are preferred.

In the polymerization, the way of charging the component (A) into a polymerization reactor, usage of each component, the feeding process and the order of feeding can be chosen as desired, but for reference, some examples are given below.

(1) The component (A) and the component (B) are fed to the polymerization reactor in an arbitrary order.

(2) A catalyst obtained by previously contacting the component (A) with the component (B) is fed to the polymerization reactor.

(3) A catalyst component obtained by previously contacting the component (A) with the component (B), and the component (B) are fed to the polymerization reactor in an arbitrary order. In this case, these components (B) may be the same or different.

(4) A catalyst component wherein the component (A) is supported on the carrier (C), and the component (B) are fed to the polymerization reactor in an arbitrary order.

(5) A catalyst wherein the component (A) and the component (B) are supported on the carrier (C) is fed to the polymerization reactor.

(6) A catalyst component wherein the component (A) and the component (B) are supported on the carrier (C), and the component (B) are fed to the polymerization reactor in an arbitrary order. In this case, these components (B) may be the same or different.

(7) A catalyst component wherein the component (B) is supported on the carrier (C), and the component (A) are fed to the polymerization reactor in an arbitrary order.

(8) A catalyst component wherein the component (B) is supported on the carrier (C), the component (A), and the component (B) are fed to the polymerization reactor in an arbitrary order. In this case, these components (B) may be the same or different.

(9) A component wherein the component (A) is supported on the carrier (C), and a component wherein the component (B) is supported on the carrier (C) are fed to the polymerization reactor in an arbitrary order.

(10) A component wherein the component (A) is supported on the carrier (C), a component wherein the component (B) is supported on the carrier (C), and the component (B) are fed to the polymerization reactor in an arbitrary order. In this case, these components (B) may be the same or different.

(11) The component (A), the component (B) and the organic compound component (D) are fed to the polymerization reactor in an arbitrary order.

(12) A component obtained by previously contacting the component (B) with the component (D), and the component (A) are fed to the polymerization reactor in an arbitrary order.

(13) A component wherein the component (B) and the component (D) are supported on the carrier (C), and the component (A) are fed to the polymerization reactor in an arbitrary order.

(14) A catalyst component obtained by previously contacting the component (A) with the component (B), and the component (D) are fed to the polymerization reactor in an arbitrary order.

(15) A catalyst component obtained by previously contacting the component (A) with the component (B), the component (B) an d the component (D) are fed to the polymerization reactor in an arbitrary order. In this case, these components (B) may be the same or different.

(16) A catalyst component obtained by previously contacting the component (A) with the component (B), and a component obtained by previously contacting the component (B) with the component (D) are fed to the polymerization reactor in an arbitrary order. In this case, these components (B) may be the same or different.

(17) A component wherein the component (A) is supported on the carrier (C), the component (B) and the component (D) are fed to the polymerization reactor in an arbitrary order.

(18) A component wherein the component (A) is supported on the carrier (C), and a component obtained by previously contacting the component (B) with the component (D) are fed to the polymerization reactor in an arbitrary order.

(19) A catalyst component obtained by previously contacting the component (A), the component (B) and the component (D) with one another in an arbitrary order is fed to the polymerization reactor.

(20) A catalyst component obtained by previously contacting the component (A), the component (B) and the component (D) with one another, and the component (B) are fed to the polymerization reactor in an arbitrary order. In this case, these components (B) may be the same or different.

(21) A catalyst wherein the component (A), the component (B) and the component (D) are supported on the carrier (C) is fed to the polymerization reactor.

(22) A catalyst component wherein the component (A), the component (B) and the component (D) are supported on the carrier (C), and the component (B) are fed to the polymerization reactor in an arbitrary order. In this case, these components (B) may be the same or different.

An olefin may be prepolymerized onto a solid catalyst component wherein the component (A) and, if necessary, the component (B) are supported on the carrier (C).

The polymerization can be carried out by any of liquid phase polymerization such as solution polymerization or suspension polymerization, and gas phase polymerization.

Examples of an inert hydrocarbon media for use in the liquid phase polymerization include aliphatic hydrocarbons such as propane, butane, pentane, hexane, heptane, octane, decane, dodecane and kerosine; alicyclic hydrocarbons such as cyclopentane, cyclohexane and methylcyclopentane; aromatic hydrocarbons such as benzene, toluene and xylene; halogenated hydrocarbons such as ethylene chloride, chlorobenzene and dichloromethane; and mixtures of these hydrocarbons. A non-polar olefin or a polar olefin itself can be used as the solvent.

In the copolymerization of a non-polar olefin and a polar olefin using the olefin polymerization catalyst as mentioned above, the component (A) may be used in an amount of usually $10^{-12}$ to $10^{-2}$ mol, preferably $10^{-10}$ to $10^{-3}$ mol, based on 1 liter of the reaction volume. In the present invention, even if the component (A) is used in a relatively low concentration, an olefin can be polymerized with a high polymerization activity.

The component (B-1) may be used in such an amount that the molar ratio of the component (B-1) to the transition metal atom (M or M') in the component (A) ((B-1)/(M or M')) becomes usually 0.01 to 100,000, preferably 0.05 to 50,000.

The component (B-2) may be used in such an amount that the molar ratio of the aluminum atom in the component (B-2) to the transition metal atom (M or M') in the component (A) ((B-2)/(M or M')) becomes usually 10 to 500,000, preferably 20 to 100,000.

The component (B-3) may be used in such an amount that the molar ratio of the component (B-3) to the transition metal atom (M or M') in the component (A) ((B-3)/(M or M')) becomes usually 1 to 10, preferably 1 to 5.

The component (D) may be used, when the component (B) is the component (B-1), in such an amount that the molar ratio of (D)/(B-1) becomes usually 0.01 to 10, preferably 0.1 to 5; when the component (B) is the component (B-2), in such an amount that the molar ratio of (D)/(B-2) becomes usually 0.001 to 2, preferably 0.005 to 1; and when the component (B) is the component (B-3), in such an amount that the molar ratio of (D)/(B-3) becomes usually 0.01 to 10, preferably 0.1 to 5.

There is no specific restriction on each amount of the non-polar olefin and the polar olefin used in the polymerization, and each proper amount is determined according to the kind of olefin to be used and copolymerization ratio of the copolymer to be obtained.

In using the polymerization catalyst as mentioned above, the polymerization temperature may be in the range of usually −50 to 200° C., preferably 0 to 170° C. The polymerization pressure may be in the range of usually atmospheric pressure to 100 kg/cm², preferably atmospheric pressure to 50 kg/cm². The polymerization reaction can also be carried out by any of batchwise, semi-continuous and continuous processes. Further the polymerization can be conducted in two or more stages under different reaction conditions.

The molecular weight of the resulting polar olefin copolymer can be regulated by allowing hydrogen to be present in the polymerization system or by changing the polymerization temperature. The molecular weight can also be regulated by changing the type of the component (B).

The polar olefin copolymer of the present invention, as compared with conventional olefin polymers, has excellent adhesion properties, coating properties, compatibility, hydrophilic properties, oil resistance and the like, so that it can be used in such application fields that those characteristics are used effectively.

Further, the polar olefin copolymer of the present invention can also be used as modifiers by mixing with other polymers such as polyethylene, polypropylene and the like.

According to the present invention, a polar olefin copolymer can be produced by copolymerizing a non-polar olefin and a polar olefin with a high polymerization activity.

EXAMPLES

The present invention is further described with reference to the following examples, but it should be construed that the invention is in no way limited to those examples.

The structures of the compounds obtained in the synthesis examples were determined by 270 MHz $^1$-H-NMR (Japan Electron Optics Laboratory GSH-270 Model), FT-IR (SHIMADZU FTIR-8200D Model), FD-mass spectrometry (Japan Electron Optics Laboratory SX-102A Model), metal content analysis (analysis by ICP method after dry ashing and dissolution in dilute nitric acid, device: SHIMADZU ICPS-8000 Model), and elemental analysis for carbon, hydrogen and nitrogen (Helaus CHNO Model).

The intrinsic viscosity (η) was measured in decalin at 135° C.

Synthesis Example 1

Synthesis of Ligand Precursor (L1)

To a 100-ml reactor thoroughly purged with nitrogen, 40 ml of ethanol, 0.71 g (7.62 mmol) of aniline and 1.35 g (7.58 mmol) of 3-t-butylsalicylaldehyde were introduced and continuously stirred at room temperature for 24 hours. The reaction solution was concentrated under reduced pressure to remove the solvent, and the concentrate was purified by a silica gel column to obtain 1.83 g (7.23 mmol, yield: 95%) of a compound (ligand precursor (L1)) represented by the following formula (L1) as an orange oil.

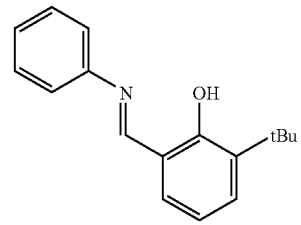

(L1)

$^1$H-NMR(CDCl$_3$): 1.47(s,9H), 6.88(dd,1H), 7.24–7.31 (m,4H), 7.38–7.46(m,3H), 8.64(s,1H), 13.95(s,1H) IR(neat): 1575, 1590, 1610 cm$^{-1}$ FD-mass spectrometry: 253 (M$^+$)

Synthesis Example 2

Synthesis of Ligand Precursor (L2)

Raction and purification were carried out in the same manner as in Synthesis Example 1 except that 0.95 g (7.58 mmol) of salicylaldehyde was used instead of the 3-t-butylsalicylaldehyde, to thereby obtain 1.39 g (7.05 mmol, yield: 93%) of a compound (ligand precursor (L2)) represented by the following formula (L2) as an orange solid-solution.

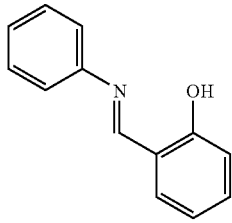

(L2)

FD-mass spectrometry: 197 (M+)

Synthesis Example 3

Synthesis of Ligand Precursor (L3)

To a 100-ml reactor thoroughly purged with nitrogen, 150 ml of ethanol, 5.0 g (53 mmol) of aniline and 5.1 g (53 mmol) of pyrrole-2-carboxyaldehyde were introduced and further 1 ml of a formic acid was added. Thereafter, the mixture was continuously stirred at room temperature for 24 hours. The reaction solution was concentrated under reduced pressure to remove the solvent, and the concentrate was purified by a silica gel column to obtain 6.0 g (34.9 mmol, yield: 66%) of a compound (ligand precursor (L3)) represented by the following formula (L3) as a white solid.

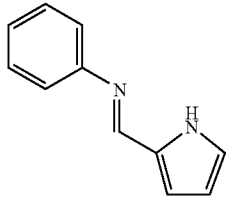

(L3)

$^1$H-NMR(CDCl$_3$): 6.3(d,1H), 6.69(dd,1H), 6.89(d,1H), 7.1–7.5(m,4H), 8.29(s,1H), 9.85(brs,1H) FD-mass spectrometry: 170

Synthesis Example 4

Synthesis of Ligand Precursor (L4)

To a 200-ml reactor thoroughly purged with nitrogen, 5.0 g-of 2,4-di-t-butylphenol and 50 ml of acetic acid were added. To the mixture, 3.0 ml of concentrated nitric acid was rapidly dropwise added under cooling. After the dropwise addition was completed, the resultant mixture was stirred at the same temperature for 1 minute and poured into 200 ml of water. The organic phase extracted with diethyl ether was washed with water and concentrated. The concentrate was purified by a column chromatography to obtain 5.1 g (yield: 84%) of yellow crystals.

HNMR(CDCl$_3$, δ): 11.41(s,1H), 7.94(d,1H,2 Hz), 7.63(d, 1H,2 Hz), 1.43(s,9H), 1.29(s,9H)

Then, the total amount of the above-obtained compound, 50 mg of 5% palladium carbon and 100 ml of ethanol were added to a 200-ml reactor, and the mixture was stirred for 48 hours under hydrogen of 1 atmospheric pressure. The reaction solution was filtered through Celite, and then the solvent was distilled off to obtain 4.1 g (yield: 89%) of white crystals.

$^1$HNMR(CDCl$_3$, δ): 6.92(d,1H,2 Hz), 6.82(d,1H,2 Hz), 5.70(s,1H), 3.19(br1H), 141(s,9H), 1.28(s,9H)

Subsequently, 2.83 g of the-above-obtained compound and 50 ml of ethanol were added to a 100-ml reactor thoroughly purged with nitrogen, and 1.63 g of benzaldehyde and 1.0 ml of acetic acid were further added to the reactor. The mixture was stirred at room temperature for 24 hours. The reaction solution was concentrated, and then the concentrate was purified by a column chromatography to obtain 3.2 g (yield: 80%) of a compound (ligand precursor (L4)) represented by the following formula (L4) as yellow crystals.

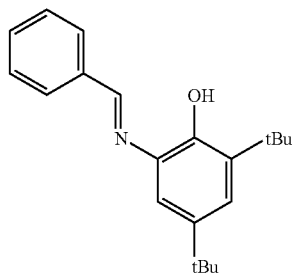

(L4)

$^1$HNMR(CDCl$_3$, δ): 8.70(s,1H), 7.96–7.92(m,2H), 7.73 (s,1H), 7.48–7.43(m,3H), 7.25(d,1H,2 Hz), 7.17(d,1H,2 Hz), 1.46(s,9H), 1.35(s,9H)

Synthesis Example 5

Synthesis of Ligand Precursor (L5)

1.40 g (12.8 mmol) of o-aminophenol and 50 ml of ethanol were added to a 100-ml reactor thoroughly purged with nitrogen, and 1.63 g (15.4 mmol) of benzaldehyde and 1.0 ml of acetic acid were further added to the reactor. The mixture was stirred at room temperature for 24 hours. The reaction solution was concentrated, and then the concentrate was separated and purified by a column chromatography to obtain 1.74 g (8.83 mmol, yield: 69%) of a compound (ligand precursor (L5)) represented by the following formula (L5) as yellow crystals.

$^1$HNMR(CDCl$_3$, δ): 8.71(s,1H), 7.95–7.88(m,2H), 7.52–7.43(m,3H), 7.32–7.16(m,3H) 7.04–6.86(m,2H) FD-mass spectrometry: 197

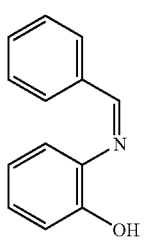

(L5)

Synthesis Example 6

Synthesis of Ligand Precursor (L6)

To a 300-ml reactor equipped with a Dean and Stark tube, 18.2 g (0.12 mol) of p-nitrobenzaldehyde, 50 ml of n-butanol, 500 mg of p-toluenesulfonic acid monohydrate and 150 ml of toluene were added, and stirred under reflux for 2.5 hours. The reaction solution was cooled down to room temperature and washed twice with 100 ml of an aqueous solution of saturated sodium hydrogen carbonate and once with pure water. The resultant organic phase was dried with anhydrous magnesium sulfate, followed by distilling off the solvent, and the resultant product was dried with a vacuum pump to obtain 30.9 g (yield: 92%) of a compound (a) represented by the following formula as a yellow oil.

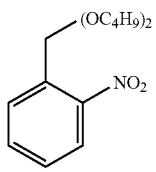

(a)

To a 2-litter reactor thoroughly purged with nitorgen, 28.2 g (0.10 mol) of the above obtained compound (a) and 500 ml of dry THF were introduced, and they were cooled to −65° C. Subsequently, to the reactor, 330 ml (0.33 mol) of vinylmagnesiumbromide (1M, THF solution) was dropwise added with a dropping funnel over a period of 25 minutes, and they were stirred at −40° C. for 1 hour. The reaction solution was poured into 1 liter of an aqueous solution of saturated ammonium chloride and further 300 ml of diethylether was added, followed by repeating extraction operation twice. The organic layer was concentrated and 200 ml of THF and 10 ml of 0.5 M hydrochloric acid aqueous solution were added to the concentrate, followed by stirring at room temperature for 20 minutes. Thereafter, 200 ml of an aqueous solution of saturated sodium carbonate was added to confirm the mixture being PH>8. Then, an extraction operation with 100 ml of ethyl acetate was repeated twice, and the resultant product was purified by a column chromatography to obtain 10.6 g (yield: 73%) of a compound (b) represented by the following formula as a light yellow solid.

$^1$HNMR(CDCl$_3$): 6.62–6.65(t,1H), 7.25–7.30(m,2H), 7.34–7.37(t,1H), 7.65–7.68(d,1H), 7.93–7.97(d,1H), 10.13 (s,1H) FD-mass spectrometry: 145 Elemental analysis: Measured values (wt %) C, 74.4; H, 4.7; N, 9.6. Theoretical values (wt %) C, 74.5; H, 4.9; N, 9.7.

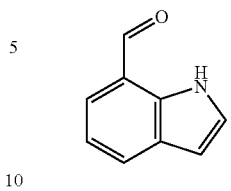

(b)

To a 100-ml reactor thoroughly purged with nitrogen, 1.20 g (8.27 mmol) of the above-obtained compound (b), 40 ml of dewatered ethanol, 0.77 g (8.27 mmol) of aniline and acetic acid (catalyst amount) were added, and they were stirred at room temperature for 3 hours. The reaction solution was concentrated, and then the concentrate was purified by a column chromatography to obtain 1.53 g (yield: 85%) of a compound (ligand precursor (L6)) represented by the following formula (L6) as a light yellow oil.

$^1$HNMR(CDCl$_3$): 6.50–6.60(t,1H), 7.10–7.40(m,8H), 8.63(s,1H), 10.76(bs,1H) FD-mass spectrometry: 220

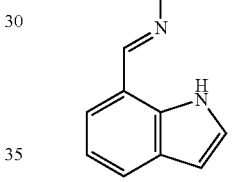

(L6)

Synthesis Example 7

Synthesis of Ligand Precursor (L7)

Reaction was carried out in the same manner as in Synthesis Example 1, except that 0.76 g (7.62 mmol) of cyclohexyl amine was used instead of aniline and 0.95 g (7.58 mmol) of salicyl aldehyde was used instead of 3-t-butylsalicylaldehyde. The solvent was distilled off to obtain 1.51 g (7.43 mmol, yield: 98%) of a compound (ligand precursor (L7)) represented by the following formula -(L7) as a yellow oil.

FD-mass spectrometry: 203

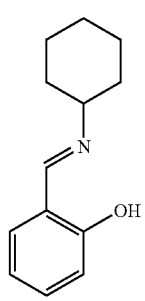

(L7)

Synthesis Example 8

Synthesis of Ligand Precursor (L8)

Reaction was carried out in the same manner as in Synthesis Example 1, except that 1.15 g (7.58 mmol) of 2-hydroxy-5-methoxybenzaldehyde was used instead of 3-t-butylsalicylaldehyde. The solvent was distilled off to obtain 1.69 g (7.43 mmol, yield: 98%) of a compound (ligand precursor (L8)) represented by the following formula (L8) as an orange oil.

FD-mass spectrometry: 227

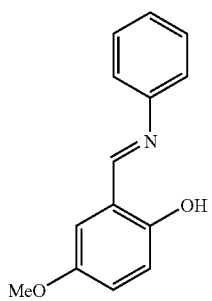

(L8)

Synthesis Example 9

Synthesis of Ligand Precursor (L9)

Reaction was carried out in the same manner as in Synthesis Example 1, except that 2.05 g (7.62 mmol) of n-octadecyl amine was used instead of aniline, 0.95 g (7.56 mmol) of salicyl aldehyde was used instead of 3-t-butylsalicylaldehyde, and as a solvent 120 ml of a toluene/ethanol mixed solvent (volume ratio: 5/1) was used instead of ethanol. The solvent was distilled off to obtain 2.75 g (7.35 mmol, yield: 97%) of a compound (ligand precursor (L9)) represented by the following formula (L9) as a yellow oil.

FD-mass spectrometry: 373

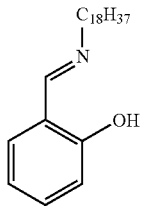

(L9)

Synthesis Example 10

Synthesis of Ligand Precursor (L10)

Reaction was carried out in the same manner as in Synthesis Ex-ample 1, except that 0.34 g (3.81 mmol) of 1,4-tetramethylenediamine was used instead of aniline and 0.95 g (7.58 mmol) of salicyl aldehyde was used instead of 3-t-butylsalicylaldehyde, and that the reaction was carried out under reflux while dewatering through a Dean and Stark tube. After the solvent was distilled off, the resultant product was recrystallized from hot methanol (MeOH) to obtain 0.56 g (1.90 mmol, yield: 50%) of a compound (ligand precursor (L10)) represented by the following formula (L10) as yellow crystals.

FD-mass spectrometry: 296

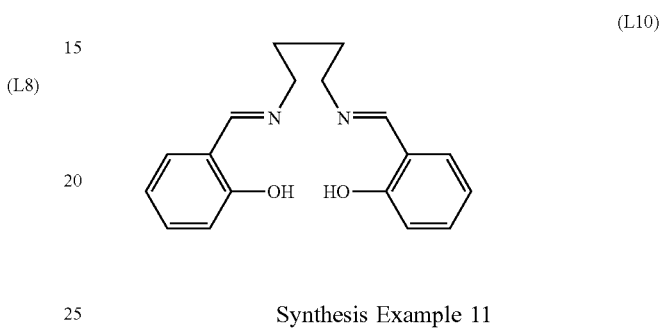

(L10)

Synthesis Example 11

Synthesis of Ligand Precursor (L11)

Reaction was carried out in the same manner as in Synthesis Example 1, except that 0.44 g (3.81 mmol) of 1,6-hexamethylenediamine was used instead of aniline and 0.95 g (7.58 mmol) of salicyl aldehyde was used instead of 3-t-butylsalicylaldehyde, and that the reaction was carried out under reflux while dewatering through a Dean and Stark tube. After the solvent was distilled off, the resultant product was recrystallized from hot MeOH to obtain 1.13 g (3.49 mmol, yield: 92%) of a compound (ligand precursor (L11)) represented by the following formula (L11) as yellow crystals.

FD-mass spectrometry: 324

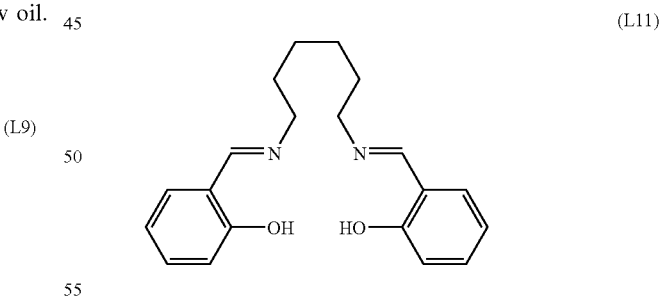

(L11)

Synthesis Example 12

Synthesis of Ligand Precursor (L12)

Reaction and purification were carried out in the same manner as in Synthesis Example 1, except that 0.82 g (7.62 mmol) of 2-(aminomethyl)pyridine was used instead of aniline, to thereby obtain 1.83 g (6.82 mmol, yield: 90%) of a compound (ligand precursor (L12)) represented by the following formula (L12) as a yellow oil.

(L12)

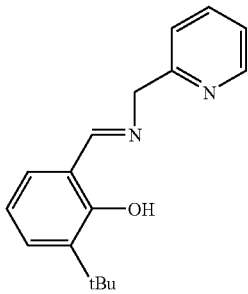

Synthesis Example 13

Synthesis of Ti-L1 Complex

To a 300-ml reactor thoroughly dried and purged with argon, 1.785 g (7.05 mmol) of the ligand precursor (L1) and 100 ml of diethyl ether were introduced, and they were cooled to −78° C. and stirred. To the resulting mixture, 4.78 ml of n-butyllithium (1.55 mmol/ml-n-hexane solution, 7.40 mmol) was dropwise added over a period of 5 minutes, and they were slowly heated to room temperature and continuously stirred at room temperature for 4 hours to prepare a lithium salt solution. The solution was dropwise added slowly to a mixture solution of 7.05 ml (0.5 mmol/ml-heptane solution, 3.53 mmol) of a titanium tetrachloride solution and 40 ml of diethyl ether, said mixture having been cooled to −78° C. After the dropwise addition was completed, the reaction solution was slowly heated to room temperature with stirring. The reaction solution was further stirred for another 8 hours at room temperature, and the solution was filtered through a glass filter to obtain a solid. The solid was dissolved in and washed with 50 ml of methylene chloride, and the insolubles were removed. The filtrate was concentrated under reduced pressure to precipitate a solid. The solid was dissolved in 10 ml of methylene chloride and 70 ml of pentane was slowly added to the solution with stirring. The mixture solution was allowed to stand at room temperature to precipitate reddish brown crystals. The crystals were filtered through a glass filter and washed with pentane. The resultant crystals were vacuum dried to obtain 1.34 g (2.15 mmol, yield: 61%) of a complex (1) represented by the following formula as reddish brown crystals.

(1)

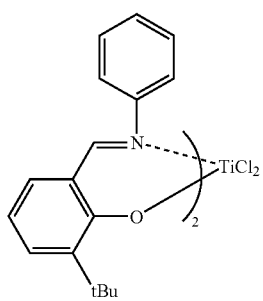

FD-mass spectrometry: 268

$^1$H-NMR(CDCl$_3$): 1.35(s,18 H), 6.82–7.43(m,16H) 8.07 (s,2H) IR(KBr): 1550, 1590, 1600 cm$^{31}$ $^1$ FD-mass spectrometry: 622 (M$^+$) Elemental analysis: Ti, 7.7% (7.7); C, 65.8% (65.5); H, 6.0% (5.8); N, 4.5% (4.5). *The value in ( ) is calculated value.

Synthesis Example 14

Synthesis of Ti-L3 Complex

In a 100-ml reactor thoroughly dried and purged with argon, 16 ml of a diethyl ether solution of the ligand precursor (L3) (1.04 g, 6.08 mmol) obtained in Synthesis Example 3 was introduced and cooled to −78° C. To the solution, 4.2 ml (6.08 mmol) of a 1.45 N n-BuLi/hexane solution was dropwise added, and they were slowly heated to room temperature. The resultant solution was dropwise added slowly to a mixture solution of 6.08 ml of a titanium tetrachloride solution (0.5 mmol/ml-heptane solution, 3.04 mmol) and 16 ml of diethyl ether, said mixture having been cooled to −78° C. After the dropwise addition was completed, the reaction solution was slowly heated to room temperature with stirring. The reaction solution was further stirred for another 8 hours at room temperature, and the reaction solution was filtered through a glass filter. The filtrate was concentrated under reduced pressure to precipitate a solid. The solid was dissolved in 5 ml of methylene chloride, and 10 ml of hexane was slowly added to the solution with stirring. The mixture was allowed to stand at room temperature to precipitate a blackish brown solid. The solid was filtered through a glass filter and washed with pentane. The resultant product was vacuum dried to obtain 1.10 g (2.40 mmol, yield: 79%) of a complex (2) represented by the following formula as a blackish brown solid.

(2)

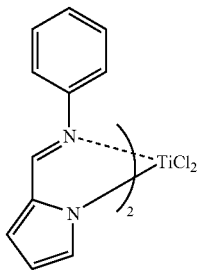

$^1$H-NMR(CDCl$_3$): 6.0–7.9(m,16H), 7.80(s,2H) FD-mass spectrometry: 456 (M$^+$) Elemental analysis Ti, 10.4% (10.5). *The value in ( ) is calculated value.

Synthesis Example 15

Synthesis of Ti-L4 Complex 618 mg of the ligand precursor (L4) obtained in Synthesis Example 4 was dissolved in 10 ml of toluene, and the resultant solution was dropwise added to 10 ml of a toluene solution of titanium chloride (0.1 mol/l) at room temperature with stirring. After the stirring was carried out at the same temperature for 24 hours, the reaction mixture was filtered through a glass filter. To the resultant filtrate, 10 ml of n-hexane was added, and the mixture was allowed to stand at −40° C. for 5 hours to obtain a solid. The solid was separated by filtration to obtain 241 mg (yield: 33%) of a complex (3) represented by the following formula as reddish brown crystals.

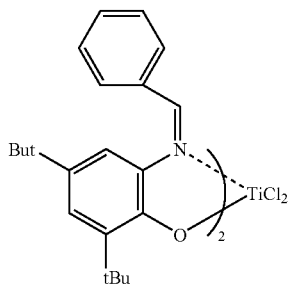

(3)

FD-MS:734 (M$^+$), 307 (ligand fragment)

Synthesis Example 16

Synthesis of V-L2 Complex (1)

To a 300-ml reactor thoroughly dried and purged with argon, 0.99 g (5.0 mmol) of the ligand precursor L2 and 100 ml of THF were introduced, and they were cooled to –78° C. and stirred. To the resulting mixture, 3.23 ml of n-butyllithium (1.55 mmol/ml-n-hexane solution, 5.0 mmol) was dropwise added over a period of 5 minutes, and they were slowly heated to room temperature and continuously stirred at room temperature for 4 hours to prepare a lithium salt solution. The solution was dropwise added slowly to a mixture solution of 0.62 g (1.67 mmol) of VCl$_3$.(THF)$_3$ and 40 ml of THF, said mixture having been cooled to –78° C. After the dropwise addition was completed, the reaction solution was slowly heated to room temperature with stirring. The reaction solution was further stirred for another 5 hours at room temperature, and THF was distilled off under reduced pressure to obtain a solid. The solid was dissolved in methylene chloride, and the insolubles were removed by filtration. The filtrate was concentrated and pentane was slowly added to the concentrate with stirring to precipitate a reddish brown solid. The solid was separated by filtration through a glass filter and washed with pentane. The resultant solid was vacuum dried to obtain 0.44 g (0.69 mmol, yield: 41%) of a complex (4) represented by the following formula.

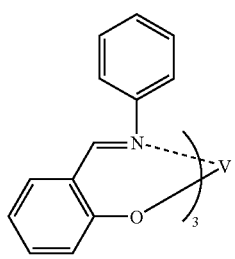

(4)

FD-MS: 639 (M$^+$)

Synthesis Example 17

Synthesis of V-L2 Complex (2)

3.30 g (13 mmol) of (VO) (SO$_4$).5H$_2$O was introduced and dissolved in 100 ml of pure water, and the aqueous solution was dropwise added to a solution of 5.13 g (26 mmol) of the ligand precursor L2 and 100 ml of 95% ethanol. To the mixture, further 50 ml of an aqueous solution of 4.6 g (56 mmol) of sodium acetate was added and the reaction solution was stirred for 20 minutes under reflux. The reaction solution was allowed to stand at room temperature for 2 hours to precipitate a dark green powder. The powder was separated by filtration through a glass filter and washed with water, ethanol and ether. The resultant powder was vacuum dried to obtain 4.48 g (9.75 mmol, yield: 75%) of a complex (5) represented by the following formula.

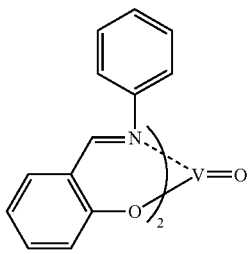

(5)

FD-MS: 459 (M$^+$)

Synthesis Example 18

Synthesis of Cr-L1 Complex

To a 300-ml reactor thoroughly dried and purged with argon, 1.785 g (7.05 mmol) of the ligand precursor (L1) and 100 ml of THF were introduced, and they were cooled to –78° C. and stirred. To the resulting mixture, 4.78 ml of n-butyllithium (1.55 mmol/ml-n-hexane solution, 7.40 mmol) was dropwise added over a period of 5 minutes, and they were slowly heated to room temperature and stirred at room temperature for 4 hours to prepare a lithium salt solution. The solution was dropwise added slowly to a mixture solution of 0.558 g (3.53 mmol) of chromium trichloride and 40 ml of THF, said mixture having been cooled to –78° C. After the dropwise addition was completed, the reaction solution was slowly heated to room temperature with stirring. The reaction solution was further stirred for another 5 hours at room temperature, and the reaction solution was filtered through a glass filter to obtain a solid. The solid was dissolved in and washed with 50 ml of methylene chloride to remove insolubles. The filtrate was vacuum dried, and reprecipitated with ether/hexane to obtain a green powder. The powder was separated by filtration through a glass filter and washed with hexane. The resultant powder was vacuum dried to obtain 1.04 g (1.76 mmol, yield: 50%) of a complex (6) represented by the following formula.

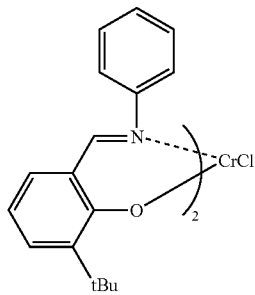

(6)

FD-mass spectrometry: 592(M⁺) Elemental analysis: Cr, 8.9% (8.8); C, 69.3% (69.0); H, 6.4% (6.1); N, 5.0% (4.7).
*The value in ( ) is calculated value.

Synthesis Example 19

Synthesis of Cu-L1 Complex

To a 100-ml egg-plant flask, 500 mg (1.97 mmol) of the ligand precursor (L1) was introduced and dissolved in 30 ml of methanol, and they were heated to 50° C. Separately, to another 50-ml egg-plant flask, 200 mg (1.10 mmol) of copper acetate (II) was introduced and 15 ml of methanol was added to the flask and they were stirred with raising the temperature to 50° C. This cupper acetate-methanol solution was pippetted into the methanol solution of the above ligand precursor (L1) with stirring to immediately precipitate a brown solid. The solid precipitated was then cooled to room temperature, and was recovered by filtration with a glass filter. The solid was washed with 20 ml of methanol twice and vacuum dried to obtain 510 mg (yield: 82%) of a complex (7) represented by the-following formula as a luster brown solid.

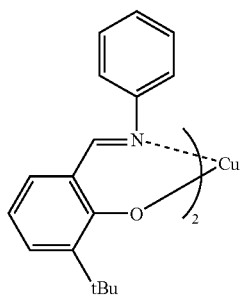

(7)

FD-mass spectrometry: 568 (M⁺)

Synthesis Example 20

Synthesis of V-L7 Complex 1.10 g (4.86 mmol) of (VO) (SO₄).5H₂O was dissolved in 25 ml of MeOH, and to the solution, a solution of 1.96 g (9.64 mmol) of the ligand precursor L7 in 25 ml of MeOH was dropwise added at room temperature. To the mixture further 1 ml of pyridine was added, and the reaction solution was stirred for 2 hours under reflux. The resultant reaction solution was allowed to stand at room temperature for 2 hours to precipitate a green powder. The powder was filtered off through a glass filter and washed with methanol. Then, the resultant powder was vacuum dried to obtain 1.25 g (2.65 mmol, yield: 55%) of a complex (8) represented by the following formula as a green power.

FD-mass spectrometry: 471 (M⁺)

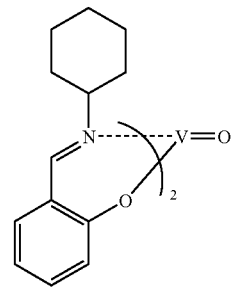

(8)

Synthesis Example 21

Synthesis of V-L8 Complex

Reaction and purification were carried out in the same manner as in Synthesis Example 20, except that 2.19 g (9.64 mmol) of the ligand precursor (L8) was used instead of the ligand precursor (L7) and the reaction time was changed to 4 hours, to thereby obtain 0.39 g (0.74 mmol, yield: 15%) of a complex (9) represented by the following formula as a blue green power.

FD-mass spectrometry: 419 (M⁺)

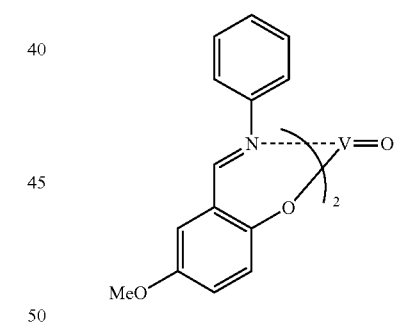

(9)

Synthesis Example 22

Synthesis of V-L9 Complex

Reaction was carried out in the same manner as in Synthesis Example 20, except that 3.60 g (9.64 mmol) of the ligand precursor (L9) was used instead of the ligand precursor (L7) and the reaction solvent was changed to a toluene/methanol mixed solvent (volume ratio; 1/1) After the solvent was distilled off, the resultant product was extracted with hexane, followed by evaporation to dryness. As a result, 2.39 g (2.94 mmol, yield: 61%) of a complex (10) represented by the following formula was obtained as a light brown power.

FD-mass spectrometry: 811 (M⁺)

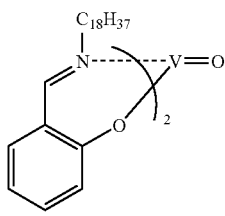

(10)

Synthesis Example 23

Synthesis of V-L10 Complex

Reaction and purification were carried out in the same manner as in Synthesis Example 20, except that 1.44 g (4.86 mmol) of the ligand precursor (L10) was used instead of the ligand precursor (L7), the solvent amount was changed to 100 ml and the pyridine amount was changed to 2 ml. As a result, 1.13 g (3.12 mmol, yield: 64%) of a complex (11) represented by the following formula was obtained as a yellowish green power.

FD-mass spectrometry: 361 (M$^+$)

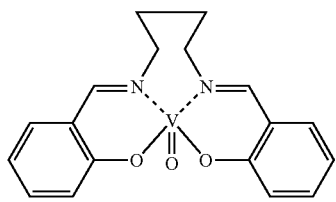

(11)

Synthesis Example 24

Synthesis of V-L11 Complex

Reaction and purification were carried out in the same manner as in Synthesis Example 20, except that 1.58 g (4.86 mmol) of the ligand precursor (L11) was used instead of the ligand precursor (L7), the solvent amount was changed to 100 ml and the pyridine amount was changed to 2 ml. As a result, 1.02 g (2.61 mmol, yield: 54%) of a complex (12) represented by the following formula was obtained as a yellowish green power.

FD-mass spectrometry: 389 (M$^+$)

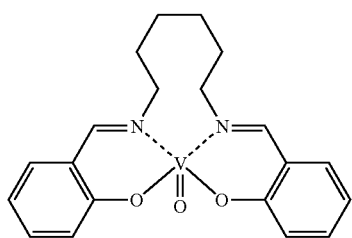

(12)

Synthesis Example 25

Synthesis of V-L12 Complex

To a 100-ml reactor thoroughly dried and purged with argon, 0.43 g (1.61 mmol) of the ligand precursor (L12) and 15 ml of diethylether were introduced, and they were cooled to −78° C. and stirred. To the resulting mixture, 1.00 ml of n-butyllithium (1.59 mmol/ml-n-hexane solution, 1.59 mmol) was dropwise added over a period of 10 minutes, and they were slowly heated to room temperature and stirred at room temperature for 4 hours to prepare a lithium salt solution.

The solution was dropwise added slowly to a solution 0.59 g (1.57 mmol) of VCl$_3$(thf)$_3$ in 15 ml of diethylether, having been cooled to −0° C. After the dropwise addition was completed, the reaction solution was slowly heated to room temperature with stirring. The reaction solution was further stirred for another 3 hours at room temperature. After the stirring, the solvent was distilled off under reduced pressure. Then the remained yellowish brown solid was extracted with 30 ml of methylene chloride. The extract was filtered through a glass filter to concentrate to about 10 ml, and then 15 ml of hexane was added thereto. The precipitated solid was filtered off through a glass filter, washed with pentane and then vacuum dried to obtain 0.37 g (0.10 mmol, yield: 60%) of a complex (13) represented by the following formula (13) as a yellowish brown power.

FD-mass spectrometry: 388

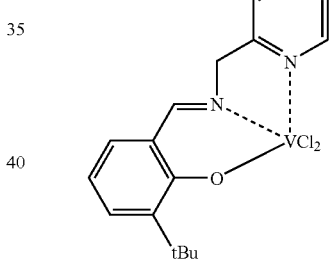

(13)

Synthesis Example 26

Synthesis of Ti-L6 Complex

In a 50-ml Schlenk flask thoroughly degassed and purged with argon, 0.85 g (3.9 mmol) of the ligand precursor (L6) was dissolved in 15 ml of diethylether, and the solution was cooled to −78° C. To the mixture, 2.48 ml (3.9 nmol) of butyllithium (1.6 M hexane solution) was slowly added with stirring, and the resultant mixture was gradually heated to room temperature to prepare a lithium salt solution of the ligand.

On the other hand, to another Schlenk flask thoroughly degassed and purged with argon, 3.86 ml (1.93 mmol) of titanium tetrachloride (0.5 M heptane solution) was introduced at −78° C., and further 6 ml of diethylether was added, and the mixture was slowly heated to room temperature with stirring. The solution was again cooled down to −78° C., and to the solution, the former prepared lithium salt solution of the ligand was dropwise added. The resultant mixture was stirred overnight at room temperature. After the solvent was distilled off with a vacuum pump, 30 ml of dichloromethane was added to filer off insolubles. The filtrate was concentrated and subjected to recrystallization with a hexane-dichloromethane solvent to obtain 0.94 g (yield: 87%) of a complex (14) represented by the following formula as a dark purple solid.

FD-mass spectrometry: 556

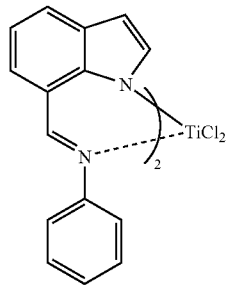

(14)

Synthesis Example 27

Synthesis of V-L4 Complex

In 50 ml of hexane, 2.50 g (8.1 mmol) of the ligand precursor (L4) was dissolved, and to the solution, 4.0 ml (6.4 mmol) of a n-butyllithium hexane solution (1.6 M) was dropwise added at room temperature with stirring. After stirring for 1 hour at the same temperature, the resulting yellow precipitate was separated by filtration through a glass filter, washed with 15 ml of n-hexane and then dried under vacuum to obtain 1.79 g of a lithium phenoxide derivative as a starting materiel compound. This compound was dissolved in 50 ml of THF at room temperature, and the resulting solution was dropwise added to 125 ml (2.86 mmol) of a vanadium trichloride THF solution (0.023 M) having been cooled to −78° C., with stirring. After the dropwise addition was completed, the reaction solution was heated to room temperature and stirred for 12 hours. Then, the solvent was removed under vacuum, and 50 ml of toluene was added at room temperature to prepare a solution. The solution was filtered through a glass filter to remove an inorganic salt contained in the solution. Then, the solution was concentrated to about 10 ml. To the solution, 80 ml of n-hexane was added, and they were stirred for one hour. Then, the resulting precipitate was filtered off through a glass filter, washed with 20 ml of n-hexane and dried under vacuum to obtain 1.23 g of a complex (15) represented by the following structural formula (brown powder, yield: 46%).

FD-MS (m/z): 703 (intensity 100%, M$^+$) 309 (intensity 58%, ligand fragment)

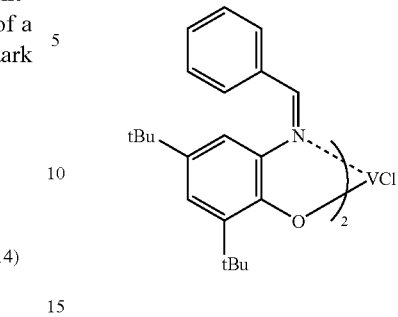

(15)

Synthesis Example 28

Synthesis of V-L5 Complex

Reaction and purification were carried out in the same manner as in Synthesis Example 27, except that the ligand precursor (L5) was used in place of the ligand precursor (L4). As a result, 1.23 g of a complex (16) represented by the following structural formula was obtained (brown powder, yield: 48%).

FD-MS (m/z): 478 (intensity 100%, M$^+$), 197 (intensity 52%, ligand fragment)

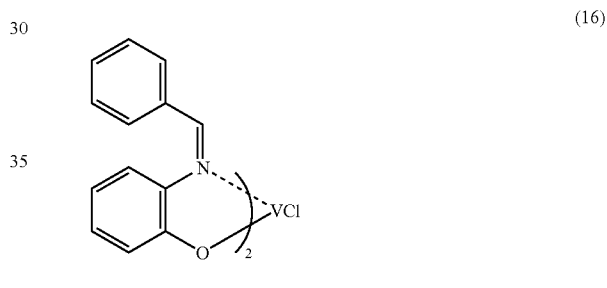

(16)

Example 1

Ethylene-Norbornene Dicarboxylic Acid Anhydride Copolymer Using Complex (1)

To a 500-ml glass autoclave thoroughly purged with nitrogen, 250 ml of toluene was introduced, and the liquid phase and the gas phase were saturated with 0.5 mmcl of norbornene-2,3-dicarboxylic acid anhydride (hereinafter referred simply to as "NDCA") and 100 l/hr of ethylene. Thereafter, 2.50 mmol (in terms of aluminum atom) of methylaluminoxane was added, and then 0.005 mmol of the complex (1) obtained in Synthesis Example 13 was added to initiate polymerization. The reaction was conducted at 25° C. for 10 minutes in an ethylene gas atmosphere at atmospheric pressure. Then, a small amount of isobutanol was added to terminate the polymerization. After the polymerization was completed, the reaction product was introduced into a large amount of methanol to precipitate a total amount of a polymer. Then, hydrochloric acid was added, and the mixture was filtered through a glass filter. The resulting polymer was sufficiently washed with methanol, and then further vacuum dried at 80° C. for 10 hours to obtain 1.15 g of a polymer.

Measurements of IR and $^{13}$C-NMR of the polymer obtained were carried out. As a result, the polymer proved to be an ethylene/NDCA copolymer containing 0.02 mol % of NDCA.

Further, the coordination energy difference ΔE was calculated under the conditions that in the chemical formulas (2) and (3) described above, the ligand L was a ligand of the complex (1), the number a of the ligands was 2, and the central metal M was Ti (IV) As a result, the coordination energy difference ΔE was 20.3 kJ/mol.

Example 2

Ethylene-Maleic Anhydride Copolymer Using Complex (2)

Polymerization and post-treatment were carried out in the same manner as in Example 1 except that the complex (2) obtained in Synthesis Example 14 was used instead of the complex (1) and 0.5 mmol of maleic anhydride was used instead of the NDCA, to thereby obtain 0.06 g of a polymer.

Measurements of IR and $^{13}$C-NMR of the polymer obtained were carried out. As a result, the polymer proved to be an ethylene/maleic anhydride copolymer containing 0.01 mol % of maleic anhydride.

Further, the coordination energy difference ΔE was calculated under the conditions that in the chemical formulas (2) and (3) described above, the ligand L was a ligand of the complex (2), the number a of the ligands was 2, and the central metal M was Ti (IV). As a result, the coordination energy difference ΔE was 43.6 kJ/mol.

Example 3

Ethylene-Norbornene Dicarboxylic Acid Anhydride Copolymer Using Complex (3)

To a 500-ml glass autoclave thoroughly purged with nitrogen, 250 ml of toluene was introduced, and the liquid phase and the gas phase were saturated with 100 l/hr of ethylene. Thereafter, 0.5 mmol of NDCA and 0.25 mmol of triisobutylalminum were added, and then 0.005 mmol of the complex (3) obtained in Synthesis Example 15 and 0.006 mmol of triphenylcarbeniumtetrakis(pentafluorophenyl)borate were added to initiate polymerization. The reaction was conducted at 75° C. for 30 minutes in an ethylene gas atmosphere at atmospheric pressure. Then, a small amount of isobutanol was added to terminate the polymerization. After the polymerization was completed, the reaction product was introduced into a large amount of methanol to precipitate a total amount of a polymer. Then, hydrochloric acid was added, and the mixture was filtered through a glass filter. The resulting polymer was sufficiently washed with methanol, and then further vacuum dried at 80° C. for 10 hours to obtain 0.13 g of a polymer.

Measurements of IR and $^{13}$C-NMR of the polymer obtained were carried out. As a result, the polymer proved to be an ethylene/NDCA copolymer containing 0.02 mol % of NDCA.

Further, the coordination energy difference ΔE was calculated under the conditions that in the chemical formulas (2) and (3) described above, the ligand L was a ligand of the complex (3), the number a of the ligands was 2, and the central metal M was Ti (IV). As a result, the coordination energy difference ΔE was 24.2 kJ/mol.

Example 4

Ethylene-Norbornene Dicarboxylic Acid Anhydride Copolymer Using Complex (4)

To a 500-ml glass autoclave thoroughly purged with nitrogen, 250 ml of toluene was introduced, and the liquid phase and the gas phase were saturated with 100 l/hr of ethylene. Thereafter, 0.5 mmol of NDCA and 0.1 mmol of diethylaluminum chloride were added, and then 0.5 mmol of ethyltrichloroacetate and 0.005 mmol of the complex (4) obtained in Synthesis Example 16 were added to initiate polymerization. The reaction was conducted at 25° C. for 10 minutes in an ethylene gas atmosphere at atmospheric pressure. Then, a small amount of isobutanol was added to terminate the polymerization. After the polymerization was completed, the reaction product was introduced into a large amount of methanol to precipitate a total amount of a polymer. Then, hydrochloric acid was added, and the mixture was filtered through a glass filter. The resulting polymer was sufficiently washed with methanol, and then vacuum dried at 80° C. for 10 hours to obtain 0.38 g of a polymer.

Measurements of IR and $^{13}$C-NMR of the polymer obtained were carried out. As a result, the polymer proved to be an ethylene/NDCA copolymer containing 0.03 mol % of NDCA.

Further, the coordination energy difference ΔE was calculated under the conditions that in the chemical formulas (2) and (3) described in claim 1, the ligand L was a ligand of the complex (4), the number a of the ligands was 2, and the central metal M was V (III). As a result, the coordination energy difference ΔE was −26.9 kJ/mol.

Example 5

Ethylene-Norbornene Dicarboxylic Acid Anhydride Copolymer Using Complex (5)

Polymerization and post-treatments were carried out in the same manner as in Example 4 except that 0.5 mmol of the complex (5) obtained in Synthesis Example 17 was used instead of the complex (4), to thereby obtain 0.24 g of a polymer.

Measurements of IR and $^{13}$C-NMR of the polymer obtained were carried out. As a result, the polymer proved to be an ethylene/NDCA copolymer containing 0.02 mol % of NDCA.

Further, the coordination energy difference ΔE was calculated under the conditions that in the chemical formulas (2) and (3) described in claim 1, the ligand L was a ligand of the complex (5), the number a of the ligands was 2, and the central metal M was V (IV). As a result, the coordination energy difference ΔE was 9.1 kJ/mol.

Example 6

Ethylene-Norbornene Dicarboxylic Acid Anhydride Copolymer Using Complex (6)

Polymerization and post-treatments were carried out in the same manner as in Example 1 except that the complex (6) obtained in Synthesis Example 18 was used instead of the complex (1), to thereby obtain 0.05 g of a polymer.

Measurements of IR and $^{13}$C-NMR of the polymer obtained were carried out. As a result, the polymer proved to be an ethylene/NDCA copolymer containing 0.02 mol % of NDCA.

Example 7

Ethylene-Methylmethacrylate Copolymer Using Complex (7)

To a 500-ml glass polymerization reactor (equipped with a stirring blade) thoroughly purged with nitrogen, 250 ml of toluene was introduced, and ethylene was blown into the toluene through a blowing tube for 10 minutes with slowly stirring. Thereafter, 3.39 ml (5 mmol) of a toluene solution of methylaluminoxane (Al concentration: 1.475 M), 2.5 ml (0.025 mmol) of a toluene solution of the complex (7) (0.01 M) and 2 ml of methylmethacrylate were successively added and stirred at 20° C. for 6 hours (600 rpm) with blowing ethylene at 50 l/hr. To the reaction solution, 25 ml of isobutanol and 5 ml of hydrochloric acid were added to terminate the reaction. After stirring was carried out at room temperature for 30 minutes, 1.5 liters of methanol was added to the reaction solution to obtain a slurry. The slurry was recovered by filtration to obtain 958 mg of a polymer. The obtained polymer was determined by IR, and as a result, it was found to be an ethylene-methylmethacrylate copolymer containing carbonyl groups derived from methylmethacrylate.

Example 8

Ethylene-Maleic Anhydride Copolymer Using Complex (1)

Polymerization and post-treatments were carried out in the same manner as in Example 1 except that maleic anhydride was used instead of the NDCA, to thereby obtain 0.30 g of a polymer.

Measurements of IR and $^{13}$C-NMR of the polymer obtained were carried out. As a result, the polymer proved to be an ethylene/maleic anhydride copolymer containing 0.02 mol % of maleic anhydride.

Example 9

Copolymerization of Ethylene and Norbornenedicarboxylic Acid Using Complex (14)

Polymerization and after-treatments were carried out in the same manner as in Example 1, except that the complex (14) obtained in Synthesis Example 26 was used in place of the complex (1), the amount of NDCA was changed to 2.0 mmol, and the polymerization time was changed to 60 minutes. As a result, 0.03 g of a polymer was obtained. Then, measurements of IR and $^{13}$C-NMR of the polymer obtained were carried out. As a result, the polymer proved to be an ethylene/NDCA copolymer containing NDCA in an amount of 0.02 mol based on 100 mol of the ethylene unit.

Comparative Example 1

Polymerization was carried out in the same manner as in Example 1, except that dicyclopentadienyltitanium dichloride ($CP_2TiCl_2$) was used in place of the complex (1). As a result, any polymer was not obtained.

Further, the coordination energy difference $\Delta E$ was calculated under the conditions that in the chemical formulas (2) and (3) described in claim 1, the ligand L was a cyclopentadienyl group, the number a of the ligands was 2, and the central metal M was Ti (IV). As a result, the coordination energy difference $\Delta E$ was 93.1 kJ/mol.

Comparative Example 2

Polymerization was carried out in the same manner as in Example 5, except that dicyclopentadienyltitanium dichloride was used in place of the complex (5). As a result, any polymer was not obtained.

Examples 10–17

Copolymerization of Ethylene and Polar Olefin Using Complexes (5) and (15)

In a 500 ml glass autoclave thoroughly purged with nitrogen, 250 ml of hexane was placed, and ethylene was fed at a feed rate shown in Table 1 to saturate the liquid phase and the gas phase with ethylene. Thereafter, a polar olefin shown in Table 1, diethylaluminum chloride or ethylaluminum dichloride as a co-catalyst and then the complex (5) or the complex (15) as a catalyst were added in amounts shown in Table 1 to initiate polymerization. With blowing ethylene into the autoclave, polymerization was conducted at 25° C. for a period of time shown in Table 1, and then a small amount of isobutanol was added to terminate the polymerization. After the polymerization was completed, the reaction product was introduced into a large amount of methanol acidified with hydrochloric acid, to precipitate the whole polymer, followed by filtration through a glass filter. The polymer was sufficiently washed with methanol and then vacuum dried at 80° C. for 10 hours.

The yield of the polymer, (η) and a polar olefin content determined by $^{13}$C-NMR are set forth in Table 1. In all polymers obtained, a polar olefin was contained, and the polymers obtained were ethylene/polar olefin copolymers.

TABLE 1

| | | | Example 10 | Example 11 | Example 12 | Example 13 |
|---|---|---|---|---|---|---|
| polymerization conditions | polar olefin | type | methyl acrylate (COOMe) | 4-ethyl pentenoate (COOEt) | | norbornene carboxylate (COOEt) |
| | | amount (mmol) | 6 | 6 | 6 | 6 |
| | catalyst | type | complex(5) | complex(5) | complex(15) | complex(5) |
| | | amount (mmol) | 0.04 | 0.04 | 0.04 | 0.04 |

TABLE 1-continued

|  |  |  |  |  |  |  |
|---|---|---|---|---|---|---|
|  | co-catalyst | type | DCL | DCL | DCL | DCL |
|  |  | amount (mmol) | 8 | 8 | 8 | 8 |
|  | ethylene flow rate (L/hr) |  | 100 | 100 | 100 | 100 |
|  | polymerization time (min) |  | 5 | 30 | 30 | 30 |
| polymerization results | polymer yield (g) |  | 1.47 | 0.31 | 0.35 | 0.38 |
|  | [η] (dl/g) |  | 7.42 | 1.09 | 1.15 | 1.18 |
|  | polar olefin content (mol %) |  | 0.03 | 0.26 | 0.54 | 0.30 |

|  |  |  | Example 14 | Example 15 | Example 16 | Example 17 |
|---|---|---|---|---|---|---|
| polymerization conditions | polar olefin | type | _____ undecenol _____OH | | | |
|  |  | amount (mmol) | 6 | 6 | 40 | 40 |
|  | catalyst | type | complex(5) | complex(15) | complex(5) | complex(15) |
|  |  | amount (mmol) | 0.04 | 0.04 | 0.025 | 0.025 |
|  | co-catalyst | type | DEAC | DEAC | DEAC | DEAC |
|  |  | amount (mmol) | 8 | 8 | 50 | 50 |
|  | ethylene flow rate (L/hr) |  | 100 | 100 | 2 | 2 |
|  | polymerization time (min) |  | 5 | 5 | 60 | 90 |
| polymerization results | polymer yield (g) |  | 2.74 | 3.14 | 3.76 | 3.76 |
|  | [η] (dl/g) |  | 5.30 | 5.12 | 1.02 | 1.50 |
|  | polar olefin content (mol %) |  | 0.80 | 0.40 | 6.7 | 6.3 |

(*): DEAC = diethylaluminumchloride, DCL = ethylaluminumdichloride

Examples 18–21

Copolymerization of Ethylene and Methyl Acrylate Using Complexes (8), (9), (10) and (13)

Polymerization and after-treatments were carried out in the same manner as in Example 10, except that the complex used as a catalyst was replaced with a complex shown in Table 2.

The yield of the polymer, (η) and a methyl acrylate content determined by $^{13}$C-NMR are set forth in Table 2, in which the results of Example 10 are also set forth. In all polymers obtained, methyl acrylate was contained, and the polymers obtained were ethylene/methyl acrylate copolymers.

TABLE 2

| catalyst | Example 10 Complex (5) | Example 18 Complex (8) | Example 19 Complex (9) | Example 20 Complex (10) | Example 21 Complex (13) | Example 22 Complex (11) | Example 23 Complex (12) |
|---|---|---|---|---|---|---|---|
| polymer yield (g) | 1.47 | 0.07 | 2.15 | 0.5 | 1.48 | 1.77 | 0.89 |
| [η] (dl/g) | 7.42 | 7.56 | 7.38 | 7.58 | 8.24 | 7.15 | 7.26 |
| methyl acrylate content (mol %) | 0.03 | 0.05 | 0.02 | 0.08 | 0.02 | 0.07 | 0.05 |

The yield of the polymer, (η) and a methyl acrylate content determined by 13C-NMR are set forth in Table 2, in which the results of Example 10 wherein the polymerization was conducted under the same conditions are also set forth. In all polymers obtained, methyl acrylate was contained, and the polymers obtained were ethylene/methyl acrylate copolymers.

Examples 22–23

Copolymerization of Ethylene and Methyl Acrylate Using Complexes (11) and (12)

Polymerization and after-treatments were carried out in the same manner as in Example 10, except that 4 mmol of ethyl trichloroacetate was added prior to the addition of the catalyst at the beginning of the polymerization and the complex used as a catalyst was replaced with a complex shown in Table 2.

The yield of the polymer, (η) and a methyl acrylate content determined by $^{13}$C-NMR are set forth in Table 2, in which the results of Example 10 are also set forth. In all polymers obtained, methyl acrylate was contained, and the polymers obtained were ethylene/methyl acrylate copolymers.

Examples 24–28

Copolymerization of Ethylene, Propylene and Methyl Acrylate Using Complexes (5) and (15)

In a 500 ml glass autoclave thoroughly purged with nitrogen, 250 ml of hexane was placed, and an ethylene/propylene mixed gas was fed at a feed rate shown in Table 3 to saturate the liquid phase and the gas phase with the mixed gas Thereafter, 6 mmol of methyl acrylate, 8 mmol of diethylaluminum chloride or ethylaluminum dichloride as a co-catalyst and then 0.04 mmol of the complex (5) or the complex (15) as a catalyst were added to initiate polymerization. With blowing the ethylene/propylene mixed gas into the autoclave, polymerization was conducted at 25° C. for a period of time shown in Table 3, and then a small amount of isobutanol was added to terminate the polymerization. After the polymerization was completed, the reaction product was introduced into a large amount of methanol acidified with hydrochloric acid, to precipitate the whole polymer, followed by filtration through a glass filter. Then, operations of sufficiently washing the polymer with methanol, dissolving the polymer in hot toluene and introducing the resulting solution into a large amount of methanol to precipitate a polymer were repeated twice to purify the polymer. Thereafter, the polymer was vacuum dried at 130° C. for 10 hours.

The yield of the polymer, ($\eta$), and a propylene content and a methyl acrylate content determined by $^{13}$C-NMR are set forth in Table 3. In all polymers obtained, methyl acrylate was contained, and the polymers obtained were ethylene/propylene/methyl acrylate copolymers.

The monomer-monomer sequence distribution of the copolymer obtained in Example 26 was measured by $^{13}$C-NMR, and as a result, the copolymer had an ethylene-ethylene sequence proportion of 65.4 mol %, an ethylene-propylene sequence proportion of 32.0 mol %, an ethylene-methyl acrylate sequence proportion of 0 .2 mol %, a propylene-propylene sequence proportion of 1.6 mol %, a propylene-methyl acrylate sequence proportion of 0.7 mol % and a methyl acrylate-methyl acrylate sequence proportion of 0.1 mol %.

of the polymer obtained was carried out, and as a result, the polymer proved to be an ethylene/propylene/methyl acrylate copolymer containing 0.6 mol % of methyl acrylate. The propylene content was 19.4 mol %, and ($\eta$) was 2.31 dl/g.

Example 31

Measurement of Heat-Sealing Strength of Ethylene/Propylene/Methyl Acrylate Copolymer to Aluminum A sheet (thickness: 100 μm) of the copolymer obtained in Example 30 was prepared, and the sheet was cut into a strip. The strip was interposed between aluminum foils (thickness: 50 pm) having the same width as that of the strip, and they were heat-sealed at 200° C. for 5 seconds by a heat sealer. From the sealed portion, a strip having a width of 15 mm was cut out, and the peel strength was measured under the conditions of a peel angle of 180° and a peel rate of 200 m/min. As a result, the peel strength was 0.90 kg/15 min.

On the other hand, the peel strength of an ethylene/propylene copolymer (propylene content: 18.4 mol %, ($\eta$):

TABLE 3

| catalyst | Example 24 Complex (5) | Example 25 Complex (5) | Example 26 Complex (15) | Example 27 Complex (16) | Example 28 Complex (15) |
| --- | --- | --- | --- | --- | --- |
| co-catalyst (*) | DEAC | DCL | DCL | DCL | DCL |
| ethylene/propylene flow rate (L/hr) | 60/40 | 60/40 | 60/40 | 60/40 | 60/80 |
| polymerization time (min) | 5 | 5 | 10 | 10 | 10 |
| polymer yield (g) | 0.14 | 0.71 | 4.57 | 1.82 | 2.52 |
| [$\eta$] (dl/g) | 1.47 | 4.67 | 3.75 | 4.01 | 3.54 |
| propylene content (mol %) | 9.0 | 13.7 | 19.0 | 17.6 | 38.6 |
| methyl acrylate content (mol %) | 0.2 | 0.5 | 0.6 | 0.3 | 1.0 |

(*) DEAC = diethylaluminumchloride DCL = ethylaluminumdichloride

Example 29

Copolymerization of Ethylene, Propylene and Methyl Acrylate Using Complex (5) (in the Presence of Ethyl Trichloroacetate)

Polymerization and after-treatments were carried out in the same manner as in Example 26, except that 4 mmol of ethyl trichloroacetate was added after the addition of ethylaluminum dichloride. As a result, 2.76 g of a polymer was obtained. Then, measurement of $^{13}$C-NMR of the polymer obtained was carried out, and as a result, the polymer proved to be an ethylene/propylene/methyl acrylate copolymer containing 1.6 mol % of methyl acrylate. The propylene content was 11.6 mol %, and ($\eta$) was 1.75 dl/g.

Example 30

Copolymerization of Ethylene, Propylene and Methyl Acrylate Using Complex (15) (in the Presence of Hydrogen)

Polymerization and after-treatments were carried out in the same manner as in Example 26, except that a mixed gas obtained by further adding 20 l/hr of hydrogen to the ethylene/propylene mixed gas was used. As a result, 2.37 g of a polymer was obtained. Then, measurement of $^{13}$C-NMR 2.29 dl/g) containing no methyl acrylate was measured in the same manner as described above. As a result, the peel strength was 0.08 kg/15 min.

It was proved that the ethylene/propylene/methyl acrylate copolymer obtained in Example 30 had a higher peel strength and higher adhesion properties to aluminum.

Example 32

Measurement of Contact Angle of Ethylene/Propylene/Methyl Acrylate Copolymer

A film of the copolymer obtained in Example 30 was prepared using a hot toluene solution of the copolymer. The film was subjected to a droplet method to measure a forward contact angle and a backward contact angle of the copolymer against water. As a result, the forward contact angle was 60°, and the backward contact angle was 93°.

On the other hand, the forward contact angle and the backward contact angle of an ethylene/propylene copolymer (propylene content: 18.4 mol %, ($\eta$): 2.29 dl/g) containing no methyl acrylate was measured in the same manner as described above. As a result, the forward contact angle was 88°, and the backward contact angle was 105°.

It was proved that the ethylene/propylene/methyl acrylate copolymer obtained in Example 30 had smaller contact angles and higher wetting properties to water.

What is claimed is:

1. A process for producing a polar olefin copolymer comprising copolymerizing a non-polar olefin and a polar olefin in the presence of a catalyst comprising:

(A3) a reaction product of (C') a compound of a transition metal selected from Groups 3 to 11 of the periodic table, which is represented by the following formula (c'):

$$MX_k \qquad (c')$$

wherein M is a transition metal atom selected from Groups 3 to 11 of the periodic table, k is a number satisfying a valence of M, and X is a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-contalning group, and when k is 2 or greater, plural atoms or groups indicated by X may be the same or different, and plural groups indicated by X may be bonded to each other to form a ring, and (A-iii) a compound represented by the following formula (III):

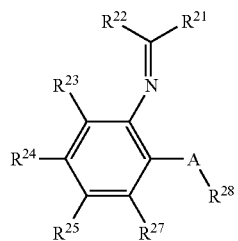

(III)

wherein A is an oxygen atom, a sulfur atom or a selenium atom, or a nitrogen atom having a substituent $R^{26}$, and $R^{21}$ to $R^{28}$ may be the same or different, they are each a hydrogen atom, a halogen atom, a hydrocarbon group, an oxygen-containing group, a sulfur-containing group, a nitrogen-containing group, a boron-containing group, an aluminum-containing group, a phosphorus-containing group, a heterocyclic compound residual group, a silicon-containing group, a germanium-containing group or a tin-containing group, two or more of them may be bonded to each other to form a ring.

2. A process for producing a polar olefin copolymer comprising copolymerizing a non-polar olefin and a polar olefin in the presence of a catalyst comprising:

(A3) a reaction product of (C') a compound of a transition metal selected from Groups 3 to 11 of the periodic table, which is represented by the following formula (c'):

$$MX_k \qquad (c')$$

wherein M is a transition metal atom selected from Groups 3 to 11 of the periodic table, k is a number satisfying a valence of M, and X is a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group, and when k is 2 or greater, plural atoms or groups indicated by X may be the same or different, and plural groups indicated by X may be bonded to each other to form a ring, and (A-iii) a compound represented by the following formula (III):

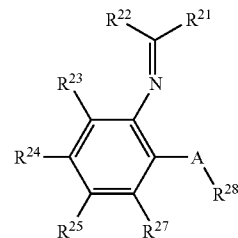

(III)

wherein A is an oxygen atom, a sulfur atom or a selenium atom, or a nitrogen atom having a substituent $R^{26}$, and $R^{21}$ to $R^{28}$ may be the same or different, they are each a hydrogen atom, a halogen atom, a hydrocarbon group, an oxygen-containing group, a sulfur-containing group, a nitrogen-containing group, a boron-containing group, an aluminum-containing group, a phosphorus-containing group, a heterocyclic compound residual group, a silicon-containing group, a germanium-containing group or a tin-containing group, two or more of them may be bonded to each other to form a ring; and (B) at least one compound selected from the group consisting of:

(B-1) an organometallic compound, (B-2) an organoaluminum oxy-compound, and (B-3) a compound which reacts with the transition metal compound (A3) to form an ion pair.

3. The process for producing a polar olefin copolymer as claimed in claim 1 or 2, wherein the compound of a transition metal represented by the formula (c') is a compound of a transition metal selected from Groups 4, 5, 6 and 11 of the periodic table.

* * * * *